US011571806B2

(12) United States Patent
Kawaguchi et al.

(10) Patent No.: US 11,571,806 B2
(45) Date of Patent: Feb. 7, 2023

(54) THREE-ROTATIONAL-DEGREE-OF-FREEDOM CONNECTION MECHANISM, ROBOT, ROBOT ARM, AND ROBOT HAND

(71) Applicant: Mitsubishi Electric Corporation, Chiyoda-ku (JP)

(72) Inventors: Noboru Kawaguchi, Chiyoda-ku (JP); Hidetaka Yamauchi, Chiyoda-ku (JP); Tomoya Hattori, Chiyoda-ku (JP); Koji Hirose, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 961 days.

(21) Appl. No.: 16/341,821

(22) PCT Filed: Sep. 11, 2017

(86) PCT No.: PCT/JP2017/032667
§ 371 (c)(1),
(2) Date: Apr. 12, 2019

(87) PCT Pub. No.: WO2018/074101
PCT Pub. Date: Apr. 26, 2018

(65) Prior Publication Data
US 2019/0240832 A1 Aug. 8, 2019

(30) Foreign Application Priority Data
Oct. 20, 2016 (JP) .............................. JP2016-205947

(51) Int. Cl.
*B25J 9/10* (2006.01)
*B25J 15/10* (2006.01)
(Continued)

(52) U.S. Cl.
CPC ................. *B25J 9/106* (2013.01); *B25J 5/00* (2013.01); *B25J 9/102* (2013.01); *B25J 9/144* (2013.01);
(Continued)

(58) Field of Classification Search
CPC ..... B25J 9/106; B25J 5/00; B25J 9/102; B25J 9/144; B25J 15/10; B25J 17/00;
(Continued)

(56) References Cited

U.S. PATENT DOCUMENTS 4,957,320 A  9/1990  Ulrich
7,099,743 B2  8/2006  Lee et al.
(Continued)

FOREIGN PATENT DOCUMENTS

JP  4-501682 A  3/1992
JP  8-11081 A  1/1996
(Continued)

OTHER PUBLICATIONS

Notice of Reasons for Refusal dated Aug. 20, 2019 in Japanese Patent Application No. 2018-237361 (with unedited computer generated English translation), 5 pages.
(Continued)

*Primary Examiner* — Zakaria Elahmadi
(74) *Attorney, Agent, or Firm* — Oblon, McClelland, Maier & Neustadt, L.L.P.

(57) ABSTRACT

A three-rotational-degree-of-freedom connection mechanism required for a robot that can make motion similar to a human has a simple structure, and there is no restriction on motion within a movable range. The three-rotational-degree-of-freedom connection mechanism includes a joint connecting a second member rotatably to a first member with three rotational degrees of freedom including rotation around a torsion axis, three actuators each including variable length
(Continued)

links having a variable length, and power sources for generating force changing the lengths of variable length links and three first-member-side link attaching units provided in first member and the second-member-side link attaching units provided on the second member such that variable length links having a twisted relationship with respect to a torsion axis exist in each state within a movable range of joint.

20 Claims, 104 Drawing Sheets

(51) Int. Cl.
| | |
|---|---|
| B25J 17/02 | (2006.01) |
| B25J 9/14 | (2006.01) |
| F16H 25/20 | (2006.01) |
| F15B 15/14 | (2006.01) |
| F15B 11/10 | (2006.01) |
| B62D 57/032 | (2006.01) |
| F16H 19/00 | (2006.01) |
| F15B 15/06 | (2006.01) |
| F16H 21/46 | (2006.01) |
| B25J 17/00 | (2006.01) |
| B25J 5/00 | (2006.01) |

(52) U.S. Cl.
CPC .............. *B25J 15/10* (2013.01); *B25J 17/00* (2013.01); *B25J 17/0283* (2013.01); *B62D 57/032* (2013.01); *F15B 11/10* (2013.01); *F15B 15/06* (2013.01); *F15B 15/14* (2013.01); *F16H 19/001* (2013.01); *F16H 21/46* (2013.01); *F16H 25/20* (2013.01); *F15B 2211/7053* (2013.01); *F15B 2211/7107* (2013.01); *F16H 2025/2043* (2013.01)

(58) Field of Classification Search
CPC .... B25J 17/0283; B62D 57/032; F15B 11/10; F15B 15/06; F15B 15/14; F15B 2211/7053; F15B 2211/7107; F16H 19/001; F16H 21/46; F16H 25/20; F16H 2025/2043
See application file for complete search history.

(56) References Cited

U.S. PATENT DOCUMENTS

| 7,498,758 | B2 * | 3/2009 | Baba | B62D 57/032 |
| | | | | 901/29 |
| 8,074,369 | B2 * | 12/2011 | McMurtry | F16C 11/0614 |
| | | | | 33/573 |
| 8,452,453 | B2 * | 5/2013 | Zhang | B25J 9/0078 |
| | | | | 901/30 |
| 8,661,928 | B1 * | 3/2014 | Tilden | B25J 18/00 |
| | | | | 901/27 |
| 9,327,785 | B2 * | 5/2016 | Alfayad | B62D 57/032 |
| 10,144,464 | B1 * | 12/2018 | Buerger | F16H 9/04 |
| 10,518,372 | B2 * | 12/2019 | Bergeron | B25J 5/007 |
| 2001/0028174 | A1 | 10/2001 | Matsuda et al. | |
| 2003/0101838 | A1 | 6/2003 | Shinozaki | |
| 2004/0133307 | A1 * | 7/2004 | Lee | B62D 57/032 |
| | | | | 700/245 |
| 2006/0012197 | A1 | 1/2006 | Anderson et al. | |
| 2007/0158964 | A1 | 7/2007 | Kanayama | |
| 2008/0150465 | A1 | 6/2008 | Baba et al. | |
| 2009/0145254 | A1 | 6/2009 | Hirabayashi et al. | |
| 2011/0147103 | A1 | 6/2011 | Alfayad et al. | |
| 2011/0160907 | A1 * | 6/2011 | Orita | B25J 9/1607 |
| | | | | 700/260 |
| 2012/0158175 | A1 * | 6/2012 | Lee | B25J 9/162 |
| | | | | 901/1 |
| 2012/0168593 | A1 * | 7/2012 | Mekid | F16M 11/043 |
| | | | | 248/398 |
| 2013/0057004 | A1 | 3/2013 | Murata et al. | |
| 2013/0079929 | A1 * | 3/2013 | Lim | B62D 57/032 |
| | | | | 700/250 |
| 2013/0175816 | A1 | 7/2013 | Kawasaki et al. | |
| 2014/0005830 | A1 * | 1/2014 | Ogawa | B25J 9/1602 |
| | | | | 901/1 |
| 2016/0236356 | A1 * | 8/2016 | Waita | B25J 17/00 |
| 2017/0036346 | A1 * | 2/2017 | Kamioka | B62D 57/032 |
| 2017/0326736 | A1 * | 11/2017 | Nagatsuka | B25J 17/00 |
| 2019/0070729 | A1 * | 3/2019 | Kamioka | B25J 11/0035 |
| 2020/0009746 | A1 * | 1/2020 | Young | B25J 17/0283 |
| 2020/0182336 | A1 * | 6/2020 | Xiong | A63H 13/02 |
| 2021/0331310 | A1 * | 10/2021 | Mokhlespour Esfahani | |
| | | | | B25J 17/00 |

FOREIGN PATENT DOCUMENTS

| JP | 11-156778 | A | 6/1999 |
| JP | 2000-334687 | A | 12/2000 |
| JP | 2001-347482 | A | 12/2001 |
| JP | 2003-170381 | A | 6/2003 |
| JP | 2003-172418 | A | 6/2003 |
| JP | 2004-202676 | A | 7/2004 |
| JP | 2004353848 | A | * 12/2004 |
| JP | 2007-516854 | A | 6/2007 |
| JP | 2007-185733 | A | 7/2007 |
| JP | 2011-527641 | A | 11/2011 |
| WO | WO 2005/025814 | A1 | 3/2005 |
| WO | WO 2005/065264 | A2 | 7/2005 |
| WO | WO 2007/077698 | A1 | 7/2007 |
| WO | WO 2011/118646 | A1 | 9/2011 |
| WO | WO 2012/039479 | A1 | 3/2012 |

OTHER PUBLICATIONS

International Search Report dated Dec. 5, 2017 in PCT/JP2017/032667, 8 pages.
Japanese Office Action dated Mar. 6, 2019 in Patent Application No. 2018-237361 (with English translation), # pages.

* cited by examiner

THREE-ROTATIONAL-DEGREE-OF-FREEDOM CONNECTION MECHANISM, ROBOT, ROBOT ARM, AND ROBOT HAND

TECHNICAL FIELD

The present disclosure relates to a three-rotational-degree-of-freedom connection mechanism used in a joint of a robot capable of making a motion close to a human, and a robot, a robot arm, and a robot hand, in which the three-rotational-degree-of-freedom connection mechanism is used.

BACKGROUND ART

A humanoid robot including a body, arms, legs, and a head similarly to a human is being developed. In a conventional humanoid robot, typically a motor and a gear are disposed in a joint and a joint intersection is disposed on an axis of the joint. In such a humanoid robot, it is necessary to dispose the gear in the joint by a rotational degree of freedom, and the joint becomes large. Patent Document 1 proposes a biped walking robot in which a skeleton is connected by the joint and the joint is driven with two rotational degrees of freedom by expansion and contraction of a link by two actuators for each joint. Patent Document 2 proposes a robot that drives the joint with two rotational degrees of freedom by expansion and contraction of the link by two actuators and drives an ankle, a wrist, and a neck with three rotational degrees of freedom in which one rotary actuator is added to the two actuators. Patent Document 3 proposes a parallel link mechanism including one fixed length link, in which one end is connected to a bearing with three degrees of freedom provided on a fixed side member while the other end is connected to a movable side member, and three variable length links, in each of which one end is connected to the fixed side member by a bearing with three rotational degrees of freedom while the other end is connected to the movable side member by a bearing with three degrees of freedom.

CITATION LIST

Patent Document

Patent Document 1: Japanese Patent Laid-Open No. 2004-202676
Patent Document 2: National Patent Publication No. 2011-527641
Patent Document 3: Japanese Patent Laid-Open No. 2003-172418

SUMMARY OF INVENTION

Technical Problems

The joint can be made compact using the actuator. However, when the joint has two rotational degrees of freedom, for example, a motion accompanied by torsion cannot be made by a wrist. When the motion accompanied by torsion cannot be made, sometimes the motion close to a human cannot be made.

A structure of the three-rotational-degree-of-freedom joint described in Patent Document 2 is complicated. The ankle and the wrist cannot be made thick because a shape similar to a human is required to be obtained, and a distance between the joint being a fulcrum and the connection point of the link being an action point is short. For this reason, it is considered that sometimes the robot cannot output enough power.

The parallel link mechanism described in Patent Document 3 can take a state in which three variable length links and one fixed length link are parallel to each other. In the state in which the three variable length links and the one fixed length link are parallel to each other, the variable length links cannot be rotated around the fixed length link even if a length of the variable length link is changed. The parallel link mechanism described in Patent Document 3 has a restriction on the motion.

An object of the present disclosure is to obtain a three-rotational-degree-of-freedom connection mechanism having a simple structure with no restriction on the motion within a movable range.

Solution to Problems

According to one aspect of the present disclosure, a three-rotational-degree-of-freedom connection mechanism includes; a joint for enabling a second member to rotate with respect to a first member around a torsion axis having a direction being fixed with respect to either the first member or the second member, and to connect the second member rotatably to the first member with three rotational degrees of freedom; and three actuators, each of the three actuators including a variable length link having a variable length and a power source for generating force changing the length of the variable length link. Three-rotational-degree-of-freedom connection mechanism also includes; three first-member-side link attaching units, each of the three first-member-side link attaching units being attached rotatably with one end of the three variable length link with at least two rotational degrees of freedom, and being provided in the first member having a fixed relative positional relationship with the joint; and three second-member-side link attaching units, each of the three second-member-side link attaching units being attached rotatably with the other end of the three variable length link with at least two rotational degrees of freedom, and being provided in the second member having a fixed relative positional relationship with the joint. The first-member-side link attaching units and the second-member-side link attaching units are disposed such that the variable length link has a twisted relationship with the torsion axis in each state within a movable range of the joint.

Advantageous Effects of Invention

The present disclosure can obtain the three-rotational-degree-of-freedom connection mechanism having the simple structure with no restriction on the motion within the movable range.

DESCRIPTION OF EMBODIMENTS

First Embodiment

Figure 1:
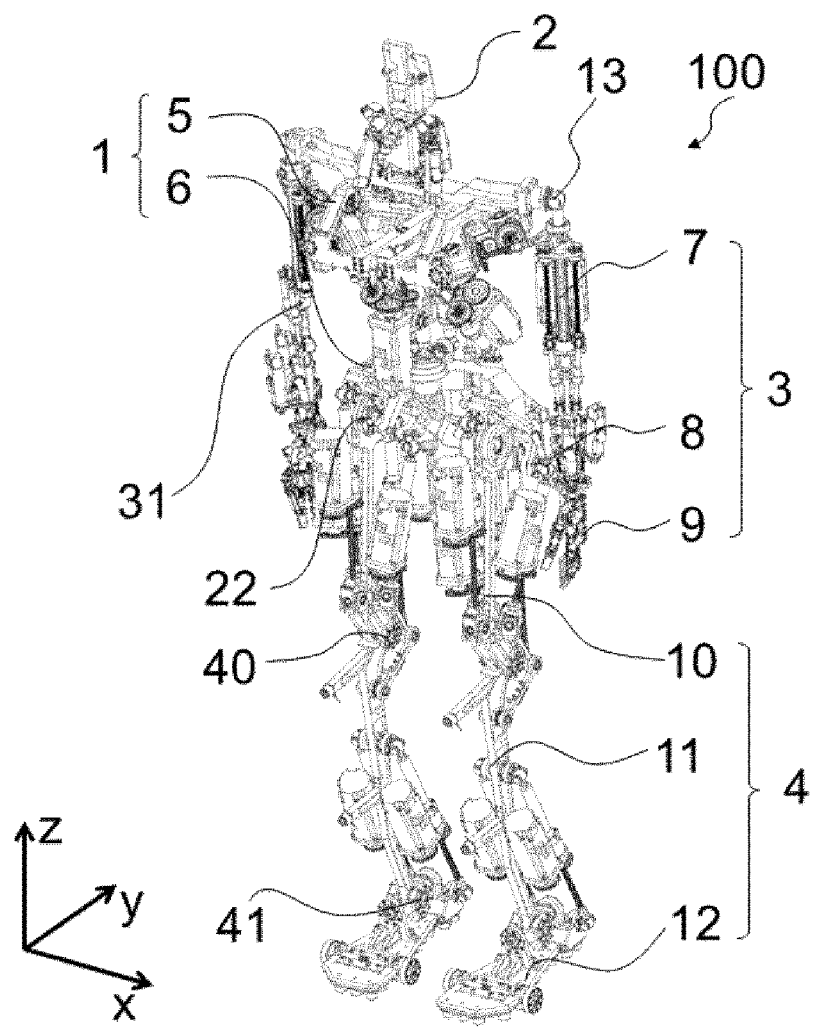
FIG. 1 is a perspective view illustrating a humanoid robot according to a first embodiment of the present disclosure.
Figure 2:
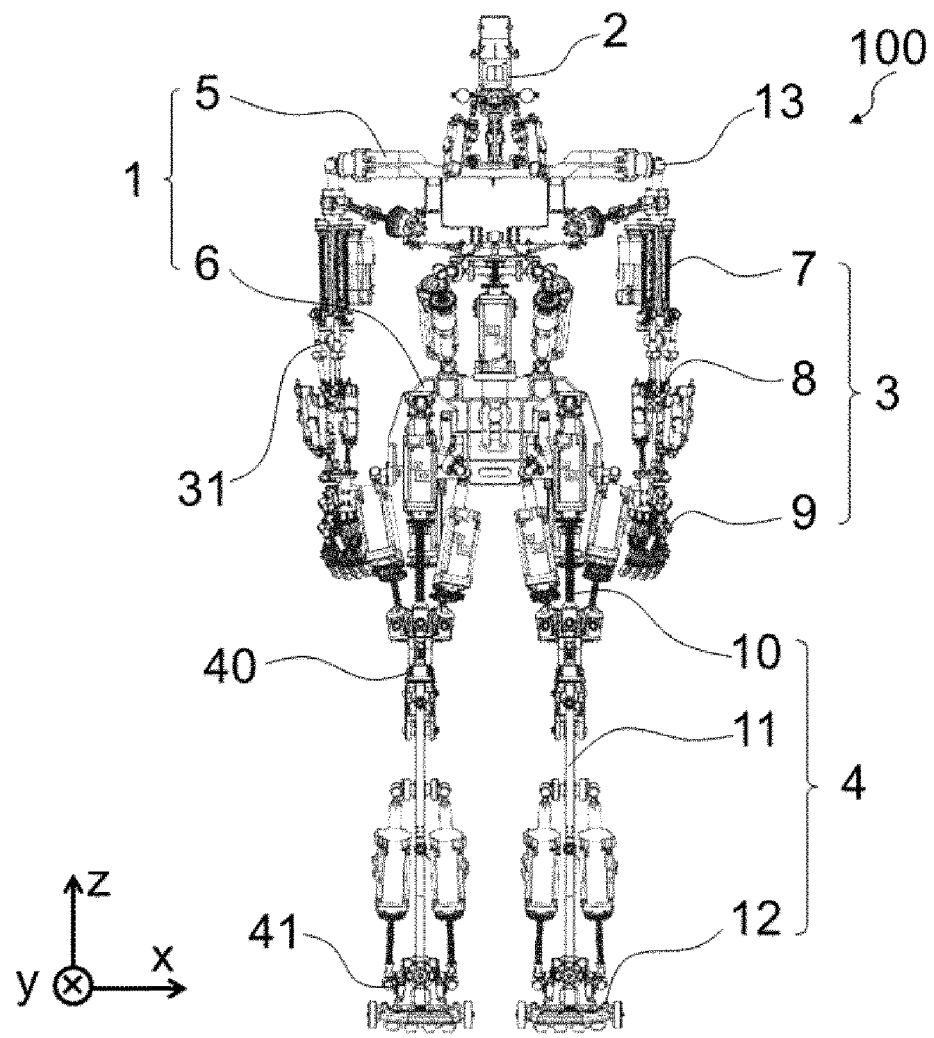
FIG. 2 is a front view illustrating the humanoid robot of the first embodiment.
Figure 3:
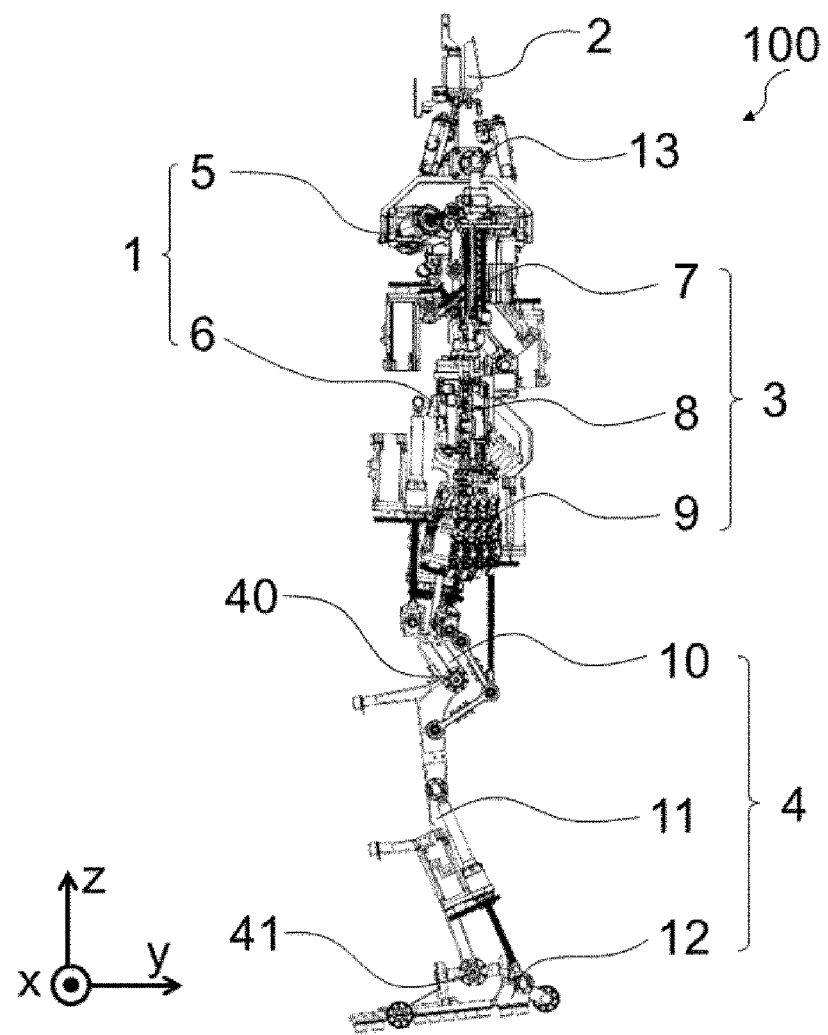
FIG. 3 is a left side view illustrating the humanoid robot of the first embodiment.
Figure 4:
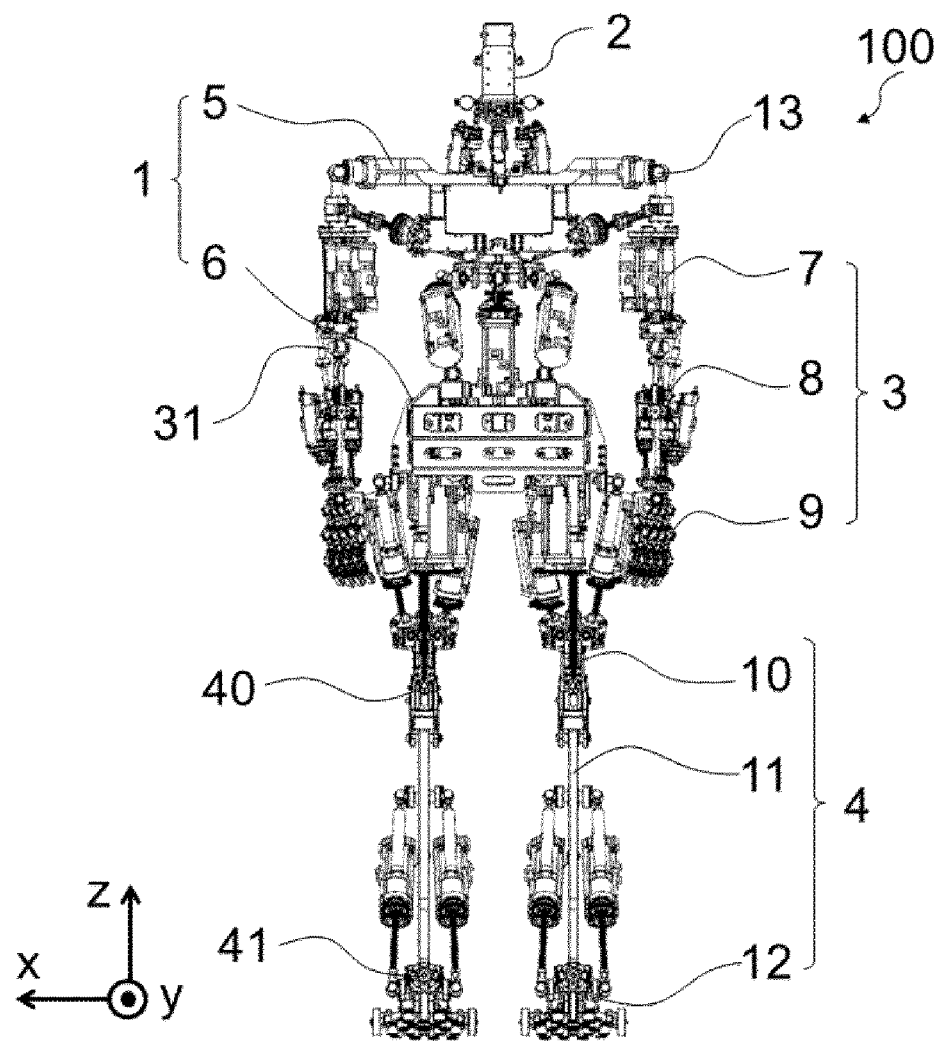
FIG. 4 is a rear view illustrating the humanoid robot of the first embodiment.
Figure 5:
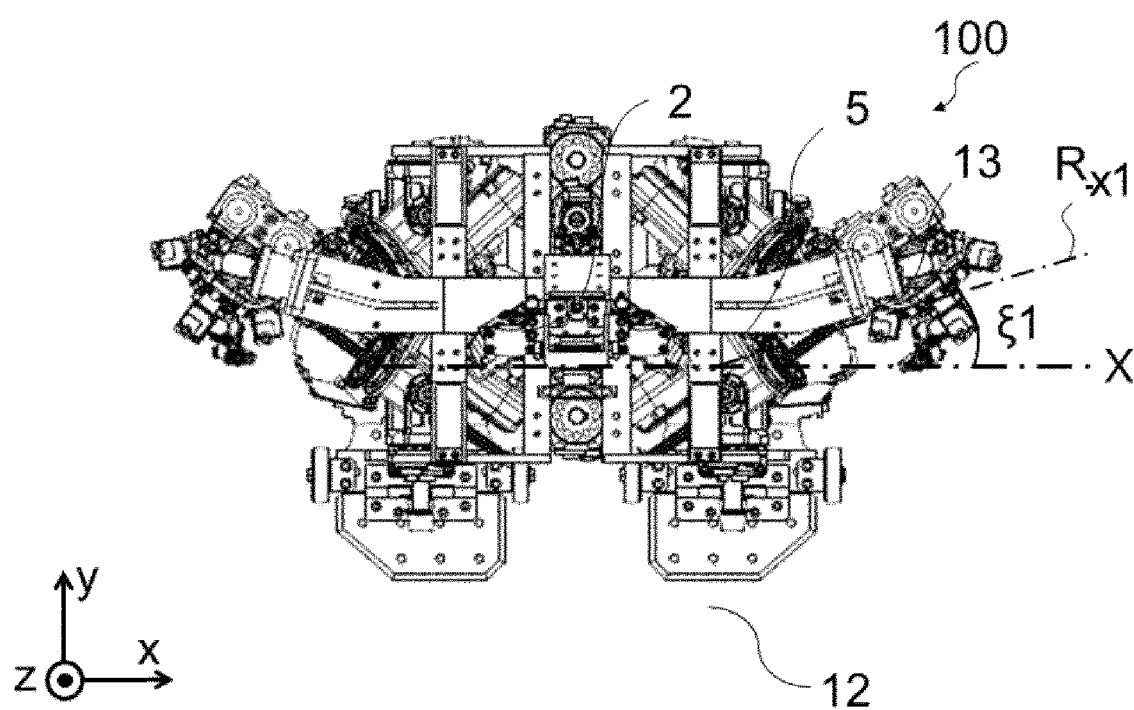
FIG. 5 is a plan view illustrating the humanoid robot of the first embodiment viewing from above.
Figure 6:
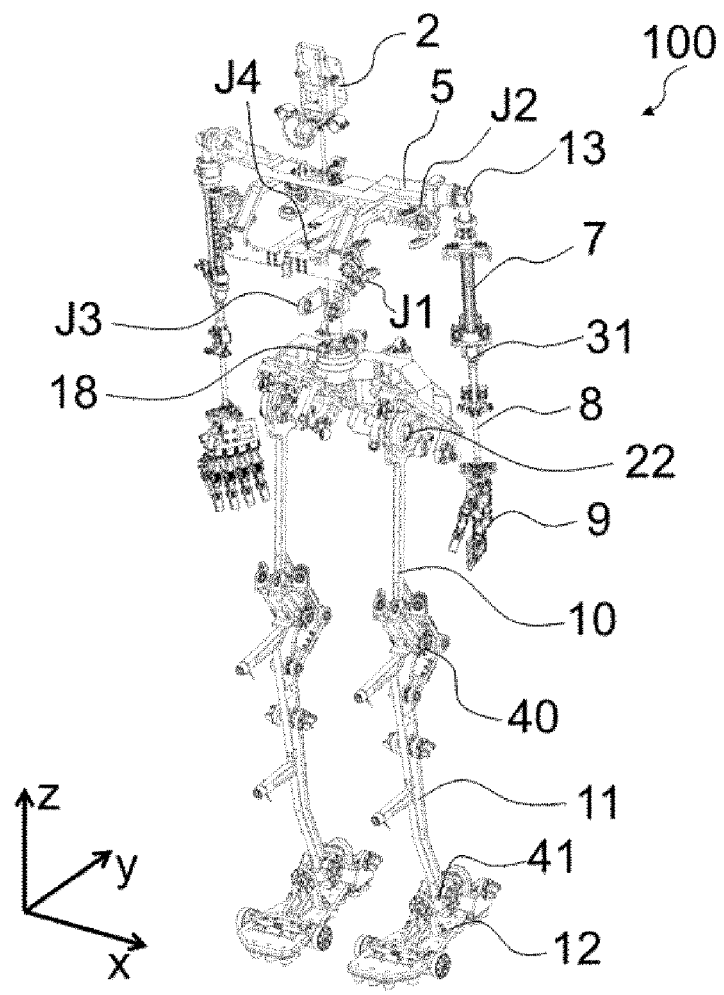
FIG. 6 is a perspective view illustrating a skeleton structure of the humanoid robot of the first embodiment.
Figure 7:
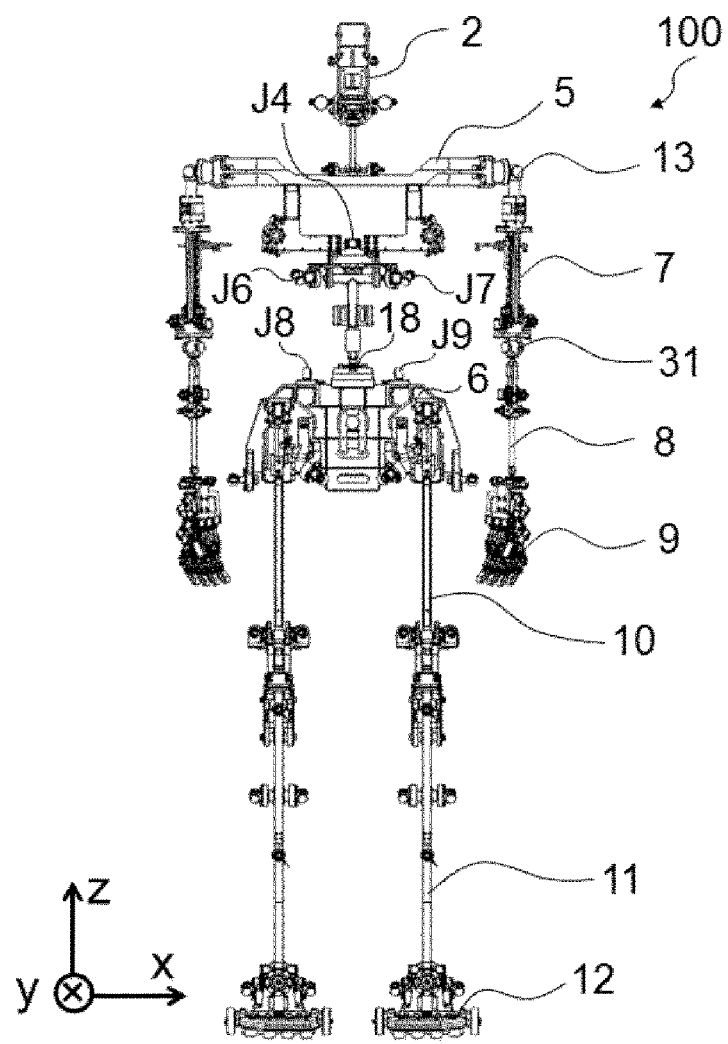
FIG. 7 is a front view illustrating the skeleton structure of the humanoid robot of the first embodiment.
Figure 8:
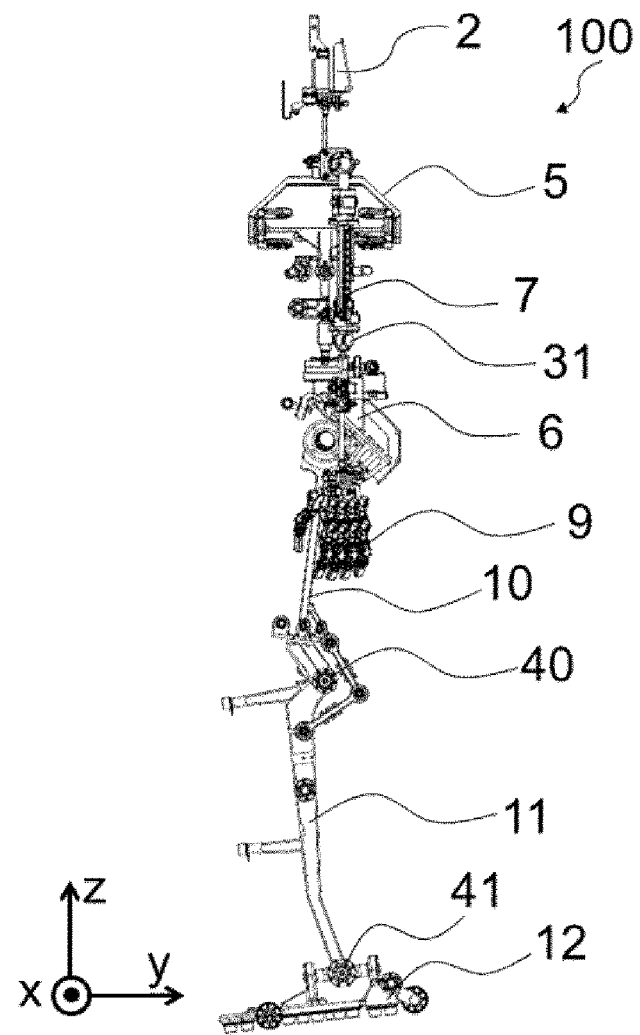
FIG. 8 is a left side view illustrating the skeleton structure of the humanoid robot of the first embodiment.
Figure 9:
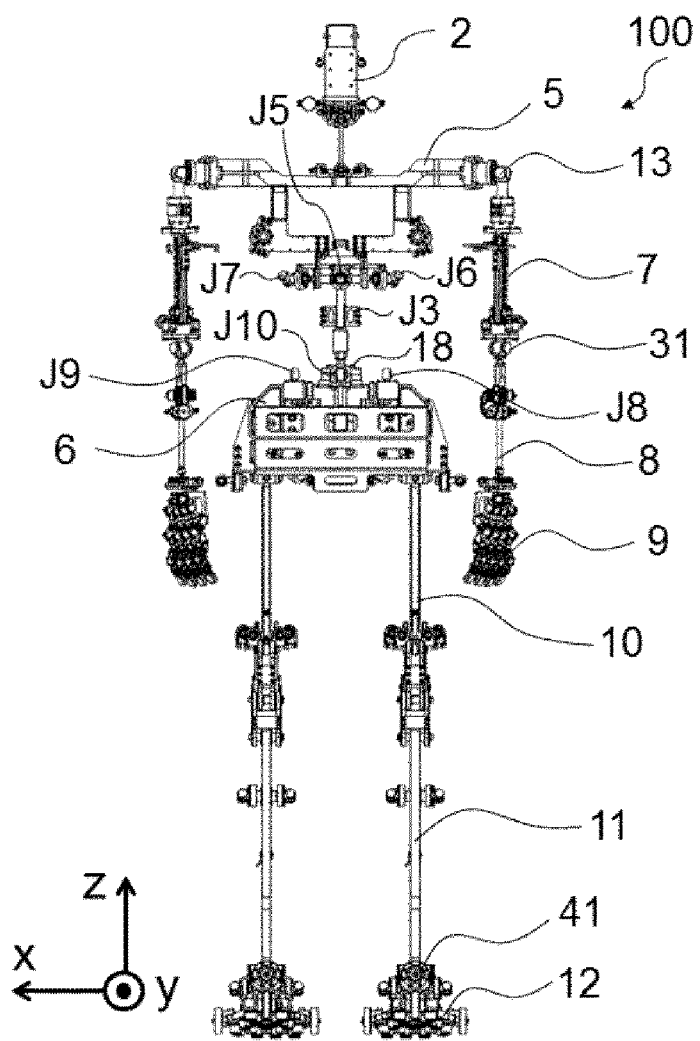
FIG. 9 is a rear view illustrating the skeleton structure of the humanoid robot of the first embodiment.

FIG. 1 is a perspective view of a humanoid robot 100 according to a first embodiment of the present disclosure. FIGS. 2, 3, 4, and 5 are a front view, a left side view, a rear view, and a plan view of humanoid robot 100, respectively. FIG. 6 is a perspective view explaining a skeleton structure of humanoid robot 100. FIGS. 7, 8, 9, and 10 are a front view, a left side view, a rear view, and a plan view of humanoid robot 100 having only a skeleton, respectively. An axis of a right and left direction of humanoid robot 100 is defined as an X-axis, an axis of a front-back direction is defined as a Y-axis, and an axis in a height direction is defined as a Z-axis. A direction from the right to the left is defined as a positive direction of the X-axis, a direction from the front to the rear is defined as a positive direction of the Y-axis, and a direction from a bottom to a top is defined as a positive direction of the Z-axis.

A posture in which humanoid robot 100 stands upright and lowers both arms as illustrated in FIGS. 1 to 5 is referred to as a reference state. The reference state is a posture often taken when humanoid robot 100 is used.

Humanoid robot 100 has a structure similar to a human body. Humanoid robot 100 includes a trunk 1, a head 2 connected to an upper center of trunk 1, a pair of upper limbs 3 protruding from the right and left of an upper part of trunk 1, and a pair of right and left lower limbs 4 protruding from a lower part of trunk 1. Trunk 1 is divided into a chest 5 on an upper side and a waist 6 on a lower side. In upper limb 3, an upper arm 7, a forearm 8, and a hand 9 are connected in series. In lower limb 4, a thigh 10, a lower leg 11, and a foot 12 are sequentially connected in series from waist 6. The pair of right and left upper limbs 3 has a structure in which right upper limb 3 and left upper limb 3 become a mirror image relationship. Similarly, the mirror image relationship also holds for the pair of right and left lower limbs 4. Left and right upper limbs 3 may have a portion in which the mirror image relationship does not hold. Left and right lower limbs 4 may also have the portion in which the mirror image relationship does not hold.

In humanoid robot 100, each joint connecting rotatably a skeleton constituting a neck, a shoulder, an elbow, a wrist, a crotch, a knee, an ankle, or the like is moved by changing a length of a link (variable length link) having a variable length included in an actuator that corresponds to a muscle. A number of variable length links that move the joints is the same as a degree of a rotational degree of freedom required at the joint. The length of the variable length link can be changed within a movable range of the variable length link, and any length within the movable range can be maintained. The actuator also includes a motor as a power source that generates force changing the length of the variable length link. A reference sign XXL denotes the link included in an actuator XX, and a reference sign XXM denotes a motor. The variable length link XXL and the motor XXM are illustrated in the drawings. A reference sign XX of the actuator is not illustrated in the drawings.

In many conventional humanoid robots, the motor and the gear are disposed in each joint, and joint intersection is disposed on the axis. For this reason, a space necessary for the joint becomes large, the compact joint is hardly made. On the other hand, in humanoid robot 100, it is unnecessary to dispose a gear near the joint, so that the joint can be made compact. Additionally, the link exists in parallel with the skeleton connected by the joint, so that the joint can withstand force larger than that of the case of only the joint. Each joint has the rotational degree of freedom of the necessary degree, so that humanoid robot 100 can make motion close to that of a human. For example, being able to make the motion similar to that of a human is a necessary condition as a robot that work on behalf of a human in an area where a human cannot enter.

Each joint of humanoid robot 100 has three rotational degrees of freedom, at which the joint can be moved back and forth, right and left and also be twisted, in the neck, the wrist, the crotch, and a space between chest 5 and waist 6. The joint has two rotational degrees of freedom, at which the joint can be moved back and forth and right and left, in the shoulder, the elbow, and the ankle. The joint has one rotational degree of freedom, at which the joint can be moved back and forth, in the knee. The joint may have three rotational degrees of freedom in the shoulder, the elbow, and the ankle.

Chest 5 is divided into a chest upper portion 5U and a chest lower portion 5D. Upper arm 7 and head 1 are connected to chest upper portion 5U. Chest lower portion 5D is connected to waist 6. An angle of chest upper portion 5U can vertically be changed with respect to chest lower portion 5D with one rotational degree of freedom. Chest 5 includes a chest bending unit C1 (illustrated in FIG. 26) connecting chest upper portion 5U rotatably to chest lower portion 5D with at least one rotational degree of freedom.

Figure 11:
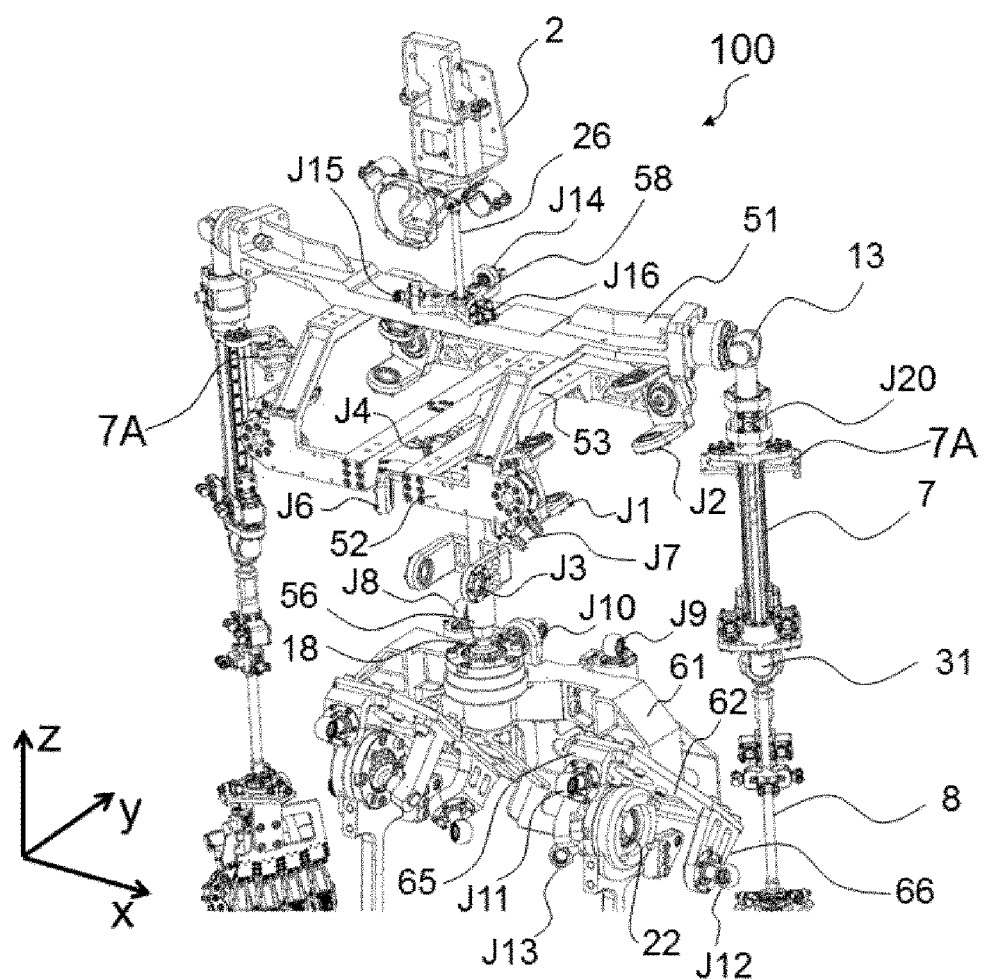
FIG. 11 is a perspective view illustrating an upper half body in the skeletal structure of the humanoid robot of the first embodiment viewing from an oblique front on a left hand side.
Figure 12:
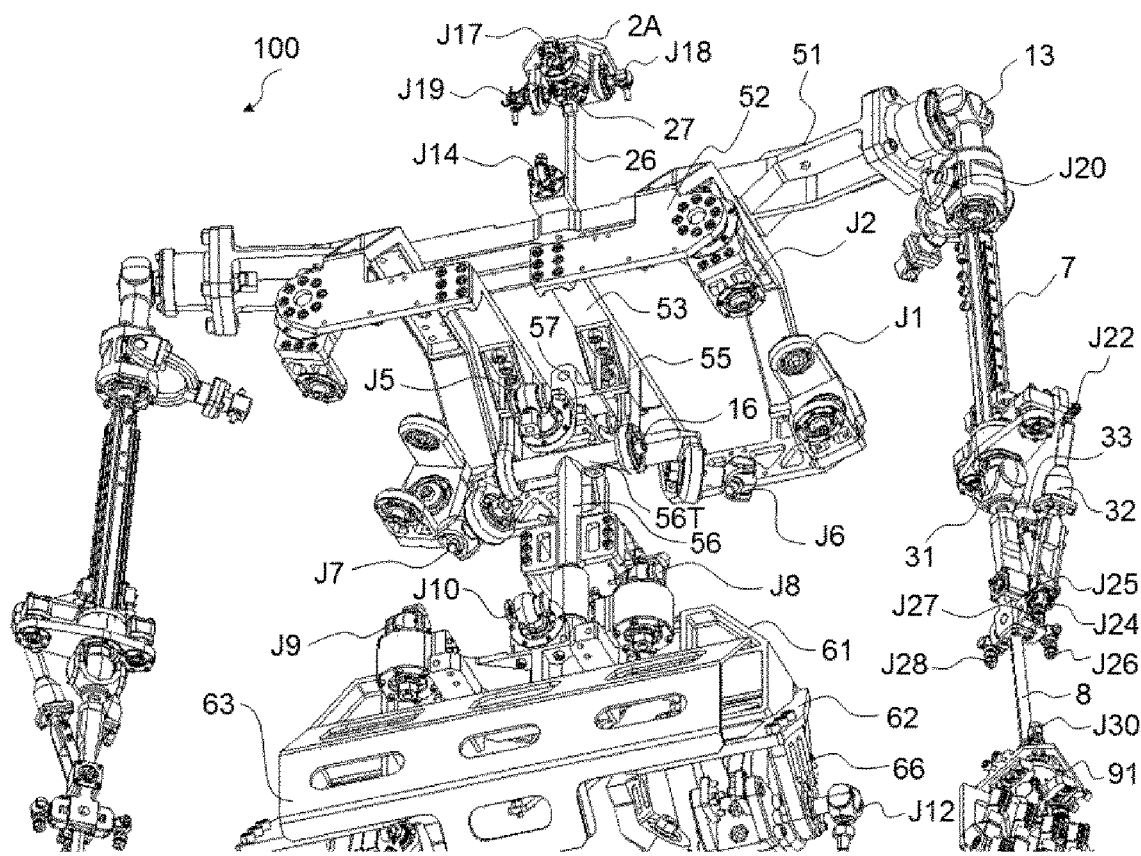
FIG. 12 is a perspective view illustrating the upper half body in the skeletal structure of the humanoid robot of the first embodiment viewing up from an oblique rear on the right hand side.
Figure 13:
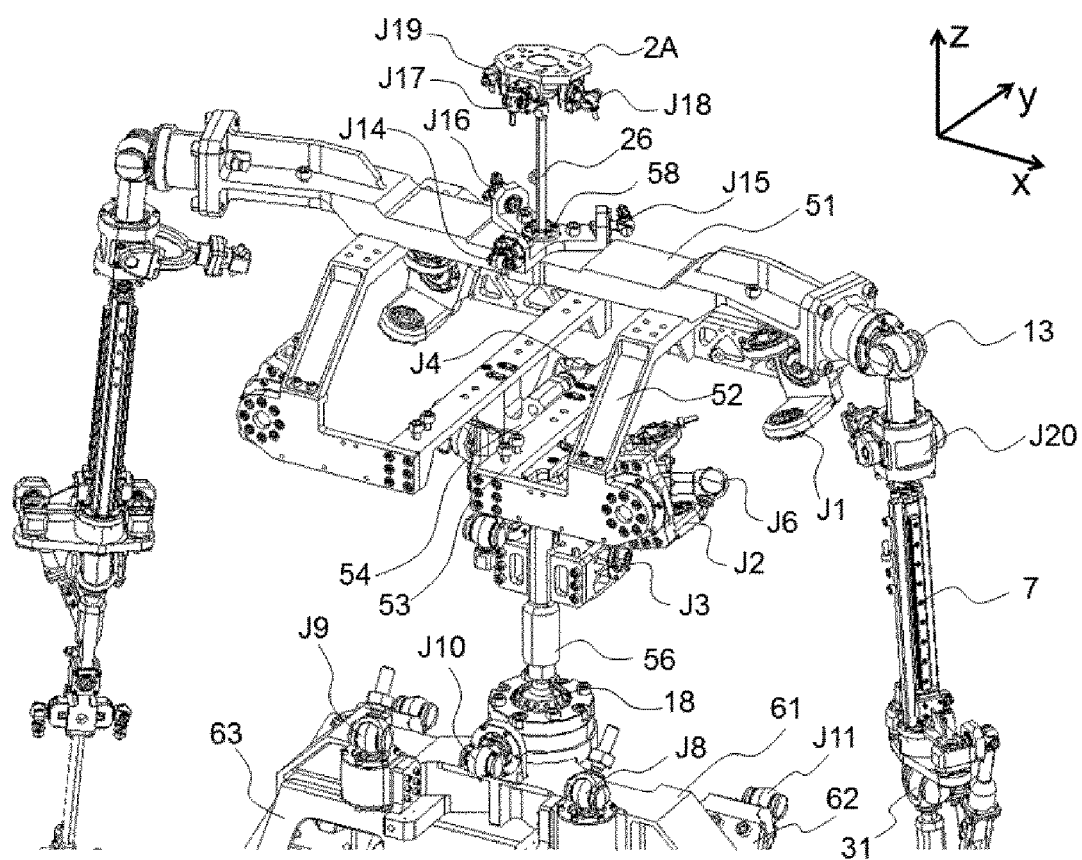
FIG. 13 is a perspective view illustrating the upper half body in the skeletal structure of the humanoid robot of the first embodiment viewing down from the oblique rear on the right hand side.
Figure 14:
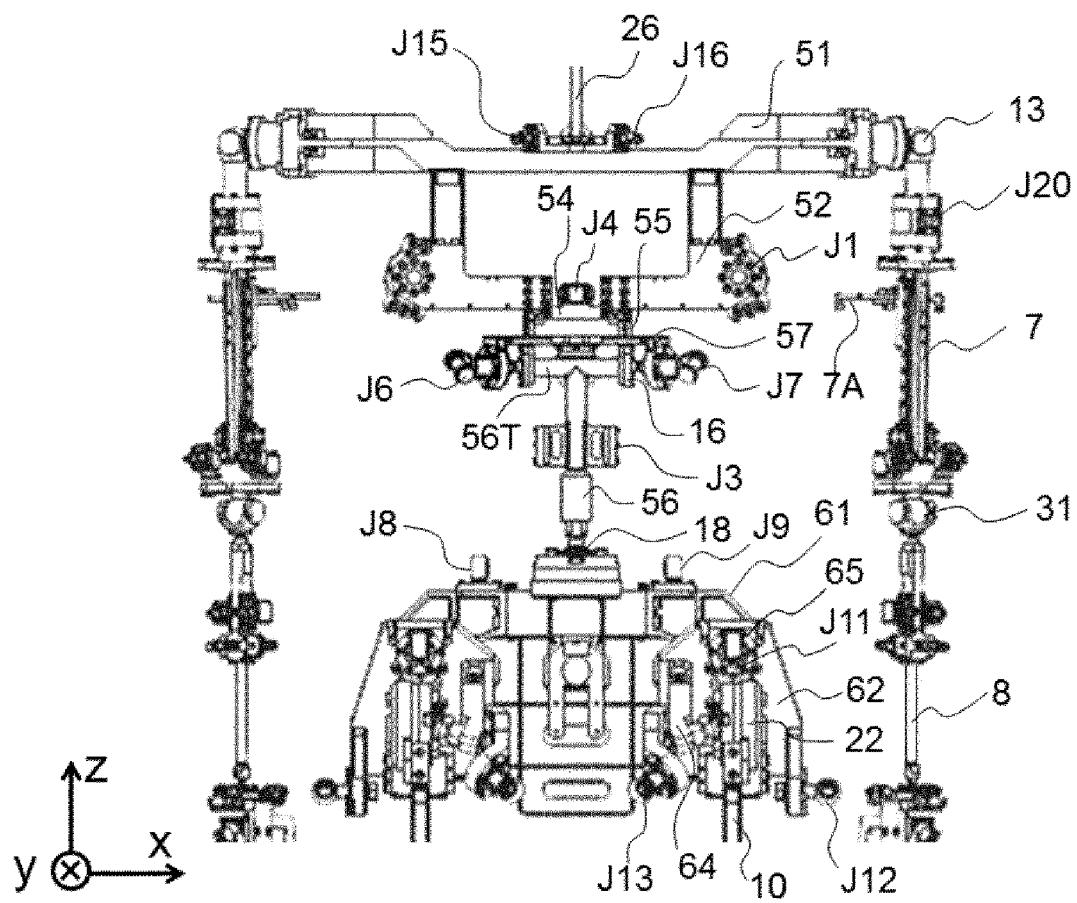
FIG. 14 is an enlarged front view illustrating a trunk in the skeletal structure of the humanoid robot of the first embodiment.
Figure 15:
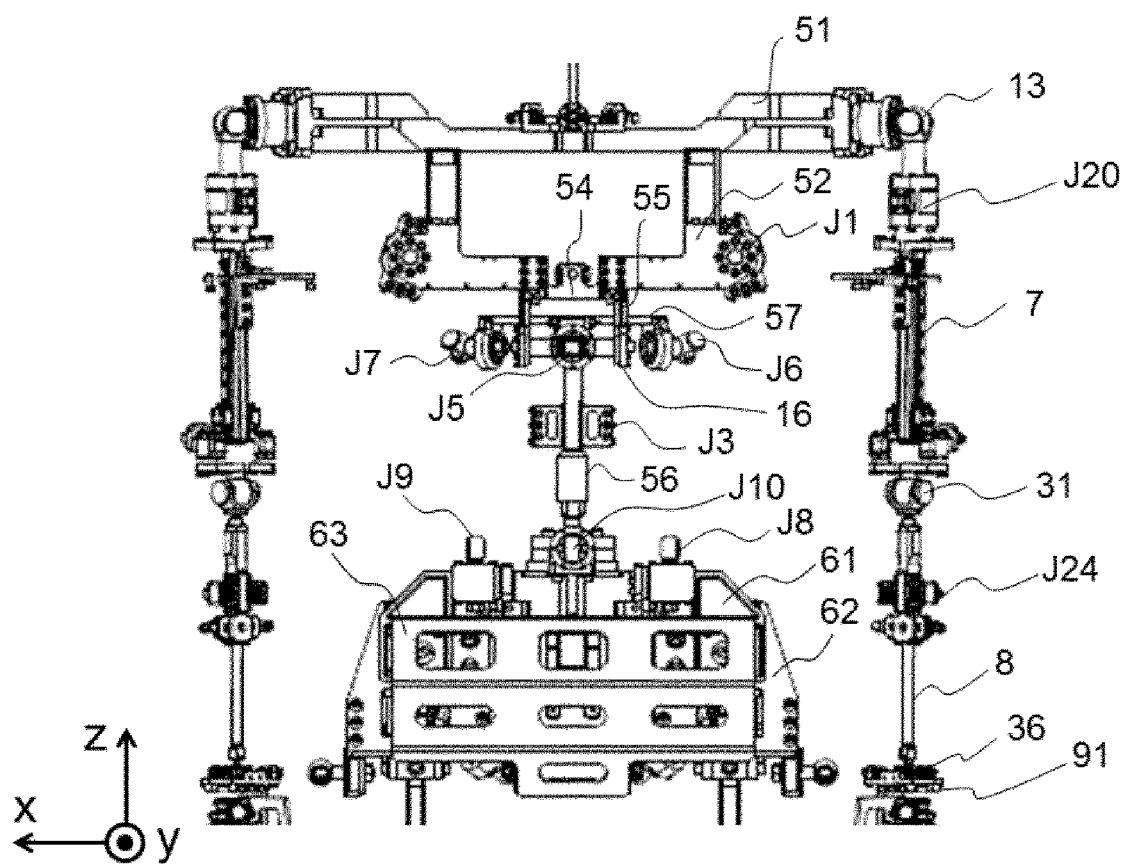
FIG. 15 is an enlarged rear view of the trunk in the skeletal structure of the humanoid robot of the first embodiment.
Figure 16:
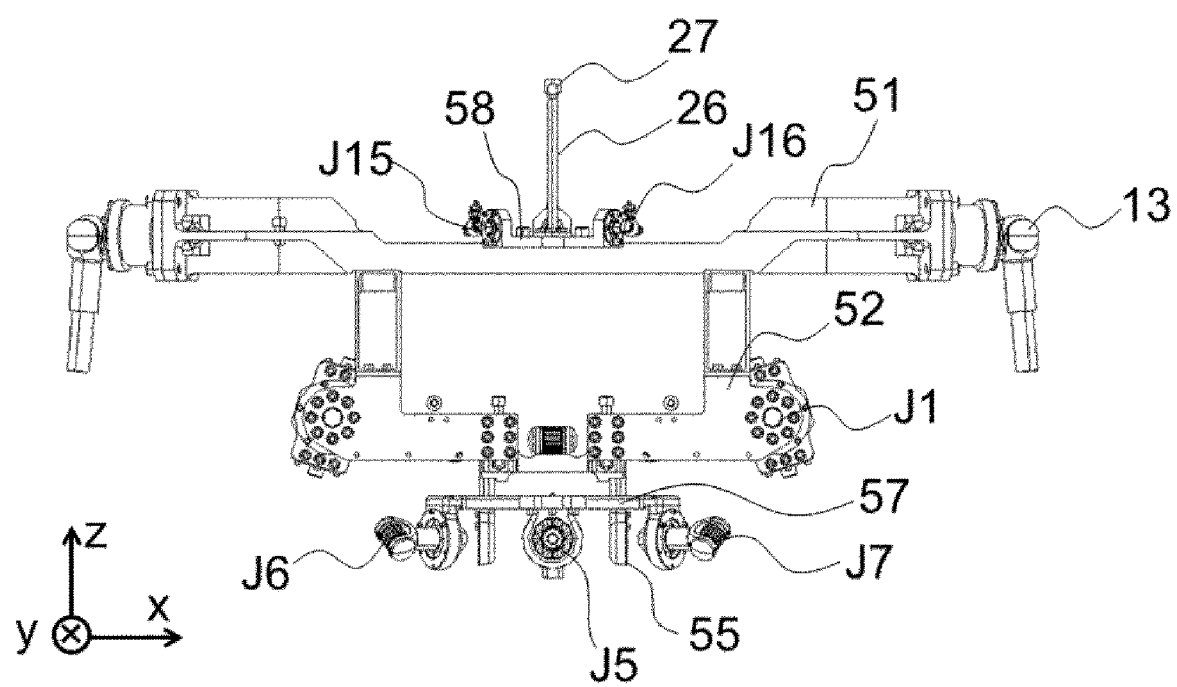
FIG. 16 is a front view illustrating a chest upper portion included in the humanoid robot of the first embodiment.
Figure 17:
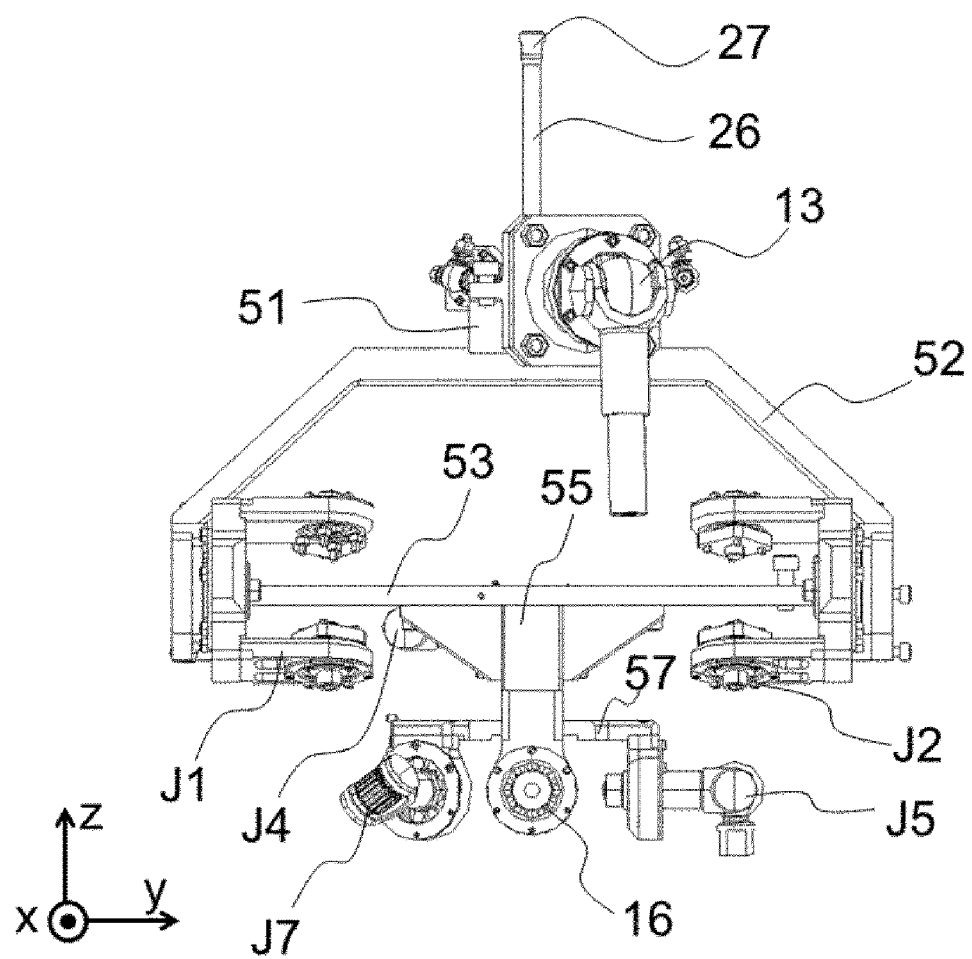
FIG. 17 is a left side view illustrating the chest upper portion included in the humanoid robot of the first embodiment.
Figure 18:
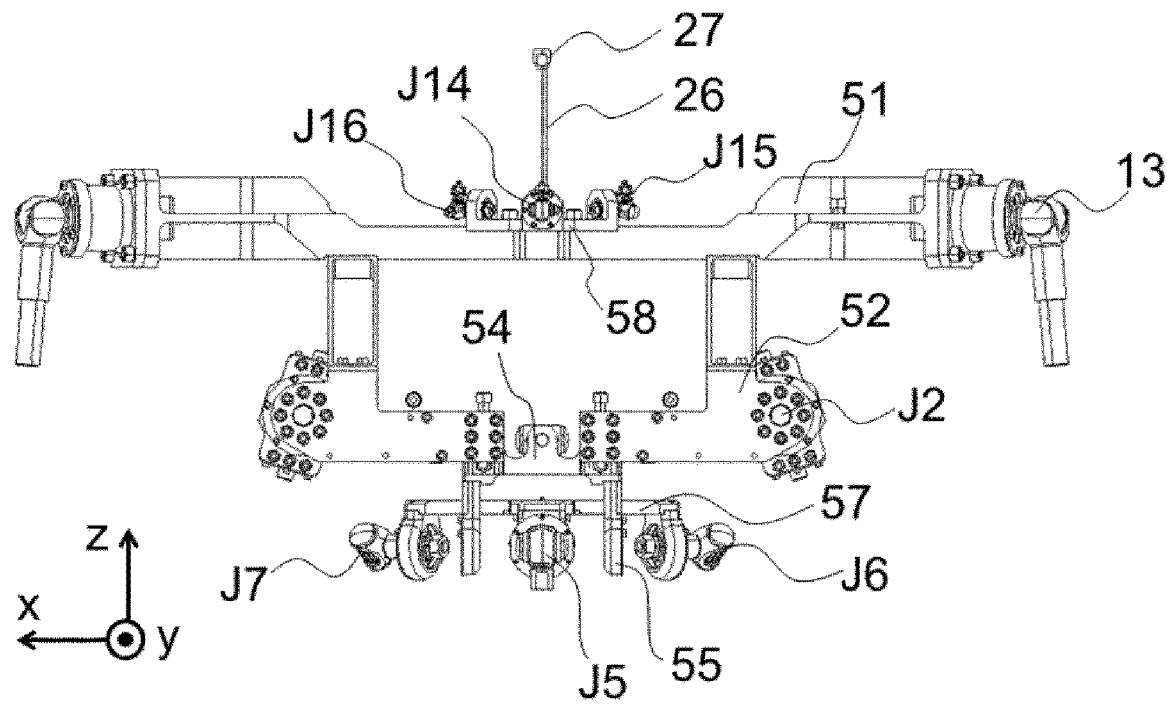
FIG. 18 is a rear view illustrating the chest upper portion included in the humanoid robot of the first embodiment.
Figure 19:
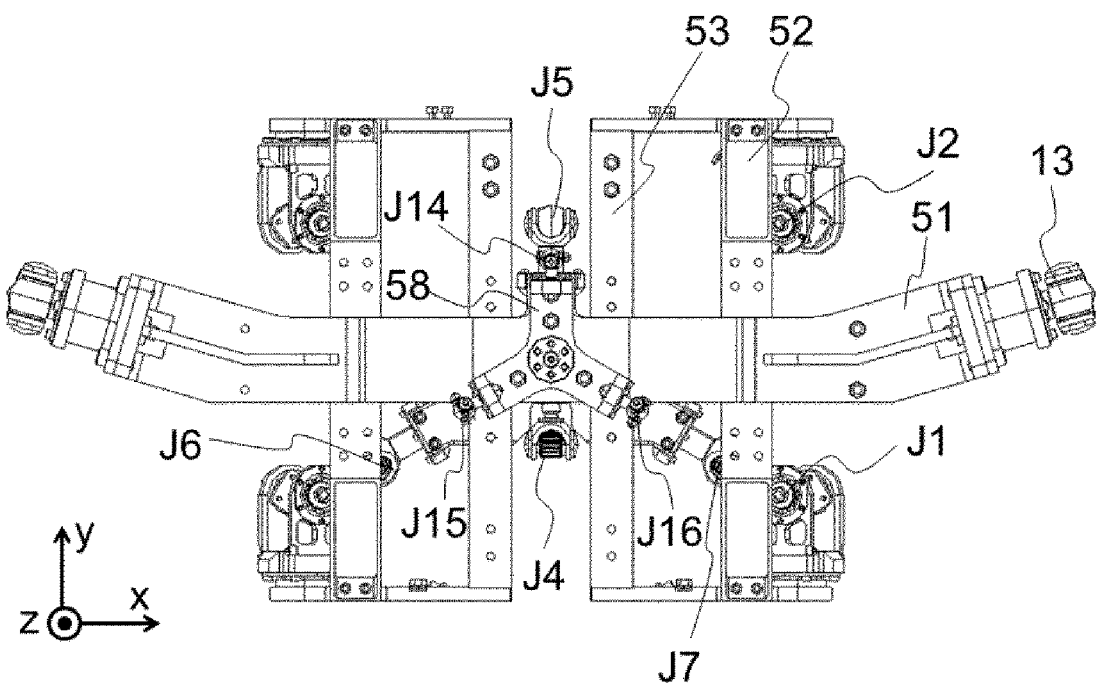
FIG. 19 is a plan view illustrating the chest upper portion included in the humanoid robot of the first embodiment viewing from above.
Figure 20:
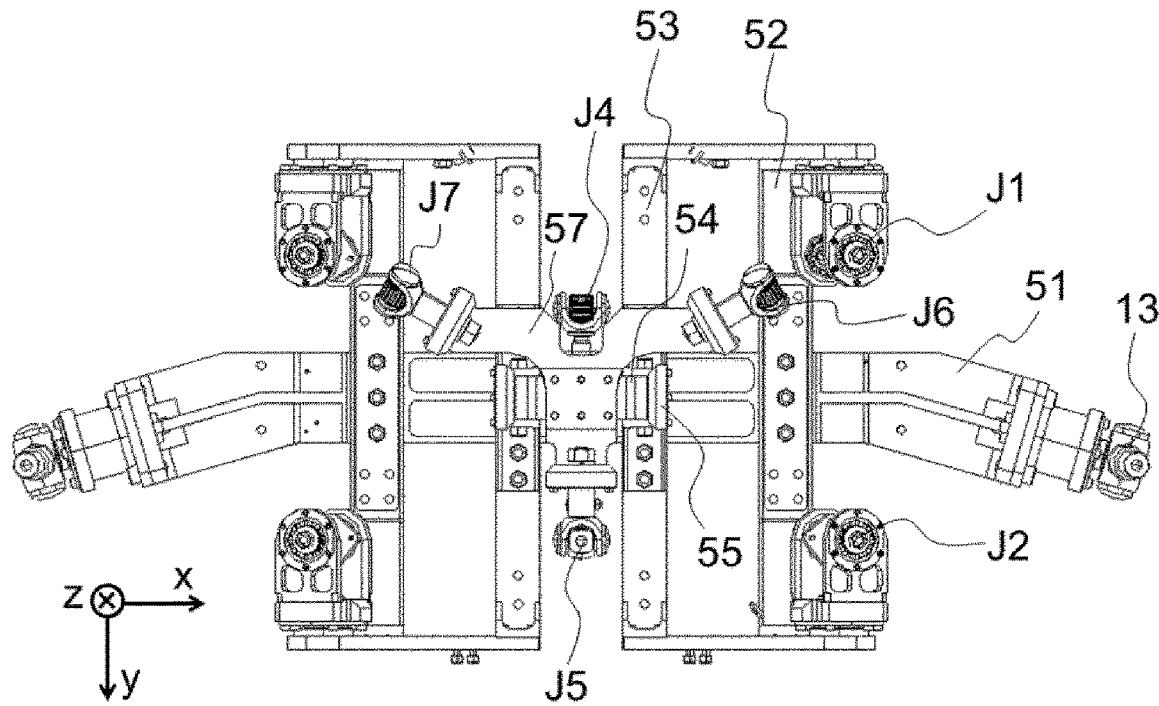
FIG. 20 is a plan view illustrating the chest upper portion included in the humanoid robot of the first embodiment viewing from below.
Figure 21:
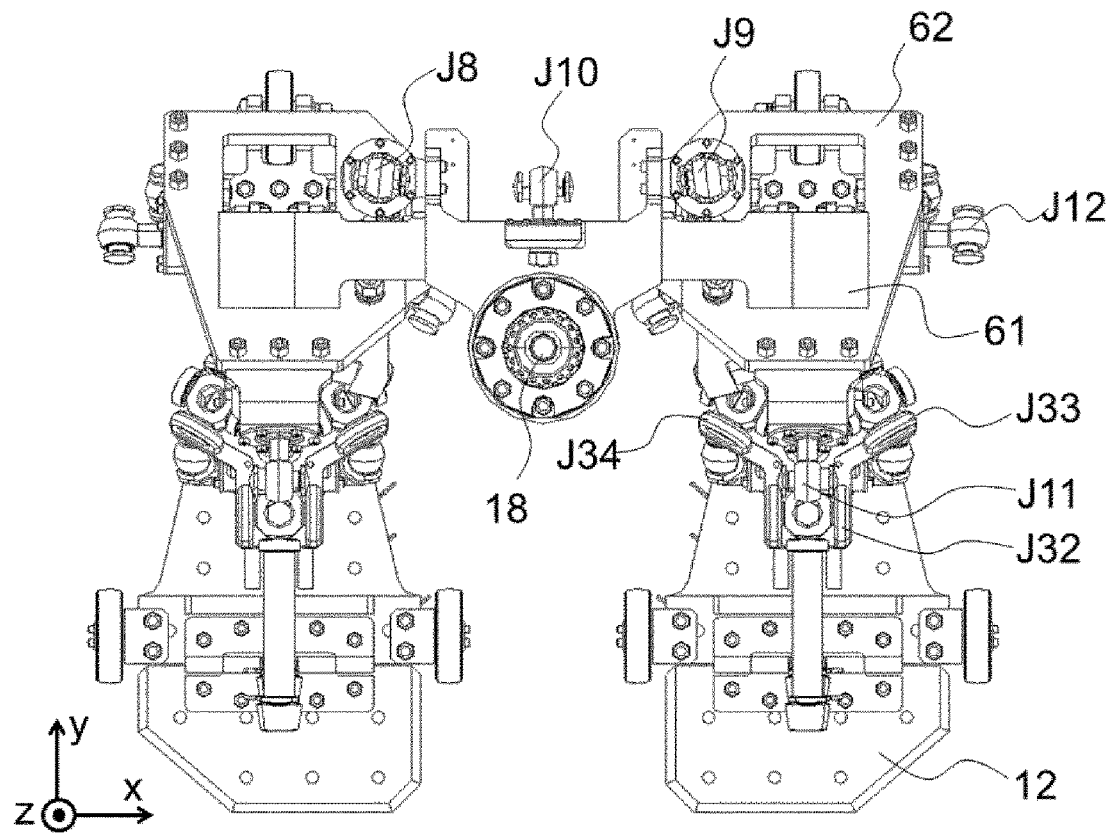
FIG. 21 is a plan view illustrating a portion below a waist in the skeleton structure of the humanoid robot of the first embodiment viewing from above.
Figure 22:
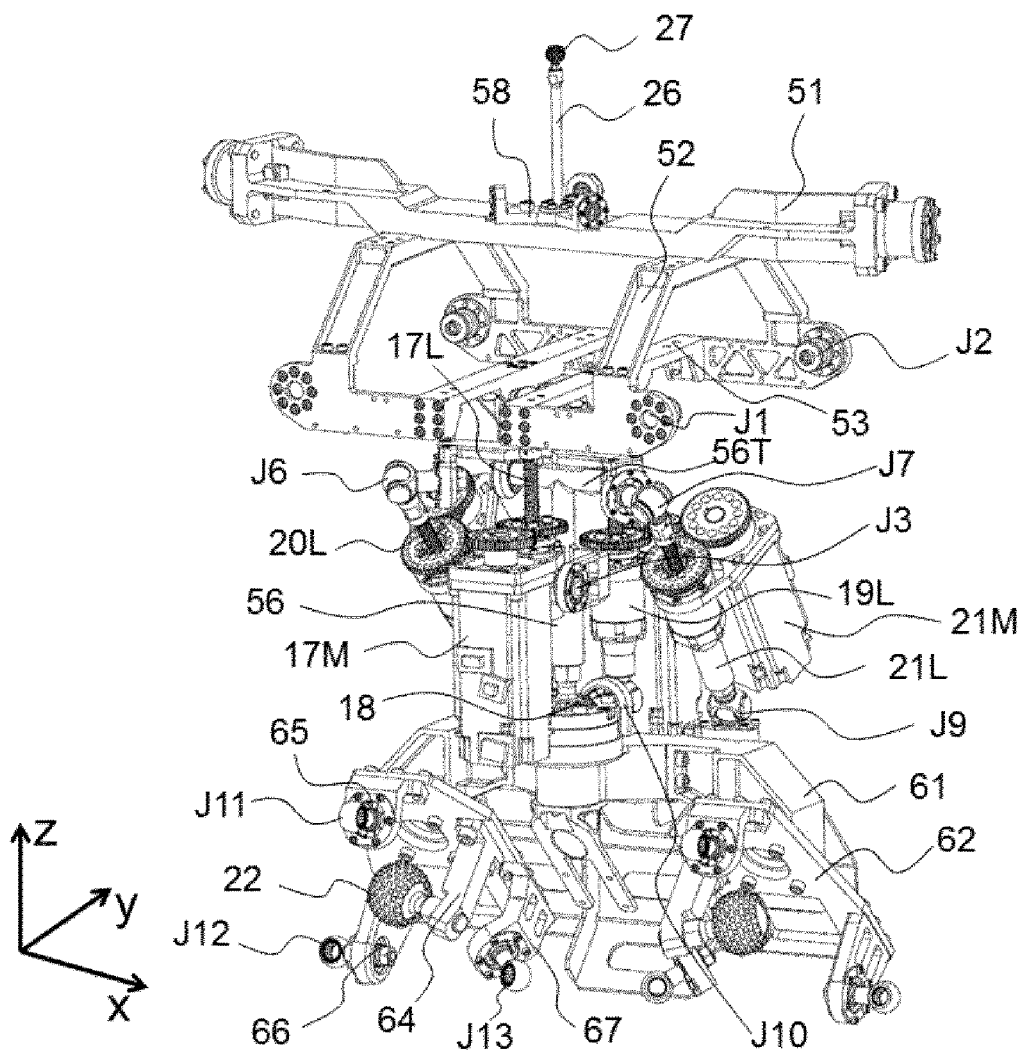
FIG. 22 is a perspective view illustrating the trunk included in the humanoid robot of the first embodiment viewing from an oblique front on the left hand side.
Figure 23:
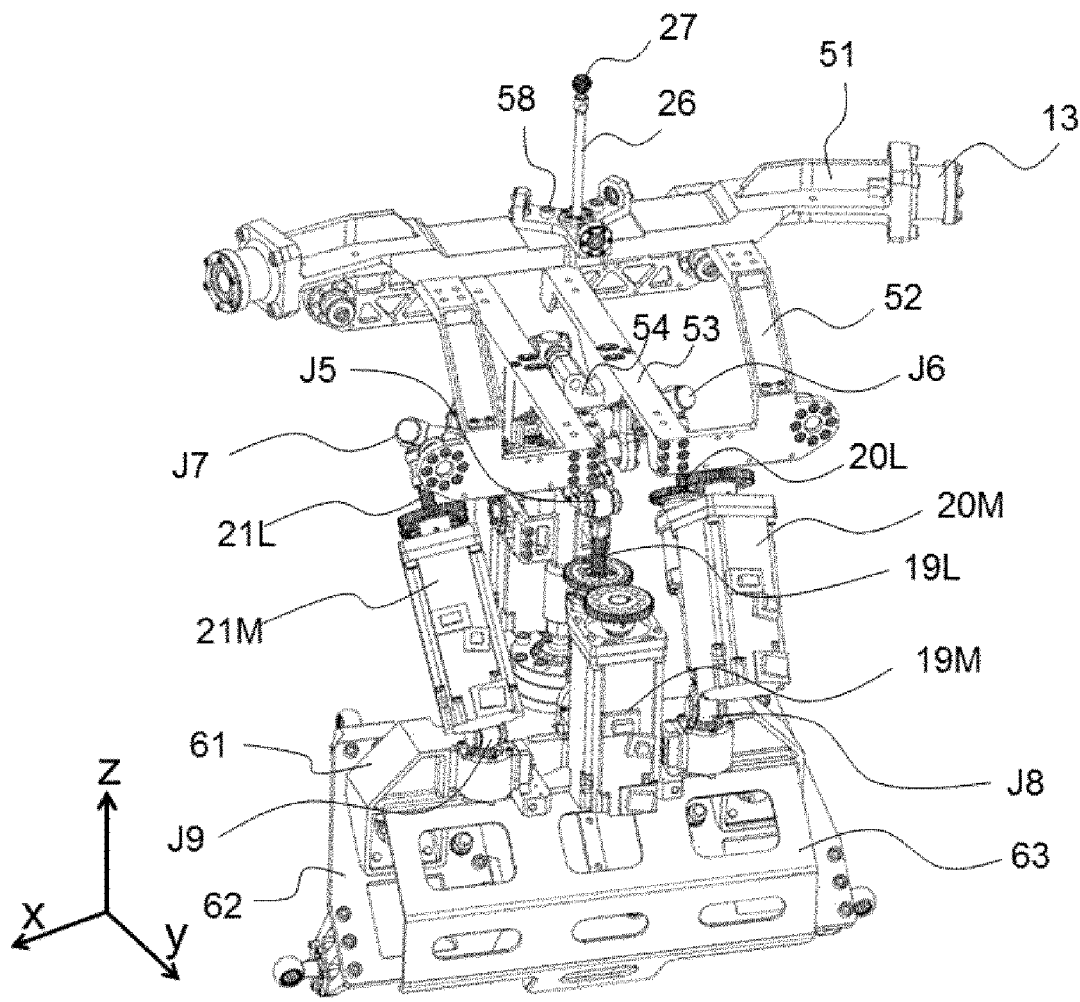
FIG. 23 is a perspective view illustrating the trunk included in the humanoid robot of the first embodiment viewing from the oblique rear on the left hand side.
Figure 24:
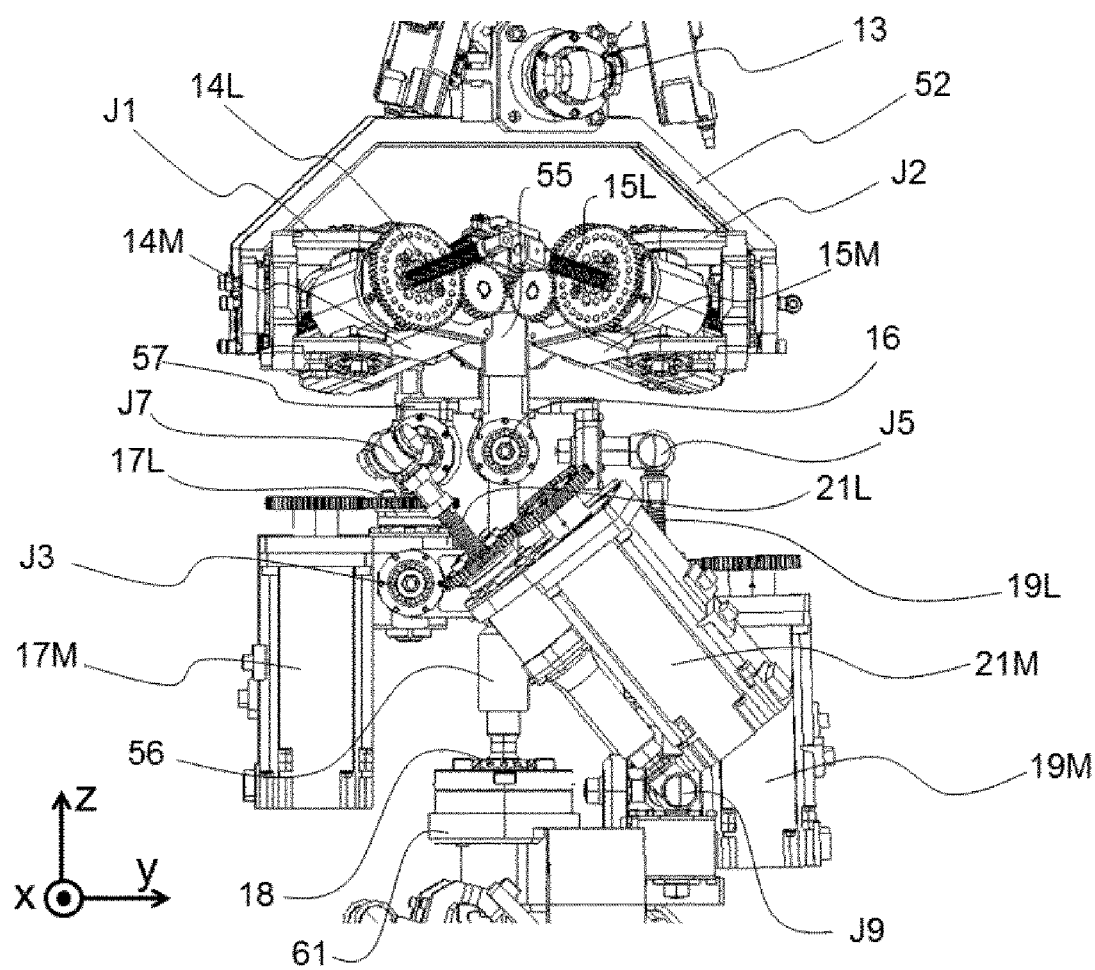
FIG. 24 is a left side view illustrating the trunk when an upper limb of the humanoid robot of the first embodiment does not exist.

Referring to FIGS. 10 to 24, a structure of the trunk 1 is described. FIG. 11 is a perspective view illustrating an upper half body in a skeleton structure viewing from an oblique front on a left hand side. FIG. 12 is a perspective view illustrating the upper half body in the skeleton structure viewing up from an oblique rear on a side existing a right hand 9. FIG. 13 is a perspective view illustrating the upper half body in the skeletal structure viewing down from the oblique rear on the side existing right hand 9. FIG. 14 is an enlarged front view illustrating trunk 1 in the skeleton structure. FIG. 15 is an enlarged rear view illustrating trunk 1 in the skeleton structure. FIGS. 16 to 18 are a front view, a left side view, and a rear view of chest upper portion 5U. FIG. 19 is a plan view illustrating chest upper portion 5U viewing from above. FIG. 20 is a plan view illustrating chest upper portion 5U viewing from below. FIG. 21 is a plan view illustrating a portion below waist 6 in the skeleton structure. FIG. 22 is a perspective view illustrating trunk 1 viewing from the oblique front on the side existing left hand 9. FIG. 23 is a perspective view illustrating trunk 1 viewing from the oblique rear on the side existing left hand 9. FIG. 24 is a left side view illustrating trunk 1 without upper limb 3.

Referring mainly to FIGS. 10 to 21, the skeleton constituting trunk 1 and a place to which the variable length link of the actuator, corresponding to a muscle, is attached is described. Chest 5 includes a shoulder frame 51, a thorax frame 52, a thorax front-back coupling frame 53, a chest center coupling frame 54, an intrathoracic joint frame 55, a backbone 56, and a link attaching frame 57. Chest upper portion 5U is configured to include shoulder frame 51, thorax frame 52, thorax front-back coupling frame 53, chest center coupling frame 54, and intrathoracic joint frame 55. Chest lower portion 5D is configured to include backbone 56 and link attaching frame 57. Intrathoracic joint 16 connects chest upper portion 5U and chest lower portion 5D with one rotational degree of freedom at which chest upper portion 5U and chest lower portion 5D can vertically be rotated.

Shoulder frame 51 is a frame connecting positions corresponding to both shoulders. Thorax frame 52 is a bent frame provided on the right and left on a lower side of shoulder frame 51. The variable length link that moves upper arm 7 is attached to thorax frame 52. Thorax front-back coupling frame 53 is a frame connecting thorax frames 52 in an front-back direction. Chest center coupling frame 54 is a frame connecting right and left thorax front-back coupling frames 53. Intrathoracic joint frame 55 is a plate-shaped frame provided on the lower side of each of right and left thorax front-back coupling frames 53. Intrathoracic joint frame 55 constitutes intrathoracic joint 16 together with the backbone 56.

Backbone 56 is a T-shaped rod viewing from the front. A horizontal cylindrical portion on an upper side of backbone 56 is referred to as an intrathoracic rotation shaft 56T. Intrathoracic rotation shaft 56T is sandwiched rotatably between two intrathoracic joint frames 55 to form intrathoracic joint 16.

A vertically extending portion of backbone 56 has a columnar shape. Backbone 56 is a coupling rod coupling chest 5 and waist 6. A thoracolumbar joint 18 connecting backbone 56 to waist 6 with three rotational degrees of freedom is provided at a lower end of backbone 56. A spherical bearing is used for thoracolumbar joint 18. Link attaching frame 57 is connected to the upper side of intrathoracic rotation shaft 56T. The variable length link that rotates chest 5 with respect to waist 6 is attached to link attaching frame 57. FIGS. 16 to 20 illustrate chest upper portion 5U and link attaching frame 57 such that the attaching position of the variable length link that rotates chest 5 with respect to waist 6 can be seen.

Figure 10:
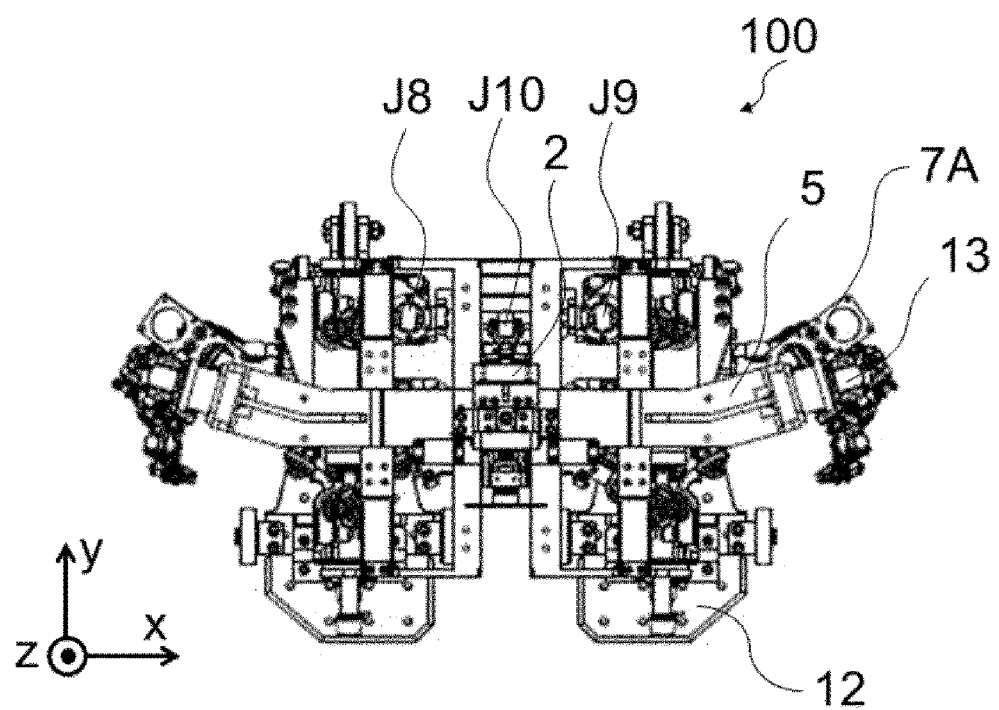
FIG. 10 is a plan view illustrating the skeleton structure of the humanoid robot of the first embodiment.

As illustrated in FIG. 10, portions near right and left ends of shoulder frame 51 are bent backward by an angle 1 with respect to the X-axis. Shoulder joint 13 connecting upper arm 7 to chest 5 with two rotational degrees of freedom is connected to each of two ends of shoulder frame 51. Shoulder joint 13 is a biaxial gimbal having two rotation axes orthogonal to each other. The biaxial gimbal of shoulder joint 13 has a structure in which a member (referred to as a rotation member) that rotates around a rotation axis existing in a direction in which shoulder frame extends 51 is sandwiched by a yoke such that the yoke provided on upper arm 7 can change (rotate) an angle formed by upper arm 7 and the rotating member. The yoke has members opposed to each other, and holes or protrusions for holding rotatably other member are provided in the yoke. A member, which is held in holes provided in the yoke and can rotate another member, is referred to as a shaft member. In the biaxial gimbal, the rotation axis of the rotation member and the shaft member are orthogonal to each other. In shoulder joint 13, two protrusions existing on a straight line orthogonal to the rotation axis of the rotation member are inserted in holes provided in the yoke. This enables the yoke to hold the rotation member rotatably. Shoulder joint 13 has the structure described above, so that upper arm 7 can rotate around the rotation axis existing in the direction in which shoulder frame 51 extends. The angle formed by upper arm 7 and shoulder frame 51 can also be changed.

Thorax frame 52 is connected to the lower side of shoulder frame 51 at a place slightly closer to the center side than the places where portions near the right and left ends of shoulder frame 51 are bent backward. Thorax frame 52 has an L-shape viewing from the front-back direction, and has a shape like a rectangle without lower side in which both upper corners of the rectangle are cut viewing from the side. Thorax frame 52 extending downward in the front-back direction from shoulder frame 51 extends horizontally toward the center side while being bent into the L-shape. A portion extending horizontally at the front side and the rear side of thorax frame 52 is coupled at the center side by thorax front-back coupling frame 53. Left and right thorax front-back coupling frames 53 are coupled together by chest center coupling frame 54.

A chest-side main link attaching unit J1 is provided in the L-shaped corner portion on the front side of thorax frame 52. An upper arm drive main link 14L (illustrated in FIG. 37), which is the variable length link of upper arm drive main actuator 14 that moves upper arm 7, is attached rotatably to a chest-side main link attaching unit J1 with two rotational degrees of freedom. A chest-side auxiliary link attaching unit J2 is provided in the L-shaped corner portion on a rear side. Chest-side auxiliary link attaching unit J2 is a biaxial gimbal being attached rotatably with an upper arm drive auxiliary link 15L with two rotational degrees of freedom. There exists a space where upper arm drive main actuator 14 and upper arm drive auxiliary actuator 15 can move freely between thorax frames 52 on the lower side of shoulder frame 51.

Chest-side main link attaching unit J1 has a structure in which the yoke provided in the rotation member holds columnar protrusions (shaft member) provided in upper arm drive main link 14L. The rotation member rotates around the rotation axis (Y-axis) perpendicular to thorax frame 52. The columnar protrusions (shaft member) provided perpendicularly from the both sides of a square tubular portion included in upper arm drive main link 14L. The columnar protrusions are sandwiched rotatably by the yoke. Chest-side auxiliary link attaching unit J2 has the same structure. That is, chest-side main link attaching unit J1 and chest-side auxiliary link attaching unit J2 are biaxial gimbals each including the rotation member and the yoke provided on thorax frame 52.

Plate-shaped intrathoracic joint frame 55 parallel to a YZ-plane is connected to the lower side in the central of thorax front-back coupling frame 53. A mechanism that holds rotatably intrathoracic rotation shaft 56T that is a horizontally cylindrical portion provided in the upper portion of backbone 56 is provided in intrathoracic joint frame 55. Intrathoracic rotation shaft 56T is sandwiched rotatably between two intrathoracic joint frames 55 to form intrathoracic joint 16. Intrathoracic joint 16 connects chest upper portion 5U and chest lower portion 5D with one rotational degree of freedom at which chest upper portion 5U and chest lower portion 5D are rotatable in the front-back direction. A connection angle between chest upper portion 5U and chest lower portion 5D is determined by a length of a intrathoracic link 17L (illustrated in FIG. 22) in which one end is connected to chest upper portion 5U while the other end is connected to chest lower portion 5D. Intrathoracic actuator 17 is provided in the center on the front side of chest 5.

One end of intrathoracic link 17L is attached rotatably to backbone 56 through a lower intrathoracic link attaching unit J3. The yoke of lower intrathoracic link attaching unit J3 protrudes forward from backbone 56, and intrathoracic link 17L is sandwiched rotatably by the yoke. The other end of intrathoracic link 17L is attached rotatably to chest center coupling frame 54 through an upper intrathoracic link attaching unit J4. The yoke of upper intrathoracic link attaching unit J4 is provided in chest center coupling frame 54. A chest bending unit C1 is configured to include intrathoracic joint 16, intrathoracic actuator 17, upper intrathoracic link attaching unit J4, and lower intrathoracic link attaching unit J3.

As illustrated in FIGS. 22, 23, and 24, a thoracolumbar center actuator 19, a thoracolumbar right actuator 20, and a thoracolumbar left actuator 21 exist between chest 5 and waist 6. A thoracolumbar center link 19L connects a center point existing on the rear side in the lower portion of chest 5 and a center point existing behind thoracolumbar joint 18 of the waist 6. A thoracolumbar right link 20L connects a right point existing on the front side in the lower portion of chest 5 and a right point existing on the rear side of waist 6. A thoracolumbar left link 21L connects a left point existing on the front side in the lower portion of chest 5 and a left point existing on the rear side of waist 6. Viewing from above, thoracolumbar right link 20L and thoracolumbar left link 21L exist so as to sandwich backbone 56. Thoracolumbar right link 20L and thoracolumbar left link 21L are directed from the front-side position in chest 5 to the rear-side position in waist 6.

In link attaching frame 57, a chest center link attaching unit J5 is provided in the center on the rear side, a chest right link attaching unit J6 is provided on the right of the front side, and a chest left link attaching unit J7 is provided on the left of the front side. Chest center link attaching unit J5, chest right link attaching unit J6, and chest left link attaching unit J7 are provided so as to be located at the same height as intrathoracic joint 16 in the reference state. One ends of thoracolumbar center link 19L, thoracolumbar right link 20L, and thoracolumbar left link 21L are attached to chest center link attaching unit J5, chest right link attaching unit J6, and chest left link attaching unit J7 with two rotational degrees of freedom, respectively.

Chest center link attaching unit J5 has the structure in which thoracolumbar center link 19L is sandwiched rotatably by the yoke, which protrudes from the link attaching frame 57 to the rear side and rotates around the rotation axis parallel to the Y-axis. Chest right link attaching unit J6 has the structure in which thoracolumbar right link 20L is sandwiched rotatably by the yoke, which protrudes from link attaching frame 57 to the front oblique right and rotates around the rotation axis. Chest left link attaching unit J7 has the structure in which thoracolumbar left link 21L is sandwiched rotatably by the yoke, which protrudes from link attaching frame 57 to the front oblique left and rotates around the rotation axis.

Figure 25:
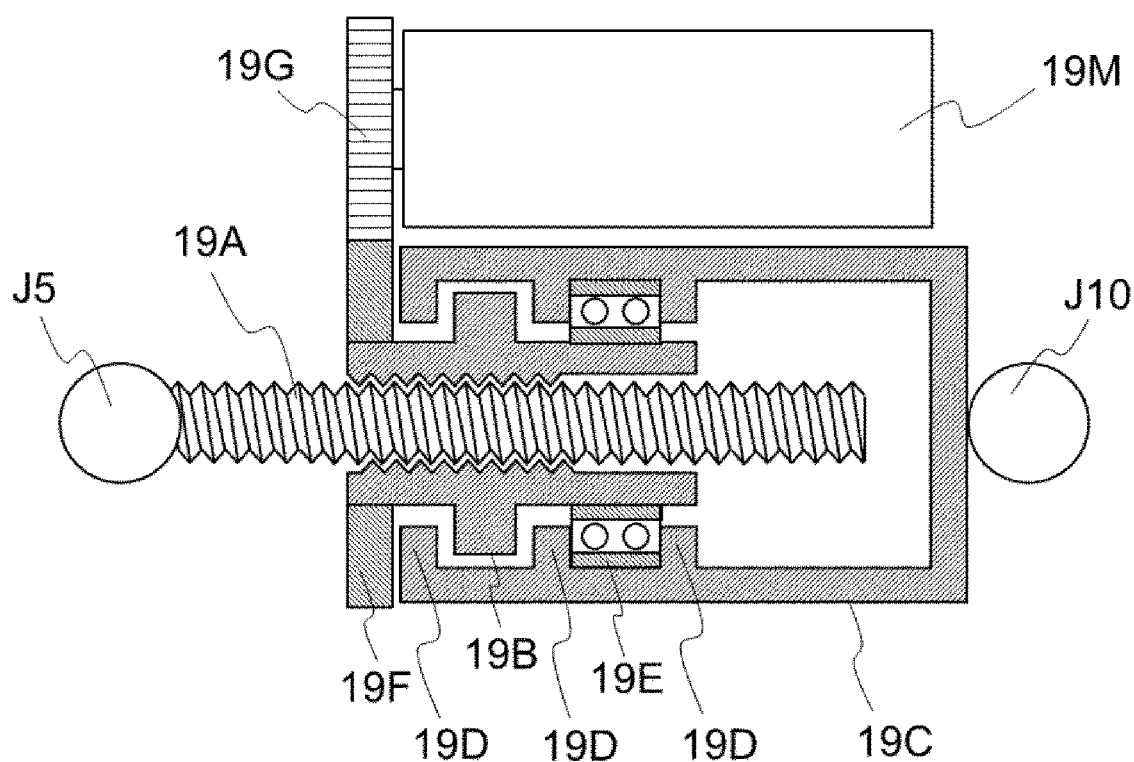
FIG. 25 is a cross-sectional view illustrating a structure of a variable length link included in an actuator used in the humanoid robot of the first embodiment.

The structure of the variable length link is described with thoracolumbar center link 19L being the variable length link included in thoracolumbar center actuator 19 as an example. FIG. 25 is a cross-sectional view illustrating the structure of the variable length link included in the actuator. FIG. 25 also illustrates a motor 19M not illustrated in cross-sectional view. A positional relationship between motor 19M and cylinder 19C is fixed. Thoracolumbar center link 19L includes a screw rod 19A, a nut 19B, a cylinder 19C, a nut position fixing unit 19D, a nut rotation holding unit 19E, and a nut gear 19F. Screw rod 19A is a rod having a circular shape in cross section, and male threads are provided on a side surface of screw rod 19A. Nut 19B is a female screw member including a through-hole in which female threads meshing with screw rod 19A is provided on the inner surface. Cylinder 19C accommodates a part of screw rod 19A and nut 19B therein. Nut position fixing unit 19D fixes the axial position of nut 19B with respect to cylinder 19C. Nut rotation holding unit 19E holds rotatably nut 19B with respect to cylinder 19C. Nut gear 19F is a gear that rotates together with nut 19B.

Nut position fixing unit 19D is protrusions circumferentially provided in cylinder 19C so as not to move nut 19B. The protrusions being nut position fixing unit 19D are provided so as to sandwich the circumferentially-provided protrusion provided included in nut 19B. Nut position fixing unit 19D is provided at three places, that are, both sides of nut rotation holding unit 19E and a connection portion between nut gear 19F and nut 19B. Any nut position fixing unit 19D may be used as long as nut position fixing unit 19D fixes the relative position in the axial direction of nut 19B with respect to cylinder 19C. The axial direction of screw rod 19A is also the length direction of cylinder 19C.

Nut gear 19F is disposed outside cylinder 19C. Nut gear 19F meshes with a drive gear 19G provided on the rotation shaft of motor 19M. Nut gear 19F and nut 19B rotate when drive gear 19G rotates. Nut 19B moves with respect to screw rod 19A when nut 19B rotates. Because the position of nut 19B is fixed with respect to the length direction of cylinder 19C, screw rod 19A moves with respect to nut 19B and cylinder 19C when nut 19B rotates.

One end of screw rod 19A is attached rotatably to link attaching frame 57 through chest center link attaching unit J5. One end of cylinder 19C is attached rotatably to a waist main frame 61 through a waist center link attaching unit J10. A distance between chest center link attaching unit J5 and waist center link attaching unit J10 increases when screw rod 19A moves in the direction protruding from cylinder 19C. The distance between chest center link attaching unit J5 and waist center link attaching unit J10 is shorten when screw rod 19A moves in the direction entering into cylinder 19C. In this way, the length of thoracolumbar center link 19L can be changed, and the distance between two points being attached with both ends of thoracolumbar center link 19L can be changed.

The end on the side existing screw rod 19A of thoracolumbar center link 19L may be attached to waist 6 instead of chest 5. In this case, cylinder 19C is attached to chest 5. One end of screw rod 19A in which the male threads are provided is attached to one of the link attaching units on both sides of thoracolumbar center link 19L. One end of cylinder 19C is attached to the link attaching unit not being attached with screw rod 19A among the link attaching units at both ends of thoracolumbar center link 19L.

Nut 19B includes a through-hole in which female threads meshing with male threads provided in screw rod 19A is provided on an inner surface. Nut 19B is a rotation member that rotates by transmitting force from motor 19M to the rotation member. Cylinder 19C is a tube that accommodates screw rod 19A and nut 19B. Nut position fixing unit 19D is a rotation member position fixing unit that fixes a relative position of nut 19B with respect to cylinder 19C in the axial direction of screw rod 19A. Nut rotation holding unit 19E is a rotation member holding unit, which is provided between nut 19B and cylinder 19C and holds nut 19B rotatably with respect to cylinder 19C. Because the rotation member holding unit is included, thoracolumbar center link 19L being the variable length link has one rotational degree of freedom at which thoracolumbar center link 19L can rotate around the axis. The rotation around the axis means that both ends of the link differ from each other in the rotation angle around the axis. The variable length link has one rotational degree of freedom, so that the link attaching units being attached with both ends of the variable length link may have two rotational degrees of freedom. In the case that the variable length link does not have one rotational degree of freedom, the link attaching unit being attached with either end of the variable length link has three rotational degrees of freedom. The case in that the variable length link has one rotational degree of freedom around the axis and both ends of the variable length link are attached to the attaching units with two rotational degrees of freedom, and the case in that one end of the variable length link is attached to the attaching unit with three rotational degrees of freedom and the other end is attached to the attaching unit with two rotational degrees of freedom are defined as the variable length link having five rotational degrees of freedom.

The variable length links included in thoracolumbar right link 20L, thoracolumbar left link 21L, and other actuators also have the same structure.

A screw, such as a ball screw and a bench screw, which has a small friction coefficient during the rotation, is used as a screw between the screw rod and the nut. When a screw pitch is the same, the force necessary to change the length of the variable length link is decreased with decreasing friction coefficient. For this reason, the maximum output of the motor may be smaller than that of the case that the friction coefficient is large. Power consumption required for operation of the actuator is also decreased. Frictional force in a still state is set to such magnitude that the nut does not rotate when the motor does not generate drive force. This enables the angle before interruption of electric power supply to be maintained at each joint of the humanoid robot can be maintained when the electric power supply is interrupted. When the humanoid robot is in a still state, its posture can be maintained. When the humanoid robot holds an object, the state in which the humanoid robot holds the object can be maintained.

It is assumed that the magnitude of the frictional force is set such the magnitude that the angle of each joint can be changed by the force of one or a plurality of persons when the electric power supply is interrupted. In a disaster in which the electric power supply is interrupted, there is a possibility that the humanoid robot may interfere with rescue of injured person. When the posture of the humanoid robot can be changed, for example, the humanoid robot can be changed to the posture so as not to interfere with the rescue, or the humanoid robot can be moved. Whether the nut is rotated by the force trying to change the length of the variable length link depends on not only the friction coefficient of the screw but also the pitch. When the friction coefficient is the same, the minimum value of the force with which the nut is rotated can be increased when the pitch is decreased. The pitch of the threads and the magnitude of the friction coefficient are determined such that the minimum value of the force that can change the length of the variable length link with which the nut is rotated becomes proper magnitude.

The tube accommodating the screw rod and the nut may be a square tube, or have a side surface in which a flat surface and a curved surface are combined with each other. A diameter of the tube may change in a length direction. The variable length link may have any structure as long as one end of the screw rod is attached to the link attaching unit with at least two rotational degrees of freedom and the other end on the side existing the tube or motor is attached to the link attaching unit with at least two rotational degrees of freedom. The end on the side existing the tube or the motor may be attached to the link attaching unit with a link attachment interposed therebetween. When the link attachment is used, the screw rod, the tube, and the link attachment become the variable length link. A portion that is not the end of the tube may be attached to the link attaching unit. In this case, the variable length link is up to the place of the tube attached to the link attaching unit, and one end of the variable length link is attached to the link attaching unit.

Waist 6 includes a waist main frame 61 in which thoracolumbar joint 18 is provided, a lower limb connecting frame 62 being connected with lower limb 4, and a waist cover 63 covering a lower portion on the rear side of waist main frame 61. Lower limb connecting frame 62 is provided on each of the right and left. In a space between waist cover 63 and waist main frame 61, a power supply device is arranged, wiring and the like are routed.

Viewing from above, waist main frame 61 includes a rectangle, a circle connected to and overlapped on the front side of the rectangle and two thick plate-shaped portions extending rearward at symmetrical positions on the rear side of the rectangle. The circular portion, existing on the front side, viewed from above is a cylinder in which thoracolumbar joint 18 exists. Thoracolumbar joint 18 is constructed with a spherical bearing that holds a spherical surface provided at one end of backbone 56 with three rotational degrees of freedom. As illustrated in FIG. 12, waist right link attaching unit J8 and waist left link attaching unit J9, to which the other ends of thoracolumbar right link 20L and the other end of thoracolumbar left link 21L are attached with two rotational degrees of freedom, respectively, are provided on the upper side of the two thick plate-shaped portions protruding rearward. Waist center link attaching unit J10 being attached with thoracolumbar center link 19L with two rotational degrees of freedom is provided in the center on the rear side in the upper portion of waist main frame 61.

Each of waist right link attaching unit J8, waist left link attaching unit J9, and waist center link attaching unit J10 is a biaxial gimbal. In waist right link attaching unit J8 and waist left link attaching unit J9, the yoke including the through-hole is provided rotatably and facing upward. To the through-hole included in the yoke, the shaft member provided in the variable length link is inserted. In waist center link attaching unit J10, the yoke having the through-hole is provided rotatably so as to be directed toward the rear side.

Figure 26:
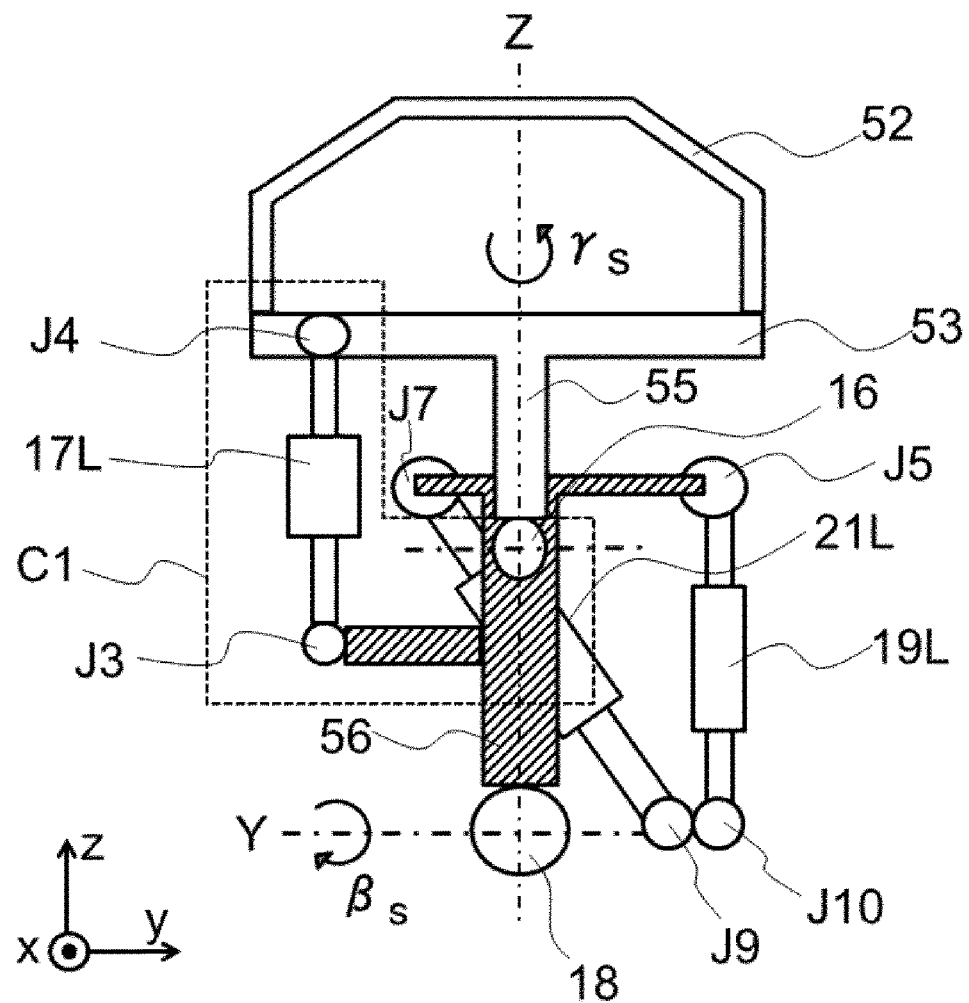
FIG. 26 is a schematic diagram illustrating a division between the chest upper portion and a chest lower portion and disposition of the variable length links that drive a chest in the humanoid robot of the first embodiment viewing from a side.
Figure 27:
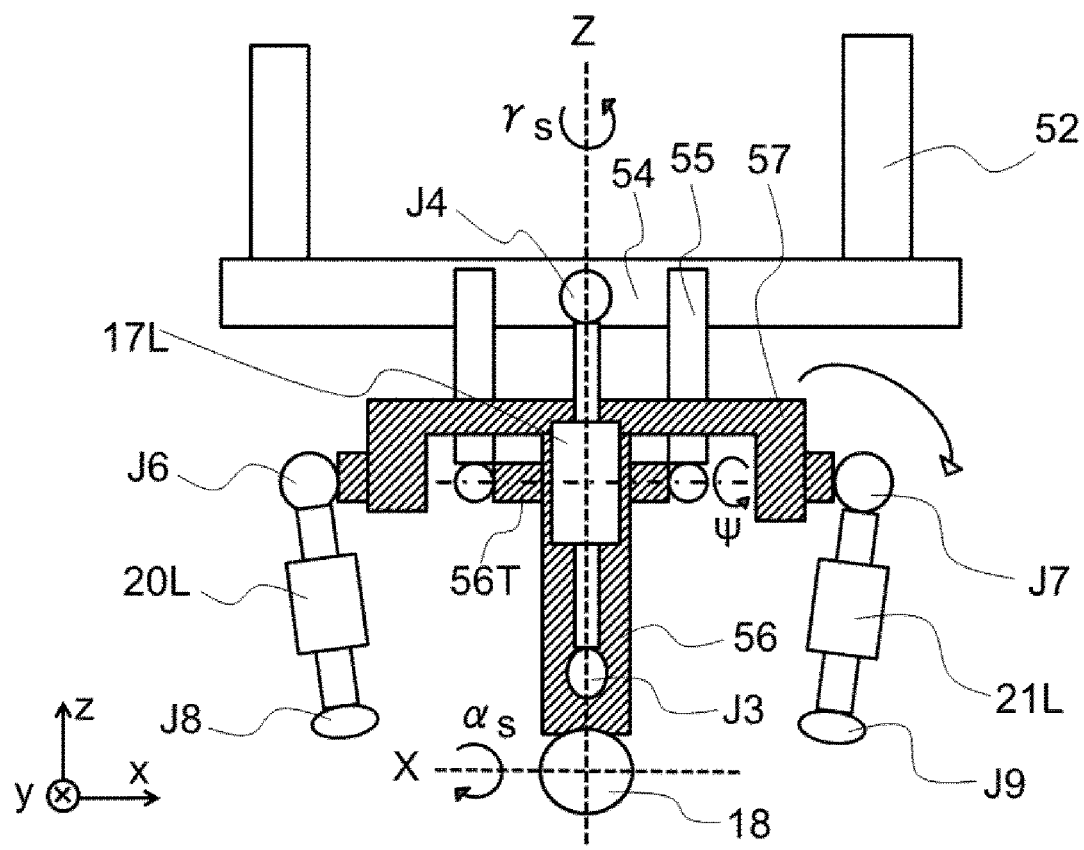
FIG. 27 is a schematic diagram illustrating the division between the chest upper portion and the chest lower portion and the disposition of the variable length links that drive the chest in the humanoid robot of the first embodiment viewing from a front.

FIG. 26 is a schematic diagram illustrating a division between chest upper portion 5U and chest lower portion 5D and disposition of the variable length links that drive chest 5. In FIG. 26, for the purpose of easy understanding of the link arrangement, intrathoracic link 17L is illustrated on the front side than an actual position. FIG. 27 is a schematic view illustrating the division and the disposition viewing from the front. Chest lower portion 5D is illustrated with hatching. Chest lower portion 5D can rotate around thoracolumbar joint 18 around the X-axis, the Y-axis, and the Z-axis by three variable length links. Chest upper portion 5U can rotate around the X-axis by one variable length link with respect to chest lower portion 5D.

A body bending unit C2 is a three-rotational-degree-of-freedom connection mechanism that connects chest 5 to waist 6 with three rotational degrees of freedom. Body bending unit C2 includes thoracolumbar joint 18, thoracolumbar center actuator 19, thoracolumbar right actuator 20, thoracolumbar left actuator 21, chest center link attaching unit J5, chest right link attaching unit J6, chest left link attaching unit J7, waist center link attaching unit J10, waist right link attaching unit J8, and waist left link attaching unit J9. The three rotational degrees of freedom means that the rotation can be performed with a total of three degrees of freedom including one degree of freedom by tilting chest 5 to the front-back direction (the rotation around the X-axis) with respect to waist 6, one degree of freedom by tilting chest 5 in the right and left direction (the rotation around the Y-axis), and one degree of freedom by turning chest 5 around backbone 56 (Z-axis) with respect to waist 6. The three-rotational-degree-of-freedom connection mechanism according to the present disclosure has a simple structure including a three-rotational-degree-of-freedom joint and three actuators.

When body bending unit C2 is generally considered as the three-rotational-degree-of-freedom connection mechanism, body bending unit C2 connects chest 5 being a second member on a connecting side rotatably to waist 6 being a first member on a connected side with three rotational degrees of freedom. Thoracolumbar joint 18 is a joint that connects chest 5 to waist 6 with three rotational degrees of freedom. Backbone 56 is a torsion axis in which the direction is fixed with respect to chest 5. Chest 5 is rotatable around backbone 56 with respect to waist 6. In the three-rotational-degree-of-freedom connection mechanism, a member provided on the side closer to waist 6 is defined as the first member. A member provided on the side farther from waist 6 is defined as the second member.

Thoracolumbar center actuator 19, thoracolumbar right actuator 20, and thoracolumbar left actuator 21 are three actuators each including the variable length link having the variable length and the motor that generates force changing the length of the variable length link. Waist center link attaching unit J10, waist right link attaching unit J8, and waist left link attaching unit J9 are three first-member-side link attaching units provided in waist 6 (first member). One end of each of the three actuators is attached rotatably to each of the three first-member-side link attaching units with at least two rotational degrees of freedom. The positional relationships among waist center link attaching unit J10, waist right link attaching unit J8, and waist left link attaching unit J9 are fixed with respect to thoracolumbar joint 18. Chest center link attaching unit J5, chest right link attaching unit J6, and chest left link attaching unit J7 are three second-member-side link attaching units provided in chest 5 (second member). The other end of each of the three actuators is attached rotatably to each of the three second-member-side link attaching units with at least two rotational degrees of freedom. The positional relationships among chest center link attaching unit J5, chest right link attaching unit J6, and chest left link attaching unit J7 are fixed with respect to thoracolumbar joint 18.

In the reference state in which humanoid robot 100 stands upright, in body bending unit C2, the torsion axis (the backbone, the Z-axis) and other two rotation axes (the X-axis and the Y-axis) in three rotatable axes can be rotated in both directions. Chest center link attaching unit J5, chest right link attaching unit J6, chest left link attaching unit J7, waist center link attaching unit J10, waist right link attaching unit J8, and waist left link attaching unit J9 are disposed such that the maximum value of three angles formed by three links and the torsion axis is greater than or equal to an angle δ0 (for example, about 3 degrees).

In all three-rotational-degree-of-freedom connection mechanisms included in humanoid robot 100, at least one axis of the torsion axis and the other two rotation axes is determined to be rotatable in both directions in the reference state. That is, in the reference state of each three-rotational-degree-of-freedom connection mechanism, rotation can be performed in both directions on at least two rotation axes including the torsion axis.

In body bending unit C2, for example, the upper half body above thoracolumbar joint 18 can be tilted forward by about 20 degrees, tilted backward by about 20 degrees, and tilted in the right and left direction by about 20 degrees. Chest 5 can be rotated (twisted) with respect to waist 6 around backbone 56 by about 20 degrees in both directions. For example, chest upper portion 5U can be tilted forward by about 15 degrees with respect to chest lower portion 5D, and tilted backward by about 20 degrees with respect to chest lower portion 5D by the intrathoracic joint 16. For this reason, for example, when chest lower portion 5D is tilted in the front-back direction, chest upper portion 5U can be kept vertical. The posture that makes both hands easy to work can be taken. The movable range is an example, and the movable range can be widened or narrowed.

Figure 28:
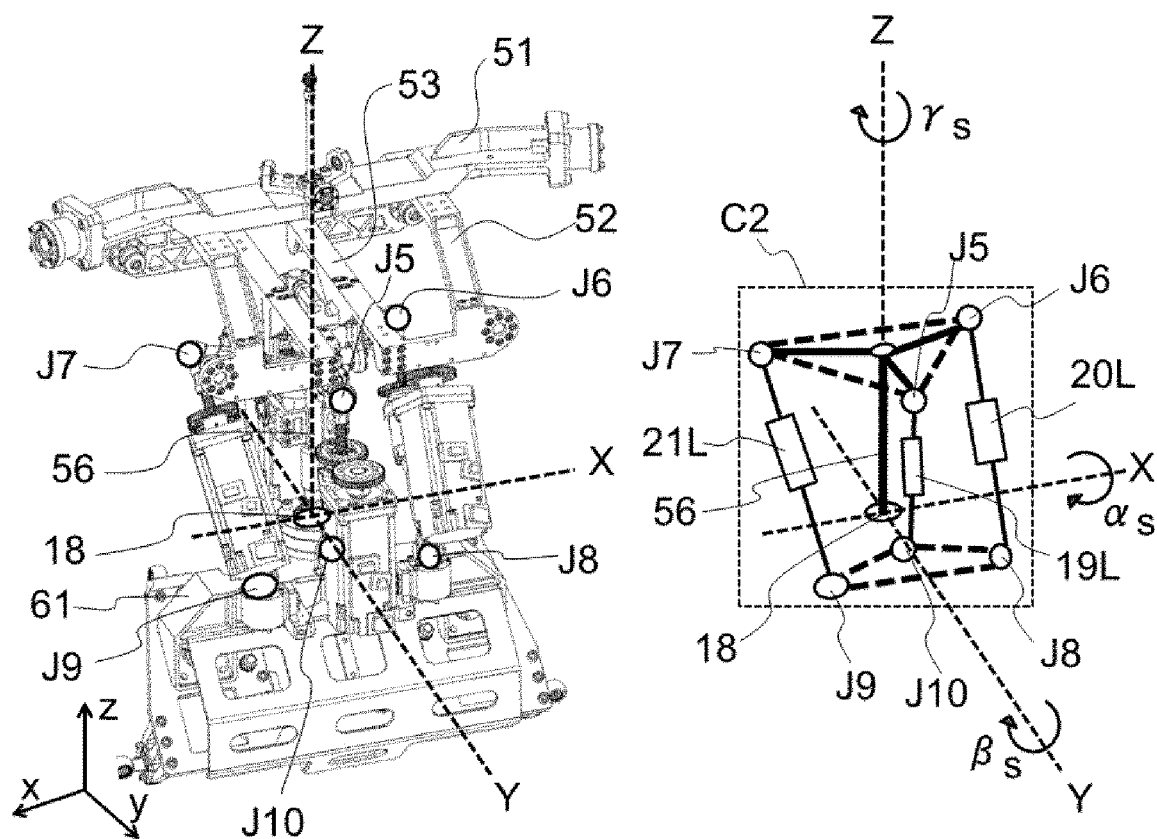
FIG. 28 is a perspective view illustrating the disposition of the variable length links in a body bending unit included in the humanoid robot of the first embodiment viewing from the oblique rear on the left hand side.

FIG. 28 is a perspective view illustrating the disposition of the variable length links in body bending unit C2 in the reference state in which humanoid robot 100 stands upright viewing from the oblique rear on the left hand side. Body bending unit C2 includes three variable length links 19L, 20L, 21L connecting three second-member-side link attaching units J5, J6, J7 provided on chest lower portion 5D and three first-member-side link attaching units J10, J8, J9 provided on waist 6. The positions of three second-member-side link attaching units J5, J6, J7 provided on chest lower portion 5D are fixed with respect to thoracolumbar joint 18. The positions of three first-member-side link attaching units J10, J8, J9 provided on waist 6 are fixed with respect to thoracolumbar joint 18. For this reason, the connection angle of chest lower portion 5D with respect to waist 6 can be changed with three rotational degrees of freedom by changing the lengths of three variable length links 19L, 20L, 21L. It is assumed that as is the rotation angle around the X-axis of thoracolumbar joint 18, that βs is the rotation angle around the Y-axis, and that γs is the rotation angle around the Z-axis. Chest upper portion 5U can rotate around the X-axis with respect to the chest lower portion 5D by intrathoracic joint 16. It is assumed that ψ is the rotation angle around the X axis at intrathoracic joint 16.

A range of the direction in which the torsion axis is directed and is changed by the rotation of the joint such as thoracolumbar joint 18 is referred to as a movable range of the joint. The example illustrated above as the angle range rotatable around the front-back direction and the right and left direction of thoracolumbar joint 18 and backbone 56 indicates the maximum angle range that can be taken on the rotation axis. The angle range that can be taken by a rotation axis is influenced by the angle taken by another rotation axis. For this reason, all the regions obtained by arbitrarily combining the angular ranges of the rotation axes do not become the movable range. The same holds true for other joints.

Figure 29:
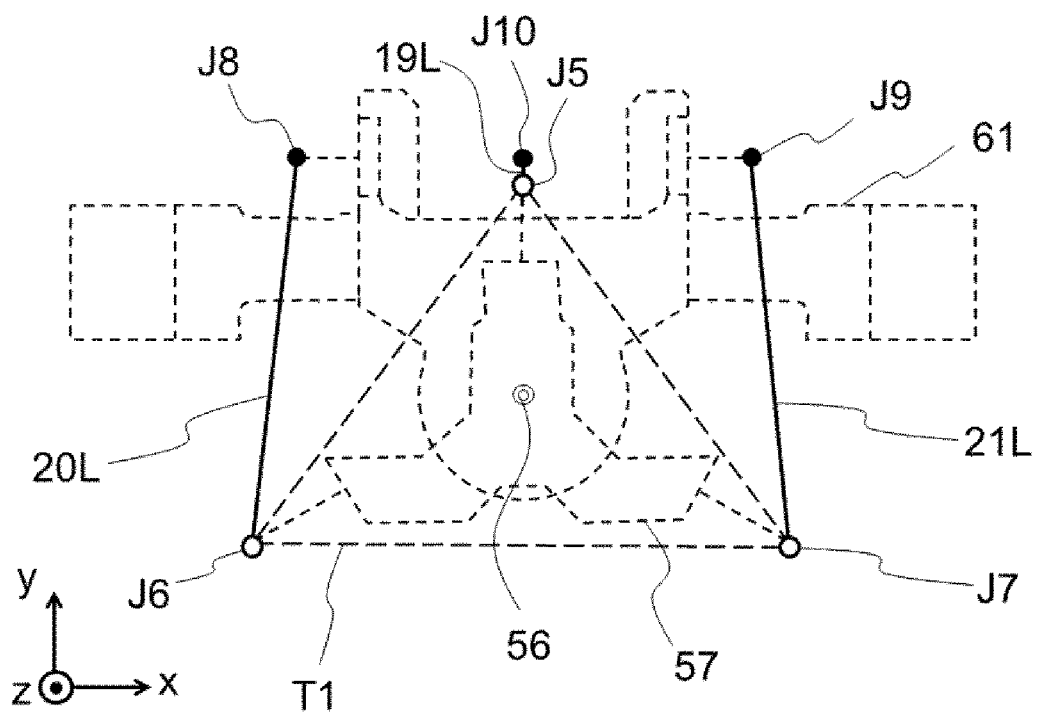
FIG. 29 is a view illustrating the disposition of the variable length links in a reference state of the body bending unit included in the humanoid robot of the first embodiment viewing from the direction in which a backbone extends.

FIG. 29 is a view illustrating the disposition of the variable length links in body bending unit C2 viewing from the direction in which the backbone extends. In FIG. 29, backbone 56 being the torsion axis is represented by a double circle. Chest center link attaching unit J5, chest right link attaching unit J6, and chest left link attaching unit J7, being the second-member-side link attaching unit, are represented by a white circle. Waist center link attaching unit J10, waist right link attaching unit J8, and waist left link attaching unit J9, being the first-member-side link attaching unit, are represented by a black circle. Thoracolumbar center link 19L, thoracolumbar right link 20L, and thoracolumbar left link 21L, being the variable length links, are represented by a bold line. The similar expression is made in other similar drawings. A triangle formed by connecting three second-member-side link attaching units is referred to as a second-member-side triangle T1.

The following facts can be understood from FIGS. 28 and 29. Variable length links 20L, 21L are long, are located at a twisted position with respect to torsion axis 56, and are largely inclined with respect to the horizontal plane. Viewing from the direction of torsion axis 56, variable length links 20L, 21L are substantially parallel to each other such that torsion axis 56 is sandwiched therebetween. The rotation direction around torsion axis 56 for shortening the variable length link 20L and the rotation direction around torsion axis 56 for shortening the variable length link 21L are opposite to each other. For this reason, when second member 6 is rotated, one of variable length links 20L, 21L is lengthened, and the other is shortened. Consequently, in the rotation around torsion axis 56, both the force pushed by the extending link and the force drawn by the shortening link are generated, the rotation is easily performed around torsion axis 56. In body bending unit C2, in each state within the movable range, the rotation around the torsion axis causes both of lengthening and shortening of the variable length links.

Torsion axis 56 represented by a double circle is located inside of second-member-side triangle T1, and exists on a bisector of a base side of second-member-side triangle T1. The bisector of the base side of the second-member-side triangle is referred to as a symmetrical axis line, and the base side is referred to as a symmetrical axis perpendicular line. When variable length links 20L, 21L are similarly expanded while variable length link 19L is contracted, the tilt of second member 6 can be changed in the direction of the symmetrical axis line. When variable length links 20L, 21L are similarly contracted while variable length link 19L is expanded, the tilt of second member 6 can be changed to the opposite direction in the direction of the symmetrical axis line. When the length of variable length link 19L is kept constant, when variable length link 20L is lengthened, and when variable length link 21L is shortened, or when the length of variable length link 19L is kept constant, when variable length link 20L is shortened, and when variable length link 21L is lengthened, the tilt of second member 6 can be changed in the direction of the symmetrical axis perpendicular line.

Figure 30:
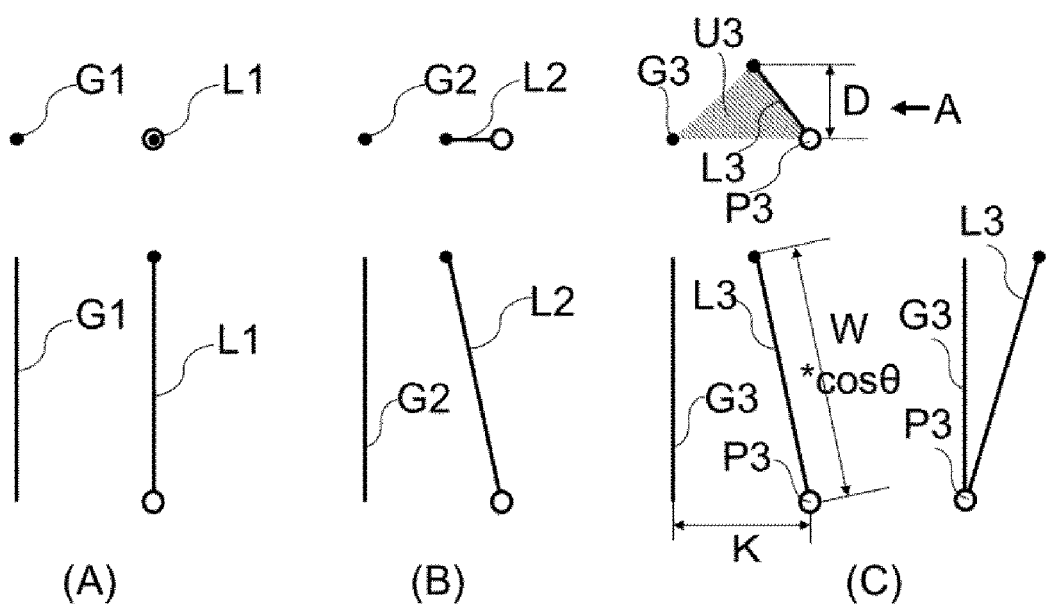
FIG. 30 is a view illustrating whether a torque rotating around a torsion axis is generated by expansion and contraction of the variable length link depending on a positional relationship between the torsion axis and the variable length link in the three-rotational-degree-of-freedom connection mechanism included in the humanoid robot of the first embodiment.

It is examined about the condition on the disposition of the links that allows the second member to rotate around the torsion axis by the expansion and contraction of the variable length link. FIG. 30 is a view illustrating whether a torque rotating around the torsion axis is generated by the expansion and contraction of the variable length link depending on the positional relationship between the torsion axis and the variable length link. In FIG. 30, it is assumed that the lower end (indicated by the white circle) of variable length link L3 has the fixed positional relationship with the torsion axis. FIG. 30(a) illustrates the case that a torsion axis G1 and variable length link L1 are parallel with each other. FIG. 30(b) illustrates the case that a torsion axis G2 and variable length link L2 are located on the same plane and are not parallel with each other. FIG. 30(c) illustrates the case that a torsion axis G3 and variable length link L3 have a twisted relationship. In each of FIGS. 30(a) to 30(c), the view viewed from the direction of the torsion axis is illustrated on the upper side, and the view viewed from the direction perpendicular to the torsion axis is illustrated on the lower side. FIG. 30(c) also illustrates the view viewed from the direction being perpendicular to the torsion axis and being able to view a lower end P3 of variable length link L3 on torsion axis G3 (illustrated by an arrow A).

In the case that torsion axis G1 and variable length link L1 are parallel with each other, as illustrated in FIG. 30(a), torsion axis G1 and variable length link L1 are points viewing from the direction of torsion axis G1. Thus, a component of the force in the direction perpendicular to torsion axis G1 and the torque rotating around torsion axis G1 are not generated by the expansion and contraction of variable length link L1. In the case that torsion axis G2 and variable length link L2 are located on the same plane and are not parallel with each other, as illustrated in FIG. 30(b), variable length link L2 is directed in the direction of torsion axis G2. For this reason, although the component of the force applying in the direction perpendicular to torsion axis G2 is generated by the expansion and contraction of variable length link L2, the torque rotating around torsion axis G1 is zero because the component is directed in the direction of torsion axis G2. In the case that torsion axis G3 and variable length link L3 have the twisted relationship, as illustrated in FIG. 30(c), the torque around torsion axis G3 is generated in proportion to an area of a triangle U3 by the expansion and contraction of variable length link L3.

Because a distance K between one end P3 of variable length link L3 and torsion axis G3 is fixed, the torque is determined by a distance D between the other end Q3 of variable length link L3 and a plane (referred to as a link reference plane) determined by torsion axis G3 and one end P3. A ratio (D/W) of distance D to a length (represented by W) of the variable length link L3 represents a change amount of distance D in the case that the length of variable length link L3 changes by a unit amount. Assuming that $\theta$ is an angle (referred to as the tilt angle) formed by the link reference plane and variable length link L3, the following equation holds.

$$\sin \theta = D/W$$

In FIGS. 30(a) and 30(b), the tilt angle $\theta$ is determined to be $\theta=0$. In order to generate the necessary torque around the torsion axis by the expansion and contraction of the variable length link, tilt angle $\theta$ is required to be greater than or equal to a predetermined angle $\delta 0$ (for example, about 3 degrees). Here, the case of one variable length link is examined. However, in the case of at least two variable length links, the maximum value among the tilt angles of the variable length links may be greater than or equal to $\delta 0$. The link reference plane is a plane that is determined in each variable length link. Specifically, the link reference plane is the plane including the torsion axis and the first-member-side link attaching unit of the variable length link provided in the first member when the direction of the torsion axis is fixed to the first member, or the plane including the torsion axis and the second-member-side link attaching unit of the variable length link provided in the second member when the direction of the torsion axis is fixed to the second member.

In the case of tilt angle $\theta$, a torque TA by the variable length link L3 is given as follows.

$$TA \propto K^*W^*\sin \theta = K^*D = 2^* \text{area of triangle } U3$$

The torque required to rotate the second member around the torsion axis also relates to inertia moment of the second member. The threshold value $\delta 0$ with respect to tilt angle $\theta$ may be set to the same value in all three-rotational-degree-of-freedom connection mechanisms, or set in each three-rotational-degree-of-freedom connection mechanism. In determining tilt angle $\theta$, the change amount of the length of the variable length link may be not the unit amount but a change amount in consideration of a width of the variable range of the length of the variable length link.

In the reference state, variable length link 19L is located on the same plane as torsion axis 56, and a tilt angle $\theta s1$ formed by variable length link 19L and the link reference plane is 0 degree. Variable length link 20L and variable length link 21L have the twisted relationship with torsion axis 56. Tilt angles $\theta s2$ and $\theta s3$ of variable length link 20L and variable length link 21L are about 41 degrees. A maximum value $\theta s\max$ of the tilt angles between three variable length links 19L, 20L, 21L and the link reference plane is greater than or equal to $\delta 0$. Thus, the torque around torsion axis 56 can be generated when any one of variable length links 20L, 21L expands or contracts.

Because tilt angles $\theta s2$ and $\theta s3$ are about 41 degrees, at least one of $\theta s2$ and $\theta s3$ is greater than or equal to $\delta 0$ even if chest 5 is largely tilted. That is, in each state within the movable range of thoracolumbar joint 18, at least one of three variable length links 19L, 20L, 21L has the twisted relationship with torsion axis 56. The tilt angle formed by the link reference plane and variable length link 20L is greater than or equal to $\delta 0$. The link reference plane is a plane including torsion axis 56 and the each of second-member-side link attaching units J6, J7 provided in second member 5 in which the direction of torsion axis 56 is fixed.

Figure 31:
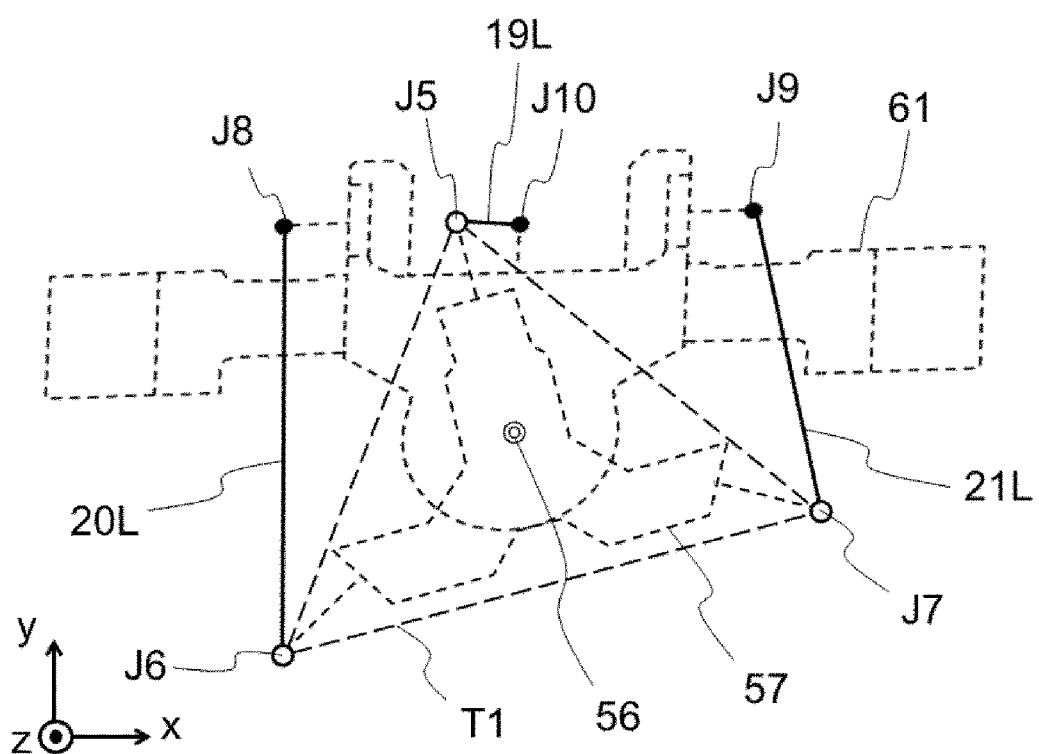
FIG. 31 is a view illustrating the disposition of the variable length links when the chest of the body bending unit included in the humanoid robot of the first embodiment is rotated and tilted forward viewing from the direction in which the backbone extends.

FIG. 31 is a view illustrating the disposition of the variable length links in body bending unit C2 when chest 5 is rotated and tilted forward viewing from the direction in which the backbone extends. In FIG. 31, chest 5 (second member) is twisted to the left by 15 degrees, and tilted forward by 30 degrees in the direction of 15 degrees to the left. Because the direction of torsion axis 56 is fixed with respect to the second member, when torsion axis 56 is tilted, waist 6 (first member) is expanded and contracted in the direction in which waist 6 (first member) is tilted by viewing the direction in which torsion axis 56 extends depending on the tilted angle. In FIG. 31, it is contracted by cos (30 degrees)=about 0.87 times. Because of the rotation around torsion axis 56, variable length link 20L is lengthened and variable length link 21L is shortened. In the case other than the rotation around torsion axis 56, the following result is obtained. In the case that torsion axis 56 is tilted forward, both tilt angles θs2, θs3 of variable length links 20L, 21L are decreased. In the case that torsion axis 56 is tilted to the right, tilt angle θs2 of variable length link 20L is increased and tilt angle θs3 of variable length link 21L is decreased. In body bending unit C2, maximum value θsmax of the tilt angle is greater than or equal to about 30 degrees even if body bending unit C2 is tilted in what way within the movable range. In the case that the movable range of the joint is determined such that rotation around the torsion axis is not required in the vicinity of the boundary within the movable range, maximum value θsmax of the tilt angle may not be greater than or equal to determined angle δ0 in the vicinity of the boundary within the movable range It.

The description is returned to the structure of waist 6. Lower limb connecting frame 62 has a substantially rectangular plate member. Lower limb connecting frame 62 is fixed to the right and left in the lower portion of waist main frame 61 such that the front side of lower limb connecting frame 62 is higher than the rear side. A protrusion 64 protrudes inside (the side closer to the center of the body) perpendicularly from lower limb connecting frame 62. At a tip of protrusion 64, a hip joint 22 is provided so as to connect thigh 10 to waist 6 outward and obliquely upward. Hip joint 22 includes a spherical bearing in which a spherical surface provided on waist 6 is surrounded by a recess provided on thigh 10. Hip joint 22 includes a spherical member including a spherical surface and a spherical receiving member provided an end of thigh 10 that holds the spherical surface of the spherical member rotatably with three rotational degrees of freedom. The spherical member protrudes outward and obliquely upward from protrusion 64 that is a part of waist 6. Consequently, the movable range of thigh 10 can be widened.

Protrusion 65 protrudes from the front side of lower limb connecting frame 62, and a crotch front link attaching unit J11 is provided on the front side at the tip of protrusion 65. A thigh front link 23L (illustrated in FIG. 57) that rotates hip joint 22 is attached to crotch front link attaching unit J11. Protrusion 65 is bent, and has the surface of the portion being provided with crotch front link attaching unit Eland being substantially vertical in the reference state. In crotch front link attaching unit J11, the rotation member and the cylinder rotated by the rotation member are provided in protrusion 65, and the yoke and the shaft member are provided at one end of thigh front link 23L. Crotch front link attaching unit J11 is a biaxial gimbal having a structure in which the shaft member provided rotatably at one end of thigh front link 23L is inserted into the cylinder provided in protrusion 65.

Protrusion 66 protrudes from the vicinity of the corner on the rear side outside lower limb connecting frame 62, and a crotch outside link attaching unit J12 is provided outside the tip of protrusion 66. A thigh outside link 24L is attached to crotch outside link attaching unit J12. Protrusion 67 protrudes vertically from the vicinity of the corner existing on the rear side and inside of lower limb connecting frame 62, and a crotch inside link attaching unit J13 is provided inside of the tip of protrusion 67. A thigh inside link 25L is attached to crotch inside link attaching unit J13. Protrusion 67 is bent, and crotch inside link attaching unit J13 is provided obliquely below on the inside. Crotch outside link attaching unit J12 and crotch inside link attaching unit J13 are a biaxial gimbal having the same structure as that of crotch front link attaching unit J11.

Figure 32:
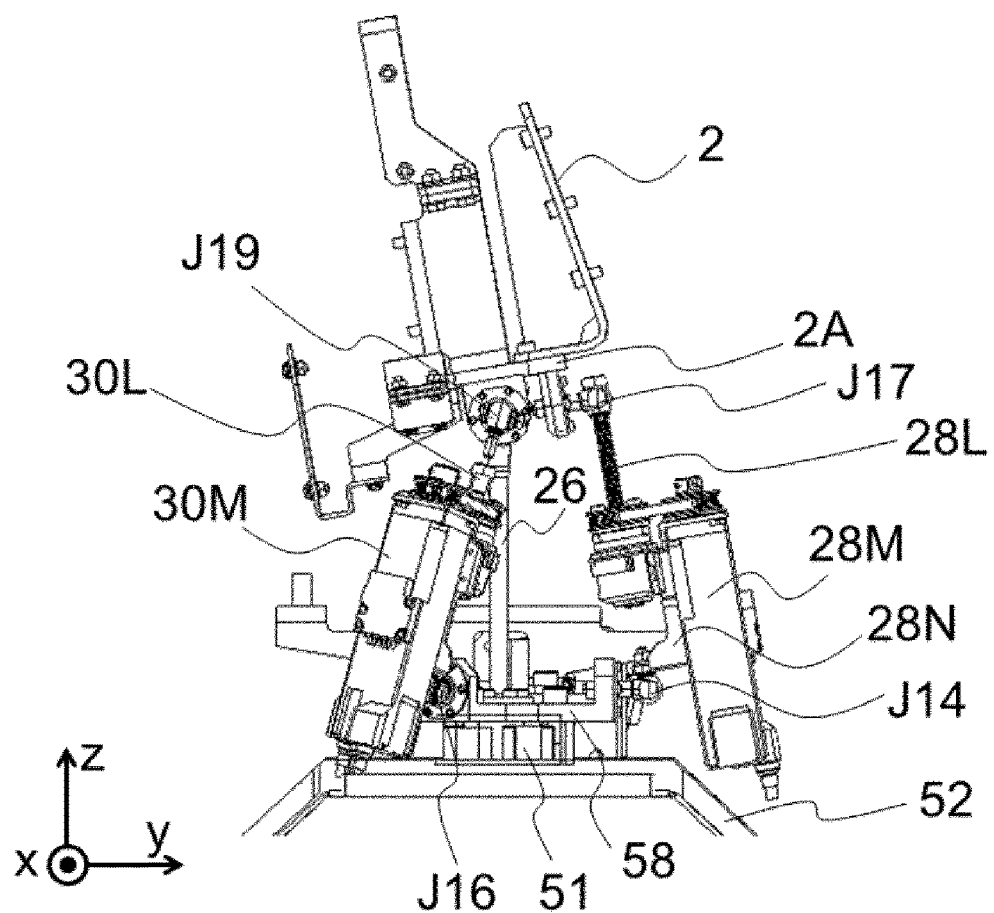
FIG. 32 is an enlarged side view illustrating a head of the humanoid robot of the first embodiment.
Figure 33:
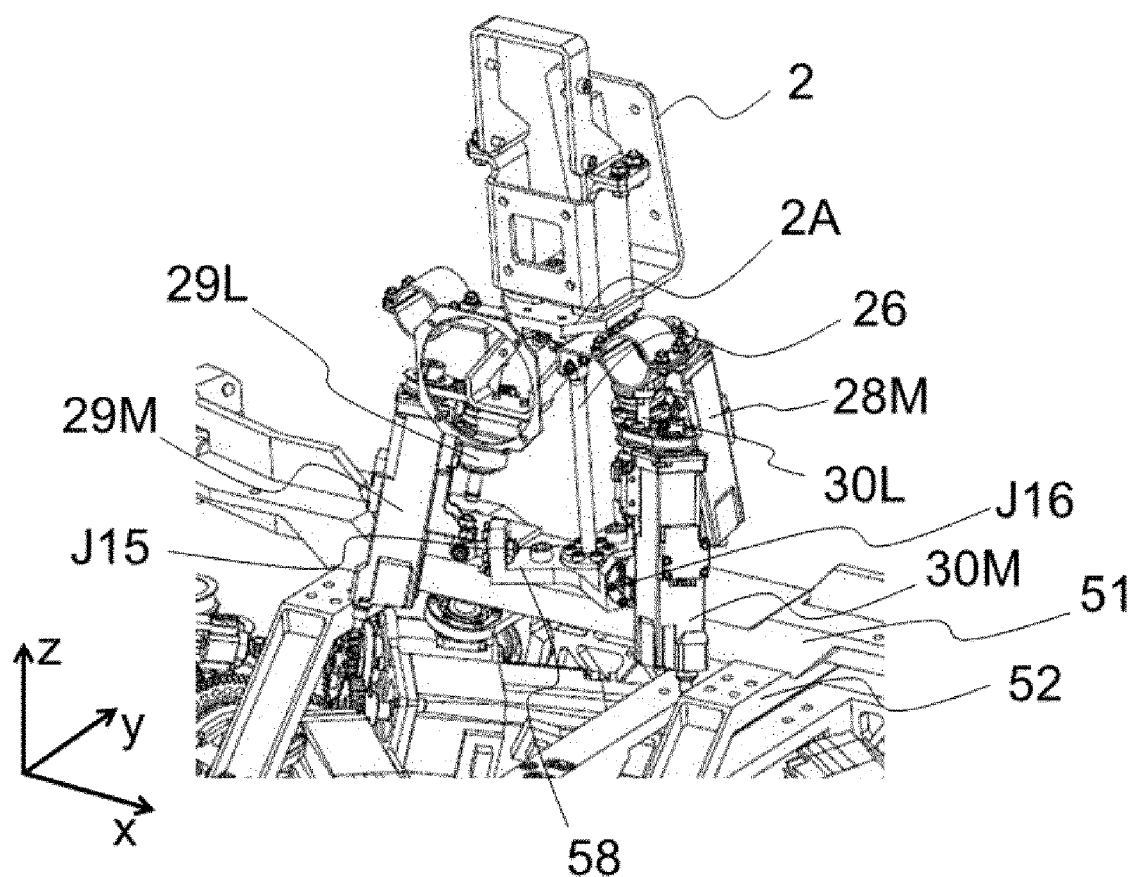
FIG. 33 is an enlarged perspective view illustrating the head of the humanoid robot of the first embodiment.

Referring to FIGS. 5, 10, 12, 13, 32, and 33, the structure of head 2 is described. FIG. 32 is an enlarged side view of head 2. FIG. 33 is an enlarged perspective view of head 2. A neck center rod 26 extends upward from the center of the upper surface of shoulder frame 51. Head 2 is connected to a neck joint 27 provided at the tip of neck center rod 26. A spherical bearing in which a spherical surface is provided at the tip of neck center rod 26 is used in neck joint 27. Neck joint 27 connects head 2 and chest 5 with three rotational degrees of freedom. Head 2 includes an octagonal plate-shaped head base plate 2A in which four corners of a square are cut. A device that implements functions such as an eye, an ear, and a mouth is attached to head base plate 2A.

Head 2 can be rotated around neck joint 27 with three rotational degrees of freedom by a neck rear actuators 28, a neck right-side actuator 29, and a neck left-side actuator 30. That is, head 2 can be tilted by, for example, about 20 degrees in the front-back direction and the right and left direction. Head 2 can be rotated around neck center rod 26 in both directions by, for example, about 60 degrees.

A neck lower frame 58 is provided on the upper surface of the shoulder frame 51. One ends of the variable length links included in the three actuators that move head 2 are attached to neck lower frame 58. Neck lower frame 58 includes three plate-like portions extending from the center at intervals of 120 degrees on a horizontal plane. The tips of the three plate-shaped portions are bent by 90 degrees, and a neck rear link attaching unit J14, a neck right-side link attaching unit J15, and a neck left-side link attaching unit J16 are provided in the bent portion. Neck rear link attaching unit J14 is located in the center of the rear side of shoulder frame 51. Neck right-side link attaching unit J15 is located to the slight right of the front center of shoulder frame 51. Neck left-side link attaching unit J16 is located to the slight left of the front center of shoulder frame 51.

Neck rear link attaching unit J14 is a biaxial gimbal in which the shaft member provided at the other end of a neck rear link 28L is held rotatably by the yoke that is rotated by the rotation member protruding rearward from neck lower frame 58. Neck right-side link attaching unit J15 and neck left-side link attaching unit J16 are also a biaxial gimbal having the same structure.

A head rear link attaching unit J17 is provided in the center on the rear side in the lower portion of head 2. A head right-side link attaching unit J18 is provided on the right side in the lower portion of head 2. A head left-side link attaching unit J19 is provided on the left side in the lower portion of head 2.

One ends of neck rear link 28L, a neck right-side link 29L, and a neck left-side link 30L are attached to head rear link attaching unit J17, head right-side link attaching unit J18, and head left-side link attaching unit J19 with two rotational degrees of freedom, respectively. The other ends are attached to neck rear link attaching unit J14, neck right-side link attaching unit J15, and neck left-side link attaching unit J16 with two rotational degrees of freedom, respectively.

Neck rear link 28L is attached to head rear link attaching unit J17 with a link attachment 28N interposed therebetween. The lengths of the screw rod and the cylinder included in neck rear link 28L are shorter than the distance between head rear link attaching unit J17 and neck rear link attaching unit J14. Link attachment 28N is a member, which extends along motor 28M from a gap existing between the cylinder included in neck rear link 28L and motor 28M. Link attachment 28N is bent into an L-shape in the side view. The tip of L-shaped link attachment 28N is attached to the head rear link attaching unit 17 at the position where the screw rod is extended. The lower end of motor 28M exists below an attachment position of link attachment 28N. A neck right-side link 29L and a neck left-side link 30L have the same structure. This allows use of a motor that is longer than the length of the variable length link included in the actuator.

A neck C3 is a three-rotational-degree-of-freedom connection mechanism that connects head 2 being the second member rotatably to chest 5 being the first member with three rotational degrees of freedom. Neck C3 includes neck joint 27 being the joint, neck rear links 28L, neck right-side link 29L, and neck left-side link 30L, being the three variable length links, neck rear link attaching unit J14, neck right-side link attaching unit J15, and neck left-side link attaching unit J16, being the three first-member-side link attaching units, and head rear link attaching unit J17, head right-side link attaching unit J18, and head left-side link attaching unit J19, being the three second-member-side link attaching units.

The direction of neck center rod 26, being the torsion axis, is fixed with respect to chest 5. The angle of neck center rod 26 can be changed with respect to head 2. Each of relative positional relations with respect to neck center rod 26 and neck joint 27 is fixed in each of neck rear link attaching unit J14, neck right-side link attaching unit J15, and neck left-side link attaching unit J16. Each of the relative positional relationships with neck joint 27 is also fixed in each of head rear link attaching unit J17, head right-side link attaching unit J18, and head left-side link attaching unit J19.

Figure 34:
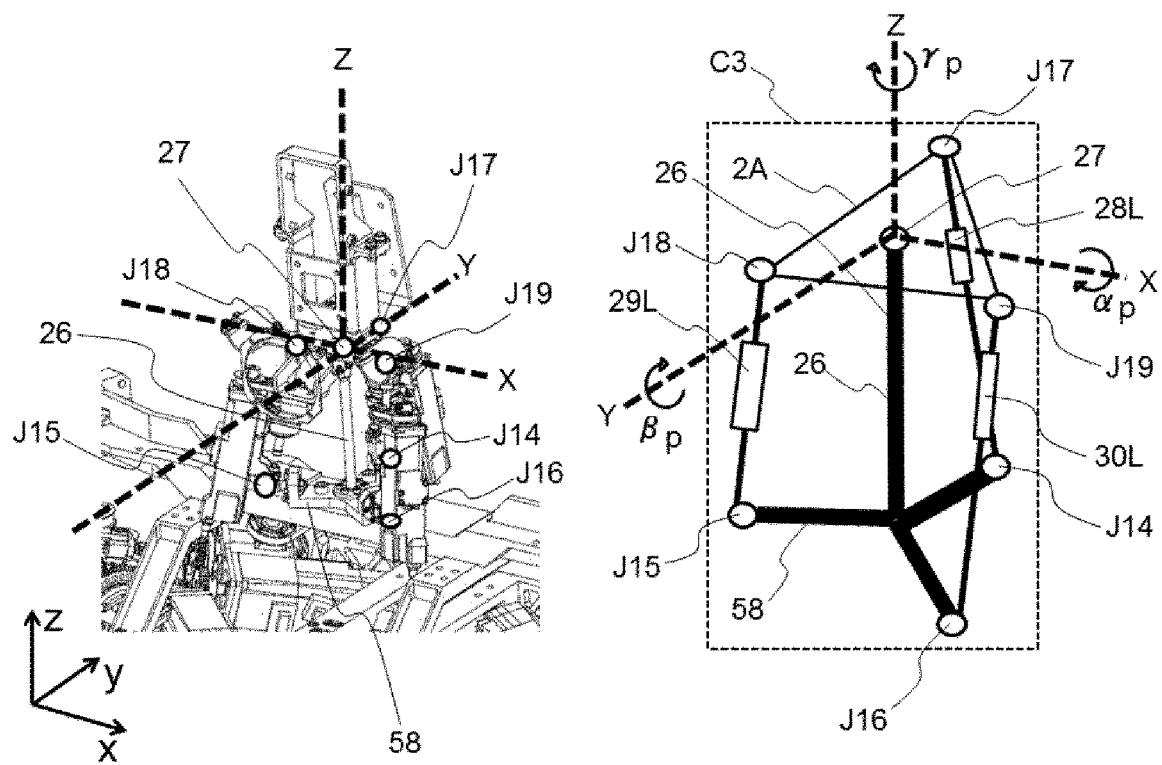
FIG. 34 is a perspective view illustrating the disposition of the variable length links at a neck included in the humanoid robot of the first embodiment.

The disposition of the variable length links in neck C3 is described. FIG. 34 is a perspective view illustrating the disposition of the variable length links in neck C3. Neck C3 includes three variable length links 28L, 29L, 30L that connect three second-member-side link attaching units J17, J18, J19 and three first-member-side link attaching units J14, J15, J16, respectively. For this reason, the connection angle of head 2 with respect to chest 5 can be changed with three rotational degrees of freedom by changing the lengths of three variable length links 28L, 29L, 30L. It is assumed that αp is the rotation angle around the X-axis of neck joint 27, that βp is the rotation angle around the Y-axis, and that γp is the rotation angle around the Z axis.

Neck joint 27 exists on a line segment connecting the second-member-side link attaching units J18, J19. A second-member-side triangle T2 is an isosceles triangle, and neck joint 27 is located at a midpoint of the base side. For this reason, in the case that second member 2 is tilted in the front-rear direction, it is only necessary to change the length of variable length link 28L. In the case that second member 2 is tilted in the right and left direction, one of variable length links 29L, 30L is lengthened while the other is shortened.

The similar effect is also obtained in the case that the first-member-side link attaching units are disposed in other joints such that the joint exists on the line segment connecting the two first-member-side link attaching units provided in the first member having a changeable angle with respect to the torsion axis. Alternatively, the similar effect is also obtained in the case that the second-member-side link attaching units are disposed such that the joint exists on the line segment connecting the two second-member-side link attaching units provided in the second member having a changeable angle with respect to the torsion axis.

Figure 35:
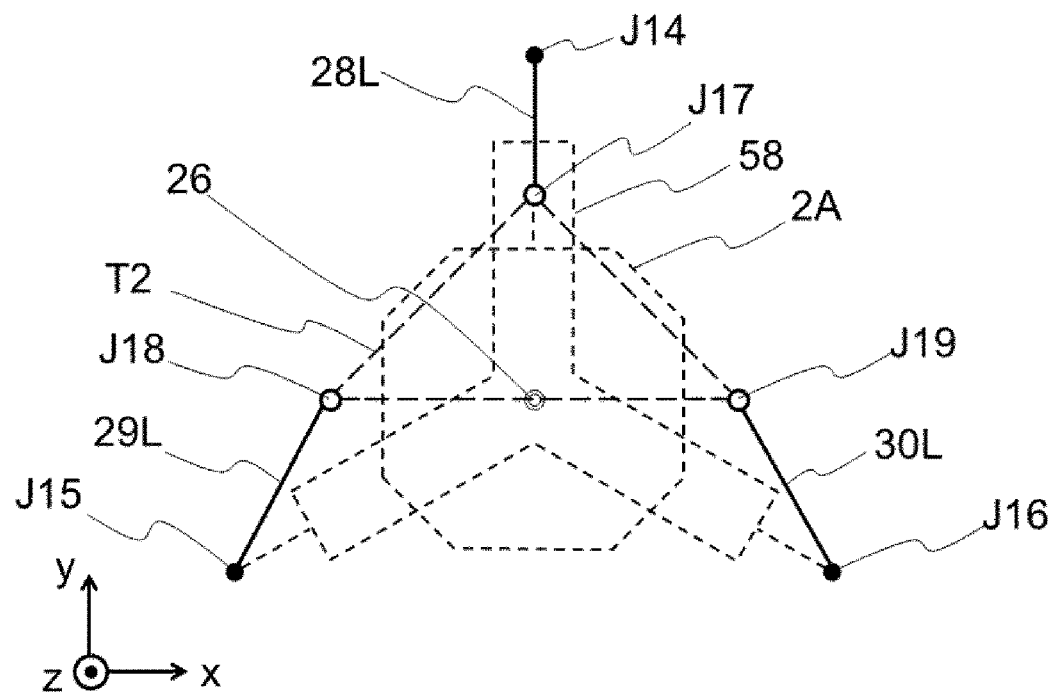
FIG. 35 is a view illustrating the disposition of the variable length links in a reference state of the neck included in the humanoid robot of the first embodiment viewing from a direction in which a neck center rod extends.

FIG. 35 is a view illustrating the disposition of the variable length links of neck C3 in the reference state viewing from the direction in which neck center rod 26 extends. In the reference state, variable length links 29L, 30L and torsion axis 26 have the twisted relationship. A tilt angle θp1 formed between variable length link 28L and the link reference plane including first-member-side link attaching unit J14 of variable length link 28L and torsion axis 26 is zero degree. Tilt angles θp2, θp3 of variable length links 29L, 30L are about 16 degrees. A maximum value θpmax of the angle formed between each of three variable length links 28L, 29L, 30L and torsion axis 26 is about 16 degrees, and is greater than or equal to δ0 (for example, about 3 degrees). The torque rotating around torsion axis 26 is generated in the case that the lengths of variable length links 28L, 29L, 30L are changed.

Figure 36:
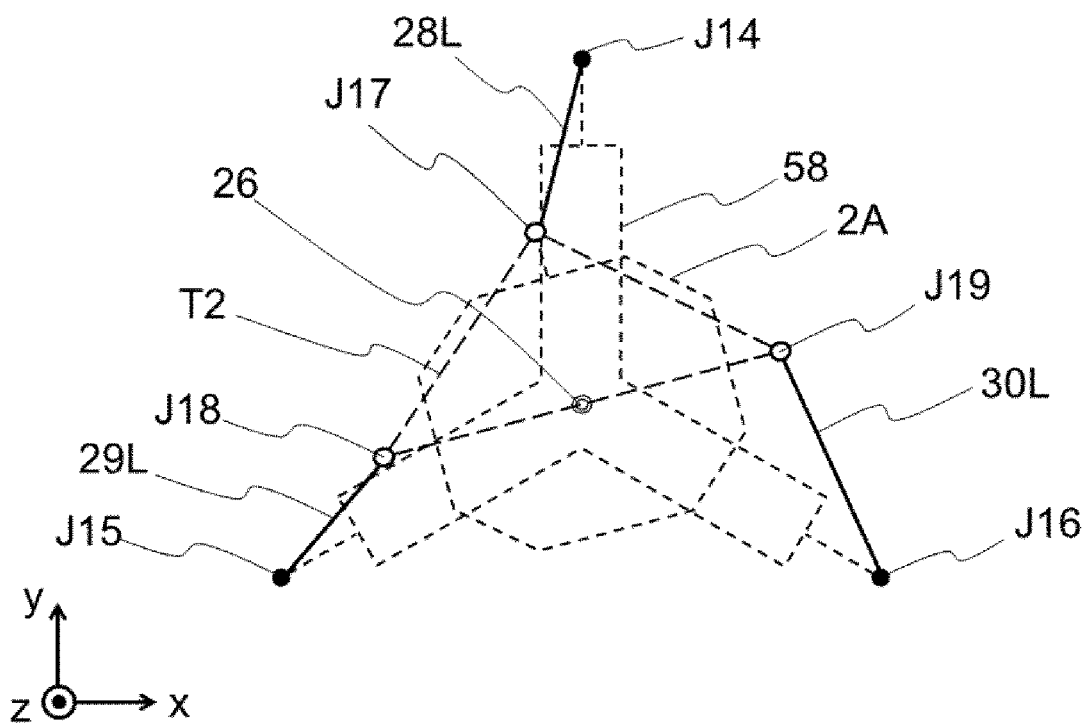
FIG. 36 is a view illustrating the disposition of the variable length links when the head of the neck included in the humanoid robot of the first embodiment is rotated and tilted forward viewing from the direction in which the neck center rod extends.

When head 2 is tilted, maximum value θpmax of the three tilt angles is greater than or equal to δ0. FIG. 36 is a view illustrating the disposition of the variable length links in neck C3 while head 2 is rotated and tilted forward viewing from the direction in which neck center rod 26 extends. FIG. 36 illustrates the disposition of the variable length links while head 2 is twisted to the left by 15 degrees and tilted forward by 30 degrees in the direction of 15 degrees to the left. Tilt angles θp1, θp3 of variable length links 28L, 30L are increased, and tilt angle θp2 of variable length link 29L is decreased. In the case that the rotation around torsion axis 26 is not performed, tilt angles θp2, θp3 of variable length links 29L, 30L are kept constant at about 16 degrees when second member (head) 2 is tilted back and forth. When second member 2 is tilted in the right and left direction, one of tilt angles θp2, θp3 of variable length links 29L, 30L is increased while the other is decreased. Thus, in each case that the length of each of variable length links 28L, 29L, 30L varies within a possible range, any one of the variable length links has the twisted relationship with respect to torsion axis 26, and maximum value θpmax in the tilt angles of the three variable length links is greater than or equal to about 16 degrees.

A plane determined by three first-member-side link attaching units or a plane determined by three second-member-side link attaching units is referred to as a link attaching plane. The intersection point of neck center rod 26 being the torsion axis and the link attaching plane is referred to as a torsion center. First-member-side link attaching units J14, J15, J16 existing on chest 5 being the first member are disposed at three points where a center angle becomes 120 degrees on a circumference of a circle having a predetermined distance from the torsion center on the link attaching plane. Second-member-side link attaching units J17, J18, J19 existing on head 2 being the second member are disposed at positions, being equidistant from neck joint 27 and has center angles of 90 degrees, 90 degrees, and 180 degrees with respect to the neck joint 27, on the link attaching plane. Consequently, all of variable length links 28L, 29L, 30L do not exist on the same plane as torsion axis 26 even if neck joint 27 rotates in what way. That is, at least one of variable length links 28L, 29L, 30L has the twisted relationship with torsion axis 26.

In other three-rotational-degree-of-freedom connection mechanisms, three center angles formed by the three first-member-side link attaching units and the torsion center in the link attaching plane on the first member side are different from three central angles formed by the three second-member-side link attaching units and the torsion center in the link attaching plane on the second member side. For this reason, the situation in that the plane including each one of the three variable length links also includes the torsion axis is not simultaneously generated in all the three variable length links. Maintaining a situation in that one variable length link (referred to as a link A) is disposed on the same plane as the torsion axis, the joint is rotated within the movable range around a rotation axis that is perpendicular to the plane. In the rotation of the joint within the movable range, one of the following states occurs. (A) At least one of the remaining two variable length links is not disposed on the same plane as the torsion axis. (B) The remaining two variable length links are disposed on the same plane as the torsion axis at different rotation angles. Consequently, even if the joint rotates in what way, the fact that the plane including the variable length link includes the torsion axis is not simultaneously generated in all the three variable length links. That is, at least one of the three variable length links has the twisted relationship with the torsion axis.

In the rotation around neck center rod 26 (torsion axis), one of neck right-side link 29L and neck left-side link 30L is lengthened and the other is shortened. Consequently, in the rotation around the torsion axis, both the force pushed by the extending link and the force drawn by the shortening link are generated, the rotation is easily performed around torsion axis.

Figure 37:
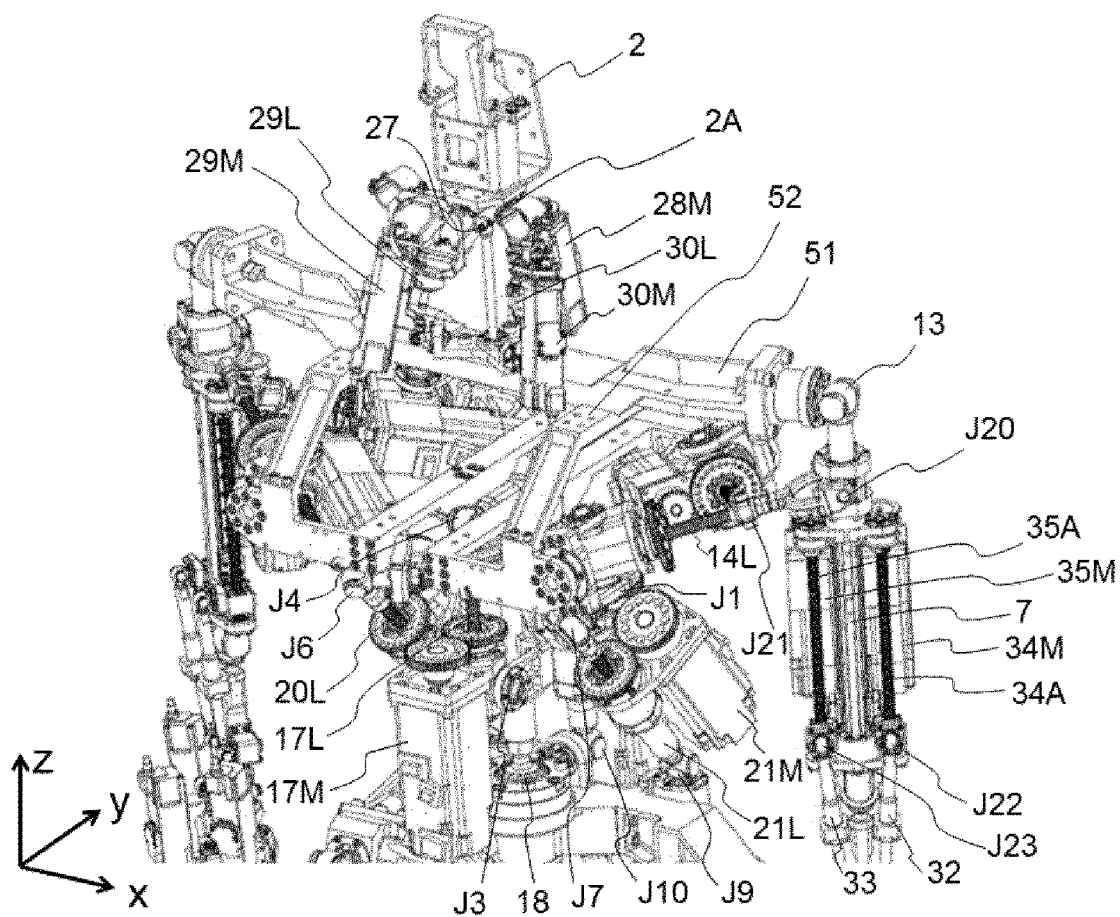
FIG. 37 is a perspective view illustrating the upper half body of the humanoid robot according to first embodiment.

Referring to FIGS. 10 to 16 and 37, a structure of a shoulder C4 is described below. FIG. 37 is a perspective view illustrating the upper half body of humanoid robot 100. Upper arm 7 is connected to chest 5 with two rotational degrees of freedom by shoulder joint 13. Upper arm 7 and forearm 8 have a straight rod shape. An upper arm main link attaching unit J20 being attached with upper arm drive main link 14L with two rotational degrees of freedom is provided at a position of a predetermined distance from shoulder joint 13 of upper arm 7. Upper arm main link attaching unit J20 is a biaxial gimbal having the structure in which the rotation member that rotates around the direction in which the upper arm 7 is sandwiched by the semicircular yoke being provided at one end of upper arm drive main link 14L such that the angle formed with upper arm 7 is rotatable. Two columnar protrusions existing on the same straight line perpendicular to the rotation member protrude toward both sides, and the protrusions are sandwiched rotatably by the yoke provided on upper arm drive main link 14L.

A main-link-side auxiliary link attaching unit J21 being attached with one end of upper arm drive auxiliary link 15L with one rotational degree of freedom is provided at a position having a distance determined from upper arm main link attaching unit J20 of upper arm drive main link 14L. The center lines of upper arm drive main link 14L and upper arm drive auxiliary link 15L exist on the same plane. The plane is referred to as an upper arm drive link plane. In main-link-side auxiliary link attaching unit J21, upper arm drive auxiliary link 15L is attached to upper arm drive main link 14L so as to be rotatable with one rotational degree of freedom at which the angle on the upper arm drive link plane can be changed. Main-link-side auxiliary link attaching unit J21 has the structure in which protrusions (shaft member) perpendicular to the upper arm drive link plane provided on upper arm drive main link 14L is sandwiched by the yoke provided at one end of upper arm drive auxiliary link 15L.

The plane determined by chest-side main link attaching unit J1, chest-side auxiliary link attaching unit J2, and main-link-side auxiliary link attaching unit J21 is referred to as the upper arm drive link plane. When the lengths of upper arm drive main link 14L and upper arm drive auxiliary link 15L change, the upper arm drive link plane rotates around the straight line passing through chest-side main link attaching unit J1 and chest-side auxiliary link attaching unit J2. Upper arm drive main link 14L and upper arm drive auxiliary link 15L exist on the upper arm drive link plane. About the relative positional relationship between upper arm drive main link 14L and upper arm drive auxiliary link 15L, only the angle formed by upper arm drive main link 14L and upper arm drive auxiliary link 15L is changed at main-link-side auxiliary link attaching unit J21. Thus, main-link-side auxiliary link attaching unit J21 may have only one rotational degree of freedom at which only the rotation can be performed in the upper arm drive link plane. Main-link-side auxiliary link attaching unit J21 may have two rotational degrees of freedom.

Figure 38:
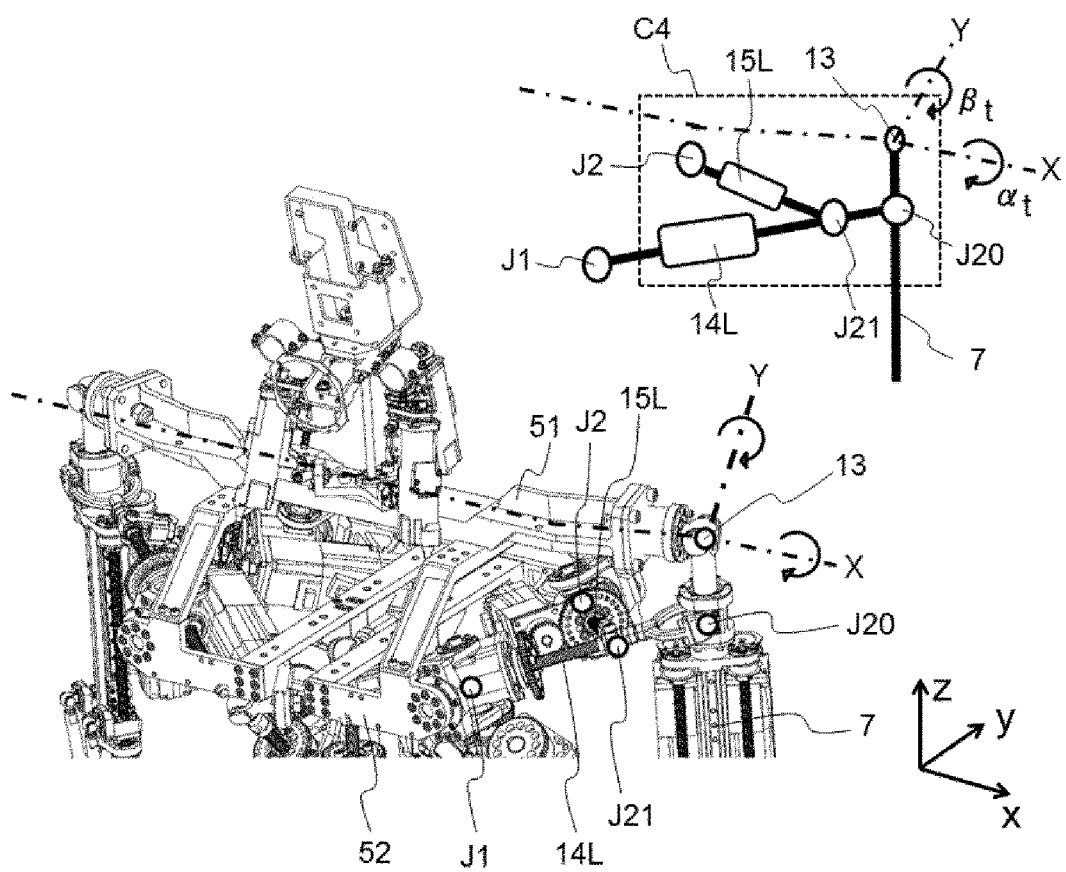
FIG. 38 is a perspective view illustrating the disposition of the variable length links at a left shoulder joint included in the humanoid robot of the first embodiment.

FIG. 38 is a perspective view illustrating the disposition of the variable length links in left shoulder joint 13. Shoulder joint 13, chest-side main link attaching unit J1, and chest-side auxiliary link attaching unit J2 are fixed to chest 5, and the relative positional relationships among shoulder joint 13, chest-side main link attaching unit J1, and chest-side auxiliary link attaching unit J2 are fixed. In upper arm main link attaching unit J20, the distance from shoulder joint 13 is predetermined. Main-link-side auxiliary link attaching unit J21 exists on upper arm drive main link 14L and at the position of the distance predetermined from upper arm main link attaching unit J20. When the position of upper arm main link attaching unit J20 is determined, upper arm 7 is directed in the direction from shoulder joint 13 toward upper arm main link attaching unit J20. Upper arm 7 can be moved with respect to chest 5 by changing the position of upper arm main link attaching unit J20. Upper arm drive main link 14L and upper arm drive auxiliary link 15L constitute a truss structure.

When the lengths of upper arm drive main link 14L and upper arm drive auxiliary link 15L are determined, the distance to upper arm main link attaching unit J20 from each of shoulder joint 13, chest-side main link attaching unit J1, and chest-side auxiliary link attaching unit J2 is determined. Because the distance from the three points to upper arm main link attaching unit J20 is determined, the position of upper arm main link attaching unit J20 is determined.

Upper arm 7 is raised by lengthening upper arm drive main link 14L, and upper arm 7 is lowered by shortening upper arm drive main link 14L. Upper arm 7 moves forward by lengthening upper arm drive auxiliary link 15L, and upper arm 7 moves rearward by shortening upper arm drive auxiliary link 15L. Upper arm 7 can move freely within the movable range that is determined under a situation in that shoulder joint 13 is used as the center of the rotation. For example, when the downward direction is set to 0 degrees and the forward direction is set to 90 degrees with respect to the vertical direction and the front-back direction, upper arm 7 can be rotated from −30 degrees to 95 degrees. In the right and left direction, upper arm 7 can be rotated outward by about 95 degrees, and rotated inward by about 5 degrees (−5 degrees) beyond the front direction.

In the biaxial gimbal of the type used in shoulder joint 13, in the case that upper arm 7 is directed in the direction of a rotation axis Rx1 rotating the rotation member of the biaxial gimbal (referred to as a singular point), upper arm 7 cannot be tilted in the direction orthogonal to the yoke of the biaxial gimbal. The direction of rotation axis Rx1 is set to a direction forming an angle of ξ1 on the rear side with respect to the right and left direction (X-axis direction) of humanoid robot 100 in the horizontal plane. Consequently, the singular point exists behind shoulder joint 13. This enables upper arm 7 to be moved freely within the movable range on the front side with respect to the right and left direction. In the conventional humanoid robot, sometimes the humanoid robot performs unnatural motion caused by avoiding the singular point of the biaxial gimbal of the shoulder joint. In humanoid robot 100, it is not necessary to perform the unnatural motion within the movable range in order to avoid the singular point.

Shoulder joint 13 exists at either a right end of a left end of shoulder frame 51, which exists on the upper portion of chest 5 and extends in the right and left direction. Shoulder joint 13 allows the rotation around rotation axis Rx1 extending in a direction being directed to the side far from the center of chest 5 and onto the rear side. The angle formed by rotation axis Rx1 and upper arm 7 is allowed to be changed by shoulder joint 13. Shoulder joint 13 connects upper arm 7 rotatably to chest 5 with two rotational degrees of freedom. Chest-side main link attaching unit J1 is provided in chest 5 at the position lower than shoulder joint 13 and on the front side. Chest-side auxiliary link attaching unit J2 is provided in chest 5 at the position lower than shoulder joint 13 and on the rear side. Chest-side main link attaching unit J1 may be provided on the rear side of shoulder joint 13, and chest-side auxiliary link attaching unit J2 may be provided on the front side. Chest-side main link attaching unit J1 and chest-side auxiliary link attaching unit J2 may be provided at positions where shoulder joint 13 is sandwiched therebetween in the front-back direction.

Figure 39:
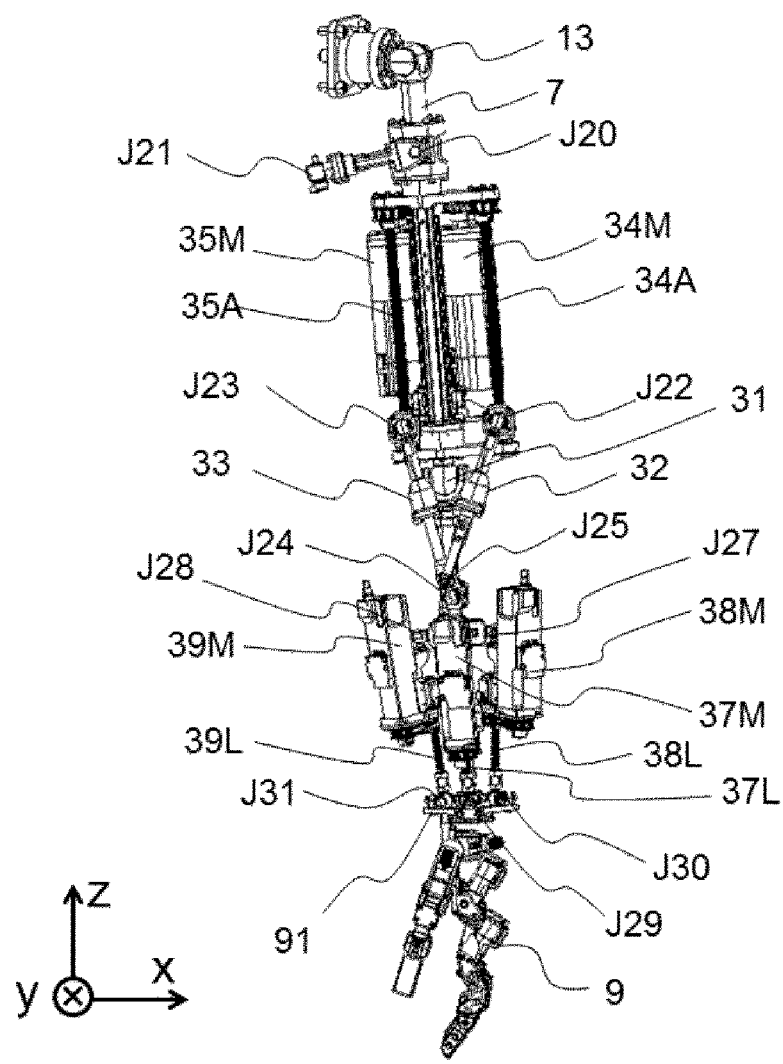
FIG. 39 is a front view illustrating a left upper limb of the humanoid robot of the first embodiment.
Figure 40:
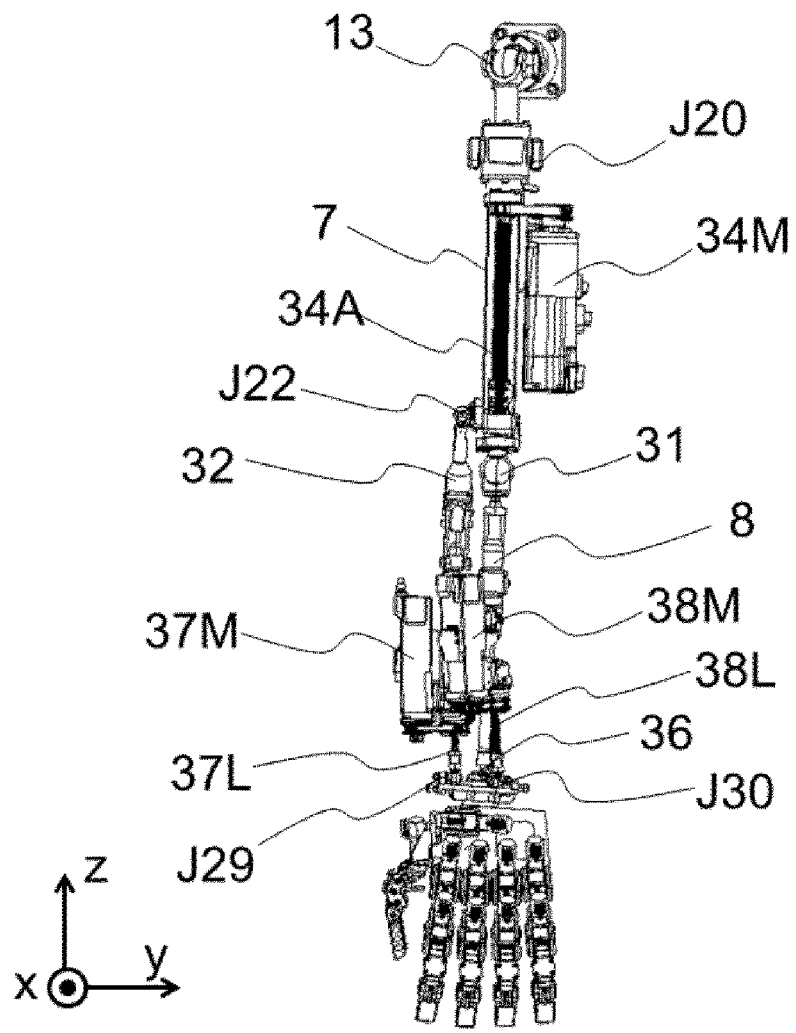
FIG. 40 is a side view illustrating the left upper limb of the humanoid robot of the first embodiment.
Figure 41:
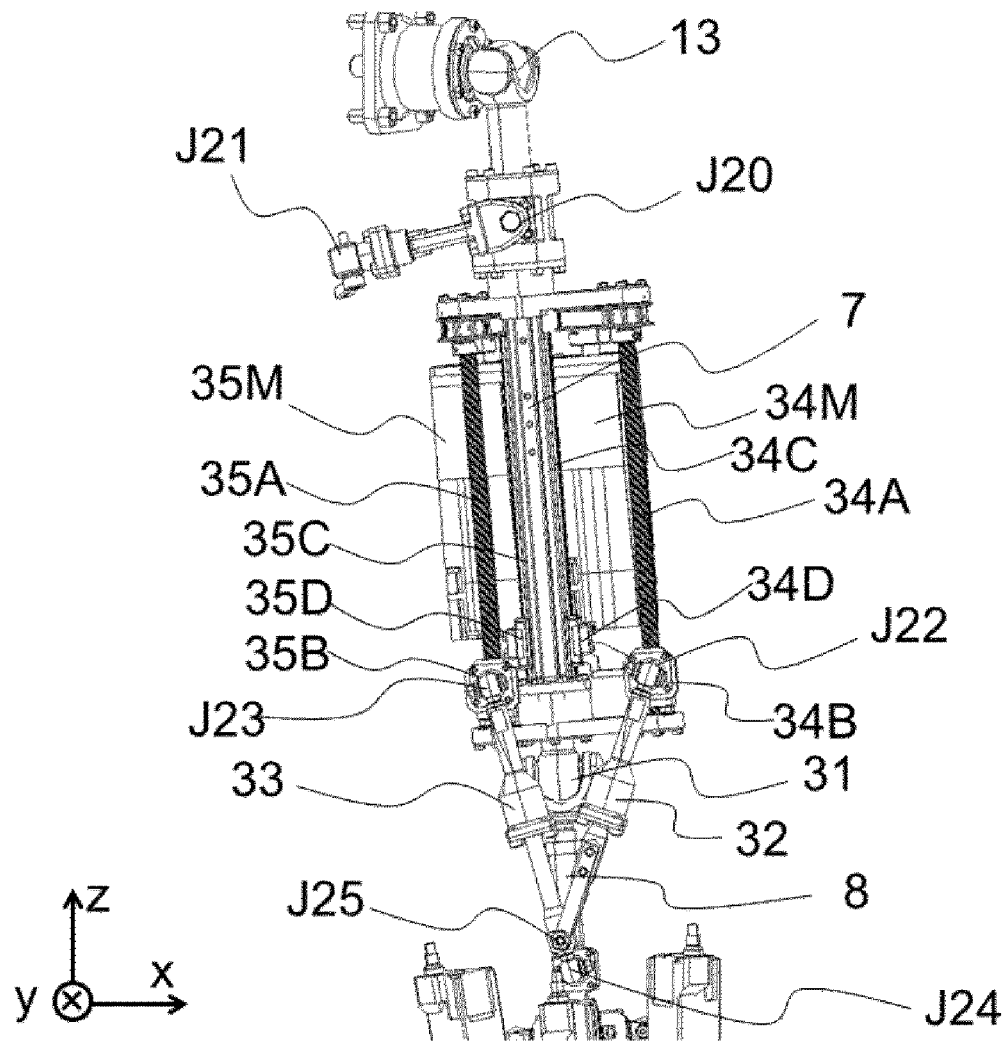
FIG. 41 is an enlarged front view illustrating a portion up to an elbow joint of the left upper limb of the humanoid robot of the first embodiment.
Figure 42:
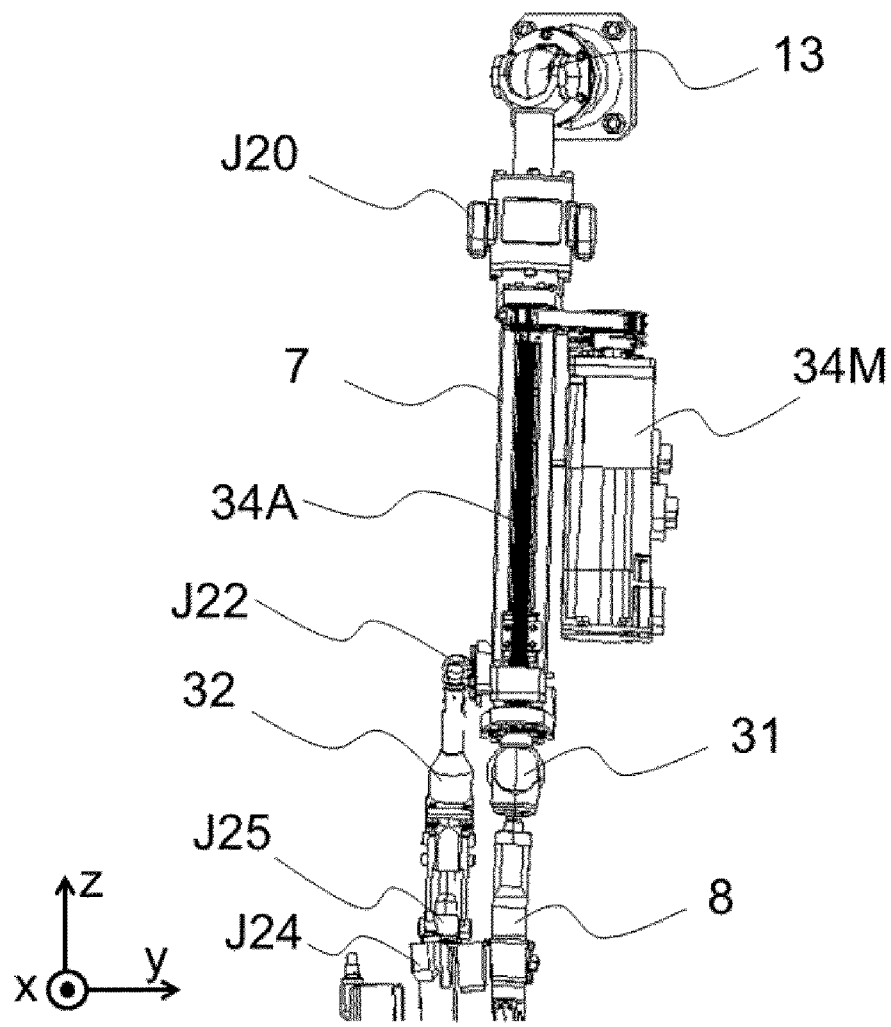
FIG. 42 is an enlarged side view illustrating the portion up to the elbow joint of the left upper limb of the humanoid robot of the first embodiment.
Figure 43:
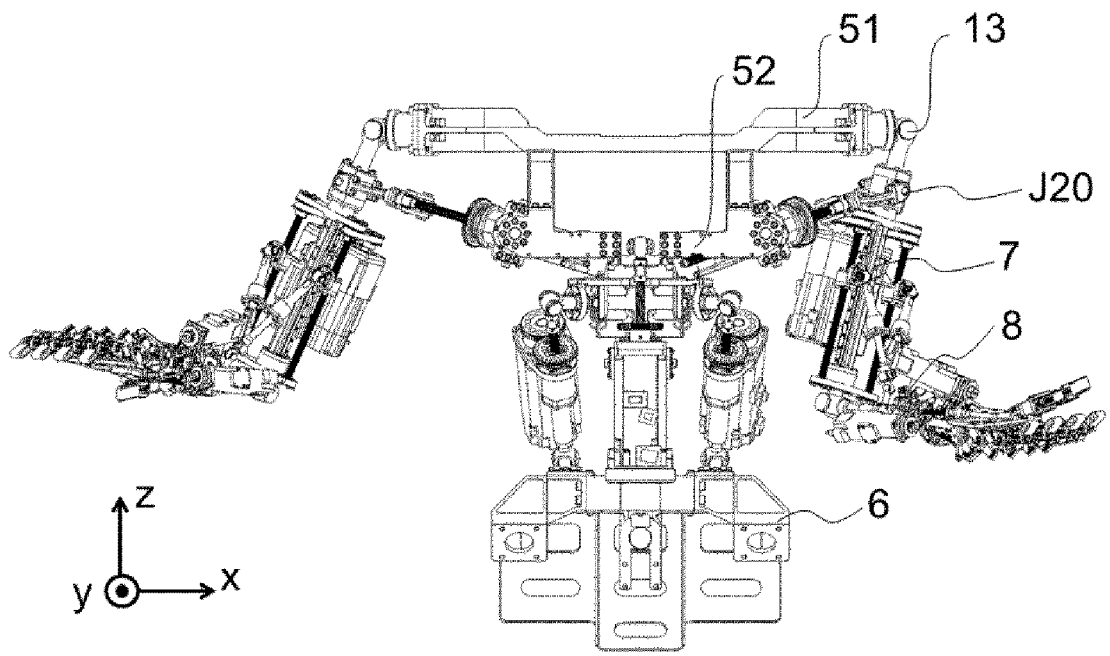
FIG. 43 is a front view illustrating a state in which right and left elbow joints are bent by 90 degrees in the trunk and upper limb included in the humanoid robot of the first embodiment.
Figure 44:
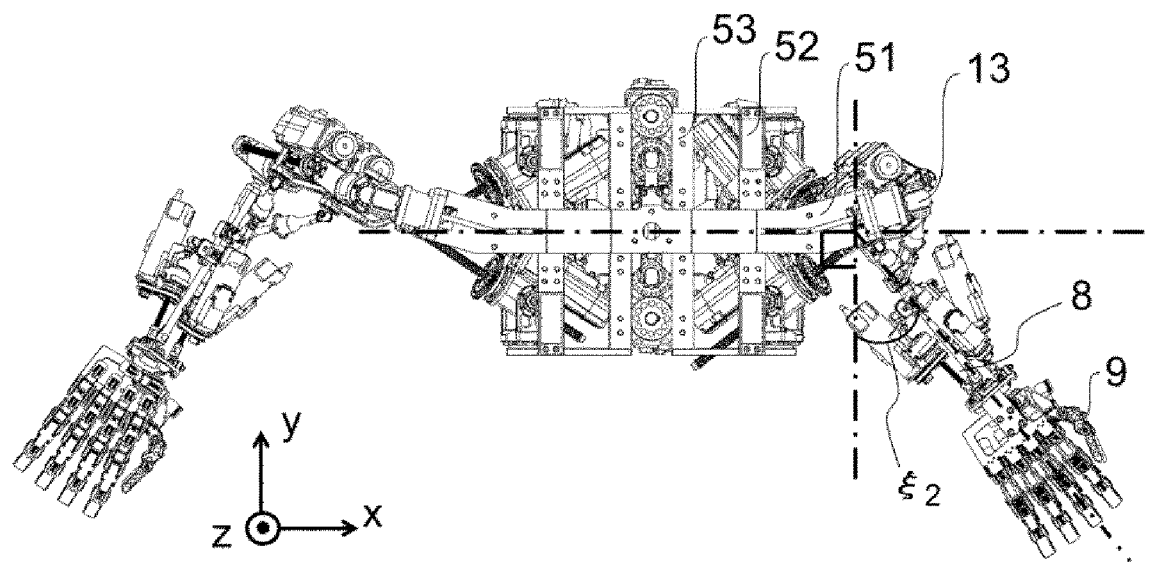
FIG. 44 is a plan view illustrating in the state in which the right and left elbow joints are bent by 90 degrees in the trunk and upper limb included in the humanoid robot of the first embodiment viewing from above.

Referring to FIGS. 11 to 15 and 39 to 44, the structure of an elbow C5 is described. FIGS. 39 and 40 are a front view and a side view of left upper limb 3. FIGS. 41 and 42 are an enlarged front view and an enlarged side view illustrating a portion up to elbow joint 31 of left upper limb 3. FIG. 43 is a front view illustrating humanoid robot 100 when right and left elbow joints 31 are bent by 90 degrees. FIG. 44 is a plan view illustrating humanoid robot 100 when right and left elbow joints 31 are bent by 90 degrees viewing from above. Only trunk 1 and right and left upper limbs 3 are illustrated in FIGS. 43 and 44. In FIGS. 43 and 44, right upper arm 7 has moved so as to be far from trunk 1, left upper arm 7 has moved so as to come close to trunk 1, and right and left elbow joints 31 are bent by 90 degrees. As can be seen from FIG. 44, right and left forearms 8 each is directed in the direction being outward with respect to the front direction of trunk 1. That is, a main bending direction of elbow joint 31 is a direction forming an angle 2 with respect to the front direction (Y-axis) of trunk 1.

The front direction of upper limb 3 is the direction in which the forearm 8 is directed when elbow joint 31 is bent by 90 degrees only in the main bending direction. When humanoid robot 100 stands upright and upper limbs 3 are directed vertically downward, the front direction of upper limb 3 is directed outward by 2 from the front direction of humanoid robot 100. For this reason, the upper limb 3 is viewed obliquely in FIG. 2 that is the front view of humanoid robot 100. In the description of upper limb 3, the front direction of upper limb 3 is set to the Y-axis direction and the direction orthogonal to the front direction of upper limb 3 is set to the X-axis direction.

The forearm 8 is connected to upper arm 7 with two rotational degrees of freedom by elbow joint 31. Elbow joint 31 is a biaxial gimbal having a rotation axis Rz2 in the same direction as upper arm 7. In the biaxial gimbal, the angle between upper arm 7 and forearm 8 can be changed. And forearm 8 can be rotated around rotation axis Rz2. In elbow joint 31, the rotation member is provided in upper arm 7, and the yoke is provided in forearm 8. An elbow drive outside links 32 and an elbow drive inside link 33 in each of which the length is fixed are attached to upper arm 7 and forearm 8. Elbow drive outside link 32 and elbow drive inside link 33 are two elbow drive links. Elbow drive outside link 32 and elbow drive inside link 33 have one rotational degree of freedom at which the link can be twisted.

The attachment positions of elbow drive outside link 32 and elbow drive inside link 33 to upper arm 7 are movable. For this reason, upper arm outside actuator 34 and upper arm inside actuator 35, being two linear actuators, are provided on both sides of upper arm 7 in parallel with upper arm 7. As illustrated in FIG. 11 and other figures, actuator holder 7A that holds a motor 34M of upper arm outside actuator 34 and a motor 35M of upper arm inside actuator 35 is provided near shoulder joint 13 of upper arm 7.

An upper arm outside link attaching unit J22, being the attachment position of elbow drive outside link 32 to upper arm 7, is moved by upper arm outside actuator 34. An upper arm inside link attaching unit J23, being the attachment position of elbow drive inside link 33 to upper arm 7, is moved by upper arm inside actuator 35. Elbow drive outside link 32 and elbow drive inside link 33 are attached to upper arm outside link attaching unit J22 and upper arm inside link attaching unit J23 with two rotational degrees of freedom, respectively. Elbow drive outside link 32 and elbow drive inside link 33 constitute a truss structure.

Referring to FIG. 41, the structure of an upper arm outside actuator 34 is described. Motor 34M of upper arm outside actuator 34 transmits the power to a screw rod 34A by a timing belt provided on the side closer to shoulder joint 13, and rotates screw rod 34A. A nut 34B including a through-hole provided with female threads engaged with male threads of screw rod 34A is movable in the length direction of screw rod 34A. A mechanism that does not rotate nut 34B around screw rod 34A is provided. For this reason, nut 34B moves along screw rod 34A when screw rod 34A rotates. Upper arm outside link attaching unit J22 is attached to nut 34B, and upper arm outside link attaching unit J22 also moves when nut 34B moves. Nut 34B is a moving member that is moved by upper arm outside actuator 34.

The mechanism that does not rotate nut 34B around screw rod 34A includes a rail 34C provided in parallel with screw rod 34A and a gripper 34D being connected to nut 34B and sandwiching rail 34C. Gripper 34D is provided so as to have low friction with rail 34C. Because gripper 34D sandwiches rail 34C, gripper 34D and nut 34B do not rotate around screw rod 34A. Another mechanism that does not rotate nut 34B around screw rod 34A may be used.

Upper arm inside actuator 35 and upper arm inside link attaching unit J23 have the same structure. Upper arm inside actuator 35 includes motor 35M, screw rod 35A, nut 35B, rail 35C and gripper 35D. Upper arm inside link attaching unit J23 is attached to nut 35B. Nut 35B is a moving member that is moved by upper arm inside actuator 35.

Upper arm outside link attaching unit J22 is the biaxial gimbal having the following structure. The rotation member, the yoke rotated by the rotation member, and the shaft member sandwiched rotatably by the yoke are provided in nut 34B being the moving member moved by upper arm outside actuator 34. The through-hole in which the shaft member is inserted is made at the end of elbow drive outside link 32. Upper arm inside link attaching unit J23 is also the biaxial gimbal having the same structure.

An elbow drive inside link attaching unit J24 being attached with elbow drive inside link 33 with two rotational degrees of freedom is provided at a position of a predetermined distance from elbow joint 31 of forearm 8. Elbow drive inside link attaching unit J24 is the biaxial gimbal having the same structure as upper arm outside link attaching unit J22. An elbow drive outside link attaching unit J25 being attached with elbow drive outside link 32 with two rotational degrees of freedom is provided at a position having a distance predetermined from elbow drive inside link attaching unit J24 of elbow drive inside link 33. Elbow drive outside link attaching unit J25, has the structure in which the protrusions provided in elbow drive inside link 33 are sandwiched by the yoke extending from one end of elbow drive outside link 32. The yoke of elbow drive outside link attaching unit J25 has a sufficient length so as to sandwich the protrusions when the angle formed by elbow drive outside link 32 and elbow drive inside link 33 is small. The portion in which the protrusions of elbow drive inside link 33 are provided can be rotated around elbow drive inside link 33. The yoke extending from one end of elbow drive outside link 32 sandwiches the protrusions such that the angle formed by elbow drive inside link 33 and the yoke can be changed.

At least one of upper arm outside link attaching unit J22 and elbow drive inside link attaching unit J24 may have three rotational degrees of freedom. At least one of upper arm inside link attaching unit J23 and elbow drive inside link attaching unit J24 may have three rotational degrees of freedom.

Figure 45:
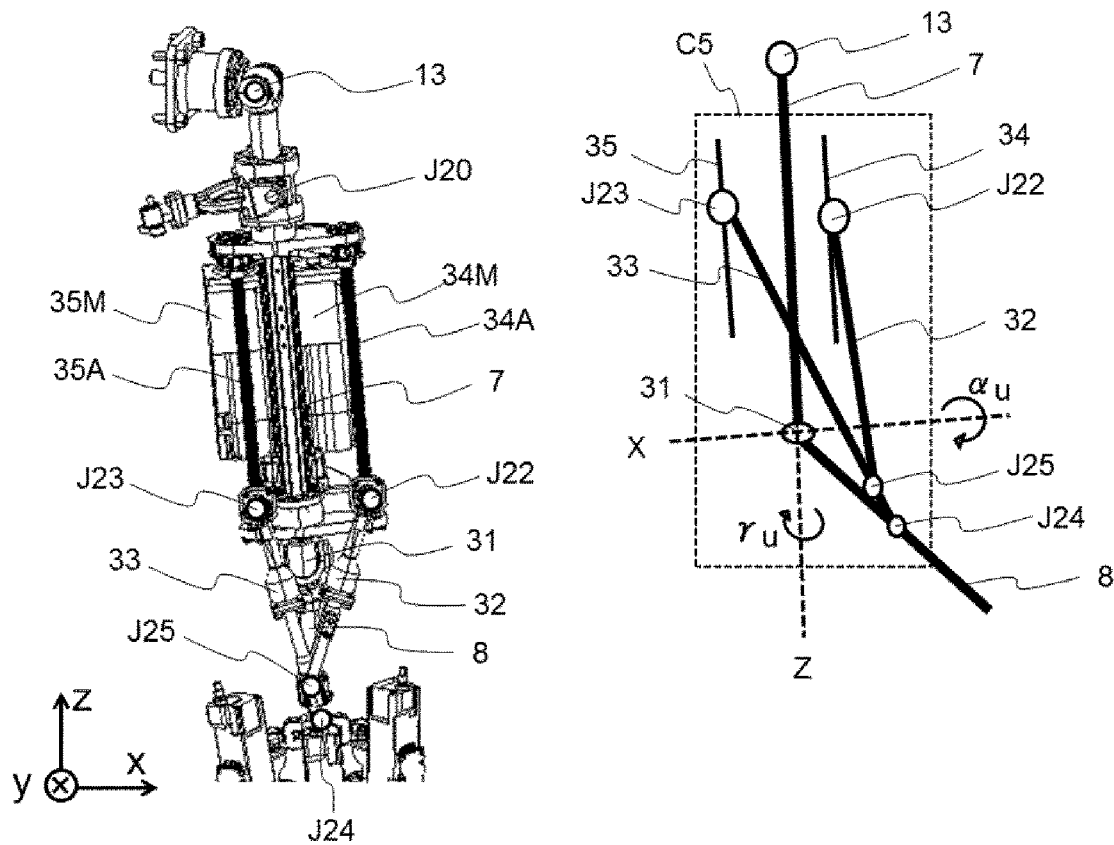
FIG. 45 is a perspective view illustrating the disposition of links of a left elbow joint included in the humanoid robot of the first embodiment.
Figure 46:
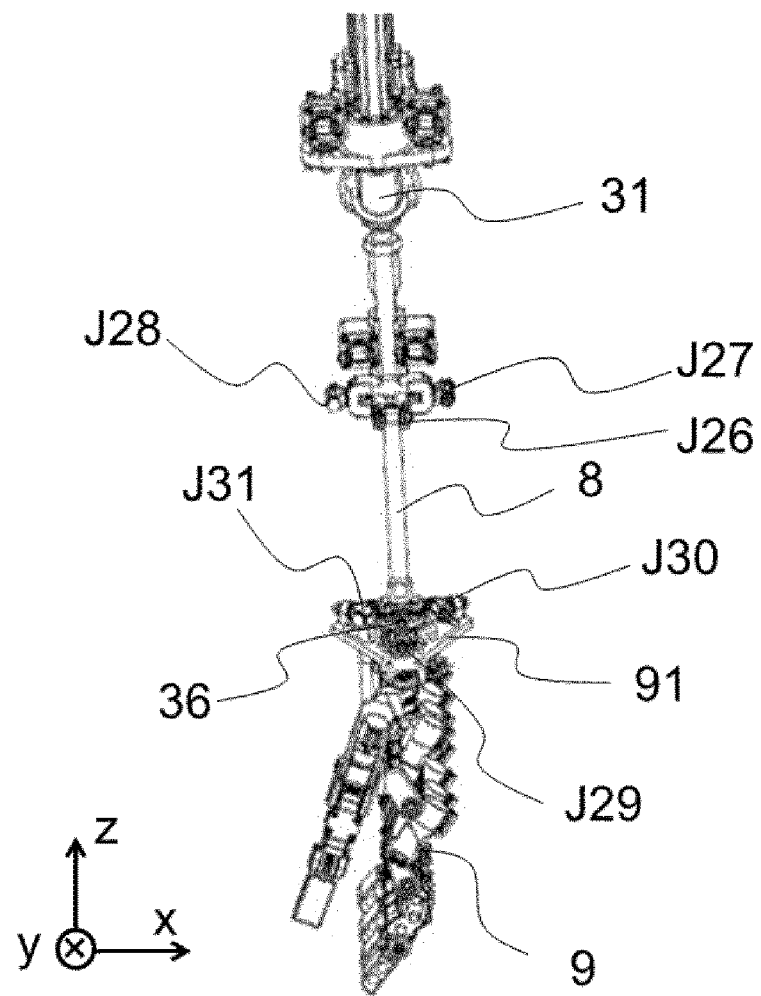
FIG. 46 is an enlarged perspective view illustrating a portion of an arm from the left elbow joint in the skeletal structure of the humanoid robot of the first embodiment.
Figure 47:
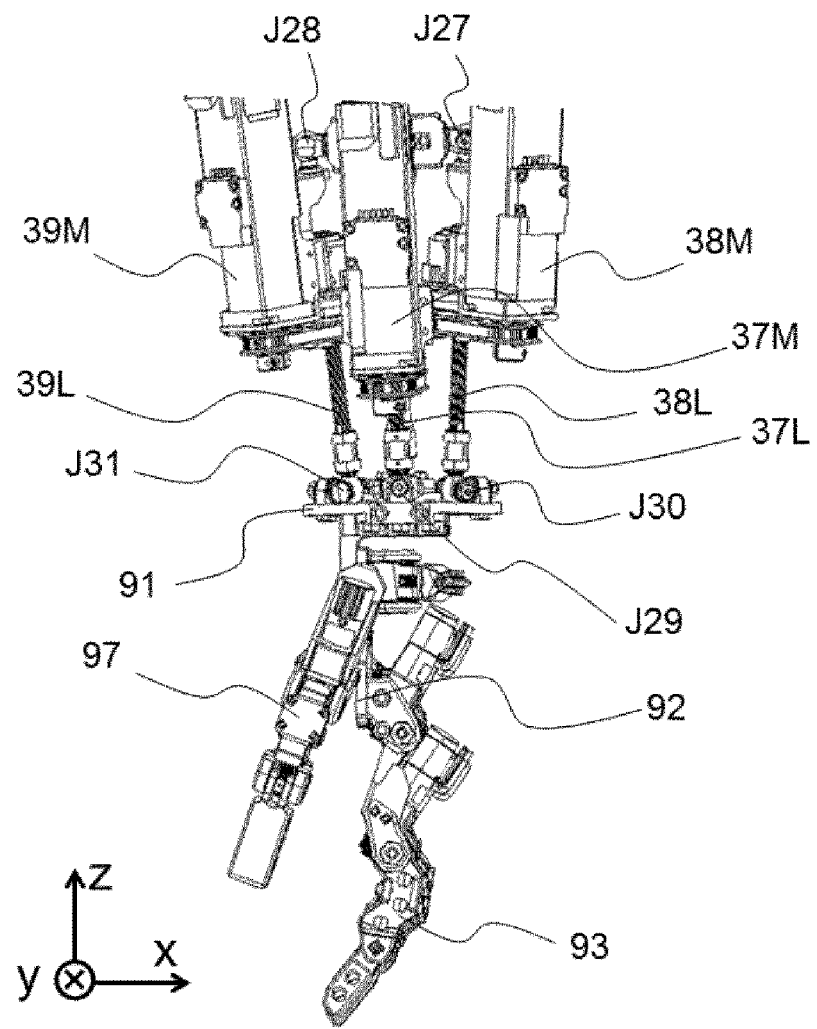
FIG. 47 is an enlarged front view illustrating the portion of the arm from the left elbow joint of the humanoid robot of the first embodiment.
Figure 48:
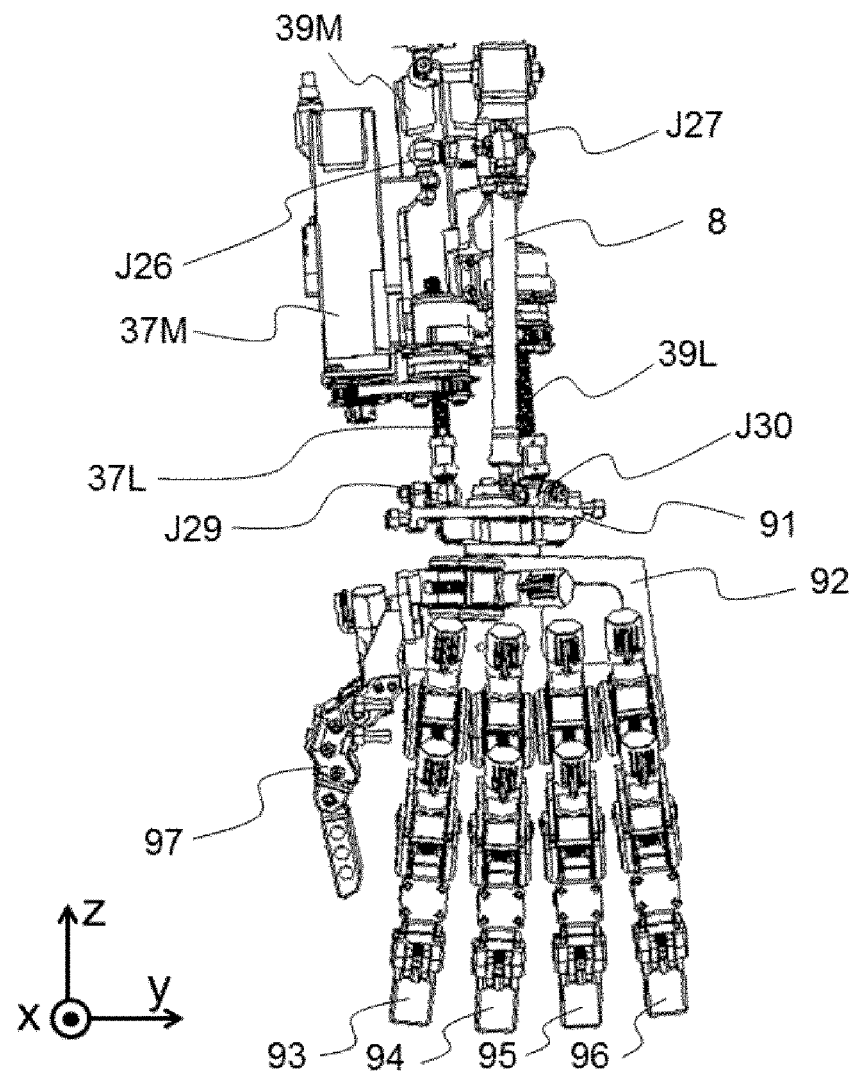
FIG. 48 is an enlarged left side view illustrating the portion of the arm from the left elbow joint of the humanoid robot of the first embodiment when an outside actuator is excluded.
Figure 49:
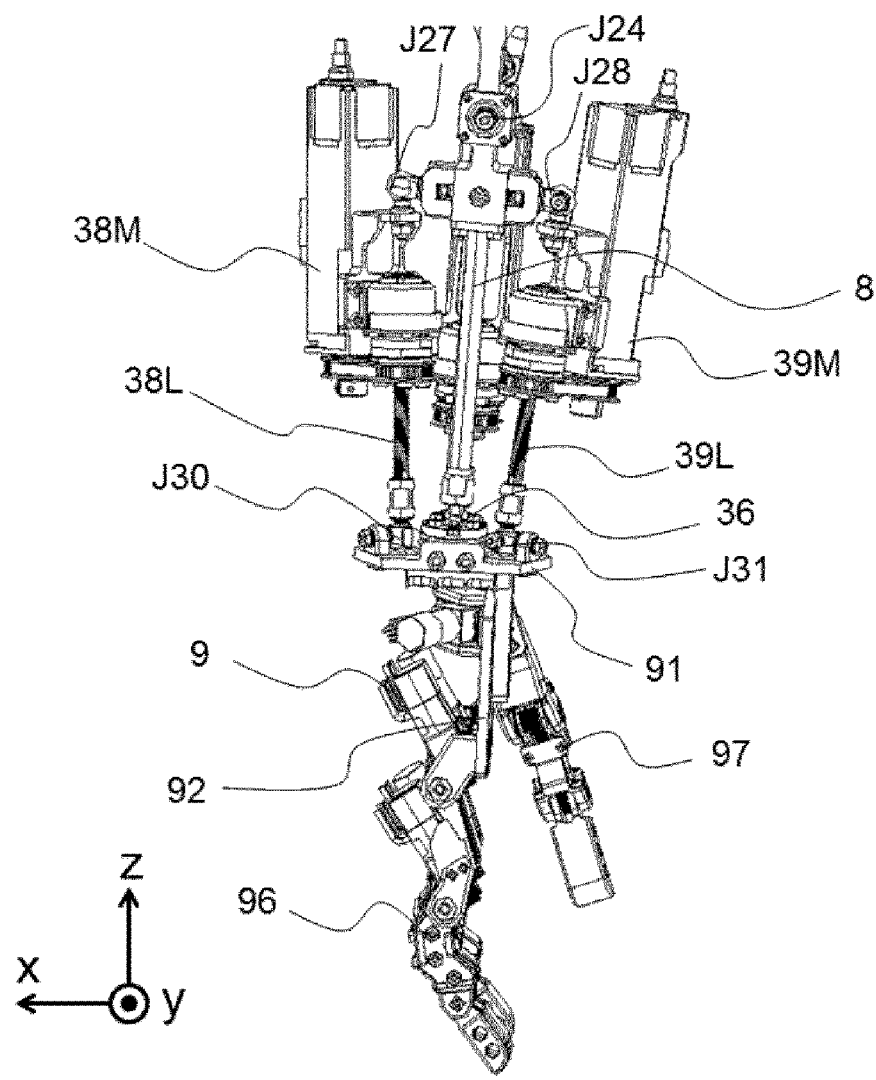
FIG. 49 is an enlarged rear view illustrating the portion of the arm from the left elbow joint of the humanoid robot of the first embodiment.

FIG. 45 is a perspective view illustrating the disposition of the links in left elbow C5. Elbow joint 31, upper arm outside actuator 34, and upper arm inside actuator 35 are fixed to upper arm 7. Upper arm outside link attaching unit J22 is moved along upper arm 7 by upper arm outside actuator 34. Upper arm inside link attaching unit J23 is moved along upper arm inside actuator 35. Elbow drive inside link attaching unit J24 provided in forearm 8 exists at a position having a predetermined distance $K_{1u}$ from elbow joint 31. Elbow drive outside link attaching unit J25 provided in elbow drive inside link 33 exists at a position having a predetermined distance $K_{2u}$ from elbow drive inside link attaching unit J24 (strictly, its rotation center). Forearm 8 is directed in the direction of elbow drive inside link attaching unit J24 located at distance $K_{1u}$ from elbow joint 31 (strictly, its rotation center). Forearm 8 can be moved with respect to upper arm 7 by changing the position of elbow drive inside link attaching unit J24.

The lengths of elbow drive inside link 33 and elbow drive outside link 32 are fixed. Upper arm outside link attaching unit J22 and upper arm inside link attaching unit J23 move along upper arm 7, and the position of elbow drive inside link attaching unit J24 is changed.

Elbow C5 includes elbow joint 31, elbow drive inside link 33, elbow drive outside link 32, elbow drive inside link attaching unit J24 being the forearm-side main link attaching unit, elbow drive outside link attaching unit J25 being the main-link-side auxiliary link attaching unit provided in elbow drive inside link 33, upper arm inside link attaching unit J23 and upper arm outside link attaching unit J22 being two upper-arm-side link attaching units, and upper arm outside actuator 34 and upper arm inside actuator 35 being two linear actuators.

When both upper arm outside link attaching unit J22 and upper arm inside link attaching unit J23 move so as to come close to shoulder joint 13, elbow joint 31 is bent and the forearm 8 comes close to upper arm 7. When upper arm outside link attaching unit J22 and upper arm inside link attaching unit J23 move so as to be far from shoulder joint 13, elbow joint 31 extends and forearm 8 moves to be far from upper arm 7. When upper arm outside link attaching unit J22 is moved so as to come close to shoulder joint 13, and upper arm inside link attaching unit J23 is moved so as to be far from shoulder joint 13, forearm 8 is directed outside. When upper arm inside link attaching unit J23 is moved so as to come close to shoulder joint 13, and upper arm outside link attaching unit J22 is moved so as to be far from shoulder joint 13, forearm 8 is directed inside.

In elbow joint 31, the angle in the plane (elbow main drive plane) including the front direction of upper limb 3 and upper arm 7 can be changed from the state in which upper arm 7 and forearm 8 exist on one straight line to the state in which the angle formed by upper arm 7 and forearm 8 becomes, for example, 70 degrees. In the plane (elbow auxiliary drive plane) perpendicular to upper arm 7, elbow joint 31 can be rotated inside and outside by, for example, about 70 degrees when elbow joint 31 is bent at right angles. When the rotation angle of elbow joint 31 in the elbow main drive plane is not the right angles (90 degrees), the rotation angle in the elbow auxiliary drive plane becomes smaller than the case of the right angles. When the rotation angle of elbow joint 31 is 180 degrees, that is, when the elbow joint 31 extends, forearm 8 cannot be rotated in the elbow auxiliary drive plane.

The mechanism that drives elbow joint 31 can be made compact by adopting a system, in which each of the two links for driving elbow joint 31 have a fixed length and the position of the link attaching unit on the upper arm side is moved. When the elbow joint is driven by two variable length links, in order to rotate the elbow joint in the elbow auxiliary drive plane, the angle formed by the two links at the attaching position of the forearm is required to be greater than or equal to a predetermined angle. For this purpose, the interval between the attaching positions of the two variable length links is required to be wider than the interval between the two linear actuators used in the first embodiment.

Elbow drive inside link 33 is the elbow drive main link having the fixed length. Elbow drive outside link 32 is the elbow drive auxiliary link having the fixed length. Elbow drive inside link attaching unit J24 is the forearm-side main link attaching unit being attached rotatably with one end of elbow drive inside link 33 with at least two rotational degrees of freedom. Elbow drive outside link attaching unit J25 is the main-link-side auxiliary link attaching unit being attached rotatably with one end of elbow drive outside link 32 with at least two rotational degrees of freedom. Upper arm inside link attaching unit J23 and upper arm outside link attaching unit J22 are two upper arm side link attaching units, being attached rotatably with the other ends of elbow drive inside link 33 and elbow drive outside link 32 with at least two rotational degrees of freedom and being provided in upper arm 7 so as to be movable along upper arm 7.

One end of elbow driving outside link 32 on the side existing forearm 8 may be attached to forearm 8 instead of elbow drive inside link 33. In this case, two forearm-side link attaching units are provided in forearm 8. One ends of elbow drive outside link 32 and elbow drive inside link 33, which are the two elbow drive links, each is attached rotatably to each of the two forearm-side link attaching units with at least two rotational degrees of freedom.

Nut 34B included in upper arm outside actuator 34 is a moving member that moves elbow drive outside link 32. Nut 35B included in upper arm inside actuator 35 is a moving member that moves elbow drive inside link 33. Screw rod 34A and screw rod 35A are guides that guide nut 34B and nut 35B to be moved along upper arm 7, respectively. Motor 34M is a power source that generates force changing the position of nut 34B with respect to screw rod 34A. Motor 35M is a power source that generates force changing the position of nut 35B with respect to screw rod 35A. Upper arm outside actuator 34 is the linear actuator including nut 34B, screw rod 34A, and motor 34M. Upper arm inside actuator 35 is the linear actuator including nut 35B, screw rod 35A, and motor 35M.

Referring to FIGS. 46 to 49, the structure of a wrist C6 is described. FIGS. 46, 47, 48, and 49 are an enlarged perspective view, an enlarged front view, an enlarged left side view, and an enlarged rear view illustrating a portion of the arm from left elbow joint 31 in the skeleton structure.

Hand 9 similar to a human hand is connected to forearm 8 with three rotational degrees of freedom by a wrist joint 36. The spherical bearing that holds rotatably the spherical surface provided at one end of rod-shaped forearm 8 is used as wrist joint 36. A member that holds the spherical surface is provided in wrist plate 91. Hand 9 can rotate around wrist joint 36 with three rotational degrees of freedom. The angle between hand 9 and forearm 8 is changed when the lengths of the three actuators, namely, a forearm front actuator 37, a forearm outside actuator 38, and a forearm inside actuator 39 change. For example, hand 9 can be tilted by about 20 degrees in the direction (front direction) to the palm side, tilted by about 20 degrees in the direction (rear direction) to the backside of the hand, and tilted by about 20 degrees in the both directions that are perpendicular to the direction of forearm 8 and the direction directed from the front toward the rear. Hand 9 can be rotated by about 70 degrees in both directions around forearm 8.

Although the angle of the movable range of wrist C6 in the front direction and the rear direction is small, wrist C6 can be bent by 90 degrees together with elbow C5. In pushing the palm against a wall or the like, for example, wrist C6 is bent by 20 degrees toward the backside of the hand, and elbow C5 is bent by about 70 degrees. As a result, the palm being parallel to a vertical axis of the body is formed, and the palm being in parallel with a chest surface is pushed out.

A forearm front link attaching unit J26, a forearm outside link attaching unit J27, and a forearm inside link attaching unit J28 are provided at positions having distances predetermined from wrist joint 36 of forearm 8 in order to attach one ends of a forearm front link 37L, a forearm outside link 38L, and a forearm inside link 39L to forearm 8. Forearm front link attaching unit J26 is provided in the front side of forearm 8. Forearm outside link attaching unit J27 is provided at the position forming the angle of 90 degrees with respect to forearm front link attaching unit J26 in the plane perpendicular to forearm 8. Forearm inside link attaching unit J28 is provided at the position where the angle between forearm inside link attaching unit J27 and forearm outside link attaching unit J27 becomes 180 degrees. A middle point of the line segment connecting forearm outside link attaching unit J27 and forearm inside link attaching unit J28 is matched with the center of the cross section of forearm 8.

Hand 9 includes a wrist plate 91, a plate-shaped palm plate 92, a hand attaching tool 98 that connects palm plate 92 vertically to wrist plate 91, a first finger 93, a second finger 94, a third finger 95, and a fourth finger 96, which are four ordinary fingers, and an opposable finger 97. The wrist plate 91 has a hexagonal plate shape in which a long side and a short side are alternately arranged. The four ordinary fingers are connected to an opposite side to wrist plate 91 of palm plate 92. Opposable finger 97 is connected to palm plate 92 in the direction different from that of the four ordinary fingers, and can move to the position opposed to the ordinary fingers. Wrist plate 91 is connected to forearm 8 with wrist joint 36 interposed therebetween. The four ordinary fingers are aligned in almost the same direction.

Hand 9 resembles a human hand. Opposable finger 97 corresponds to a thumb, and first finger 93, second finger 94, third finger 95, and fourth finger 96 correspond to an index finger, a middle finger, a ring finger, and a little finger, respectively.

In palm plate 92, the surface existing on the side where the finger is bent is referred to as the palm side, and the opposite surface is referred to as the backside of the hand. In the hand, the palm side is referred to as the front surface, the backside of the hand is set to the rear surface. In the plane parallel to palm plate 92, the direction in which the ordinary finger extends is referred to as a fingertip direction. The fingertip direction is a direction from the wrist toward a fingertip. The direction orthogonal to the fingertip direction is referred to as a hand breadth direction.

Forearm front link attaching unit J26 is the biaxial gimbal in which the shaft member provided at one end of forearm front link 37L is held rotatably by the yoke that is rotated by the rotation member protruding on the front side of forearm 8. Forearm outside link attaching unit J27 and forearm inside link attaching unit J28 are also the biaxial gimbal having the same structure.

In forearm front link 37L, the force generated by a motor 37M is transmitted to a nut 37B by a timing belt provided on the side existing hand 9. Forearm front link 37L is attached to forearm front link attachment J26 using a link attachment 37N extending in L-shape from between the cylinder of the variable length link and the motor. One end of the motor exists at a position closer to elbow joint 31 than the attachment position on one side. Forearm outside link 38L and forearm inside link 39L have the same structure.

The state in which wrist plate 91 is perpendicular to forearm 8 and opposable finger 97 exists in the front direction of upper limb 3 is the reference state of hand 9. A hand-side front link attaching unit J29, a hand-side outside link attaching unit J30, and a hand-side inside link attaching unit J31 are provided in the surface on the side existing forearm 8 of wrist plate 91 in order to attach the other ends of forearm front link 37L, forearm outside link 38L, and forearm inside link 39L to wrist plate 91.

Hand-side front link attaching unit J29, hand-side outside link attaching unit J30, hand-side inside link attaching unit J31, and wrist joint 36 exist on a same plane. Hand-side front link attaching unit J29, hand-side outside link attaching unit J30, and hand-side inside link attaching unit J31 are disposed at positions constituting an equilateral triangle. Wrist joint 36 is located at a center of gravity of the equilateral triangle. Consequently, wrist joint 36 exists on a bisector of the line segment connecting the hand-side outside link attaching unit J30 and the hand-side inside link attaching unit J31. Hand-side front link attaching unit J29 exists in the reference state on the plane determined by forearm 8 and forearm front link attaching unit J26.

Hand-side front link attaching unit J29 is the biaxial gimbal in which the shaft member provided at one end of forearm front link 37L is held rotatably by the yoke that is rotated by the rotation member protruding in the direction of the wrist joint 36 from the protrusion provided in the surface on the forearm side of the wrist plate 91. Hand-side outside link attaching unit J30 and hand-side inside link attaching unit J31 are also the biaxial gimbal having the a same structure.

One ends of forearm front link 37L, forearm outside link 38L, and forearm inside link 39L are attached to hand-side front link attaching unit J29, hand-side outside link attaching unit J30, and hand-side inside link attaching unit J31 with two rotational degrees of freedom, respectively. The other ends of forearm front link 37L, forearm outside link 38L, and forearm inside link 39L are attached to forearm-side front link attaching unit J26, forearm-side outside link attaching unit J27, and forearm-side inside link attaching unit J28 with two rotational degrees of freedom.

Wrist C6 is a three-rotational-degree-of-freedom connection mechanism that connects hand 9 being the second member rotatably to forearm 8 being the first member with three rotational degrees of freedom. Wrist C6 includes wrist joint portion 36 being the joint, forearm front link 37L, forearm outside link 38L, and forearm inside link 39L, being three variable length links, forearm front link attaching unit J26, forearm outside link attaching unit J27, and forearm inside link attaching unit J28, being three first-member-side link attaching units, and hand-side front link attaching units J29, hand-side outside link attaching unit J30, and hand-side inside link attaching unit J31, being three second-member-side link attaching units.

Forearm 8 being the first member is also the torsion axis. The angle of forearm 8 can be changed with respect to hand 9. The relative positional relationships with wrist joint 36 are fixed in forearm front link attaching unit J26, forearm outside link attaching unit J27, and forearm inside link attaching unit J28. The relative positional relationships with wrist joint 36 are also fixed by wrist plate 91 in hand-side front link attaching unit J29, hand-side outside link attaching unit J30, and hand-side inside link attaching unit J31, being the link attaching units provided in hand 9 being the second member.

Figure 50:
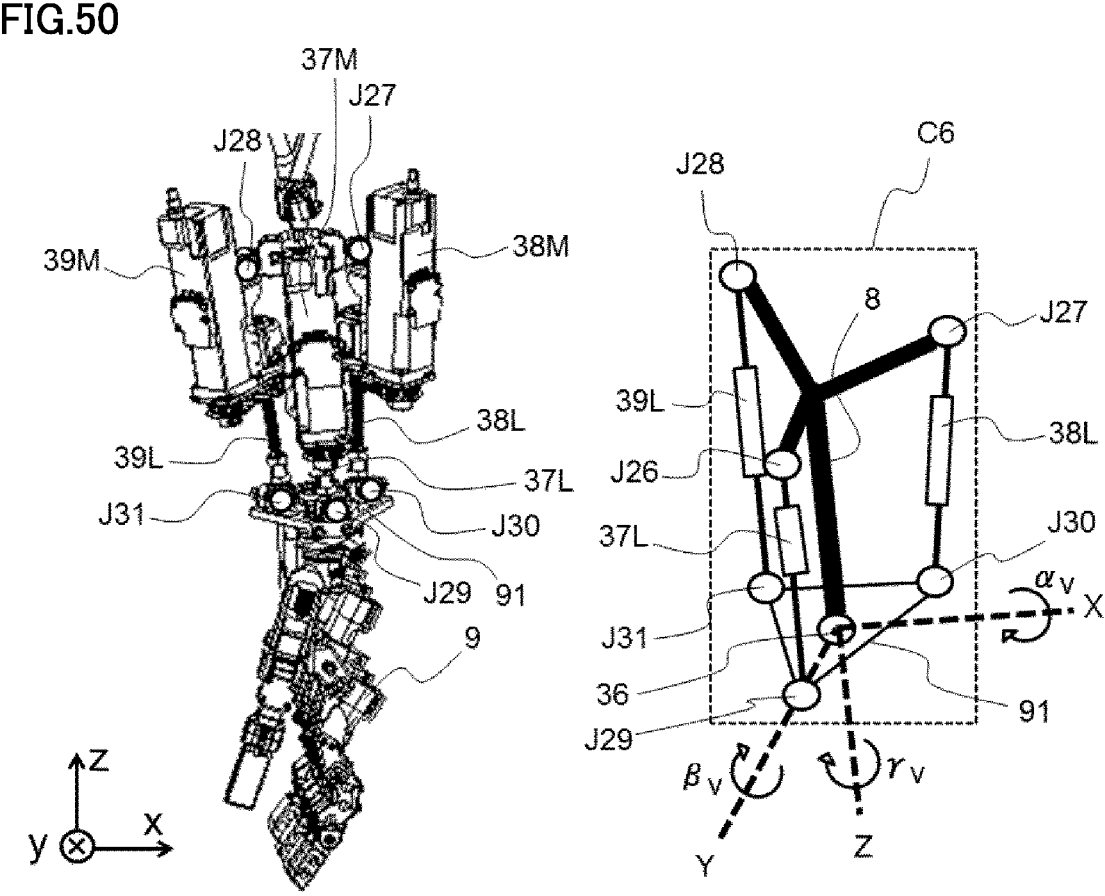
FIG. 50 is a perspective view illustrating the disposition of the variable length links in a left wrist included in the humanoid robot of the first embodiment.

The disposition of the variable length links in wrist C6 is described. FIG. 50 is a perspective view illustrating the disposition of the variable length links in left wrist C6. Wrist C6 includes three variable length links 37L, 38L, 39L connecting three first-member-side link attaching units J26, J27, J28 and three second-member-side link attaching units J29, J30, J31, respectively. Consequently, the connection angle of hand 9 to forearm 8 can be changed with three rotational degrees of freedom by changing the lengths of three variable length links 37L, 38L, 39L. It is assumed that $\alpha v$ is the rotation angle of wrist joint 36 around the X-axis, that $\beta v$ is the rotation angle around the Y-axis, and that $\gamma v$ is the rotation angle around the Z-axis.

Wrist joint 36 is located on the link attaching plane determined by second-member-side link attaching units J29, J30, and J31. Consequently, wrist joint 36 is also the torsion center being the intersection point of the link attachment plane and torsion axis 8. A second-member triangle T3 is an equilateral triangle. Wrist joint 36 exists at the position of the center of gravity of second-member triangle T3. Second-member-side link attaching units J30, J31 are symmetrically arranged with respect to the straight line passing through second-member-side link attaching unit J29 and the torsion center.

Figure 51:
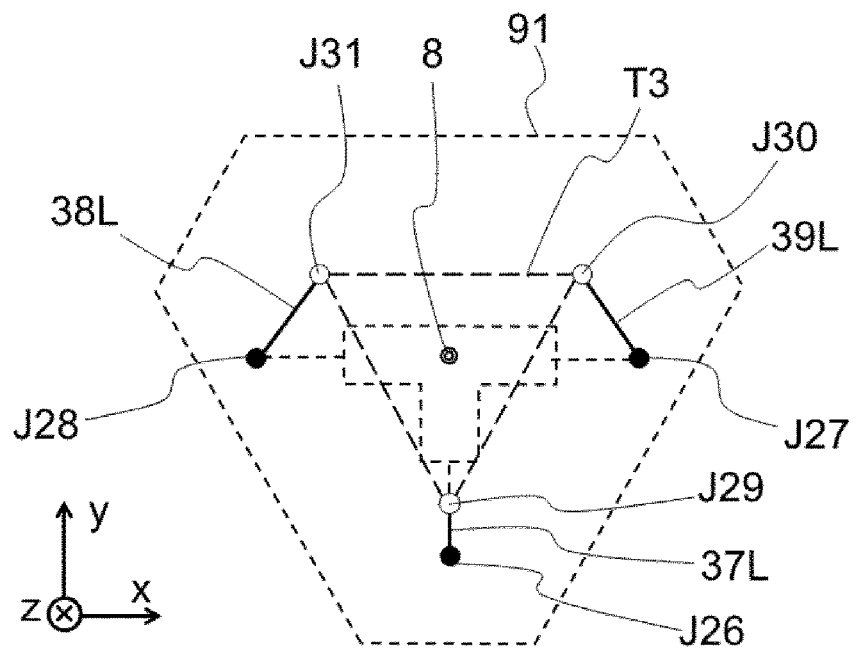
FIG. 51 is a view illustrating the disposition of the variable length links in the reference state of the left wrist included in the humanoid robot of the first embodiment viewing from the direction in which a forearm extends.

FIG. 51 is a view illustrating the disposition of the variable length links in left wrist C6 in the reference state viewing from the direction in which the forearm extends. In the reference state, variable length links 38L, 39L have the twisted relationship with torsion axis 8. A tilt angle $\theta v1$ formed between the link reference plane including first-member-side link attaching unit J26 of variable length link 37L and torsion axis 8 and variable length link 37L is zero degree. Tilt angles $\theta v2$, $\theta v3$ of variable length links 38L, 39L are about 8.1 degrees. In the reference state, a maximum value $\theta vmax$ of the tilt angles of three variable length links 37L, 38L, 39L is about 8.1 degrees, and is greater than or equal to $\delta 0$ (for example, about 3 degrees). The torque rotating around torsion axis 8 is generated in the case that the lengths of variable length links 38L, 39L are changed.

Figure 52:
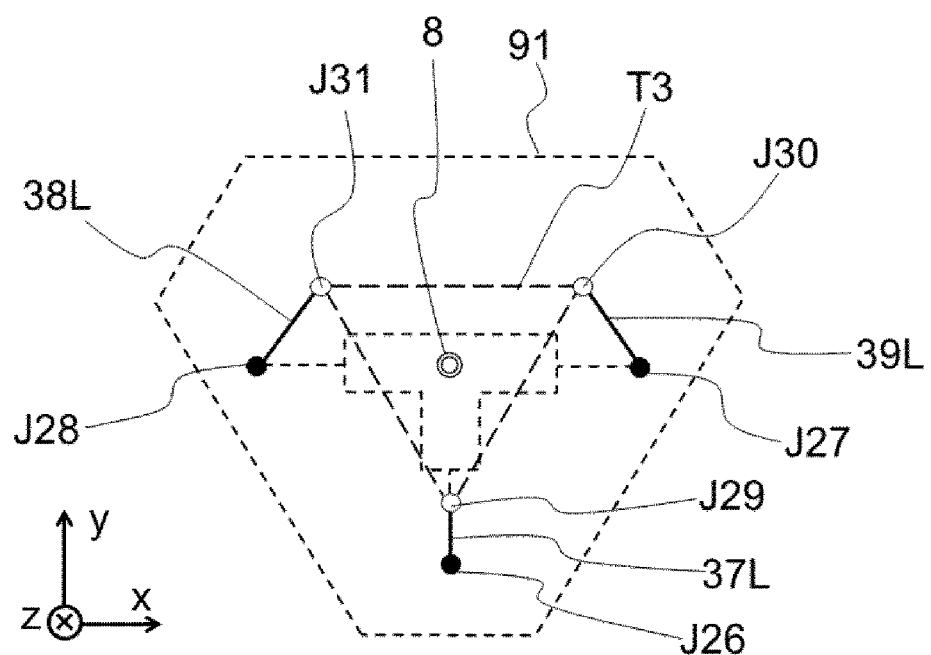
FIG. 52 is a view illustrating the disposition of the variable length links when the left wrist included in the humanoid robot of the first embodiment is tilted toward a fourth finger side viewing from the direction in which the forearm extends.

When hand 9 is tilted or twisted within the movable range with respect to forearm 8, at least one of three variable length links 37L, 38L, 39L has the twisted relationship with torsion axis 8, and maximum value $\theta vmax$ of the angle is greater than or equal to $\delta 0$. In the reference state, variable length link 37L is located on the same plane as torsion axis 8, and variable length links 38L, 39L has the twisted relationship with torsion axis 8. To decrease both of tilt angles $\theta v2$, $\theta v3$ of variable length links 38L, 39L and to keep variable length link 37L in the same plane as torsion axis 8, hand 9 is tilted onto the side existing fourth finger 96. FIG. 52 is a view illustrating the disposition of the variable length links when left wrist C6 is tilted toward the side existing fourth finger 96 viewing from the direction in which forearm 8 extends. In FIG. 52, hand 9 is tilted by 20 degrees toward the fourth finger portion side. Tilt angles $\theta v2$, $\theta v3$ of variable length links 38L, 39L are about 7.4 degrees. In the case in that wrist C6 is tilted in the direction to the palm or the backside of the hand, and in the case in that wrist C6 is rotated around torsion axis 8, one of tilt angles $\theta v2$, $\theta v3$ of variable length links 38L, 39L is increased, and the other is decreased.

Figure 53:
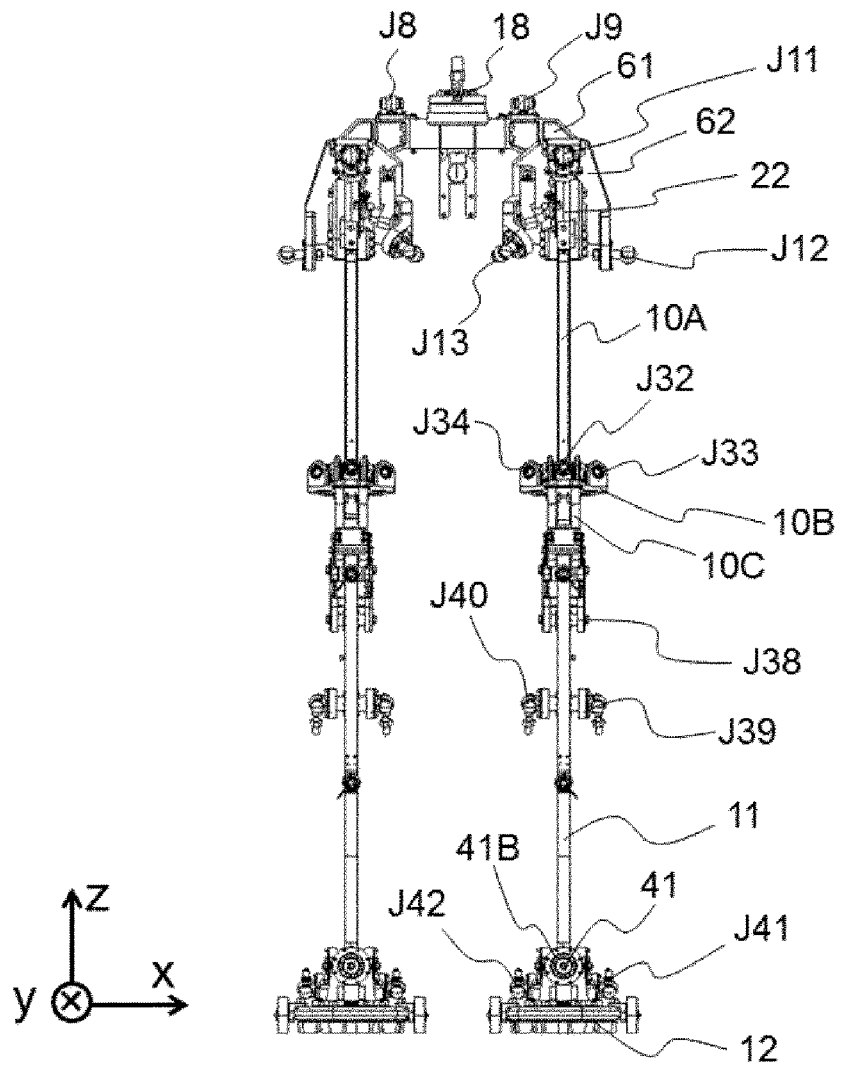
FIG. 53 is a front view illustrating a portion below a waist in the skeleton structure of the humanoid robot of the first embodiment.
Figure 54:
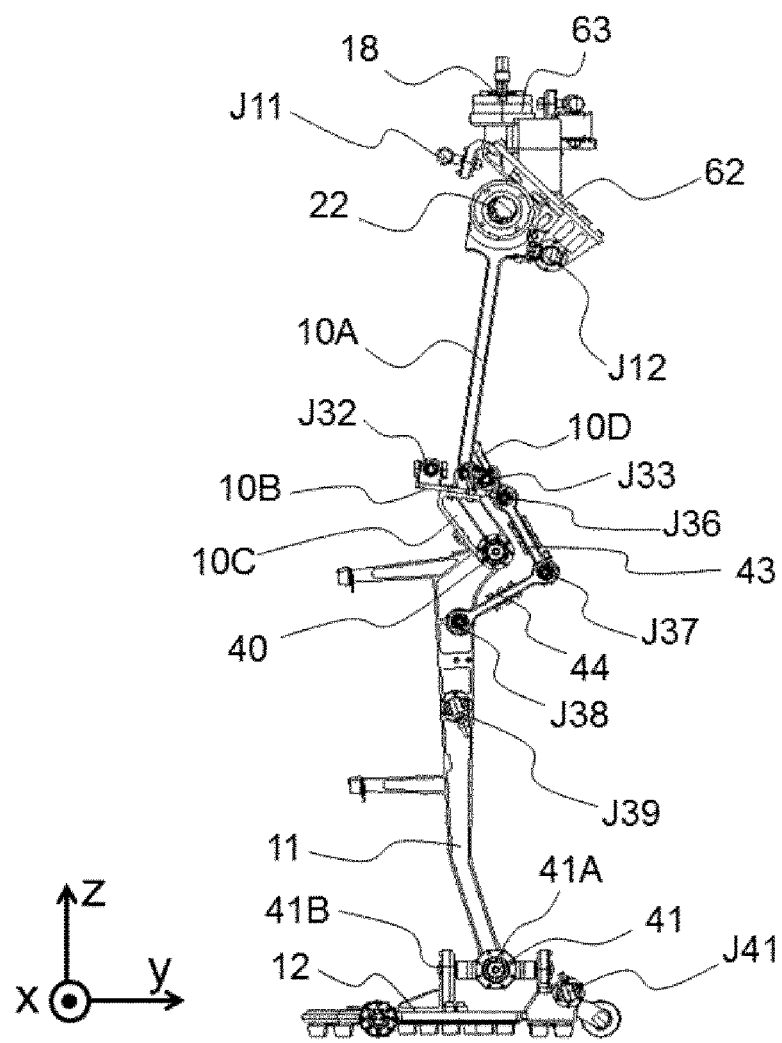
FIG. 54 is a left side view illustrating the portion below the waist in the skeleton structure of the humanoid robot of the first embodiment.
Figure 55:
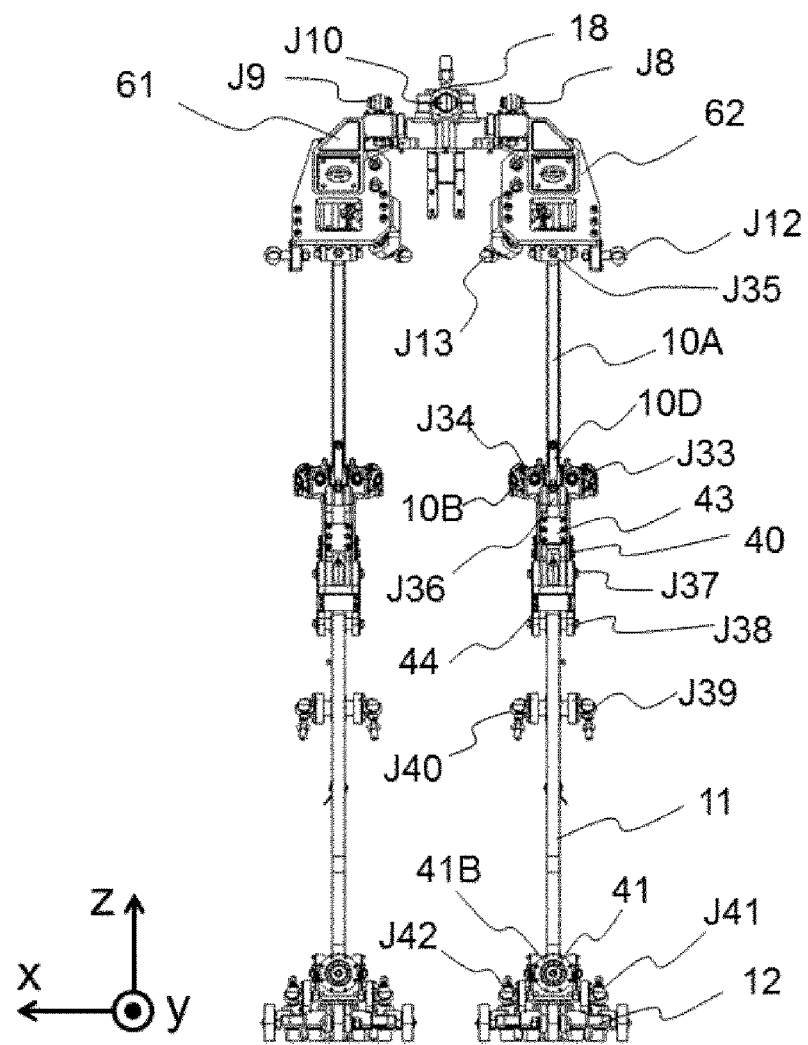
FIG. 55 is a rear view illustrating the portion below the waist in the skeleton structure of the humanoid robot of the first embodiment.
Figure 56:
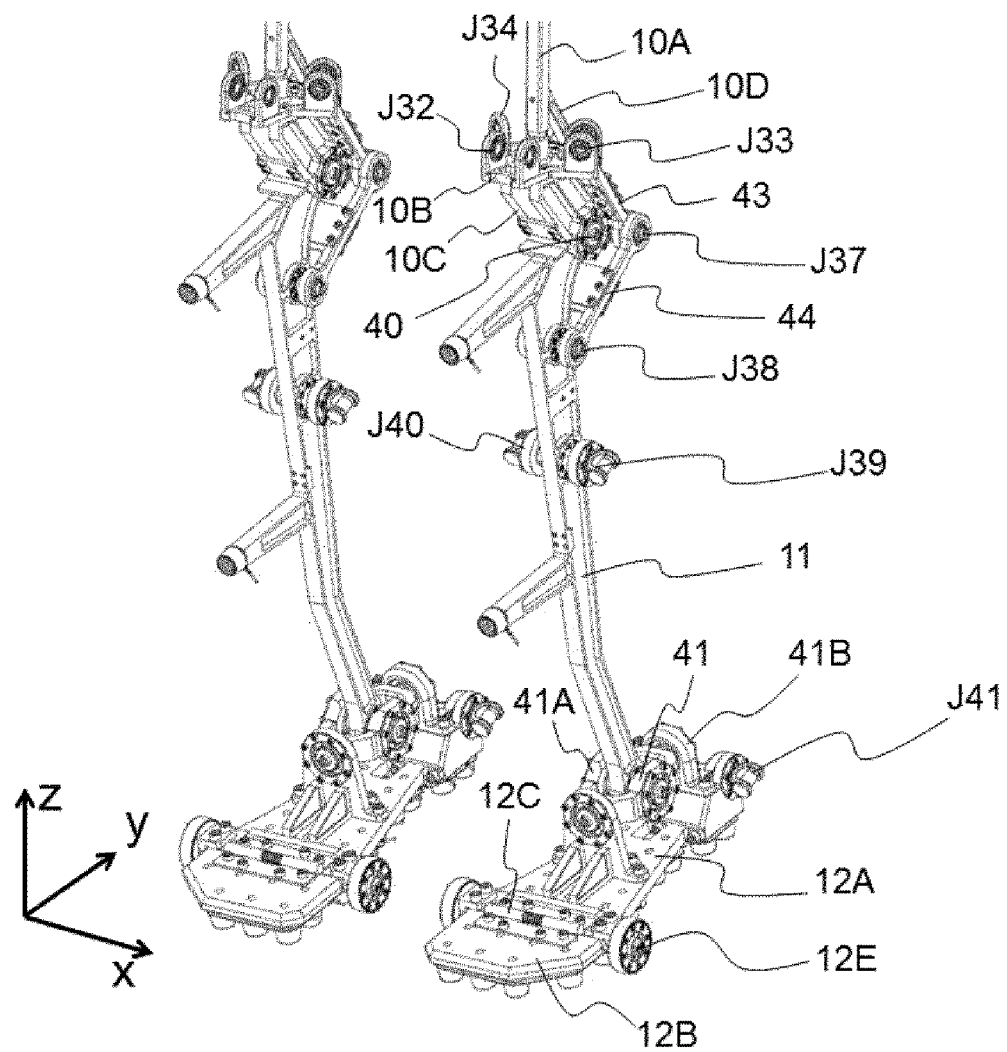
FIG. 56 is a perspective view illustrating the portion below the knee joint in the skeleton structure of the humanoid robot of the first embodiment.
Figure 57:
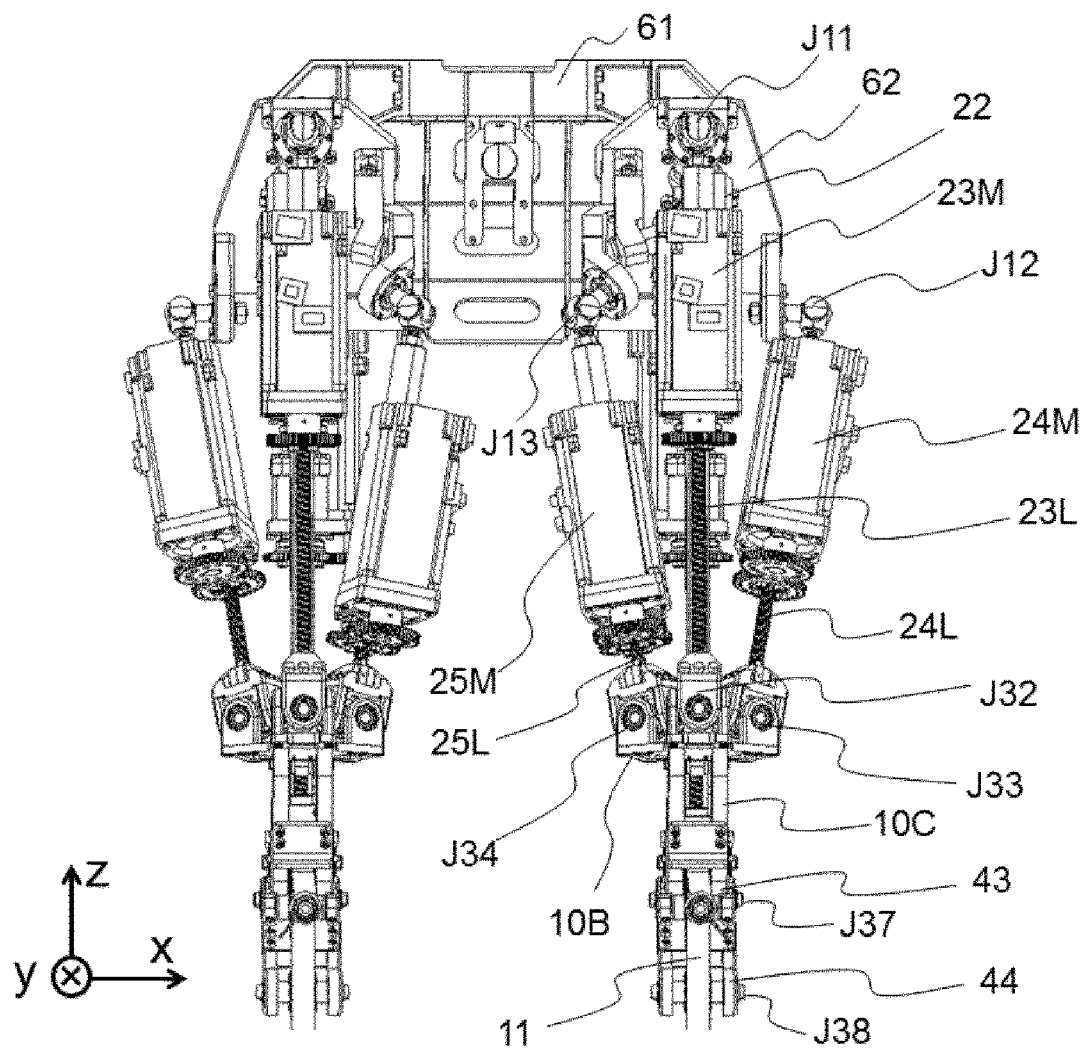
FIG. 57 is an enlarged front view illustrating a thigh of the humanoid robot of the first embodiment.
Figure 58:
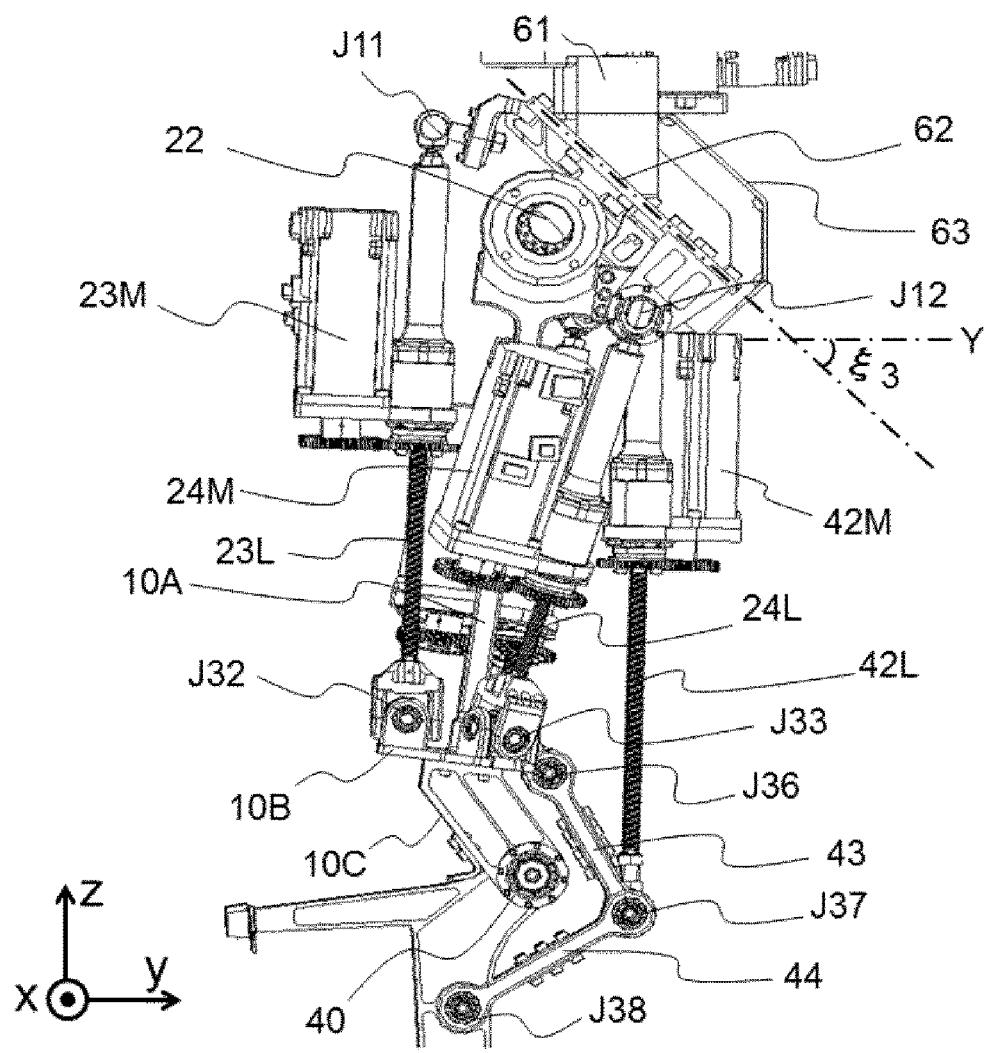
FIG. 58 is an enlarged left side view illustrating the thigh of the humanoid robot of the first embodiment.
Figure 59:
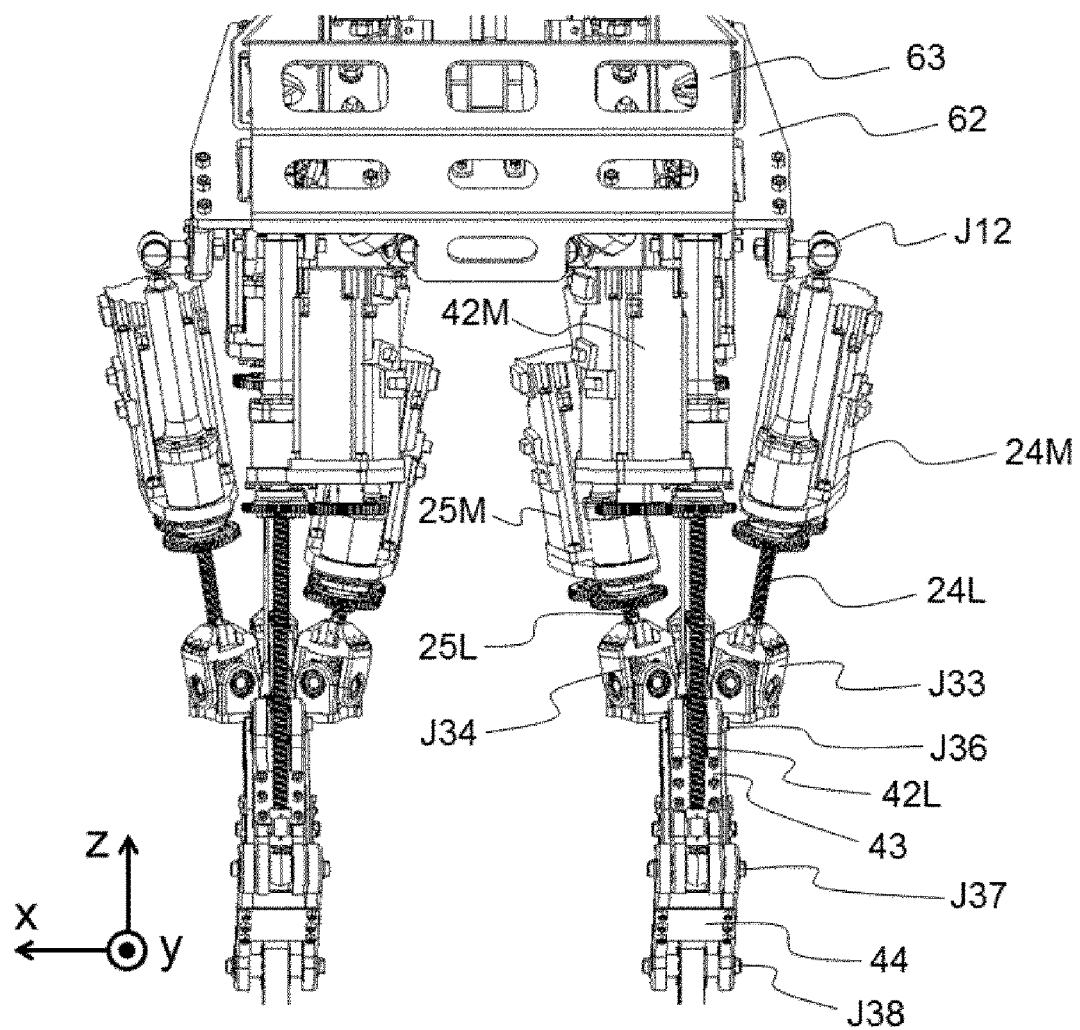
FIG. 59 is an enlarged rear view illustrating the thigh of the humanoid robot of the first embodiment.
Figure 60:
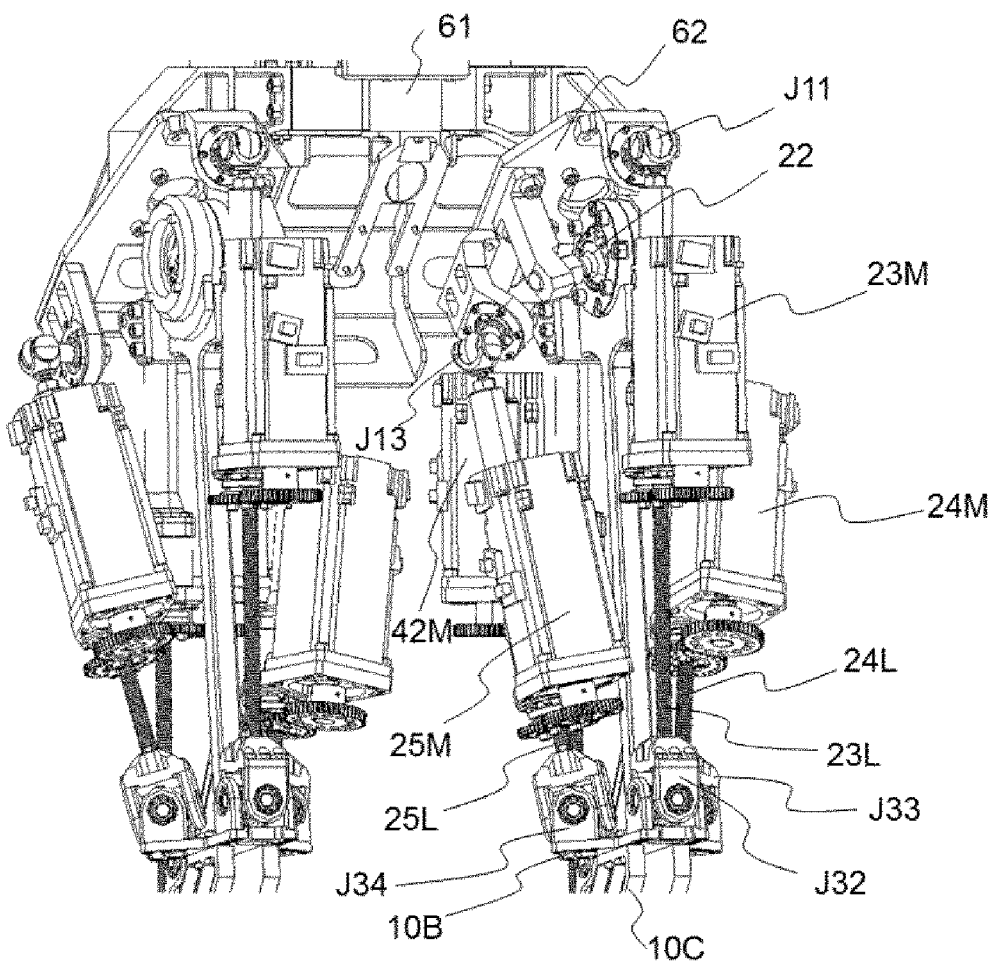
FIG. 60 is a perspective view illustrating the thigh of the humanoid robot of the first embodiment viewing from a front oblique right.
Figure 61:
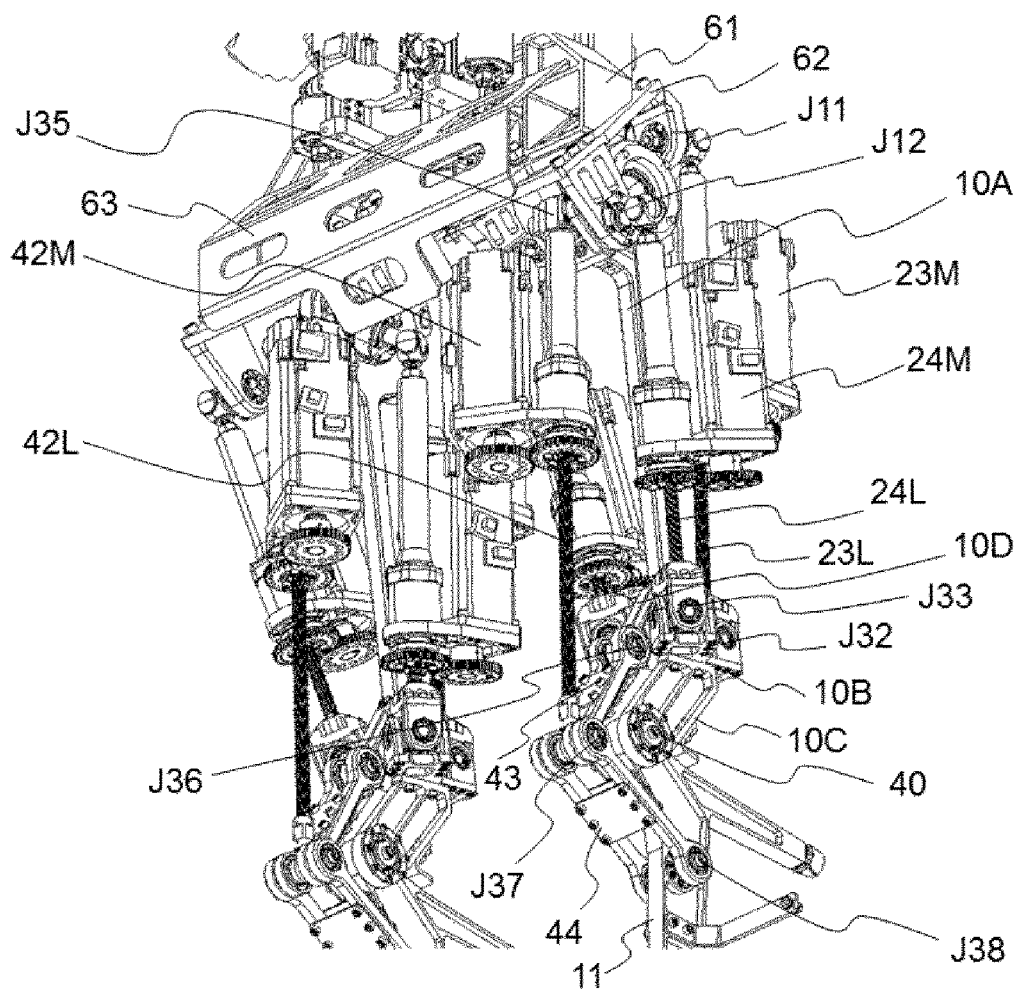
FIG. 61 is a perspective view illustrating the thigh of the humanoid robot of the first embodiment viewing from a rear oblique right.

Referring to FIGS. 11, 21, 22, and 53 to 61, the structure of a crotch C7 that moves thigh 10 relative to waist 6 is described. FIGS. 53, 54, and 55 are a front view, a left side view, and a rear view of a portion below the waist in the skeleton structure. FIG. 56 is a perspective view illustrating a portion below a knee joint 40 in the skeleton structure. FIGS. 57, 58, and 59 are an enlarged front view, an enlarged left side view, and an enlarged rear view of the thigh. FIG. 60 is a perspective view illustrating the thigh viewing from the front oblique right. FIG. 61 is a perspective view illustrating the thigh viewing from the rear oblique right.

As illustrated in FIG. 53, in the reference state, crotch front link attaching unit J11 exists on the straight line being viewed from the front, passing through thigh 10, and being extended to the upper side than hip joint 22. Crotch outside link attaching unit J12 protrudes horizontally outward. Crotch inside link attaching unit J13 protrudes obliquely forward and downward on the inside. In the reference state, hip joint 22, knee joint 40, and an ankle joint 41 exist on the same straight line viewed from the front. As illustrated in FIG. 58, lower limb connecting frame 62 on the flat plate is tilted at an angle $\xi 3$ (about 45 degrees) with respect to the horizontal plane (XY-plane), and the front side is high. For this reason, the plane determined by crotch front link attaching unit J11, crotch outside link attaching unit J12, and crotch inside link attaching unit J13 faces obliquely forward and downward.

Thigh 10 includes a rod-shaped thighbone 10A, a knee-side link attaching plate 10B provided perpendicular to thighbone 10A, and a knee connecting frame 10C being two frames connecting knee-side link attaching plate 10B and knee joint 40. Knee connecting frame 10C is tilted with respect to thighbone 10A and connected to knee-side link attaching plate 10B such that knee joint 40 is located behind thighbone 10A. One ends of the three variable length links that rotate hip joint 22 with three rotational degrees of freedom are attached to the three link attaching units provided in knee-side link attaching plate 10B. Knee joint 40 exists behind thighbone 10A, which allows hip joint 22, knee joint 40, and ankle joint 41 to exist easily on the vertical line viewing from the front.

Thigh front link 23L, thigh outside link 24L, and thigh inside link 25L are attached to a knee front link attaching unit J32, a knee outside link attaching unit J33, and a knee inside link attaching unit J34, being provided in knee-side link attaching plate 10B perpendicular to thigh 10. Knee-side link attaching plate 10B has a shape in which three rectangles connected on the center side extend in the directions each of which has an angle of 120 degrees. The rectangle provided with the knee front link attaching unit J32 exists on the front side of thigh 10.

Knee front link attaching unit J32 has a structure that allows rotation with two rotational degrees of freedom using a cross member in which two cylinders are joined into a cross shape. The yoke that holds rotatably one of the cylinders of the cross member is provided in knee-side link attaching plate 10B. The yoke that holds rotatably the other cylinder of the cross member is provided at one end of thigh front link 23L.

Knee outside link attaching unit J33 and knee inside link attaching unit J34 have the same structure as knee front link attaching unit J32.

Crotch C7 is a three-degree-of-freedom connection mechanism that connects thigh 10 being the second member rotatably to waist 6 being the first member with three rotational degrees of freedom. Crotch C7 includes hip joint 22 being the joint, three thigh front links 23L, thigh outside link 24L, and thigh inside link 25L, being three variable length links, crotch front link attaching unit J11, crotch outside link attaching unit J12, and crotch inside link attaching unit J13, being three first-member-side link attaching unit, and knee front link attaching units J32, knee outside link attaching unit J33, and a knee inside link attaching unit J34, being three second-member-side link attaching units.

The direction of thighbone 10A being the torsion axis is fixed with respect to thigh 10. The angle between thighbone 10A and waist 6 can be changed. The relative positional relationships with hip joint 22 are fixed by lower limb connecting frame 62 in crotch front link attaching unit J11, crotch outside link attaching unit J12, and crotch inside link attaching unit J13. The relative positional relationships with hip joint 22 are also fixed by thighbone 10A and knee-side link attaching plate 10B in knee front link attaching unit J32, knee outside link attaching unit J33, and knee inside link attaching unit J34.

Figure 62:
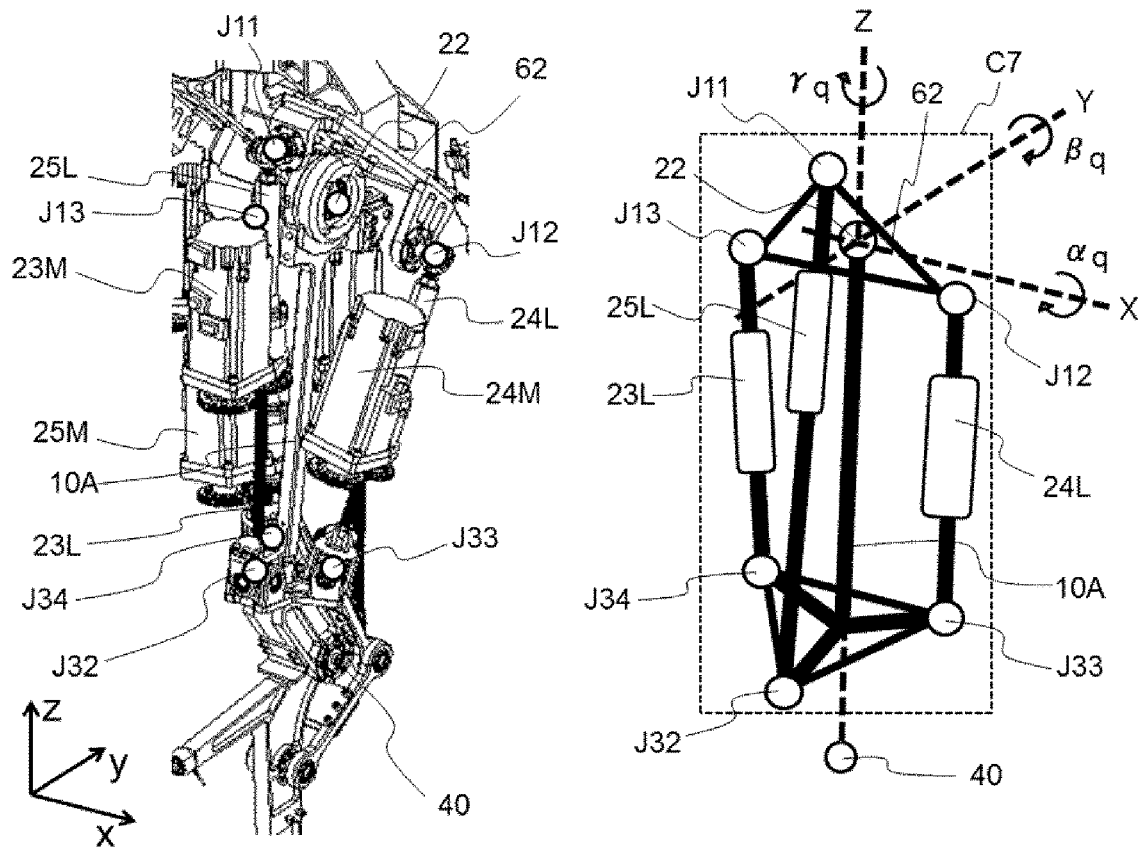
FIG. 62 is a perspective view illustrating the disposition of the variable length links in a left crotch of the humanoid robot of the first embodiment.

The disposition of the variable length links that move hip joint 22 is described. FIG. 62 is a perspective view illustrating the disposition of the variable length links in crotch C7. Crotch C7 includes three variable length links 23L, 24L, 25L connecting three first-member-side link attaching units J11, J12, J13 and three second-member-side link attaching units J32, J33, J34, respectively. For this reason, the connection angle of thigh 10 with respect to waist 6 can be changed with three rotational degrees of freedom by changing the lengths of three variable length links 23L, 24L, 25L. It is assumed that αq is the rotation angle around the X-axis of hip joint 22, that βq is the rotation angle around the Y-axis, and that γq is the rotation angle around the Z axis.

Figure 63:
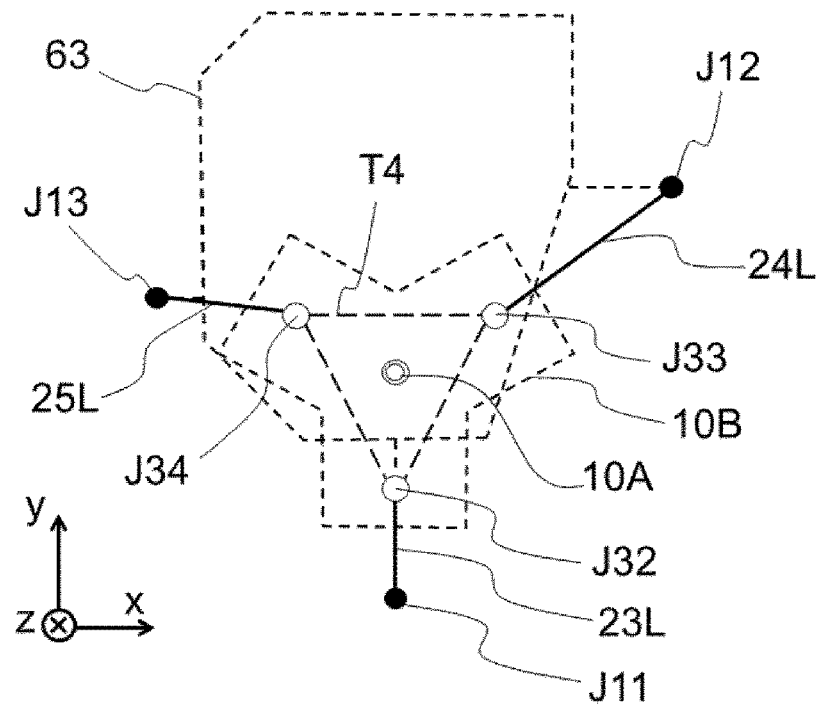
FIG. 63 is a view illustrating the disposition of the variable length links in the reference state of the left crotch of the humanoid robot of the first embodiment viewing from the direction in which a thighbone extends.

FIG. 63 is a view illustrating the disposition of the variable length links in left crotch C7 viewing from the direction in which the thighbone extends. In the reference state, variable length links 24L, 25L and torsion axis 10A have the twisted relationship. A tilt angle θq1 formed between the link reference plane including second-member-side link attaching unit J32 of variable length link 23L and torsion axis 10A and variable length link 23L is zero degree. A tilt angle θq2 of variable length link 24L is about 1.9 degrees. A tilt angle θq3 of variable length link 25L is about 3.9 degrees. A maximum value θqmax of the tilt angles of three variable length links 23L, 24L, 25L is greater than or equal to δ0 (for example, about 3 degrees). The torque rotating around torsion axis 10A is generated in the case that the lengths of variable length links 24L, 25L are changed.

Figure 64:
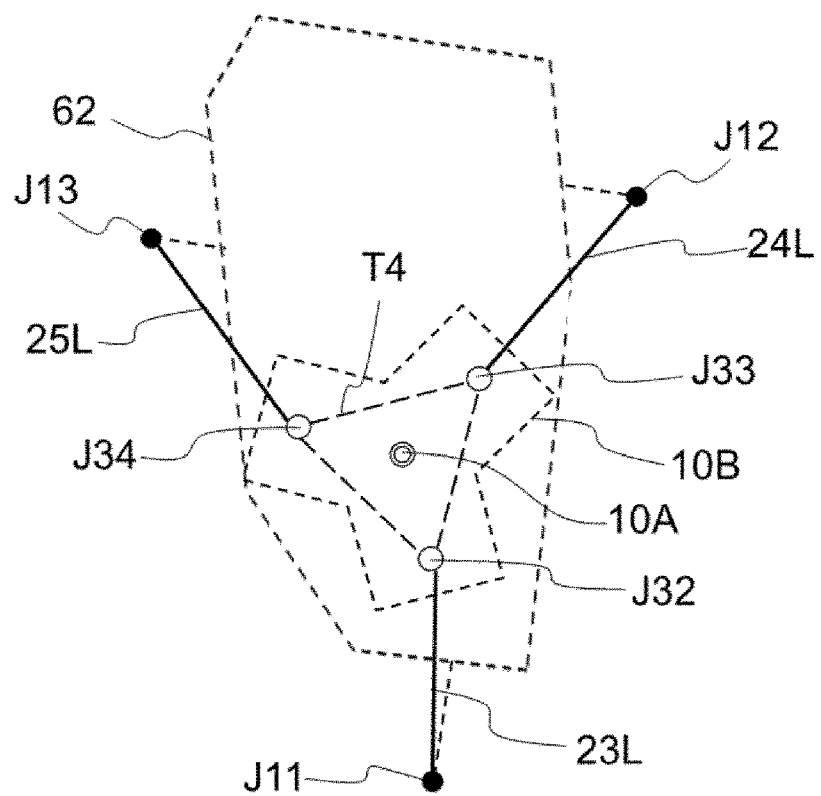
FIG. 64 is a view illustrating the disposition of the variable length links when the thigh of the left crotch included in the humanoid robot of the first embodiment is raised to a left front viewing from the direction in which the thighbone extends.

FIG. 64 is a view illustrating the disposition of the variable length links when thigh 10 of left crotch C7 is raised to the left front viewing from the direction in which thighbone 10A extends. FIG. 64 illustrates the state in which thigh 10 is raised by 30 degrees in the direction of the left front of 15 degrees. As can be seen from FIG. 64, when thigh 10 is raised, lower limb connecting frame 62 is lengthened in the vertical direction of the drawing, and tilt angle θq3 of variable length link 25L is larger than that in the case of FIG. 63. Tilt angle θq1 of variable length link 23L is also increased. In moving thigh 10 within the movable range, namely, in each state within the movable range of hip joint 22, at least one of variable length links 23L, 24L, 25L has the twisted relationship with torsion axis 10A. In each state within the movable range of hip joint 22, maximum value θqmax of the tilt angles of three variable length links 23L, 24L, 25L is greater than or equal to δ0 (for example, about 3 degrees).

The fact that hip joint 22 is rotatable around thighbone 10A is necessary when humanoid robot 100 changes the direction and walks. In the case that hip joint 22 cannot rotate around thighbone 10A, humanoid robot 100 walks in the oblique direction while facing the front. In changing the orientation of the entire body by moving lower limb 3, it is necessary to be able to change a direction in which a leg is opened at hip joint 22.

Figure 65:
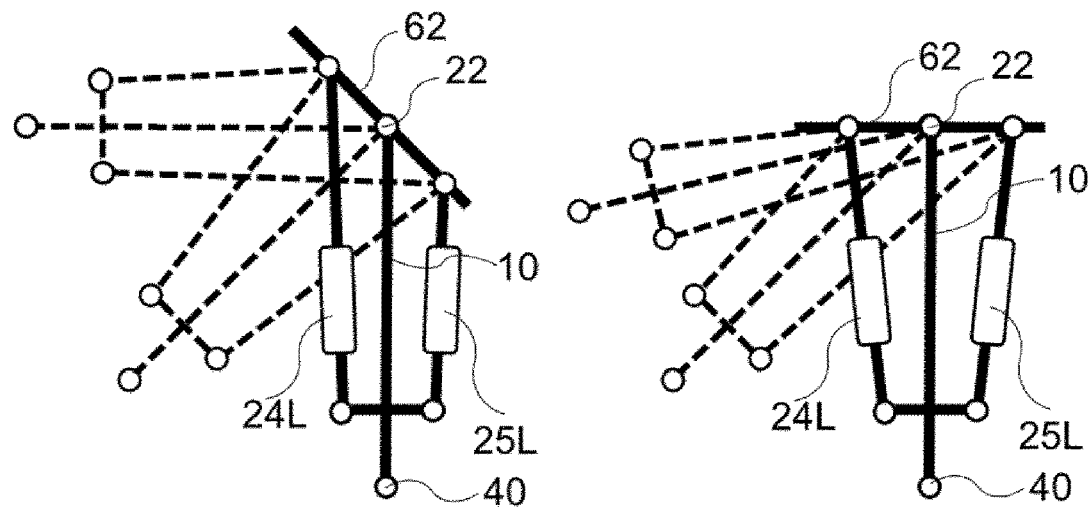
FIG. 65 is a view illustrating an effect obtained by attaching the variable length link that moves a hip joint included in the humanoid robot of the first embodiment high on a front side and by attaching the variable length link low on a rear side.

Referring to FIG. 65, the effect obtained by attaching the variable length link that moves hip joint 22 high on the front side and attaching the variable length link low on the rear side is described. In FIG. 65, only variable length links 23L, 24L are illustrated for convenience. The left side in FIG. 65 is a side view illustrating the case that variable length links 23L, 24L, 25L that move hip joint 22 are attached high on the front side and attached low in the rear side as in the first embodiment. The right side in FIG. 65 is a side view illustrating the case that variable length links 23L, 24L, 25L that move hip joint 22 are attached at the same height. The upright state is indicated by a solid line, and the state in which the thigh is raised forward by 45 degrees and to a limit of the movable range is indicated by a broken line.

When variable length links 23L, 24L, 25L that move hip joint 22 are attached at the same height, the movable range on the front side of the hip joint 22 becomes smaller than that of the case that variable length links 23L, 24L, 25L are attached high on the front side. This is because variable length link 23L and lower limb connecting frame 62 interfere with each other when hip joint 22 is rotated in the direction in which thigh 10 and knee joint 40 are located forward. When variable length link 23L on the front side is set to the higher position, the interference between variable length link 23L and lower limb connecting frame 62 is hardly generated, hip joint 22 can largely be rotated forward, and thigh 10 can further be raised.

In the case that all variable length links 23L, 24L, 25L are attached at the same height, despite the movable range is narrow, it is necessary to lengthen variable length link 24L longer in moving hip joint 22 to the limit of the movable range as compared with the case that the front side is set higher. On the other hand, it is necessary to shorten variable length link 23L shorter.

Referring to FIGS. 53 to 62, the structure of a knee C8 that moves lower leg 11 with respect to thigh 10 is described. As illustrated in FIG. 56, knee joint 40 has the structure in which plate-shaped lower leg 11 is sandwiched between two knee connecting frames 10C and the rotation axis is passed through lower leg 11 and two knee connecting frames 10C. In the reference state, the rotation axis is parallel to the X-axis. Two knee connecting frames 10C are coupled together on the front side by a coupling plate 10D in order to increase strength. Coupling plate 10D also has a function of preventing knee joint 40 from being bent in the reverse direction. As illustrated in FIG. 58 and other figures, the angle of knee joint 40 can be changed by changing the length of a knee drive link 42L included in one knee drive actuator 42 provided on the rear side of thigh 10. Lower leg 11 is a plate-shaped member, which is bent near knee joint 40 and also bent at the position predetermined from ankle joint 41. Lower leg 11 is located on the front side of the straight line connecting knee joint 40 and ankle joint 41.

Knee drive actuator 42 has the structure in which force from a motor 42M being the power source is transmitted to knee drive link 42L by a gear provided on the side existing knee joint 40.

A knee drive link attaching unit J35 being attached with one end of knee drive link 42L with one rotational degree of freedom is provided on the rear side of thighbone 10A close to hip joint 22. Knee drive link attaching unit J35 has the structure in which the yoke is provided on thighbone 10A and the columnar shaft member is provided at one end of knee drive link 42L.

Knee drive link 42L is connected to both thigh 10 and the lower leg 11 using two auxiliary tools on the side existing knee joint 40. The two auxiliary tools are a thigh-side auxiliary tool 43 and a lower leg-side auxiliary tool 44. One end of thigh-side auxiliary tool 43 is attached rotatably to one end of knee drive link 42L. A place to which one end of thigh-side auxiliary tool 43 and one end of knee drive link 42L are attached is referred to as a knee drive link auxiliary tool connecting unit J37. The other end of thigh-side auxiliary tool 43 is attached rotatably to a thigh-side auxiliary tool attaching unit J36 provided on the rear side of thigh 10. One end of lower leg-side auxiliary tool 44 is also attached rotatably to knee drive link auxiliary tool connecting unit J37. The other end of lower leg-side auxiliary tool 44 is attached rotatably to a lower leg-side auxiliary tool attaching unit J38 provided on the rear side of lower leg 11.

A rod-shaped thigh-side auxiliary tool attaching unit 10D extends backward from the position slightly upper than a knee-side link attaching plate 10B of thighbone 10A. Thigh-side auxiliary tool attaching unit J36 is provided at the tip of thigh-side auxiliary tool attaching unit 10D. Thigh-side auxiliary tool attaching unit J36 exists near knee-side link attaching plate 10B. Thigh-side auxiliary tool 43 has a structure in which the side faces of the two frames are connected to each other. The through-hole is made at the tip of thigh-side auxiliary tool attaching unit 10D. The through-holes are also made at both ends of thigh-side auxiliary tool 43. Thigh-side auxiliary tool attaching unit J36 has the structure, in which thigh-side auxiliary tool attaching unit 10D is sandwiched by thigh-side auxiliary tool 43 such that the positions of the through-holes are aligned with each other and the rotation shaft passes through the through-holes.

The end on the opposite side to thigh-side auxiliary tool 43 is connected to lower leg-side auxiliary tool 44 and knee drive link 42L with one rotational degree of freedom by knee drive link auxiliary tool connecting unit J37. Lower leg-side auxiliary tool 44 has a structure in which the side faces of the two frames are connected to each other. In knee drive link auxiliary tool connecting unit J37, thigh-side auxiliary tool 43 sandwiches knee drive link 42L. Lower leg-side auxiliary tool 44 sandwiches thigh-side auxiliary tool 43 and knee drive link 42L. At the place where lower leg-side auxiliary tool 44 sandwiches thigh-side auxiliary tool 43 and knee drive link 42L, the through-holes are made in lower leg-side auxiliary tool 44, thigh-side auxiliary tool 43, and knee drive link 42L. Each of thigh-side auxiliary tool 43, lower leg-side auxiliary tool 44, and knee drive link 42L can rotate with one rotational degree of freedom by the rotation shaft passing through these through-holes.

Lower leg-side auxiliary tool attaching unit J38 is provided near the place where lower leg 11 is bent on the side existing knee joint 40. One end of lower leg-side auxiliary tool 44 is attached rotatably to lower leg-side auxiliary tool attaching unit J38 with one rotational degree of freedom. Lower leg-side auxiliary tool attaching unit J38 has the structure in which the rotation shaft is inserted in the through-holes provided in lower leg 11 and lower leg-side auxiliary tool 44. Lower leg-side auxiliary tool 44 is attached to lower leg 11 with one rotational degree of freedom by the lower leg-side auxiliary tool attaching unit J38.

Figure 66:
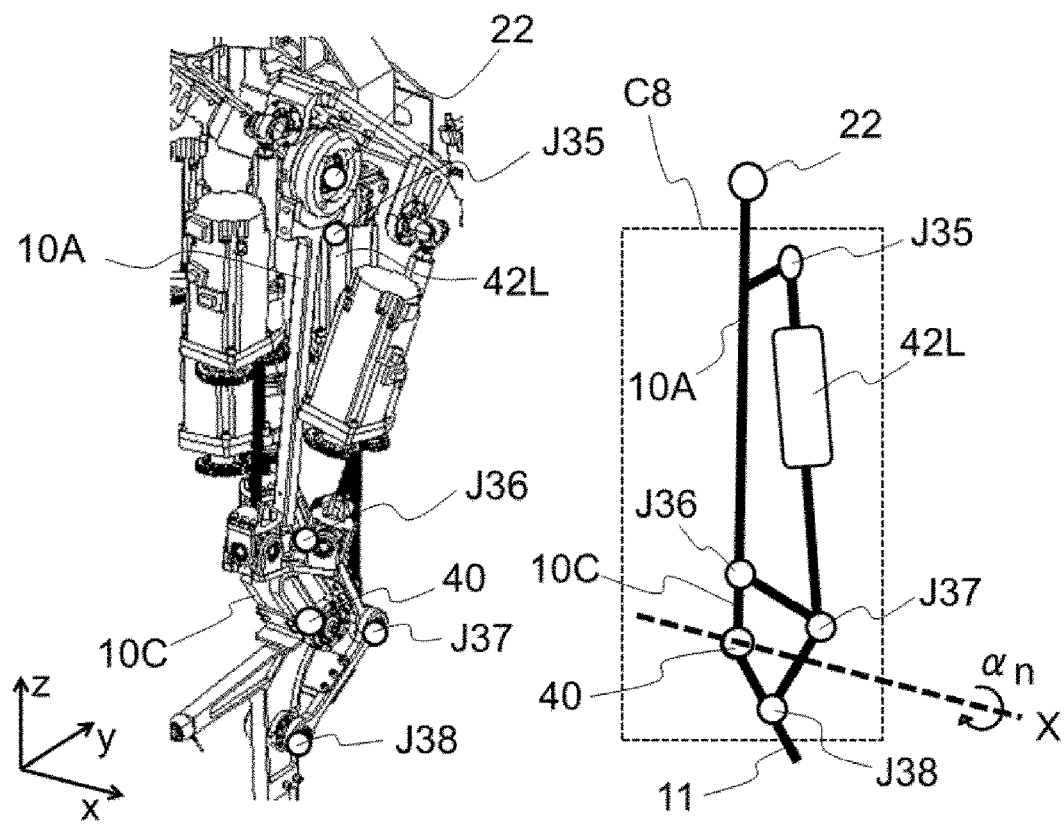
FIG. 66 is a perspective view illustrating the disposition of the variable length links for moving the left knee joint included in the humanoid robot of the first embodiment.
Figure 67:
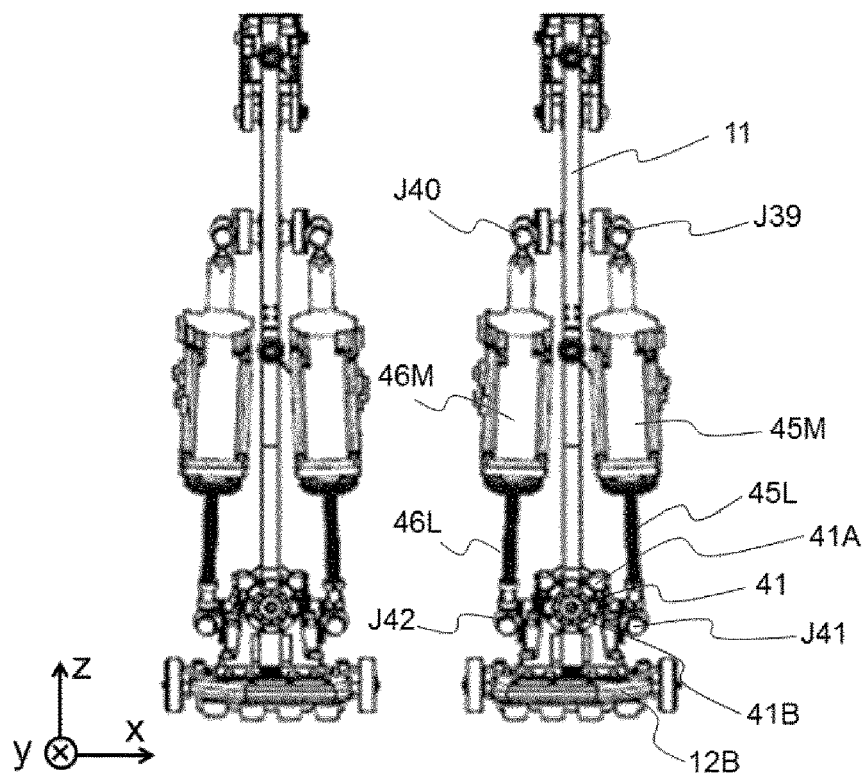
FIG. 67 is an enlarged front view illustrating the portion below the knee joint of the humanoid robot of the first embodiment.
Figure 68:
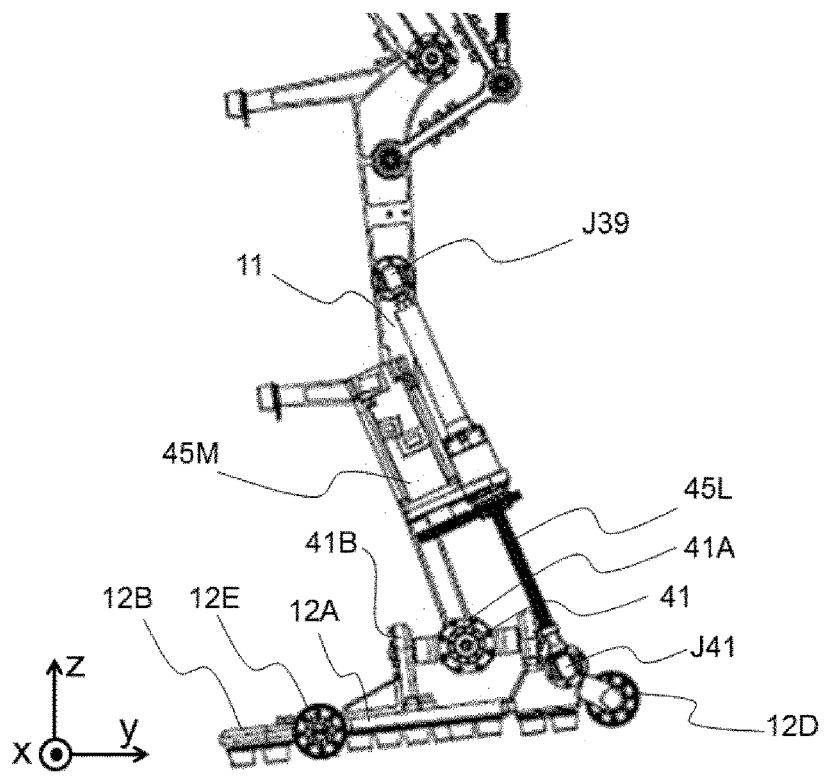
FIG. 68 is an enlarged left side view illustrating the portion below the knee joint of the humanoid robot of the first embodiment.
Figure 69:
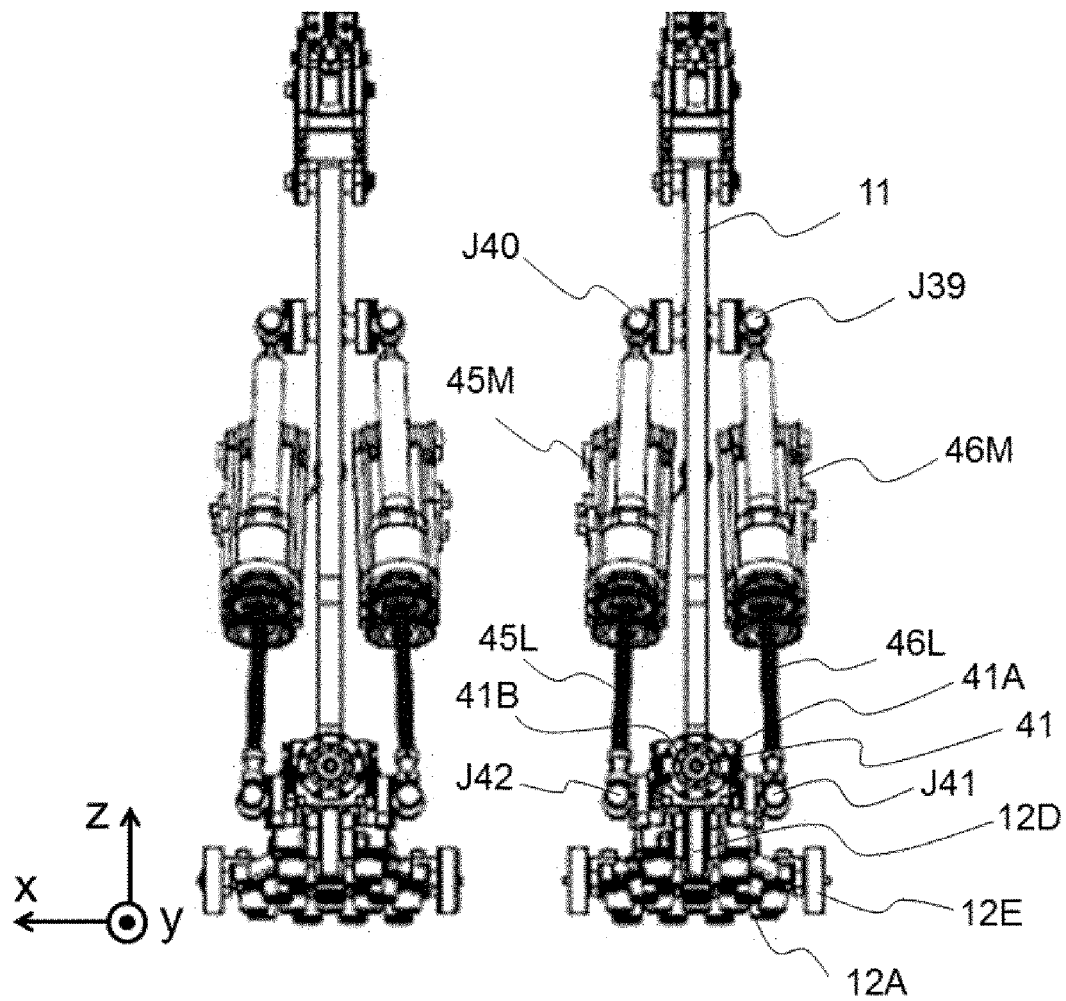
FIG. 69 is an enlarged rear view illustrating the portion below the knee joint of the humanoid robot of the first embodiment.
Figure 70:
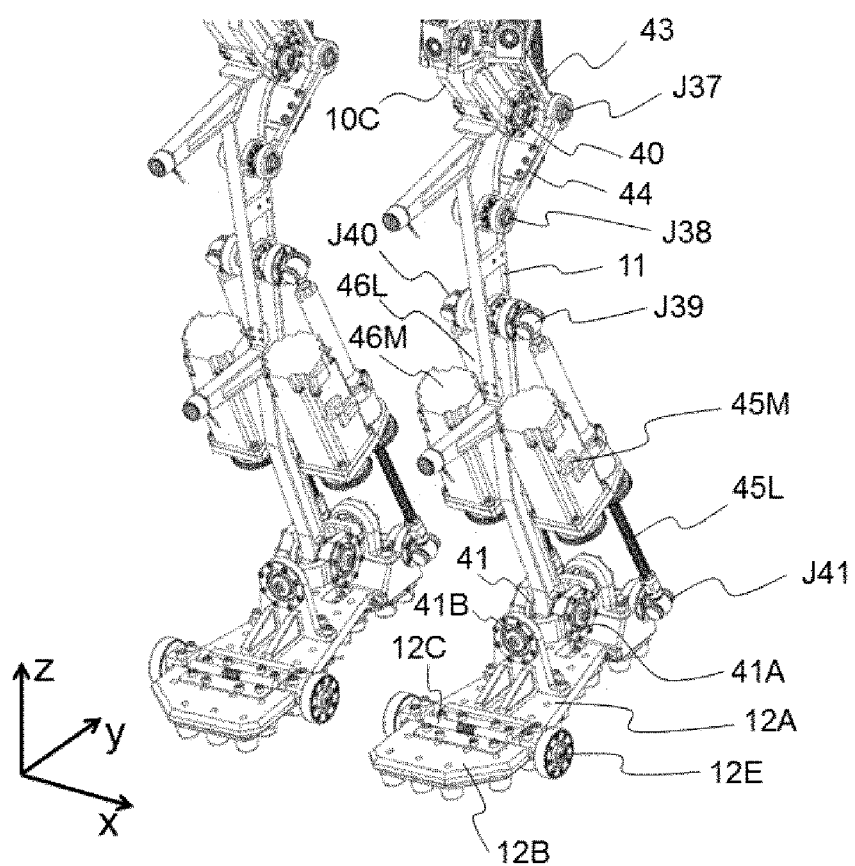
FIG. 70 is a perspective view illustrating a portion below a lower leg of the humanoid robot of the first embodiment.

FIG. 66 is a perspective view illustrating the disposition of the variable length link that moves left knee joint 40. Knee joint 40, knee drive link attaching unit J35, and thigh-side auxiliary tool attaching unit J36 are fixed to thigh 10, and the relative positional relationships among knee joint 40, knee drive link attaching unit J35, and thigh-side auxiliary tool attaching unit J36 are fixed. Lower leg-side auxiliary tool attaching unit J38 is fixed to lower leg 11. Lower leg-side auxiliary tool attaching unit J38 has a predetermined distance from knee joint 40. Knee drive link auxiliary tool connecting unit J37 has predetermined distances from thigh-side auxiliary tool attaching unit J36 and lower leg-side auxiliary tool attaching unit J38. Therefore, when the rotation angle of knee joint 40 is determined, thigh-side auxiliary tool 43 and lower leg-side auxiliary tool 44 move like a pantograph, and the position of knee drive link auxiliary tool connecting unit J37 is determined. On the other hand, when the position of knee drive link auxiliary tool connecting unit J37 is determined, the rotation angle of knee joint 40 is determined.

The length of knee drive link 42L is the distance between knee drive link attaching unit J35 and knee drive link auxiliary tool connecting unit J37. Thus, the rotation angle of knee joint 40 can be changed by changing the length of knee drive link 42L.

Knee C8 includes knee joint 40, knee drive actuator 42, knee drive link attaching unit J35 provided on the rear side of thigh 10, thigh-side auxiliary tool 43, thigh-side auxiliary tool attaching unit J36 provided on the rear side of thigh 10, lower leg-side auxiliary tool 44, and lower leg-side auxiliary tool attaching unit J38 provided on the rear side of the lower leg. Knee joint 40 connects thigh 10 and lower leg 11 with one rotational degree of freedom. Knee drive actuator 42 includes knee drive link 42L having a variable length and motor 42M. One end of knee drive link 42 is attached rotatably to knee drive link attaching unit J35. One end of thigh-side auxiliary tool 43 is attached rotatably to the other end of knee drive link 42L. The other end of thigh-side auxiliary tool 43 is attached rotatably to thigh-side auxiliary tool attaching unit J36. One end of lower leg-side auxiliary tool 44 is attached rotatably to the other end of knee drive link 42L. The other end of lower leg-side auxiliary tool 44 is attached rotatably to lower leg-side auxiliary tool attaching unit J38.

Knee C8 can be bent from the state in which hip joint 22, knee joint 40, and ankle joint 41 are disposed on the same straight line to the state in which the angle between thigh 10 and lower leg 11 is about 40 degrees.

Knee C8 includes thigh-side auxiliary tool 43 and lower leg-side auxiliary tool 44, so that the force caused by the expansion and contraction of knee drive link 42L can be transmitted to thigh-side auxiliary tool attaching unit J36 and lower leg-side auxiliary tool attaching unit J38 like the pantograph. Consequently, the force rotating knee joint 40 is easily transmitted even in the case that knee joint 40 is largely bent as thigh 10 and lower leg 11 become closer to a parallel position. As a result, with small force generated by knee drive actuator 42, the bending and stretching motion of knee joint 40 can more smoothly be performed.

Referring to FIGS. 53 to 56, and 67 to 70, the structure of an ankle C9 that moves foot 12 with respect to lower leg 11 is described. FIGS. 67, 68, 69, and 70 are a front view, a left side view, a rear view, and a perspective view of a portion below lower leg 11.

Ankle joint 41 is the biaxial gimbal that connects foot 12 to lower leg 11 with two rotational degrees of freedom, that are, in the front-back direction and in the right and left direction. A columnar portion in the right and left direction is provided at a lower end of lower leg 11 such that lower leg 11 can rotate in the front-back direction. The columnar portion of lower leg 11 is held and sandwiched rotatably by a front-back rotation yoke 41A, and lower leg 11 can rotate in the front-back direction with respect to front-back rotation yoke 41A. Columnar portions (shaft member) are provided in the surfaces in the front-rear direction of front-back rotation yoke 41A. A right and left rotation yoke 41B provided on foot 10 holds rotatably the shaft member of front-back rotation yoke 41A by sandwiching the shaft member from the front-back direction, and lower leg 11 and front-back rotation yoke 41A move in the right and left direction with respect to foot 12.

Foot 12 can rotate around ankle joint 41 with two rotational degrees of freedom in the front-back direction and the right and left direction by a lower leg outside actuator 45 and a lower leg inside actuator 46. A lower leg outside link attaching unit J39 and a lower leg inside link attaching unit J40 that attach one ends of a lower leg outside link 45L and a lower leg inside link 46L with two rotational degrees of freedom are provided in the right and left surfaces of plate-shaped lower leg 11. Lower leg outside link attaching unit J39 has the structure, in which the rotation member, the yoke, and the shaft member are provided on lower leg 11 and the shaft member is inserted into the cylinder provided at one end of lower leg outside link 45L. Lower leg inside link attaching unit J40 also has the same structure.

Lower leg outside actuator 45 has the structure in which the force from a motor 45M is transmitted to lower leg outside link 45L by the gear provided on the side existing foot 12. Lower leg inside actuator 46 also has the same structure.

A foot outside link attaching unit J41 and a foot inside link attaching unit J42 being attached with the other ends of lower leg outside link 45L and lower leg inside link 46L with two rotational degrees of freedom are provided at the right and left positions on the rear side of foot 12. Foot outside link attaching unit J41 and foot inside link attaching unit J42 are the biaxial gimbal having the same structure as lower leg outside link attaching unit J39 and lower leg inside link attaching unit J40.

The interval between foot outside link attaching unit J41 and foot inside link attaching unit J42 is larger than the interval between lower leg outside link attaching unit J39 and lower leg inside link attaching unit J40. Consequently, ankle joint 41 can be rotated easily in the right and left direction.

Foot 12 includes ankle joint 41, a foot main body 12A, and a toe 12B provided on the front side of foot main body 12A. Foot outside link attaching unit J41 and foot inside link attaching unit J42 are provided in foot main body 12A. Between foot main body 12A and toe 12B, there exists a toe joint 12C. Toe joint 12C changes vertical angle of toe 12B with respect to foot main body 12A. A spring (not illustrated) is provided between toe 12B and foot main body 12A, and toe 12B is appropriately bent according to the force when the force bending toe 12B is applied.

A heel wheel 12D is provided in the center at the rear end of foot main body 12A. Heel wheel 12D is a wheel having proper rolling friction. Foot 12 includes heel wheel 12D, which allows a heel on the rear side of foot 12 to be smoothly landed when humanoid robot 100 walks. Heel wheel 12D acts as a touch sensor that reports the landing of the heel while rotating. Foot side-surface wheels 12E having proper rolling friction are provided on the side existing foot 12 in the vicinity of toe joint 12C. Foot side-surface wheel 12E acts as a touch sensor that reports the landing of not only the heel but also entire foot 12. During the movement, foot side-surface wheel 12E can detect that toe 12B is in contact with a floor or a ground while rotating, and then detect that the toe 12B is separated from the floor or the ground.

Figure 71:
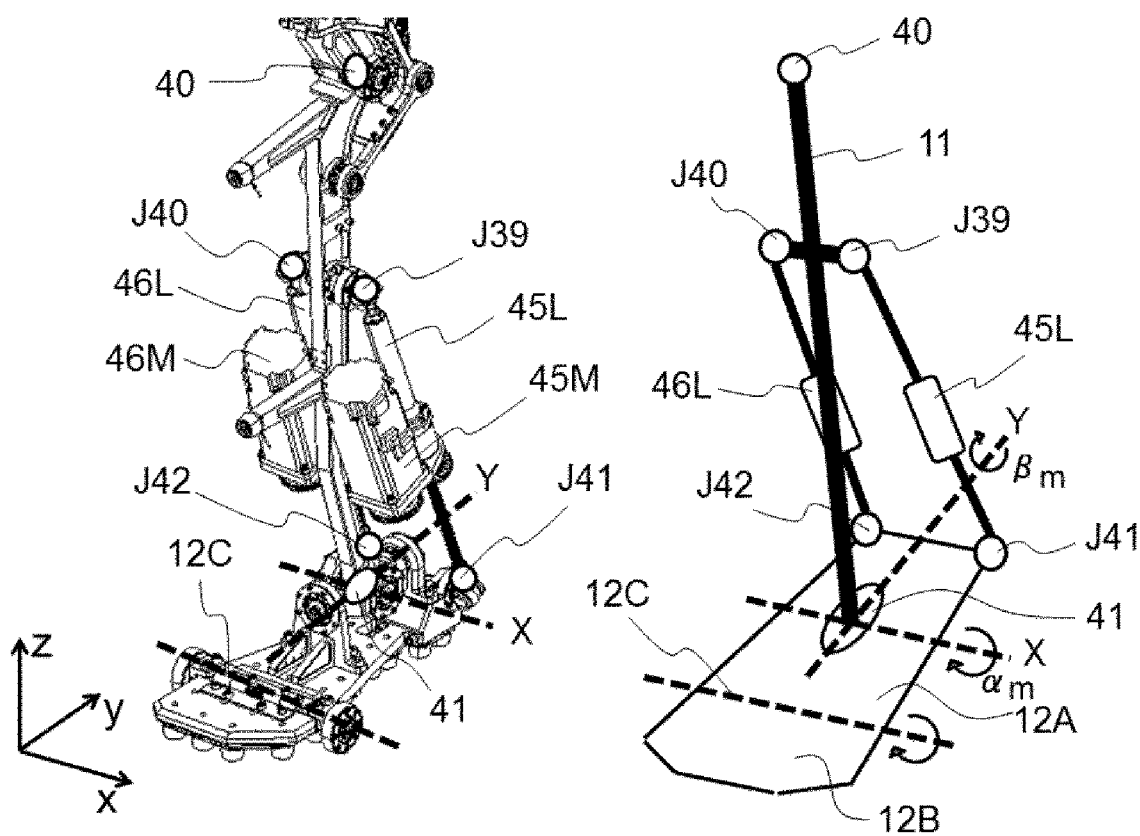
FIG. 71 is a perspective view illustrating the disposition of the variable length links for moving a left ankle joint included in the humanoid robot of the first embodiment.

FIG. 71 is a perspective view illustrating the disposition of the variable length links that move ankle joint 41. Ankle joint 41, foot outside link attaching unit J41, and foot inside link attaching unit J42 are fixed to foot main body 12A, and the relative positional relationships among ankle joint 41, foot outside link attaching unit J41, and foot inside link attaching unit J42 are fixed. Lower leg outside link attaching unit J39 and lower leg inside link attaching unit J40 are fixed to lower leg 11. The relative positional relationships among ankle joint 41, lower leg outside link attaching unit J39, and lower leg inside link attaching unit J40 are fixed. Lower leg outside link 45L and lower leg inside link 46L are the variable length link having the variable length. Lower leg outside link 45L connects lower leg outside link attaching unit J39 and foot outside link attaching unit J41. Lower leg inside link 46L connects lower leg inside link attaching unit J40 and foot inside link attaching unit J42. By changing the lengths of lower leg outside link 45L and lower leg inside link 46L, the connection angle of lower leg 41 to leg main body 12A can be changed around the X-axis and the Y-axis. It is assumed that am is the rotation angle around the X-axis of ankle joint 41, and that βm is the rotation angle around the Y-axis.

Ankle C9 includes ankle joint 41, lower leg outside actuator 45, and lower leg inside actuator 46. Ankle joint 41 connects the lower portion of lower leg 11 and foot 12 with at least two rotational degrees of freedom. Lower leg outside actuator 45 and lower leg inside actuator 46 are two ankle actuators including lower leg outside link 45L and lower leg inside link 46L and motor 45M and a motor 46M, respectively. Ankle C9 also includes lower leg outside link attaching unit J39 and lower leg inside link attaching unit J40, foot outside link attaching unit J41, and foot inside link attaching unit J42. Lower leg outside link attaching unit J39 and lower leg inside link attaching unit J40 are two lower leg-side link attaching units that are provided in lower leg 11 being attached rotatably with one ends of lower leg outside link 45L and lower leg inside link 46L, respectively. Foot outside link attaching unit J41 and foot inside link attaching unit J42 are two foot-side link attaching units being attached rotatably with one ends of lower leg outside link 45L and lower leg inside link 46L, respectively. Foot outside link attaching unit J41 and foot inside link attaching unit J42 are provided in foot main body 12A at positions behind ankle joint 41.

In ankle C9, ankle joint 41 can be rotated in the range where the straight line connecting ankle joint 41 and knee joint 40 forms the angle from, for example, about 60 degrees forward to, for example, about 30 degrees backward with respect to foot 12, and ankle joint 41 can be tilted by, for example, about 15 degrees in the right and left direction.

When both lower leg outside link 45L and lower leg inside link 46L are lengthened, lower leg 41 can be tilted forward. When both lower leg outside link 45L and lower leg inside link 46L are shortened, lower leg 41 can be tilted backward. When lower leg outside link 45L is lengthened while lower leg inside link 46L is shortened, lower leg 41 can be inclined inside. When lower leg outside link 45L is shortened while lower leg inside link 46L is lengthened, lower leg 41 can be inclined outside.

Figure 72:
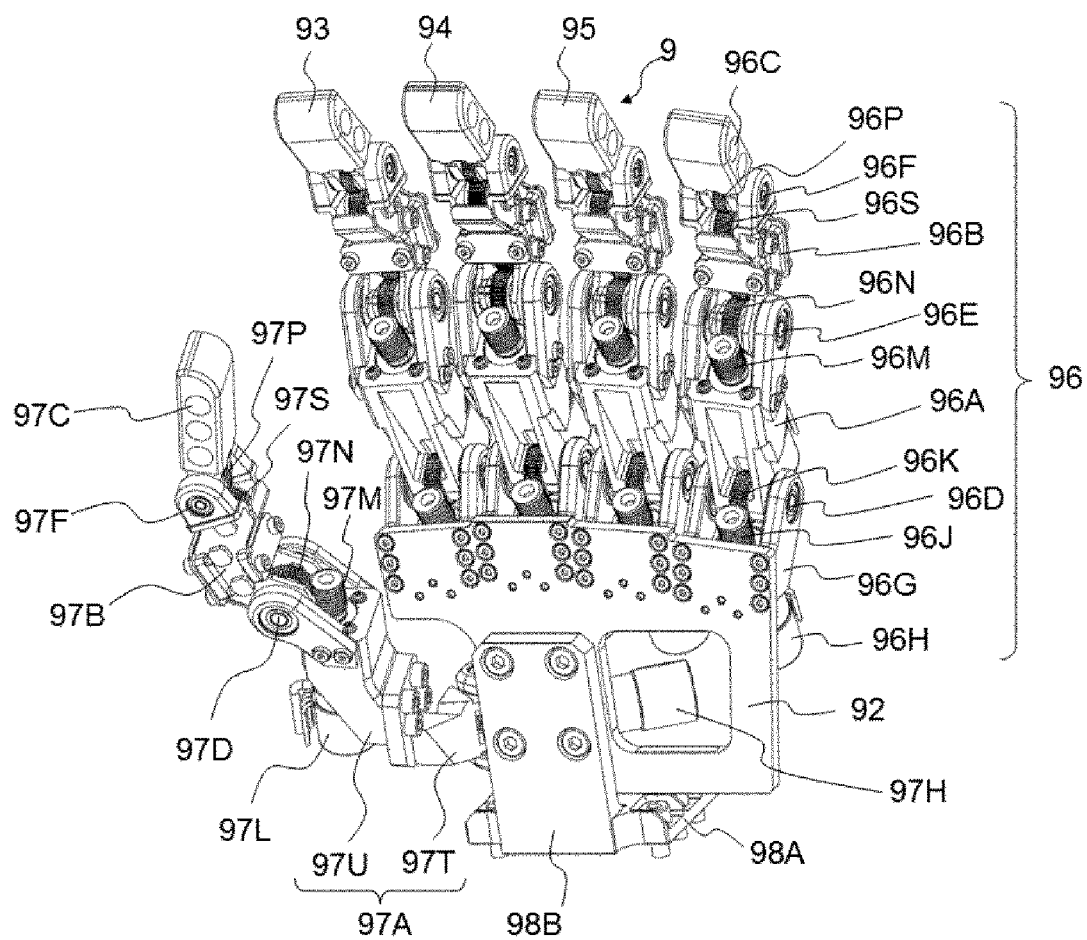
FIG. 72 is a perspective view illustrating a left hand included in the humanoid robot of the first embodiment viewing from a palm side.
Figure 73:
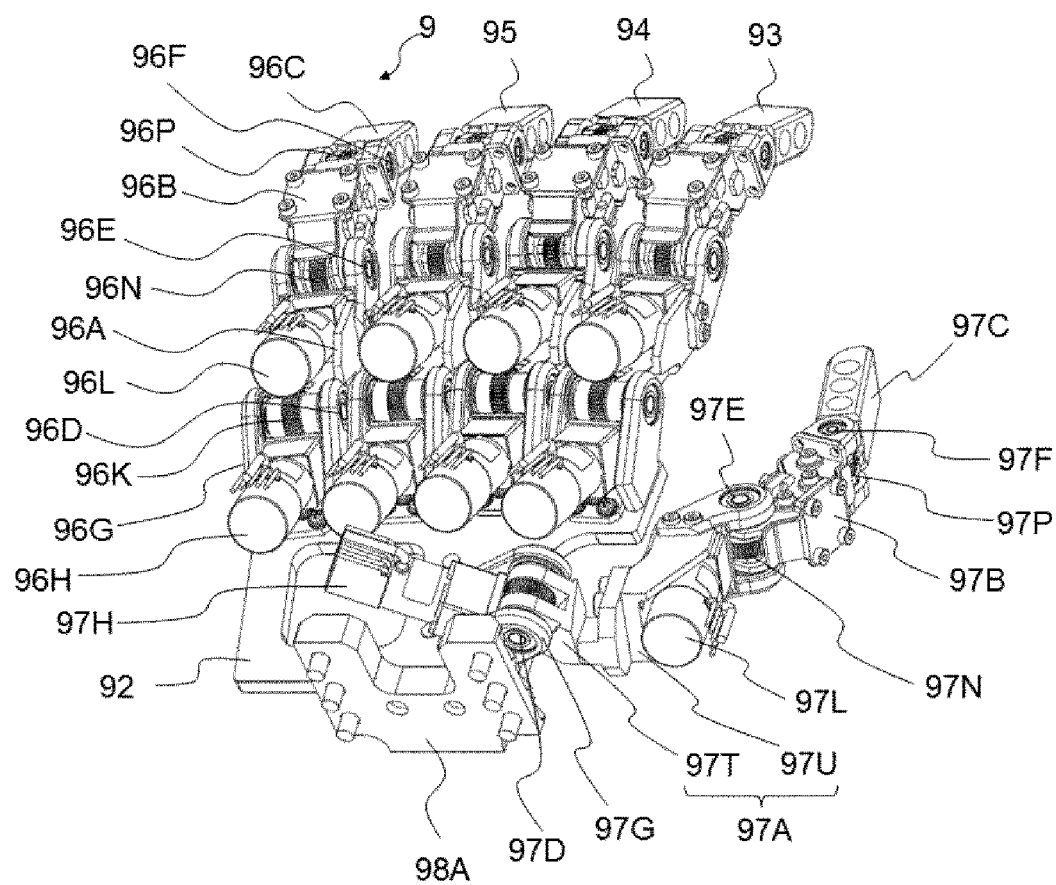
FIG. 73 is a perspective view illustrating the left hand included in the humanoid robot of the first embodiment viewing from the backside of the hand.
Figure 76:
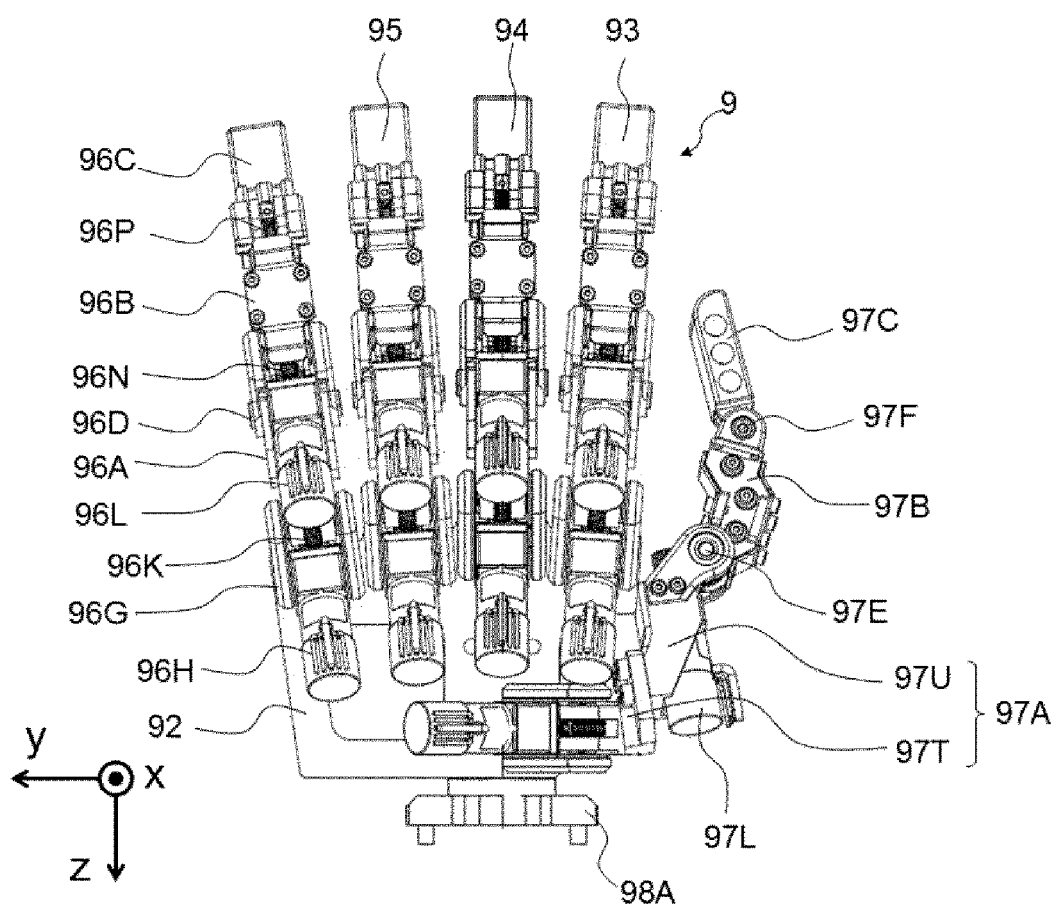
FIG. 76 is a rear view illustrating the left hand included in the humanoid robot of the first embodiment.
Figure 77:
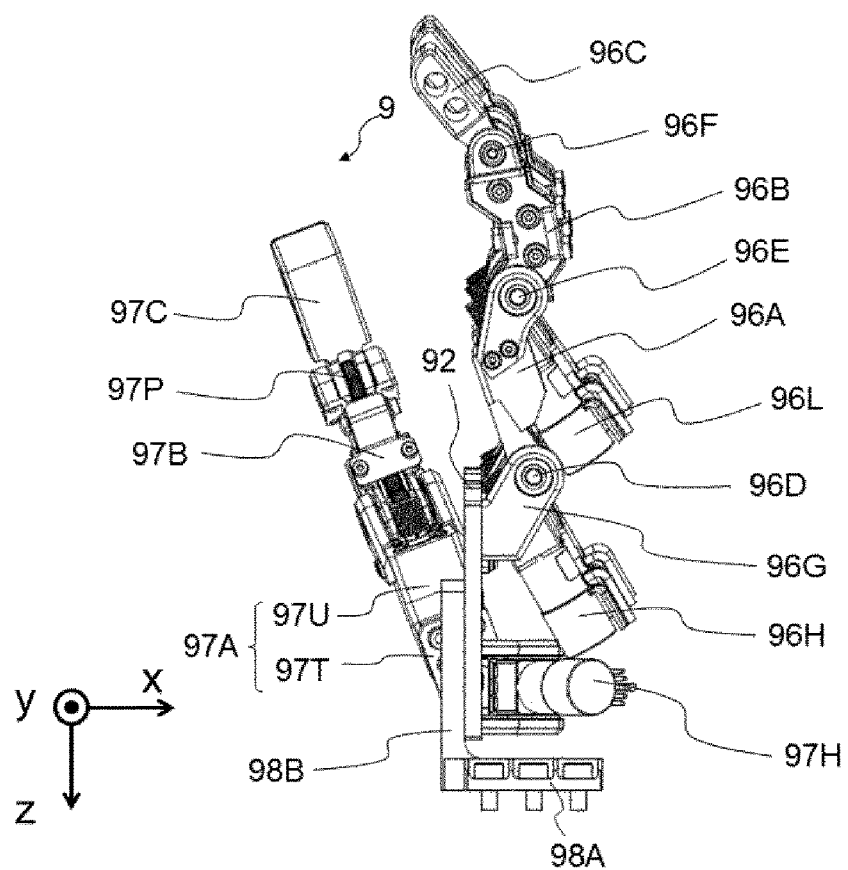
FIG. 77 is a side view illustrating the left hand included in the humanoid robot of the first embodiment viewing from the side not existing the opposable finger.
Figure 78:
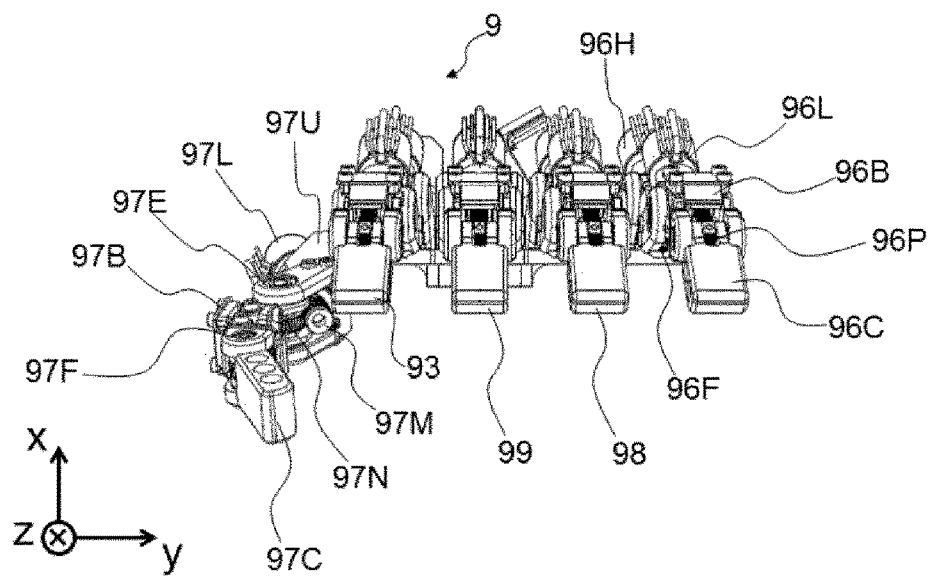
FIG. 78 is a view illustrating the left hand included in the humanoid robot of the first embodiment viewing from a fingertip side.
Figure 79:
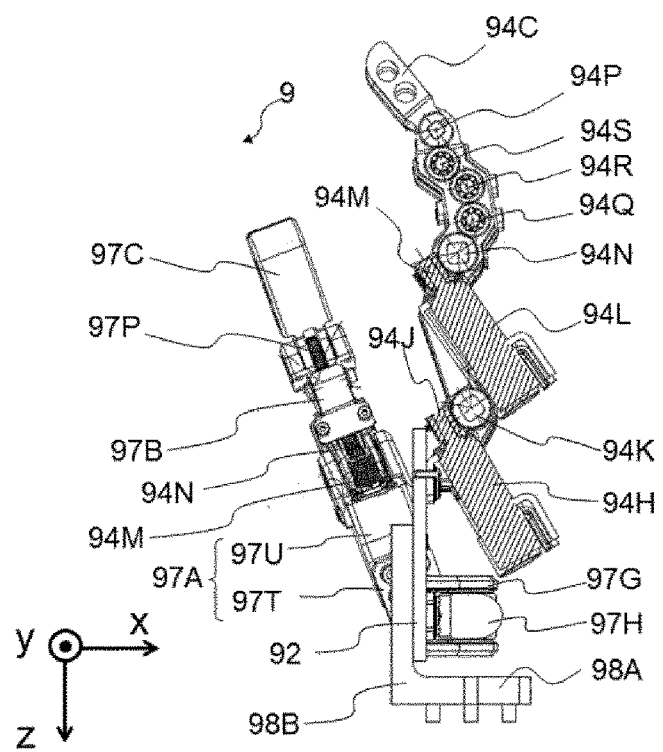
FIG. 79 is a view illustrating a cross section of a second finger of the left hand included in the humanoid robot of the first embodiment.

Referring to FIGS. 72 to 79, the structure of hand 9 is described. FIG. 72 is a perspective view illustrating left hand 9 viewing from the palm side. FIG. 73 is a perspective view illustrating left hand 9 viewing from the backside of the hand. FIGS. 74, 75, 76, and 77 are a front view of left hand 9, a side view of left hand 9 viewing from the side existing opposable finger 97, a rear view of left hand 9, and a side view of left hand 9 viewing from the side not existing opposable finger 97. FIG. 78 is a view illustrating left hand 9 viewing from the fingertip side. FIG. 79 is a view illustrating second finger 94 of left hand 9 in cross section.

Figure 74:
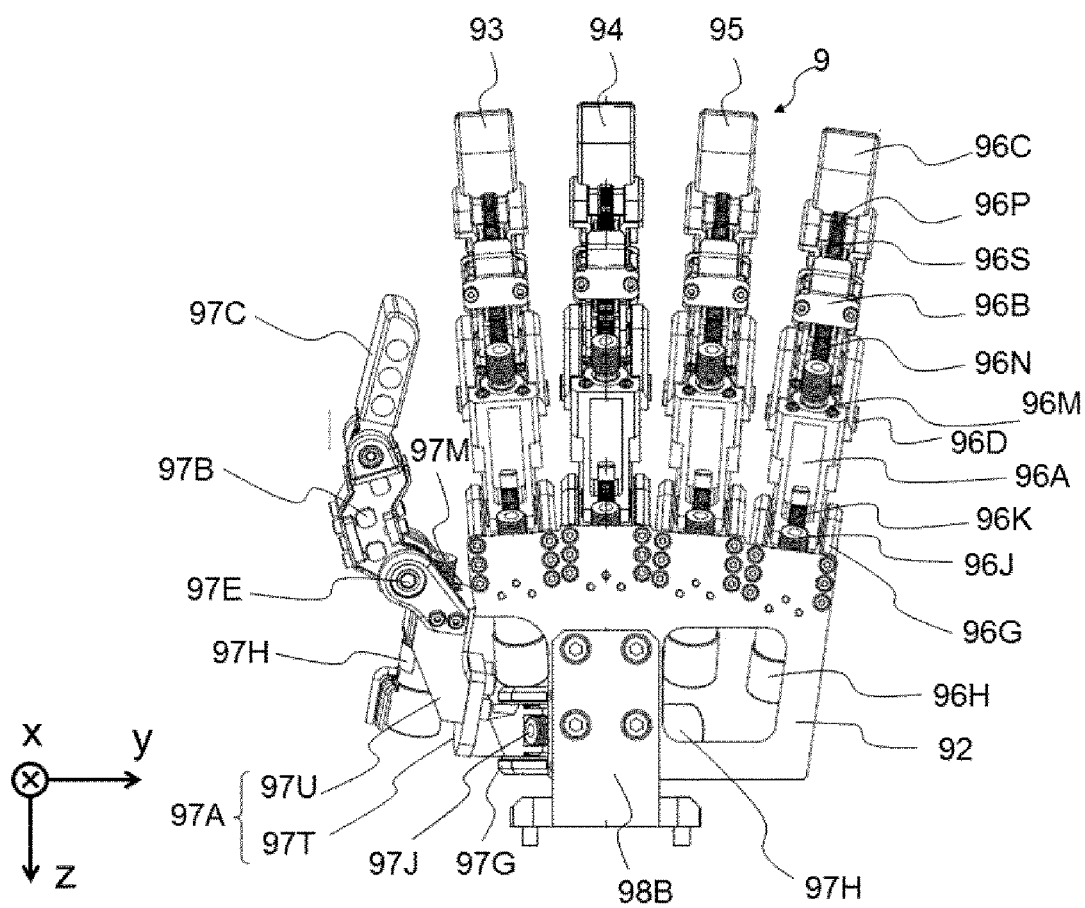
FIG. 74 is a front view illustrating the left hand included in the humanoid robot of the first embodiment.
Figure 75:
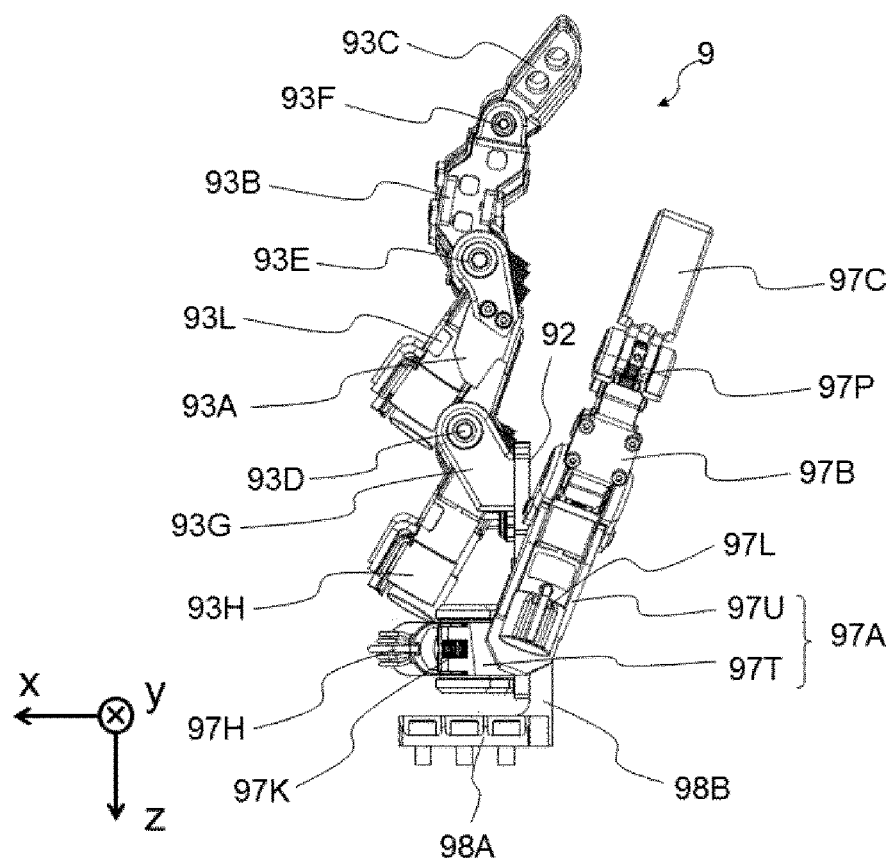
FIG. 75 is a side view illustrating the left hand included in the humanoid robot of the first embodiment viewing from the side existing an opposable finger.

As can be seen from FIGS. 74 and 79, hand attaching tool 98 that attaches palm plate 92 to wrist plate 91 is a member in which an attaching plate 98A and a palm plate connecting part 98B are connected into an L-shape in the side view. Attaching plate 98A is connected to wrist plate 91. Palm plate 92 is connected to palm plate connecting part 98B. First finger 93, second finger 94, third finger 95, and fourth finger 96 are connected to the side of palm plate 92 opposed to attaching plate 98A. In the reference state, first finger 93, second finger 94, third finger 95, and fourth finger 96 extend in the direction substantially parallel to palm plate 92. Second finger 94 is located in the substantial center of wrist plate 91. First finger 93, second finger 94, third finger 95, and fourth finger 96 are provided such that the interval on the tip side is wider than the interval on the base side. As can be seen from FIG. 76, second finger 94 is perpendicular to attaching plate 98A, and the center of second finger 94 and the center of attaching plate 98A are matched with each other.

Opposable finger 97 is rotatable in the direction substantially orthogonal to first finger 93 and other fingers, and provided in palm plate 92 on the side closer to attaching plate 98A than first finger 93 and other fingers and on the side existing first finger 93. Palm plate 92 is a base being connected with the fingers. In the reference state of hand 9, opposable finger 97 extends side by side with palm plate 92 viewing from the direction perpendicular to palm plate 92.

First finger 93, second finger 94, third finger 95, and fourth finger 96 have the same structure. First finger 93, second finger 94, third finger 95, and fourth finger 96 are referred to as ordinary fingers. The structure of the ordinary finger is described using fourth finger 96 to which the reference sign is easily added in the drawing.

In fourth finger 96, a first dactylus 96A, second dactylus 96B, and a third dactylus 96C are connected in series from the side close to palm plate 92. A first finger joint 96D exists between palm plate 92 and first dactylus 96A. First finger joint 96D connects first dactylus 96A rotatably to palm plate 92. A second finger joint 96E exists between first dactylus 96A and second dactylus 96B. Second finger joint 96E connects second dactylus 96B rotatably to first dactylus 96A. A third finger joint 96F exists between second dactylus 96B and third dactylus 96C. Third finger joint 96F connects third dactylus 96C rotatably to second dactylus 96B. The rotation axes of first finger joint 96D, second finger joint 96E, and third finger joint 96F are parallel to one another.

Regarding the adjacent two of palm plate 92, first dactylus 96A, second dactylus 96B, and third dactylus 96C, one member provided on the side close to palm plate 92 is referred to as a base-side member, and the other member provided on the side not existing the base-side member is referred to as a tip-side member. First finger joint 96D, second finger joint 96E, and third finger joint 96F are three finger joints that connect the tip-side member that is one of first dactylus 96A, second dactylus 96B, and third dactylus 96C rotatably to the base-side member.

In the reference state, first finger joint 96D exists on the rear side of palm plate 92. As illustrated in FIG. 77, when the hand 9 in the reference state is viewed from the side, the rotation axes of first finger joint 96D, second finger joint 96E, and third finger joint 96F exist on one plane substantially perpendicular to attaching plate 98A. In the reference state, a line extending forearm 8 toward hand 9 passes through or near this plane. In the reference state, forearm 7 is perpendicular to attaching plate 98A.

The rotation shaft of first finger joint 96D is held by a finger base yoke 96G provided on the rear side of palm plate 92. The rotation axis of first finger joint 96D is disposed at a predetermined position slightly outside from palm plate 92. A finger first motor 96H is disposed in finger base yoke 96G. A first worm 96J (screw gear) connected directly to the rotation shaft of finger first motor 96H meshes with a first worm wheel 96K (helical gear) that rotates around the rotation axis of first finger joint 96D. First worm 96J meshes with first worm wheel 96K existing on the side of palm plate 92. Finger first motor 96H and first worm 96J are provided obliquely with respect to palm plate 92. First worm wheel 96K is attached to first dactylus 96A. When finger first motor 96H rotates, first worm 96J rotates, and first worm wheel 96K rotates together with first dactylus 96A.

In first finger joint 96D, a worm gear mechanism rotates first dactylus 96A with respect to palm plate 92. The worm gear mechanism includes finger first motor 96H disposed on palm plate 92, first worm 96J rotated by finger first motor 96H, and first worm wheel 96K that meshes with first worm 96J to rotate around the rotation axis of first finger joint 96D together with first dactylus 96A.

First dactylus 96A has the structure in which the member rotating together with first worm wheel 96K and the yoke member holding the rotation axis of second finger joint 96E are coupled together in the direction toward the fingertip. A finger second motor 96L is attached to first dactylus 96A. A second worm 96M, which is connected directly to the rotation shaft of finger second motor 96L, meshes with a second worm wheel 96N that rotates around the rotation axis of second finger joint 96E. Finger second motor 96L and second worm 96M are provided obliquely with respect to first dactylus 96A. Second worm wheel 96N is attached to second dactylus 96B. When finger second motor 96L rotates, second worm 96M rotates, and second worm wheel 96N rotates together with second dactylus 96B.

In second finger joint 96E, a worm gear mechanism rotates second dactylus 96B with respect to first dactylus 96A. The worm gear mechanism includes finger second motor 96L disposed on first dactylus 96A, second worm 96M rotated by finger second motor 96L, and second worm wheel 96N that meshes with second worm 96M to rotate around the rotation axis of second finger joint 96E together with second dactylus 96B.

First finger joint 96D and second finger joint 96E are driven by different motors, so that the rotation angles of first finger joint 96D and second finger joint 96E can independently be determined.

In the reference state, the direction in which first finger joint 96D rotates first dactylus 96A, the direction in which second finger joint 96E rotates second dactylus 96B, the direction in which third finger joint 96F rotates third dactylus 96C are the direction toward the palm side.

Palm plate 92 can have small size by providing finger first motor 96H and first worm 96J obliquely with respect to palm plate 92. First dactylus 96A can be shortened by providing finger second motor 96L and second worm 96M obliquely with respect to first dactylus 96A. As a result, hand 9 can be made as large as a human hand.

Referring to FIG. 79, the mechanism that rotates third finger joint 94F is described. A third dactylus drive gear 94P is provided in third finger joint 94F. Third dactylus drive gear 94P rotates together with third dactylus 94C. Three idler gears 94Q, 94R, 94S are provided in second dactylus 94B. Three idler gears 94Q, 94R, 94S transmit the rotation of second worm wheel 94N to third dactylus drive gear 94P. Idler gear 94Q meshes with second worm wheel 94N, and idler gear 94Q rotates in the opposite direction when second worm wheel 94N rotates. Idler gear 94R meshes with idler gear 94Q, and idler gear 94R rotates in the opposite direction when idler gear 94Q rotates. Idler gear 94S meshes with idler gear 94R, and idler gear 94S rotates in the opposite direction when idler gear 94R rotates. Third dactylus drive gear 94P meshes with idler gear 94S, and third dactylus drive gear 94 rotates in the opposite direction when idler gear 94S rotates. Because a number of three idler gears 94Q, 94R, 94S is an odd number, third dactylus drive gear 94P rotates in the same direction when second worm wheel 94N rotates.

Idler gears 94Q, 94R, 94S are the gears that rotate on the odd number of rotating shafts driven by second worm wheel 94N included in second finger joint 94E. Third dactylus drive gear 94P is the gear provided in third finger joint 94F driven by idler gears 94Q, 94R, 94S. Second worm wheel 94N is the gear that rotates in conjunction with the rotation of second finger joint 94E.

A gear ratio of second worm wheel 94N, idler gear 94Q, 94R, 94S, and third dactylus drive gear 94P is determined such that a rotation angle $\phi 2$ of second worm wheel 94N and a rotation angle $\phi 3$ of third dactylus drive gear 94P are equal to each other. That is, a value $f=\phi 3/\phi 2$ being a ratio of $\phi 3$ to $\phi 2$ is set to $f=1$. Value $f=\phi 3/\phi 2$ of the ratio of third dactylus drive gear 94P, namely, rotation angle $\phi 3$ of third dactylus 94C to second worm wheel 94N, namely, rotation angle $\phi 2$ of second dactylus 94B may be a proper value close to 1.

The three dactyli can be rotated by two motors per one finger by rotating the third dactylus in conjunction with the second dactylus. Because there is almost no need to make the motion to bend only the third finger joint without bending the second finger joint, no problem arises in use of hand 9. The third finger joint may be rotated by the worm gear mechanism similarly to the first finger joint and the second finger joint. The third finger joint may be rotated in conjunction with the second finger joint in a finger, and the third finger joint may be rotated by the worm gear mechanism in another finger.

The structure of opposable finger 97 is described. As illustrated in FIG. 76, a finger base yoke 97G that holds the rotation axis of a first finger joint 97D of opposable finger 97 is provided at the position close to an attaching plate 98A on the rear side of palm plate 92 in a direction substantially orthogonal to second finger 94. A finger first motor 97H is disposed in finger base yoke 97G. A first worm 97J connected directly to the rotation shaft of finger first motor 97H meshes with a first worm wheel 97K that rotates around the rotation axis of first finger joint 97D. First worm wheel 97K is attached to second dactylus 97B. When finger first motor 97H rotates, first worm wheel 97K rotates together with first dactylus 97A. When first dactylus 97A rotates, second dactylus 97B and third dactylus 97C move to positions opposed to first finger 93 and other fingers.

First dactylus 97A of opposable finger 97 includes a first dactylus base 97T that rotates together with first worm wheel 97K and a first dactylus tip 97U that is directed in the direction having the angle of about 70 degrees with respect to the rotation direction of first dactylus base 97T. The direction in which first dactylus tip 97U is directed is substantially parallel to the direction in which first dactylus 93A and the like are directed. The end existing on the side opposite to the side connected to first finger joint 97D of first dactylus base 97T has a flat plate shape. First dactylus tip 97U is coupled to the flat-plate-shaped portion of first dactylus base 97T. Finger second motor 97H is disposed in first dactylus tip 97U, and the yoke member holding the rotation shaft of second finger joint 93E is provided in first dactylus tip 97U.

In opposable finger 97, the direction in which first finger joint 97D rotates first dactylus 97A is different from the direction in which second finger joint 97E rotates second dactylus 97B. The structure on the fingertip side from second finger joint 97E of opposable finger 97 is the same as first finger 93 and other fingers.

All the mechanisms that drive the finger joint are provided within hand 9. For this reason, maintenance, repair of trouble, and the like can be performed by removing only the hand 9 from humanoid robot 100.

The motion is described. The posture of humanoid robot 100 is determined by angles taken by intrathoracic joint 16, thoracolumbar joint 18, shoulder joint 13, elbow joint 31, wrist joint 36, hip joint 22, knee joint 40, ankle joint 41, and neck joint 27. The angles of these joints are determined by the lengths of the links that drive the joints. The link that drives each joint of humanoid robot 100 is set to a value determined from the designated angle that is the angle of each joint that can take the designated attitude, which allows humanoid robot 100 to take the designated posture. When humanoid robot 100 moves, time series of the designated angles corresponding to a change in the posture are converted into time series of the link lengths, and the lengths of the links are changed according to the determined time series, which allow humanoid robot 100 to be moved as designated.

How to determine the lengths of the links such that each joint can take the designated angle is explained. The designated angle is required to be within the movable range of the joint. First, intrathoracic joint 16 and thoracolumbar joint 18 are described. Thoracolumbar joint 18 changes the connection direction of chest lower portion 5D with respect to waist 6. Intrathoracic joint 16 changes the connection direction of chest upper portion 5U with respect to chest lower portion 5D.

Figure 80:
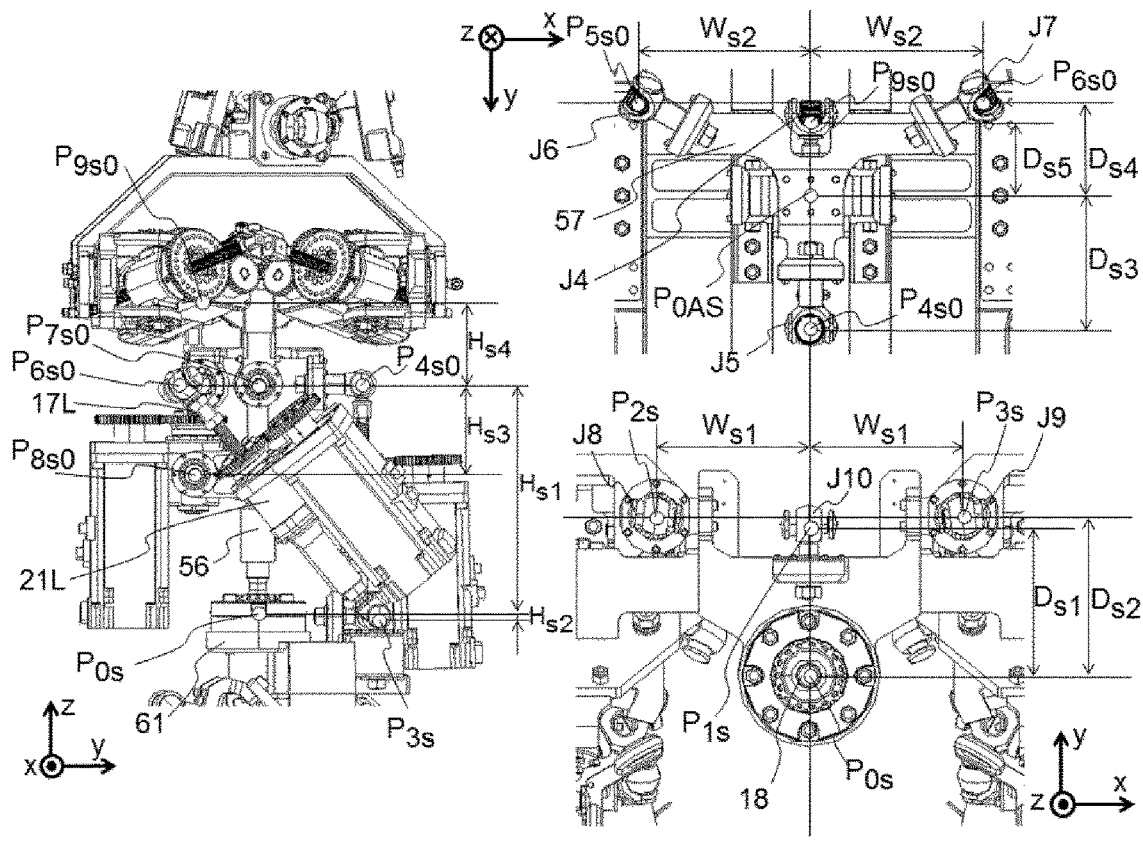
FIG. 80 is a view illustrating variables expressing distances between the joint and link attaching units in an intrathoracic joint and a thoracolumbar joint included in the humanoid robot of the first embodiment.

The distances between the joint and the link attaching units in intrathoracic joint 16 and thoracolumbar joint 18 are expressed by the following variables. FIG. 80 is a view illustrating the variables expressing distances between the joint and the link attaching units in the intrathoracic joint and the thoracolumbar joint.

The variable expressing the position of each point is defined as follows.

$P_{0s}$: position of thoracolumbar joint 18.
$P_{1s}$: position of waist-side center link attaching unit J10.
$P_{2s}$: position of waist-side right link attaching unit J8.
$P_{3s}$: position of waist-side left link attaching unit J9.
$P_{4s}$: position of chest-side center link attaching unit J5.
$P_{4s0}$: position of chest-side center link attaching unit J5 in reference state.
$P_{5s}$: position of chest-side right link attaching unit J6.
$P_{5s0}$: position of chest-side right link attaching unit J6 in reference state.
$P_{6s}$: position of chest-side left link attaching unit J7.
$P_{6s0}$: position of chest-side left link attaching unit J7 in reference state.
$P_{0As}$: position where position of thoracolumbar joint 18 is projected on plane determined by three points $P_{4s}$, $P_{5s}$, $P_{6s}$.
$P_{7s}$: position of intrathoracic joint 16.
$P_{7s0}$: position of intrathoracic joint 16 in reference state.
$P_{8s}$: position of lower intrathoracic link attaching unit J3.
$P_{8s0}$: position of lower intrathoracic link attaching unit J3 in reference state.
$P_{9s}$: position of upper intrathoracic link attaching unit J4.
$P_{9s0}$: position of upper intrathoracic link attaching unit J4 in reference state.

The intervals between points are expressed by the following variables.

Ws1: lengths of line segment $P_{0s}P_{1s}$, and line segment $P_{0s}P_{2s}$ projected on X-axis.
Ds1: length of the line segment $P_{0s}P_{1s}$ projected on Y-axis.
Ds2: lengths of line segment $P_{0s}P_{2s}$ and line segment $P_{0s}P_{3s}$ projected on Y-axis.
Ws2: lengths of line segment $P_{0As0}P_{5s0}$ and line segment $P_{0As}0P_{6s0}$ projected on X-axis.
Ds3: length of line segment $P_{0As0}P_{4s0}$ projected on Y-axis.
Ds4: lengths of line segment $P_{0As0}P_{5s0}$ and line segment $P_{0As}P_{6s0}$ projected on Y-axis.
Ds5: lengths of the line segment $P_{7s0}P_{8s0}$ and line segment $P_{7s0}P_{9s0}$ projected on Y-axis.
Hs1: length of line segment $P_{0s}P_{7s}$. The distance between plane determined by three points $P_{4s}$, $P_{5s}$, $P_{6s}$ and point $P_{0s}$.
Hs2: lengths of line segment $P_{0s}P_{1s}$, line segment $P_{0s}P_{2s}$, and line segment $P_{0s}P_{3s}$ projected on Z-axis.
Hs3: length of line segment $P_{7s0}P_{8s0}$ projected on Z-axis.
Hs4: length of line segment $P_{7s0}P_{9s0}$ projected on Z-axis.

Using the variables defined above, a coordinate of each point is expressed as follows. Position $P_{0s}$ of thoracolumbar joint 18 is set to an origin of the coordinate.

$P_{0s}=(0, 0, 0)$
$P_{1s}=(0, Ds1, -Hs2)$
$P_{2s}=(Ws1, Ds2, -Hs2)$
$P_{3s}=(-Ws1, Ds2, -Hs2)$
$P_{4s0}=(0, Ds3, Hs1)$
$P_{5s0}=(Ws2, -Ds4, Hs1)$
$P_{6s0}=(-Ws2, -Ds4, Hs1)$
$P_{7s0}=(0, 0, Hs1)$
$P_{8s0}=(0, -Ds5, Hs1-Hs3)$
$P_{9s0}=(0, -Ds5, Hs1+Hs3)$

The rotation angles of thoracolumbar joint 18 and intrathoracic joint 16 are expressed by the following variables.

$\alpha_s$: rotation angle around X-axis of thoracolumbar joint 18. $\alpha_s=0$ in reference state $\beta_s$: rotation angle around Y-axis of thoracolumbar joint 18. $\beta_s=0$ in reference state
$\gamma_s$: rotation angle around Z-axis of thoracolumbar joint 18. $\gamma_s=0$ in reference state
[Rs]: rotation matrix of thoracolumbar joint 18.
$\psi$: rotation angle around X-axis of intrathoracic joint 16. $\psi=0$ in reference state
[Rs2]: rotation matrix of intrathoracic joint 16.

The rotation matrix [Rs] of thoracolumbar joint 18 is given as follows.

$$[Rs] = \begin{pmatrix} 1 & 0 & 0 \\ 0 & \cos\alpha s & -\sin\alpha s \\ 0 & \sin\alpha s & \cos\alpha s \end{pmatrix} \quad \text{[Mathematical Formula 1]}$$

$$\begin{pmatrix} \cos\beta s & 0 & -\sin\beta s \\ 0 & 1 & 0 \\ \sin\beta s & 0 & \cos\beta s \end{pmatrix} \begin{pmatrix} \cos\gamma s & -\sin\gamma s & 0 \\ \sin\gamma s & \cos\gamma s & 0 \\ 0 & 0 & 1 \end{pmatrix}$$

The rotation matrix [Rs2] of intrathoracic joint 16 is given as follows.

$$[Rs2] = \begin{pmatrix} 1 & 0 & 0 \\ 0 & \cos\psi & -\sin\psi \\ 0 & \sin\psi & \cos\psi \end{pmatrix} \quad \text{[Mathematical Formula 2]}$$

Assuming that point $P_{D0}$ is the position in the reference state of any point $P_D$ existing in chest lower portion 5D, the position of the point $P_D$ after rotation in thoracolumbar joint 18 can be given as follows.

$P_D=[Rs]*P_{D0}$

Assuming that point $P_{U0}$ is the position in the reference state of any point $P_U$ existing in chest upper portion 5U, the position of the point $P_U$ after rotation in intrathoracic joint 16 and thoracolumbar joint 18 can be given as follows.

$P_U=[Rs]*([Rs2]*(P_{U0}-P_{7s0})+P_{7s0})$

The lengths of the links are expressed by the following variables.

$L_{1s}$: length of thoracolumbar center link 19L. Length of line segment $P_{1s}P_{4s}$.
$L_{2s}$: length of thoracolumbar right link 20L. Length of line segment $P_{2s}P_{4s}$.
$L_{3s}$: length of thoracolumbar left link 21L. Length of line segment $P_{3s}P_{6s}$.
$L_{1s0}$: length of thoracolumbar center link 19L in reference state. Length of line segment $P_{1s}P_{4s0}$.
$L_{2s0}$: length of thoracolumbar right link 20L in reference state. Length of line segment $P_{2s}P_{5s0}$.
$L_{3s0}$ length of thoracolumbar left link 21L in reference state. Length of line segment $P_{3s}P_{6s0}$.
$L_{4s}$: length of intrathoracic link 17L. Length of line segment $P_{8s}P_{9s}$.

In the reference state, how to obtain length $L_{4s}$ of intrathoracic link 17L for setting the intrathoracic joint 16 to specified angle $\psi$ is described. Position $P_{9s}$ of upper intrathoracic link attaching unit J4 existing in chest upper portion 5U is expressed as follows.

$P_{9s} = (x9s, y9s, z9s)$
$= [Rs2]*(0, -Ds5, Hs4)^t + (0, 0, Hs1)$

The expression for each variable is obtained as follows.

$x9s=0$ $y9s=-Ds5*\cos\psi-Hs4*\sin\psi$ $z9s=-Ds5*\sin\psi+Hs4*\cos\psi+Hs1$

Position $P_{8s}$ of lower intrathoracic link attaching unit J3 existing in chest lower portion 5D is not changed by the rotation in intrathoracic joint 16. For this reason, position $P_{8s}$ is equal to position $P_{8s0}$ in the reference state. Length $L_{4s}$ of intrathoracic link 17L can be calculated as follows.

$L_{4s}=\sqrt{((Ds5*(1-\cos\psi)-Hs4*\sin\psi)^2+(-Ds5*\sin\psi+Hs4*\cos\psi+Hs3)^2)}$ Positions $P_{4s}$, $P_{5s}$, $P_{8s}$ of the three points existing in chest lower portion 5D are given by the rotation in thoracolumbar joint 18.

$$P_{4s} = (x4s, y4s, z4s)$$
$$= [Rs] * P_{4s0}$$
$$= [Rs] * (0, Ds3, Hs1)^t$$

$$P_{5s} = (x5s, y5s, z5s)$$
$$= [Rs] * P_{5s0}$$
$$= [Rs] * (Ws2, -Ds4, Hs1)^t$$

$$P_{6s} = (x6s, y6s, z6s)$$
$$= [Rs] * P_{6s0}$$
$$= [Rs] * (-Ws2, -Ds4, Hs1)^t$$

Because $P_{4s}$, $P_{5s}$, $P_{6s}$ are obtained, lengths $L_{1s}$, $L_{2s}$, $L_{3s}$ of the links can be calculated by the following equations.

$L_{1s}=\sqrt{(x4s^2+(y4s-Ds1)^2+(z4s+Hs2)^2)}$ $L_{2s}=\sqrt{((x5s-Ws1)^2+(y5s-Ds2)^2+(z5s+Hs2)^2)}$ $L_{3s}=\sqrt{((x6s+Ws1)^2+(y6s-Ds2)^2+(z5+Hs2)^2)}$ $L_{1s0}=\sqrt{((Ds3-Ds1)^2+(Hs1+Hs2)^2)}$ $L_{2s0}=\sqrt{((Ws2-Ws1)^2+(Ds2+Ds4)^2+(Hs1+Hs2)^2)}$ $L_{3s0}=\sqrt{((Ws2-Ws1)^2+(Ds2+Ds4)^2+(Hs1+Hs2)^2)}$ In the case that the rotation is slightly performed around the Z-axis from the reference state, how the length of each link changes is examined. $P_{4s}$, $P_{5s}$, $P_{6s}$ are given as follows. Here, assuming that γs is small, approximation is performed using $\sin\gamma s \approx \gamma s$ and $\cos\gamma s \approx 1$.

$$P_{4s} = (x4s, y4s, z4s)$$
$$= (-Ds3*\sin\gamma s, Ds3*\cos\gamma s, Hs1)$$
$$\approx (-Ds3*\gamma s, Ds3, Hs1)$$

$$P_{5s} = (x5s, y5s, z5s)$$
$$= (Ws2*\cos\gamma s + Ds4*\sin\gamma s, Ws2*\sin\gamma s - Ds4*\cos\gamma s, Hs1)$$
$$\approx (Ws2 + Ds4*\gamma s, Ws2*\gamma s - Ds3, Hs1)$$

$$P_{6s} = (x6s, y6s, z6s)$$
$$= (-Ws2*\cos\gamma s + Ds4*\sin\gamma s, -Ws2*\sin\gamma s - Ds4*\cos\gamma s, Hs1)$$
$$\approx (-Ws2 - Ds4*\gamma s, -Ws2*\gamma s - Ds4, Hs1)$$

The lengths of the links are calculated as follows.

$L_{1s}=\sqrt{((Ds3*\gamma s)^2+(Ds3-Ds1)^2+(Hs1+Hs2)^2)}$ $L_{2s}=\sqrt{((Ws2--Ws1-Ds4*\gamma s)^2+(Ds2+Ds4-Ws2*\gamma s)^2+(Hs1+Hs2)^2)}$ $L_{3s}=\sqrt{((Ws2-Ws1+Ds4*\gamma s)^2+(Ds2+Ds4+Ws2*\gamma s)^2+(Hs1+Hs2)^2)}$ Differences from the lengths of the links in the reference state are determined as follows. Here, γs>0 is assumed.

$L_{1s}^2-L_{1s0}^2=(Ds2*\gamma s)^2>0$ $L_{2s}^2-L_{2s0}^2=(Ws2-Ws1-Ds4*\gamma s)^2-(Ws2-Ws1)^2+(Ds2+Ds4-Ws2*\gamma s)^2-(Ds2+Ds4)^2<0$ $L_{3s}^2-L_{3s0}^2=(Ws2-Ws1+Ds4*\gamma s)^2-(Ws2-Ws1)^2+(Ds2+Ds4+Ws2*\gamma s)^2-(Ds2+Ds4)^2>0$ In the reference state, it is found that one of length $L_{2s}$ of thoracolumbar right link 20L and length $L_{3s}$ of thoracolumbar left link 21L is lengthened while the other is shortened. Thus, in the rotation around the torsion axis, both the force pushed by the extending link and the force drawn by the shortening link are generated, the rotation is easily performed around torsion axis.

Figure 81:
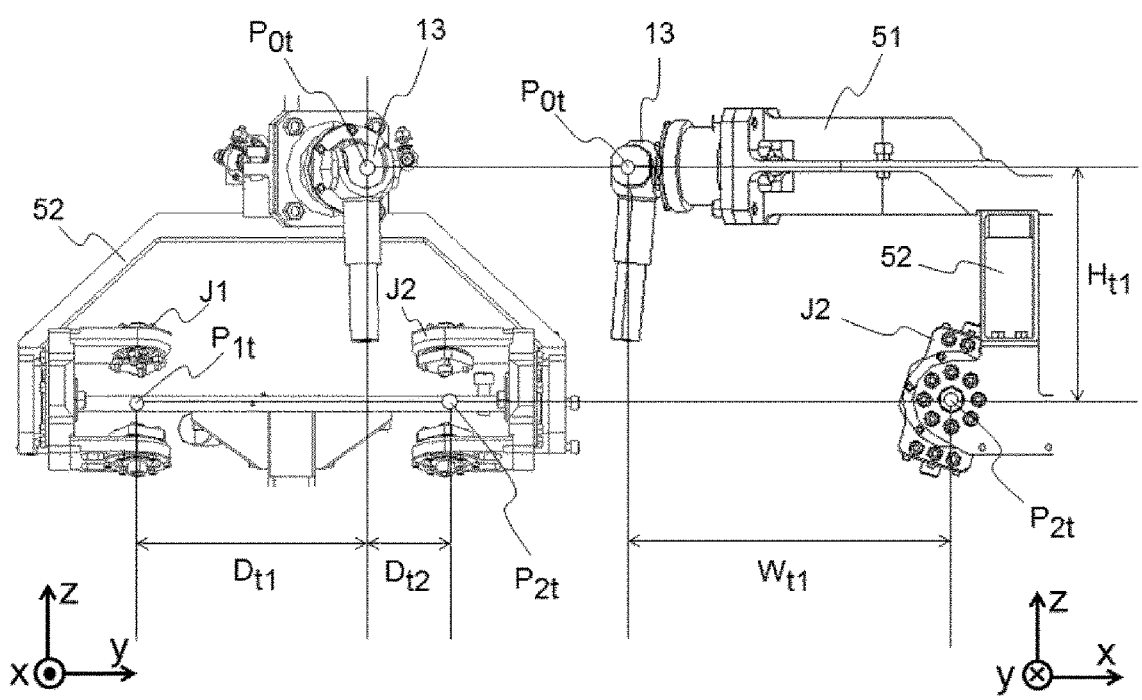
FIG. 81 is a view illustrating variables expressing distances between the joint and the link attaching units in the shoulder joint included in the humanoid robot of the first embodiment.
Figure 82:
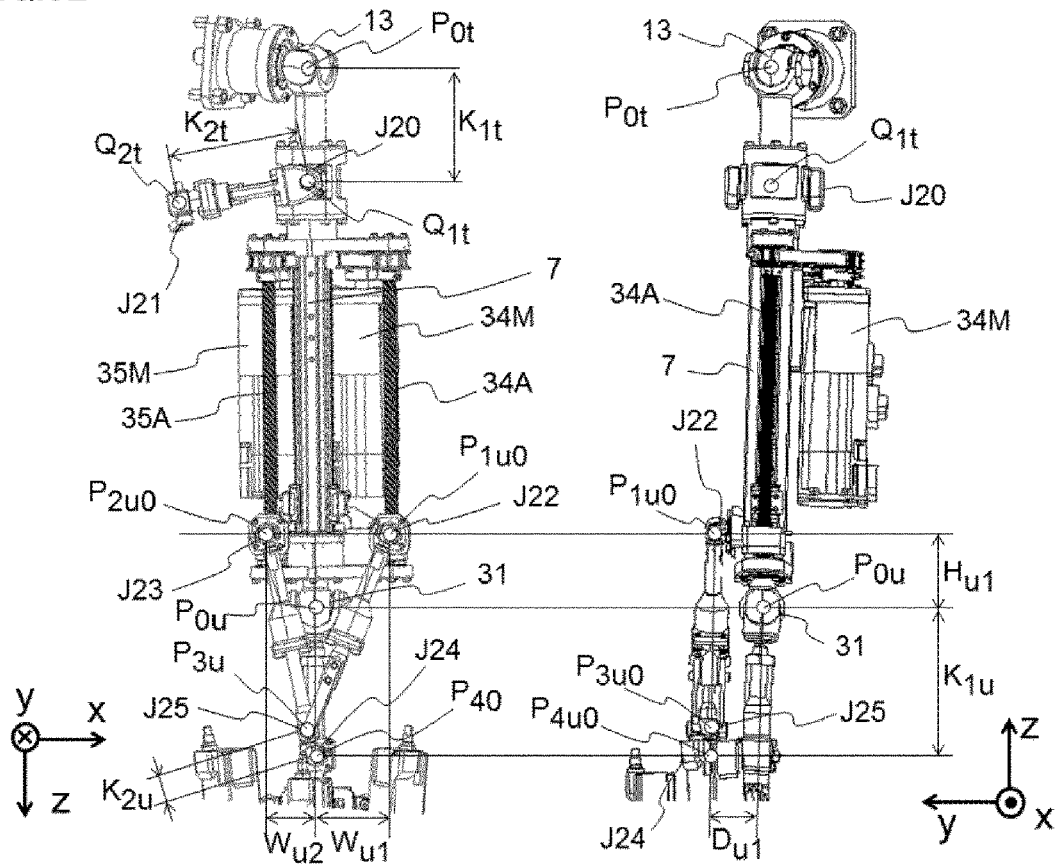
FIG. 82 is a view illustrating variables expressing the distances between the joint and the link attaching units in the elbow joint included in the humanoid robot of the first embodiment.

How to determine the lengths of the links such that the designated angle can be taken with respect to shoulder joint 13 is described. The distances between the joint and the link attaching units in shoulder joint 13 are defined by the following variables. FIG. 81 is a view illustrating the variables expressing the distances between the joint and the link attaching units in shoulder joint 13. $Q_{1t}$ and $Q_{2t}$ are illustrated in FIG. 82.

The variable expressing the position of each point is defined as follows.

$P_{0t}$: position of shoulder joint 13.
$P_{1t}$: position of the chest-side main link attaching unit J1.
$P_{2t}$: position of chest-side auxiliary link attaching unit J2.
$Q_{1t}$: position of upper-arm-side main link attaching unit J20. $Q_{1t}$=(x1t, y1t, z1t)
$Q_{1t0}$: position of upper-arm-side main link attaching unit J20 in reference state.
$Q_{2t}$: position of main-link-side auxiliary link attaching unit J21. $Q_{2t}$=(x2t, y2t, z2t)
$Q_{2t0}$: position in reference state of main-link-side auxiliary link attaching unit J21.

The intervals between points are expressed by the following variables. $K_{1t}$ and $K_{2t}$ are illustrated in FIG. 82.

Wt1: lengths of line segment $P_{0t}P_{1t}$ and line segment $P_{0t}P_{2t}$ projected on X-axis.

Dt1: length of line segment $P_{0t}P_{1t}$ projected on Y-axis.

Dt2: length of the line segment $P_{0t}P_{2t}$ projected on Y-axis.

Ht1: lengths of line segment $P_{0t}P_{1t}$ and line segment $P_{0t}P_{2t}$ projected on Z-axis.

$K_{1t}$: length of line segment $P_{0t}Q_{1t}$.

$K_{2t}$: length of line segment $Q_{1t}Q_{2t}$.

Using the variables defined above, a coordinate of each point is expressed as follows. The position $P_{0t}$ of shoulder joint 13 is set to the origin of coordinate.

$P_{0t}$=(0, 0, 0)

$P_{1t}$=(−Wt1, −Dt1, −Ht1)

$P_{2t}$=(−Wt1, Dt2, −Ht1)

$Q_{1t0}$=(0, 0, −$K_{1t}$)

The rotation angles of shoulder joint 13 are expressed by the following variables.

$\alpha_t$: rotation angle of shoulder joint 13 around X-axis. $\alpha_t$=0 in reference state $\beta_t$: rotation angle of shoulder joint 13 around Y-axis. $\beta_t$=0 in reference state

[Rt]: rotation matrix of shoulder joint 13.

The rotation matrix [Rt] is given as follows.

$$[Rt] = \begin{pmatrix} 1 & 0 & 0 \\ 0 & \cos\alpha t & -\sin\alpha t \\ 0 & \sin\alpha t & \cos\alpha t \end{pmatrix} \begin{pmatrix} \cos\beta t & 0 & -\sin\beta t \\ 0 & 1 & 0 \\ \sin\beta t & 0 & \cos\beta t \end{pmatrix}$$ [Mathematical Formula 3]

The lengths of the links are expressed by the following variables.

$L_{1t}$: length of upper arm drive main link 14L. Length of line segment $P_{1t}Q_{1t}$.

$L_{2t}$: length of upper arm drive auxiliary link 15L. Length of line segment $P_{2t}Q_{2t}$.

In the shoulder joint 13, because main-link-side auxiliary link attaching unit J21 is located on upper arm drive main link 14L, position $Q_{2t}$ of main-link-side auxiliary link attaching unit J21 is required to satisfy the following condition.

$Q_{2t}=(K_{2t}/L_{1t})*P_{1t}+(1-K_{2t}/L_{1t})*Q_{1t}$

The following constraint condition is required to hold with respect to an interval of the link attaching unit.

$\sqrt{(x1t^2+y1t^2+z1t^2)}=K_{1t}$

Using the angle matrix [Rt] of the shoulder joint 13, position $Q_{1t}$ of the upper-arm-side main link attaching unit J20 is determined as follows.

$Q_{1t}=[Rt]*Q_{1t0}$

The expression for each variable is obtained as follows.

$x1t=K_{1t}*\cos\alpha_t*\sin\beta_t$ $y1t=-K_{1t}*\sin\alpha_t$ $z1t=-K_{1t}*\cos\alpha_t*\cos\beta_t$ When position $Q_{1t}$ is determined, $L_{1t}$ can be calculated by the following equation.

$L_{1t}=\sqrt{((x1t+Wt1)^2+(y1t+Dt1)^2+(z1t+Ht1)^2)}$

The following constraint equation relating to position $Q_{2t}$ is expressed for each variable.

$x2t=x1t-(x1t+Wt1)*(K_{1t}/L_{1t})$ $y2t=y1t-(y1t+Dt1)*(K_{1t}/L_{1t})$ $z2t=z1t-(z1t+Ht1)*(K_{1t}/L_{1t})$

When position $Q_{2t}$ is determined, $L_{2t}$ can be calculated by the following equation.

$L_{2t}=\sqrt{((x2t+Wt1)^2+(y2t-Dt2)^2+(z2t+Ht1)^2)}$

How to determine the link attachment position at the upper arm such that a designated angle can be taken with respect to the elbow joint 31 is described. The distances between the joint and the link attaching units in elbow joint 31 are defined by the following variables. FIG. 82 is a view illustrating the variables expressing the distances between the joint and the link attaching units in elbow joint 31.

The variable expressing the position of each point is defined as follows.

$P_{0u}$: position of elbow joint 31.

$P_{1u}$: position of upper arm outside link attaching unit J22.

$P_{1u0}$: position of upper arm outside link attaching unit J22 in reference state.

$P_{2u}$: position of upper arm inside link attaching unit J23.

$P_{2u0}$: position of upper arm inside link attaching unit J23 in reference state.

$P_{3u}$: position of elbow drive outside link attaching unit J25. $P_{3u}$=(x3u, y3u, z3u)

$P_{3u0}$: position of elbow drive outside link attaching unit J25 in reference state.

$P_{4u}$: position of elbow drive inside link attaching unit J24. $P_{4u}$=(x4u, y4u, z4u)

$P_{4u0}$: position of elbow drive inside link attaching unit J24 in reference state.

The intervals between points are expressed by the following variables.

Wu1: length of the line segment $P_{0u}P_{1u}$ projected on X-axis.

Wu2: length of line segment $P_{0u}P_{1u}$ projected on X-axis.

Du1: lengths of line segment $P_{0u}P_{1u}$ and line segment $P_{0u}P_{2u}$ projected on Y-axis.

Hu1: lengths of line segment $P_{0u}P_{1u0}$ and line segment $P_{0u}P_{2u0}$ projected on Z-axis.

$K_{1u}$: length of line segment $P_{0u}P_{4u0}$ projected on Z-axis.

$L_{1u0}$: length of line segment $P_{1u}P_{3u}$. Length of the elbow drive outside link 32.

$L_{2u0}$: length of line segment $P_{2u}P_{4u}$. Length of elbow drive inside link 33.

$K_{2u}$: length of line segment $P_{3u}P_{4u}$.

Using the variables defined above, a coordinate of each point is expressed as follows. Position $P_{0u}$ of elbow joint 31 is set to the origin of the coordinate.

$P_{0u}$=(0, 0, 0)

$P_{1u0}$=(Wu1, Du1, Hu1)

$P_{2u0}$=(−Wu2, Du1, Hu1)

$P_{4u0}$=(0, Du1, −$K_{1u}$)

Upper arm outside actuator 34 and upper arm inside actuator 35 are provided in parallel with upper arm 9 (Z-axis). Positions $P_{1u}$, $P_{2u}$ of upper arm outside link attaching unit J22 and upper arm inside link attaching unit J23, which are moved by upper arm outside actuator 34 and upper arm inside actuator 35, move in the direction parallel to Z-axis. That is, $P_{1u}$ and $P_{2u}$ can be expressed as follows.

$P_{1u}$=(Wu1,Du1,z1u)

$P_{2u}$=(−Wu2,Du1,z2u)

Because elbow drive outside link 32 is attached to elbow drive inside link 33, $P_{2u}$, $P_{3u}$, $P_{4u}$ exist on the same straight line. Thus, the following equation holds.

$P_{3u}=(K_{2u}/L_{2u0})*P_{2u}+(1-K_{2u}/L_{2u0})*P_{4u}$

By applying this equation in the reference state, $P_{3u0}$ is determined as follows.

$$P_{3u0}=(-(K_{2u}/L_{2u0})*Wu1, Du1, -(K_{2u}/L_{2u0})*(Hu1+K_{1u})-K_{1u})$$

The lengths, which are constant, of elbow drive outside link 32 and elbow drive inside link 33 are given as follows.

$$L_{2u0}=\sqrt{(Wu2^2+(Hu1+K_{1u})^2)}$$

$$L_{1u0}=\sqrt{(Wu1^2+(Hu1+K_{1u})^2+K_{2u}*(K_{2u}-Hu1-K_{1u}+Wu1)/(Wu1^2+(Hu1+K_{1u})^2))}$$

The rotation angles of elbow joint 31 are expressed by the following variables.

$\alpha_u$: rotation angle of elbow joint 31 around X-axis. $\alpha_u=0$ in reference state $\gamma_u$: rotation angle of elbow joint 31 around Z-axis. $\gamma_u=0$ in reference state

[Ru]: rotation matrix of elbow joint 31.

The rotation matrix [Ru] is given as follows.

[Mathematical Formula 4]

$$[Ru] = \begin{pmatrix} 1 & 0 & 0 \\ 0 & \cos\alpha u & -\sin\alpha u \\ 0 & \sin\alpha u & \cos\alpha u \end{pmatrix} \begin{pmatrix} \cos\gamma u & -\sin\gamma u & 0 \\ \sin\gamma u & \cos\gamma u & 0 \\ 0 & 0 & 1 \end{pmatrix}$$

When [Ru] is given, $P_{4u}$ is determined by the following equation.

$$P_{4u} = (x4u, y4u, z4u)$$
$$= [Ru]*P_{4u0}$$
$$= [Ru]*(0, Du1, -K_{1u})^t$$

Because $L_{2u0}$ is constant, z2u is determined from $P_{4u}$ by the following equation.

$$L_{2u}^2=(x4u+Wu2)^2+(y4u-Du1)^2+(z4u-z2u)^2=L_{2u0}^2$$

$$z2u=z4u+\sqrt{(L_{2u0}^2-(x4u+Wu2)^2-(y4u-Du1)^2)}$$

$P_{3u}$ is determined from $P_{2u}$ and $P_{4u}$ by applying the constraint equation expressing that $P_{2u}$, $P_{3u}$, $P_{4u}$ exist on the same straight line. The expression for each variable is obtained as follows.

$$x3u=x4u-(Wu1+x4u)*(K_{2u}/L_{2u0})$$

$$y3u=y4u+(Du1-y4u)*(K_{2u}/L_{2u0})$$

$$z3u=z4u+(z2u-z4u)*(K_{2u}/L_{2u0})$$

Because $L_{1u0}$ is constant, z1u is determined from $P_{3u}$ by the following equation.

$$L_{1u}^2=(x3u-Wu1)^2+(y3u-Du1)^2+(z3u-z1u)^2=L_{1u0}^2$$

$$z1u=z3+\sqrt{(L_{1u0}^2-(x3u-Wu1)^2-(y3u-Du1)^2)}$$

Figure 83:
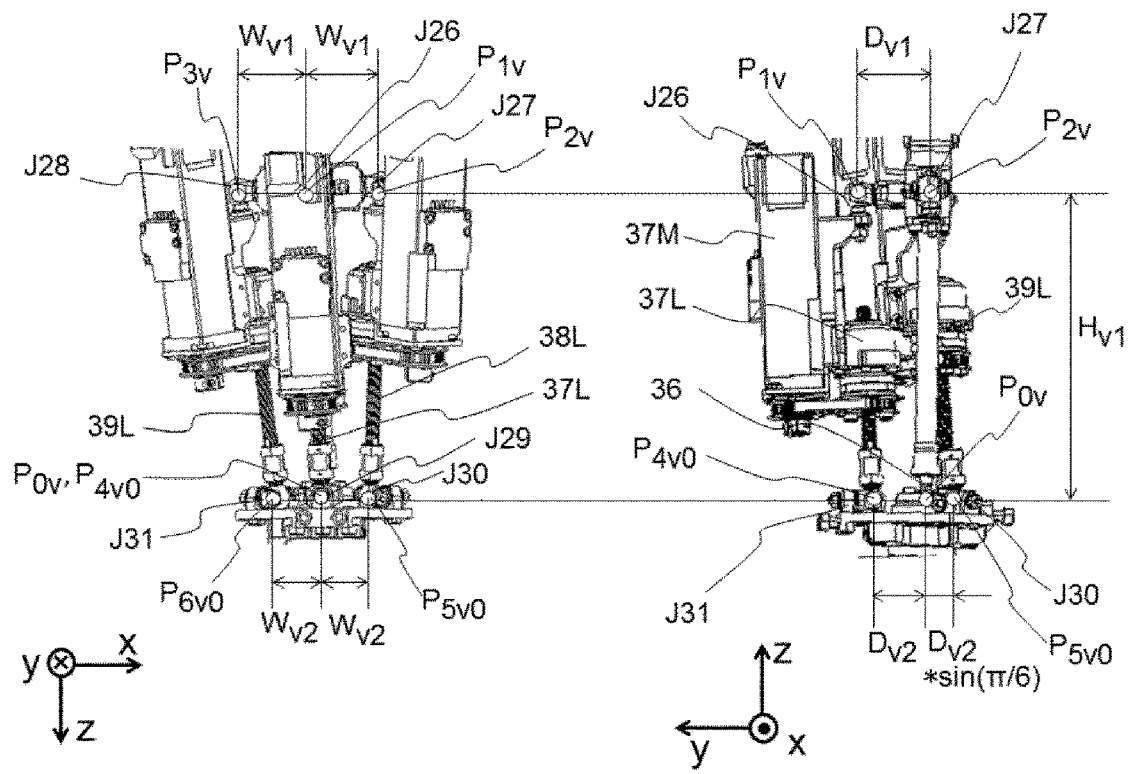
FIG. 83 is a view illustrating variables expressing the distances between the joint and the link attaching units in the wrist joint included in the humanoid robot of the first embodiment.

How to determine the lengths of the links such that the designated angle can be taken with respect to wrist joint 36 is described. The distances between the joint and the link attaching units in wrist joint 36 are defined by the following variables. FIG. 83 is a view illustrating the variables expressing the distances between the joint and the link attaching units in wrist joint 36.

The variable expressing the position of each point is defined as follows.

$P_{0v}$: position of wrist joint 36.

$P_{1v}$: position of forearm front link attaching unit J26.

$P_{2v}$: position of forearm outside link attaching unit J27.

$P_{3v}$: position of forearm inside link attaching unit J28.

$P_{4v}$: position of hand-side front link attaching unit J29.

$P_{4v0}$: position of hand-side front link attaching unit J29 in reference state.

$P_{5v0}$: position of hand-side outside link attaching unit J30.

$P_{5v0}$: position of hand-side outside link attaching unit J30 in reference state.

$P_{6v}$: position of the hand-side inside link attaching unit J31.

$P_{6v0}$: position of hand-side inside link attaching unit J31 in reference state.

$P_{0v}$, $P_{4v}$, $P_{5v}$, $P_{6v}$ exist on the same plane.

The intervals between points are expressed by the following variables.

Wv1: lengths of line segment $P_{0v}P_{1v}$ and line segment $P_{0v}P_{2v}$ projected on X-axis.

Dv1: length of line segment $P_{0v}P_{1v}$ projected on Y-axis.

Hy1: length of line segment $P_{0v}P_{2v}$.

Dv2: length of line segment $P_{0v}P_{4v}$.

Using the variables defined above, a coordinate of each point is expressed as follows. Position $P_{0v}$ of wrist joint 36 is set to the origin of the coordinate.

$$P_{0v}=(0,0,0)$$

$$P_{1v}=(0,Dv1,-Hv1)$$

$$P_{2v}=(Wv1,0,-Hy1)$$

$$P_{3v}=(-Wv1,0,-Hv1)$$

$$P_{4v0}=(0,Dv2,0)$$

$$P_{5v0}=(Dv2*\cos(\pi/6),-Dv2*\sin(\pi/6),0)$$

$$P_{6v0}=(-Dv2*\cos(\pi/6),-Dv2*\sin(\pi/6),0)$$

The rotation angles of wrist joint 36 are expressed by the following variables.

$\alpha_v$: rotation angle of wrist joint 36 around X-axis. $\alpha_v=0$ in reference state $\beta_v$: rotation angle of wrist joint 36 around Y-axis. $\beta_v=0$ in reference state $\gamma_v$: rotation angle of wrist joint 36 around Z-axis. $\gamma_v=0$ in reference state

[Rv]: rotation matrix of wrist joint 36.

The rotation matrix [Rv] is given as follows.

[Mathematical Formula 5]

$$[Rv] = \begin{pmatrix} 1 & 0 & 0 \\ 0 & \cos\alpha v & -\sin\alpha v \\ 0 & \sin\alpha v & \cos\alpha v \end{pmatrix} \begin{pmatrix} \cos\beta v & 0 & -\sin\beta v \\ 0 & 1 & 0 \\ \sin\beta v & 0 & \cos\beta v \end{pmatrix}$$

$$\begin{pmatrix} \cos\gamma v & -\sin\gamma v & 0 \\ \sin\gamma v & \cos\gamma v & 0 \\ 0 & 0 & 1 \end{pmatrix}$$

The lengths of the links are expressed by the following variables.

$L_{1v}$: length of forearm front link 37L. Length of line segment $P_{1v}P_{4v}$.

$L_{2v}$: length of forearm outside link 38L. Length of line segment $P_{2v}P_{4v}$.

$L_{3v}$: length of forearm inside link 39L. Length of line $P_{3v}P_{6v}$.

$L_{1v0}$: length of forearm front link 37L in reference state. Length of line segment $P_{1v}P_{4v0}$.

$L_{2v0}$: length of forearm outside link 38L in reference state. Length of line segment $P_{2v}P_{5v0}$.

$L_{3v0}$: length of forearm inside link 39L in reference state. Length of line segment $P_{3v}P_{6v0}$.

[Rv] is given, and $P_{4v}$, $P_{5v}$, $P_{6v}$ are obtained by the following expressions.

$$P_{4v} = (x4v, y4v, z4v)$$
$$= [Rv] * (0, Dv2, 0)^t$$

$$P_{5v} = (x5v, y5v, z5v)$$
$$= [Rv] * (Dv2 * \cos(\pi/6), -Dv2 * \sin(\pi/6), 0)^t$$

$$P_{6v} = (x6v, y6v, z6v)$$
$$= [Rv] * (-Dv2 * \cos(\pi/6), -Dv2 * \sin(\pi/6), 0)^t$$

Because $P_{4v}$, $P_{5v}$, $P_{6v}$ are obtained, the lengths $L_{1v}$, $L_{2v}$, $L_{3v}$ of the links can be calculated by the following equations.

$$L_{1v} = \sqrt{(x4v)^2 + (Dv1-y4v)^2 + (Hv1+z4v)^2}$$

$$L_{2v} = \sqrt{((Wv1-x5v)^2 + y5v^2 + (Hv1+z5v)^2)}$$

$$L_{3v} = \sqrt{((Wv1+x6v)^2 + y6v^2 + (Hv1+z6v)^2)}$$

$$L_{1v0} = \sqrt{((Dv1-Dv2)^2 + Hv1^2)}$$

$$L_{2v0} = \sqrt{((Wv1-Dv2*\cos(\pi/6))^2 + (Dv2*\sin(\pi/6))^2 + Hv1^2)}$$

$$L_{3v0} = \sqrt{((Wv1-Dv2*\cos(\pi/6))^2 + (Dv2*\sin(\pi/6))^2 + Hv1^2)}$$

In the case that the rotation is slightly performed around the Z-axis from the reference state, how the length of each link changes is examined. $P_{4v}$, $P_{5v}$, $P_{6v}$ are given as follows. Here, assuming that $\gamma v$ is small, approximation is performed using $\sin \gamma v \approx \gamma v$ and $\cos \gamma v \approx 1$.

$$P_{4v} = (x4v, y4v, z4v)$$
$$= (-Dv2 * \sin\gamma v, Dv2 * \cos\gamma v, 0)$$
$$\approx (-Dv2 * \gamma v, Dv2, 0)$$

$$P_{5v} = (x5v, y5v, z5v)$$
$$= (Dv2 * \cos(\pi/6 - \gamma v), Dv2 * \sin(\pi/6 - \gamma v), 0)$$
$$\approx (Dv2 * \cos(\pi/6) + Dv2 * \sin(\pi/6) * \gamma v,$$
$$Dv2 * \cos(\pi/6) * \gamma v - Dv2 * \sin(\pi/6), 0)$$

$$P_{6v} = (x6v, y6v, z6v)$$
$$= (-Dv2 * \cos(\pi/6 + \gamma v), -Dv2 * \sin(\pi/6 + \gamma v), 0)$$
$$\approx (-Dv2 * \cos(\pi/6) + Dv2 * \sin(\pi/6) * \gamma v,$$
$$-Dv2 * \cos(\pi/6) * \gamma v - Dv2 * \sin(\pi/6), 0)$$

The lengths of the links are calculated as follows.

$$L_{1v} = \sqrt{((Dv2*\gamma v)^2 + (Dv1-Dv2)^2 + Hv1^2)}$$

$$L_{2v} = \sqrt{((Wv1-Dv2*\cos(\pi/6)-Dv2*\sin(\pi/6)*\gamma v)^2 + (Dv2*\cos(\pi/6)*\gamma v-Dv2*\sin(\pi/6))^2 + Hv1^2)}$$

$$L_{3v} = \sqrt{((Wv1-Dv2*\cos(\pi/6)+\sin(\pi/6)*\gamma v)^2 + (Dv2*\cos(\pi/6)*\gamma v+Dv2*\sin(\pi/6))^2 + Hv1^2)}$$

Differences from the lengths of the links in the reference state are determined as follows. Here, $\gamma v > 0$ is assumed.

$$L_{1v}^2 - L_{1v0}^2 = (Dv2 * \gamma v)^2 > 0$$

$$L_{2v}^2 - L_{2v0}^2 = (Wv1 - Dv2*\cos(\pi/6) - Dv2*\sin(\pi/6)*\gamma v)^2 -$$
$$(Wv1 - Dv2*\cos(\pi/6))^2 +$$
$$(Dv2*\sin(\pi/6) - Dv2*\cos(\pi/6)*\gamma v)^2 - (Dv2*\sin(\pi/6))^2 < 0$$

$$L_{3v}^2 - L_{3v0}^2 = (Wv1 - Dv2*\cos(\pi/6) + Dv2*\sin(\pi/6)*\gamma v)^2 -$$
$$(Wv1 - Dv2*\cos(\pi/6))^2 +$$
$$(Dv2*\sin(\pi/6) + Dv2*\cos(\pi/6)*\gamma v)^2 - (Dv2*\sin(\pi/6))^2 > 0$$

In the reference state, it is found that one of length $L_{2v}$ of the forearm outside link 38L and length $L_{3v}$ of the forearm inside link 39L is lengthened while the other is shortened. Thus, in the rotation around forearm 8 being the torsion axis, both the force pushed by the extending link and the force drawn by the shortening link are generated, the rotation is easily performed around torsion axis.

Similarly to wrist joint 36, neck joint 27 changes the connection angle with three rotational degrees of freedom by changing the lengths of the three variable length links. Even in neck joint 27, the lengths of the three variable length links can be determined so as to have the determined connection angle in the same manner as wrist joint 36.

Figure 84:
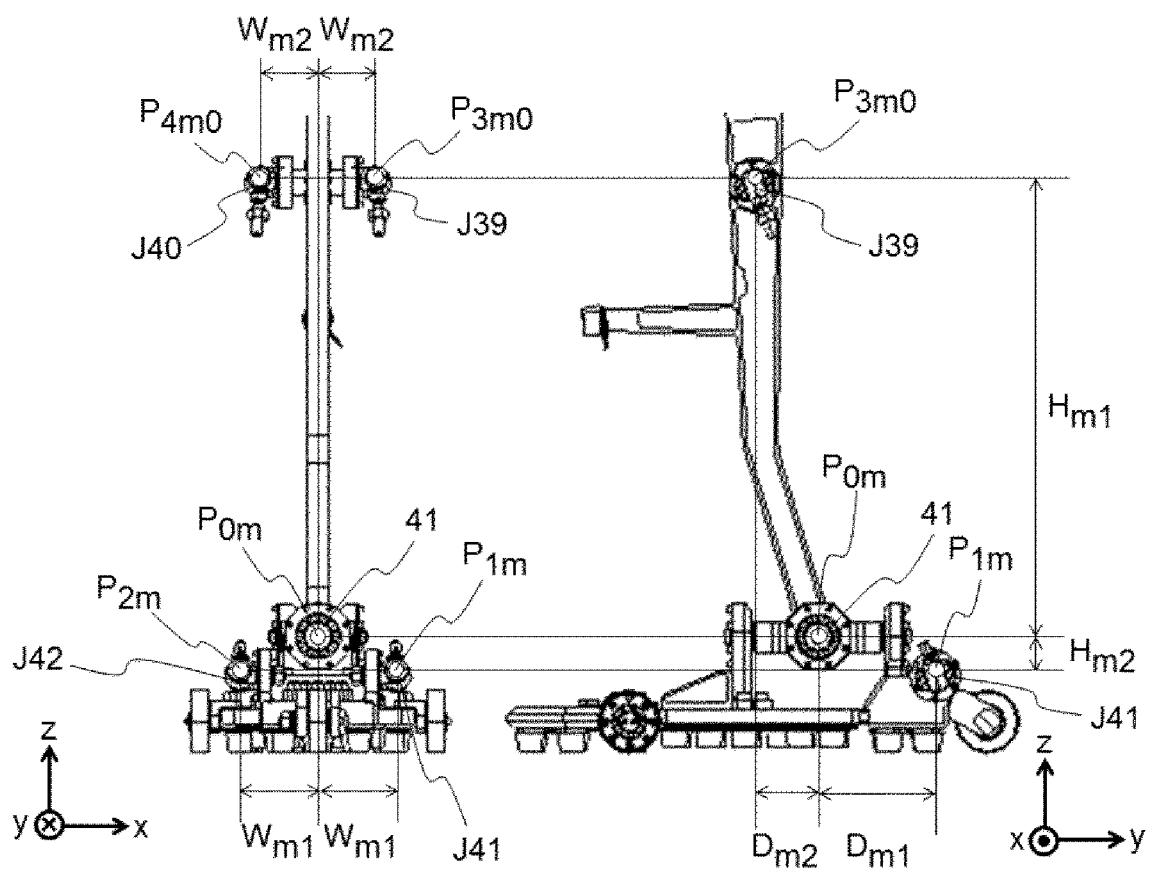
FIG. 84 is a view illustrating variables expressing the distances between the joint and the link attaching units in the ankle joint included in the humanoid robot according to the first embodiment.

How to determine the lengths of the links such that the designated angle can be taken with respect to ankle joint 41 is described. The distances between the joint and the link attaching units in ankle joint 41 are defined by the following variables. FIG. 84 is a view illustrating the variables expressing the distances between the joint and the link attaching units in ankle joint 41.

The variable expressing the position of each point is defined as follows.

$P_{0m}$: position of ankle joint 41.
$P_{1m}$: position of foot outside link attaching unit J41.
$P_{2m}$: position of foot inside link attaching unit J42.
$P_{3m}$: position of lower leg outside link attaching unit J39.
$P_{3m0}$: position of lower leg outside link attaching unit J39 in reference state.
$P_{4m}$: position of lower leg inside link attaching unit J40.
$P_{4m0}$: position of lower leg inside link attaching unit J40 in reference state.

The intervals between points are expressed by the following variables.

Wm1: lengths of line segment $P_{0m}P_{1m}$ and line segment $P_{0m}P_{2m}$ projected on X-axis.
Wm2: lengths of line segment $P_{0m}P_{3m0}$ and line segment $P_{0m}P_{4m0}$ projected on X-axis.
Dm1: lengths of line segment $P_{0m}P_{1m}$ and line segment $P_{0m}P_{2m}$ projected on Y-axis.
Dm2: lengths of line segment $P_{0m}P_{3m0}$ and line segment $P_{0m}P_{4m0}$ projected on Y-axis.
Hm1: lengths of line segment $P_{0m}P_{1m}$ and line segment $P_{0m}P_{2m}$ projected on Z-axis.
Hm2: lengths of line segment $P_{0m}P_{3m0}$ and line segment $P_{0m}P_{4m0}$ projected on Z-axis.
Dm1: length of the line segment $P_{0m}P_{1m}$ projected on Y-axis.

Using the variables defined above, a coordinate of each point is expressed as follows. Position $P_{0m}$ of ankle joint 41 is set to the origin of the coordinate.

$$P_{0m}=(0,0,0)$$

$$P_{1m}=(Wm1,Dm1,-Hm1)$$

$$P_{2m}=(-Wm1,Dm1,-Hm1)$$

$$P_{3m0}=(Wm2,-Dm2,Hm2)$$

$$P_{4m0}=(-Wm2,-Dm2,Hm2)$$

The rotation angles of ankle joint 41 are expressed by the following variables.

$\alpha_m$: rotation angle of ankle joint 41 around X-axis. $\alpha_m=0$ in reference state $\beta_m$: rotation angle of ankle joint 41 around Y-axis. $\beta_m=0$ in reference state

[Rm]: rotation matrix of ankle joint 41.
The rotation matrix [Rm] is given as follows.

[Mathematical Formula 6]

$$[Rm] = \begin{pmatrix} 1 & 0 & 0 \\ 0 & \cos\alpha m & -\sin\alpha m \\ 0 & \sin\alpha m & \cos\alpha m \end{pmatrix}$$

$$\begin{pmatrix} \cos\beta m & 0 & -\sin\beta m \\ 0 & 1 & 0 \\ \sin\beta m & 0 & \cos\beta m \end{pmatrix}$$

The lengths of the links are expressed by the following variables.

$L_{1m}$: length of lower leg outside link 45L. Length of line segment $P_{1m}P_{3m}$.

$L_{2m}$: Length of lower leg inside link 46L. Length of line segment $P_{2m}P_{4m}$.

[Rm] is given, and $P_{3m}$, $P_{4m}$ are obtained by the following expressions.

$$P_{3m}=(x3m,y3m,z3m)=[Rm]*(Wm2,-Dm2,Hm2)^t$$

$$P_{4m}=(x4m,y4m,z4m)=[Rm]*(-Wm2,-Dm2,Hm2)^t$$

Because $P_{3m}$, $P_{4m}$ are obtained, lengths $L_{1m}$, $L_{2m}$ of the links can be calculated by the following expressions.

$$L_{1m}=\sqrt{((x3m-Wm1)^2+(y3m-Dm1)^2+(z3m+Hm1)^2)}$$

$$L_{2m}=\sqrt{((x4m+Wm1)^2+(y4m-Dm1)^2+(z4m+Hm2)^2)}$$

Figure 85:
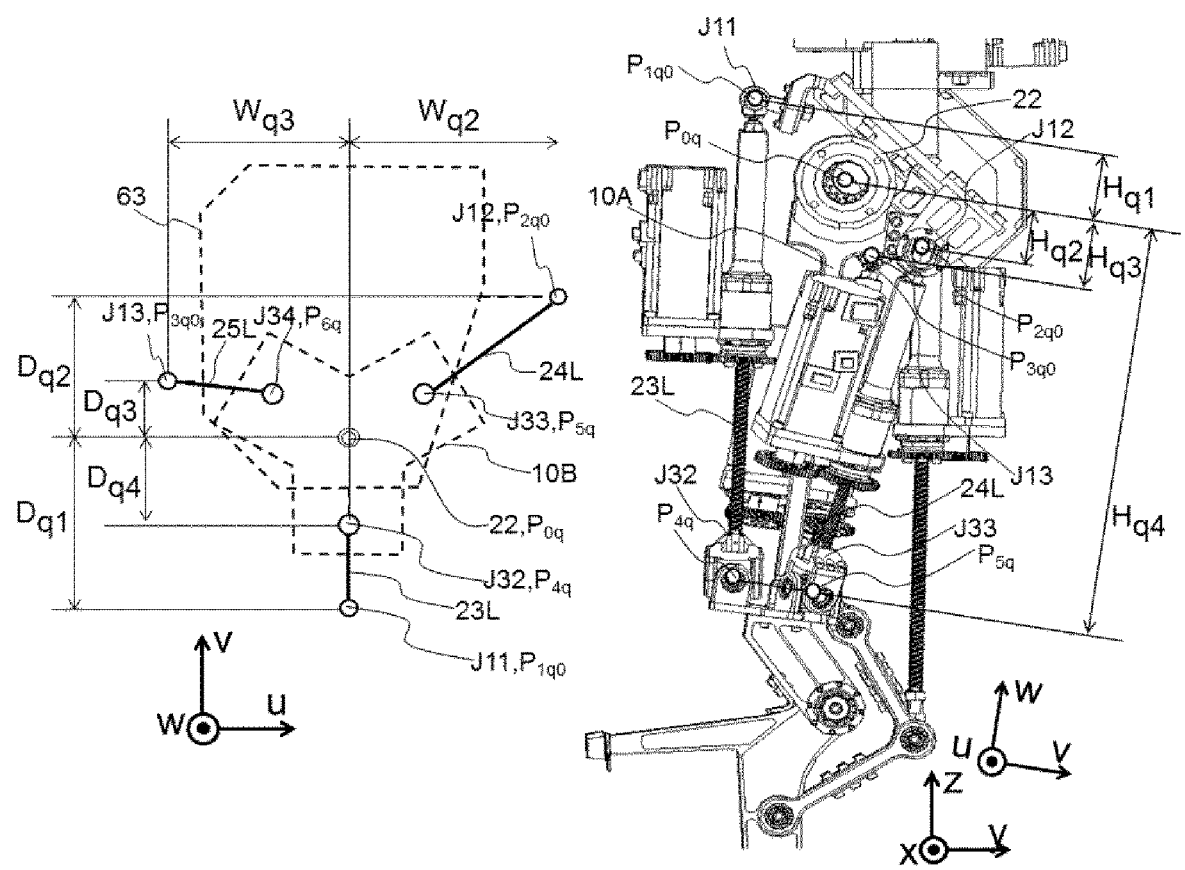
FIG. 85 is a view illustrating variables expressing the distances between the joint and the link attaching units in the hip joint included in the humanoid robot of the first embodiment.

How to determine the lengths of the links such that the designated angle can be taken with respect to hip joint 22 is described. The distances between the joint and the link attaching units in hip joint 22 are defined by the following variables. FIG. 85 is a view illustrating the variables expressing the distances between the joint and the link attaching units in hip joint 22.

The variable expressing the position of each point is defined as follows.

$P_{0q}$: position of hip joint 22.
$P_{1q}$: position of crotch front link attaching unit J11.
$P_{1q0}$: position of crotch front link attaching unit J11 in reference state.
$P_{2q}$: position of crotch outside link attaching unit J12.
$P_{2q0}$: position of crotch outside link attaching unit J12 in reference state.
$P_{3q}$: position of crotch inside link attaching unit J13.
$P_{3q0}$: position of crotch inside link attaching unit J13 in reference state.
$P_{4q}$: position of knee front link attaching unit J32.
$P_{5q}$: position of knee outside link attaching unit J33.
$P_{6q}$: position of knee inside link attaching unit J34.

The intervals between the points are defined by the following variables. A U-axis, a V-axis, and a W-axis, which are orthogonal to one another, are used as the coordinate system. The UVW-coordinate system is a coordinate system that moves along with thighbone 10A. The W-axis is set to a direction in which thighbone 10A extends. The U-axis is set to an axis that is matched with the X-axis in the reference state.

Wq2: length of line segment $P_{0q}P_{2q0}$ projected on U-axis.
Wq3: length of line segment $P_{0q}P_{3q0}$ projected on U-axis.
Dq1: length of line segment $P_{0q}P_{1q0}$ projected on V-axis.
Dq2: length of line segment $P_{0q}P_{2q0}$ projected on V-axis.
Dq3: length of line segment $P_{0q}P_{3q0}$ projected on V-axis.
Dq4: length obtained by projecting line segment $P_{0q}P_{4q}$ projected on V-axis.
Hq1: length of line segment $P_{0q}P_{1q0}$ projected on the W-axis.
Hq2: length of line segment $P_{0q1}P_{2q0}$ projected on W-axis.
Hq3: length of line segment $P_{0q}P_{3q0}$ projected on W-axis.
Hq4: lengths of line segment $P_{0q}P_{4q0}$, line segment $P_{0q}P_{5q0}$, line segment $P_{0q}P_{6q0}$ projected on W-axis.

Using the variables defined above, the coordinate of each point in the reference state is expressed as follows in the UVW-coordinate system. The position of hip joint 22 is set to the origin of the coordinate.

$$P_{0q}=(0,0,0)$$

$$P_{1q0}=(0,-Dq1,Hq1)$$

$$P_{2q0}=(Wq2,Dq2,-Hq2)$$

$$P_{3q0}=(-Wq3,Dq3,-Hq3)$$

$$P_{4q}=(0,-Dq3,-Hq4)$$

$$P_{5q}=(Dq4*\cos(\pi/6),Dq4*\sin(\pi/6),-Hq4)$$

$$P_{6q}=(-Dq4*\cos(\pi/6),Dq4*\sin(\pi/6),-Hq4)$$

The lengths of the links are expressed by the following variables.

$L_{1q}$: length of thigh front link 23L. Length of line segment $P_{1q}P_{4q}$.

$L_{2q}$: length of thigh outside link 24L. Length of line segment $P_{2q}P_{5q}$.

$L_{3q}$: length of thigh inside link 25L Length of line segment $P_{3q}P_{6q}$.

$L_{1q0}$: length of thigh front link 23L in reference state. Length of line segment $P_{1q0}P_{4q}$.

$L_{2q0}$: length of thigh outside link 24L in reference state. Length of line segment $P_{2q0}P_{5q}$.

$L_{3q0}$: length of thigh inside link 25L in reference state. Length of line segment $P_{3q0}P_{6q}$.

The rotation angles of hip joint 22 are defined by the following variables.

αq: rotation angle of hip joint 22 around X-axis·αq=αq0 in reference state.

βq: rotation angle of hip joint 22 around Y-axis·βq=0 in reference state.

γq: rotation angle of hip joint 22 around Y-axis·γq=0 in reference state.

[Rq]: rotation matrix of hip joint 22 in UVW-coordinate system.

In the case that the direction in which thighbone 10A extends rotates from the reference state (αq0, 0, 0) to (αq, βq, γq) in the XYZ-coordinate system, the point fixed in the XYZ-coordinate system rotates by (αq0−αq, −βq, −γq) in the UVW-coordinate system. Thus, rotation matrix Rq is given as follows.

[Mathematical Formula 6]

$$[Rq] = \begin{pmatrix} 1 & 0 & 0 \\ 0 & \cos(\alpha q - \alpha q0) & \sin(\alpha q - \alpha q0) \\ 0 & -\sin(\alpha q - \alpha q0) & \cos(\alpha q - \alpha q0) \end{pmatrix}$$

$$\begin{pmatrix} \cos\beta q & 0 & \sin\beta q \\ 0 & 1 & 0 \\ -\sin\beta q & 0 & \cos\beta q \end{pmatrix}$$

$$\begin{pmatrix} \cos\gamma q & \sin\gamma q & 0 \\ -\sin\gamma q & \cos\gamma q & 0 \\ 0 & 0 & 1 \end{pmatrix}$$

The coordinates of the points $P_{1q}$, $P_{2q}$, $P_{3q}$ fixed in the XYZ-coordinate system are obtained as follows in the UVW-coordinate system. The coordinates of points $P_{4q}$, $P_{5q}$, $P_{6q}$ moving together with thighbone 10A do not change in the UVW-coordinate system.

$$P_{1q} = (u1q, v1q, w1q)$$
$$= [Rq] * (0, -Dq1, Hq1)^t$$

$$P_{2q} = (u2q, v2q, w2q)$$
$$= [Rq] * (Wq2, Dq2, -Hq2)^t$$

$$P_{3q} = (u3q, v3q, w3q)$$
$$= [Rq] * (-Wq3, Dq3, -Hq3)^t$$

Because the coordinates of points $P_{1q}$, $P_{2q}$, $P_{3q}$ are obtained in the UVW-coordinate system, the lengths of the links are expressed as follows.

$L_{1q} = \sqrt{(u1q^2 + (v1q + Dq4)^2 + (w1q + Hq4)^2)}$ $L_{2q} = \sqrt{((u2q - Dq4*\cos(\pi/6))^2 + (v2q - Dq4*\sin(\pi/6))^2 + (w2q + Hq4)^2)}$ $L_{3q} = \sqrt{((u3q + Dq4*\cos(\pi/6))^2 + (v3q - Dq4*\sin(\pi/6))^2 + (w3q + Hq4)^2)}$ In the case that the rotation is slightly performed around the W-axis from the reference state, how the length of each link changes is examined. Points $P_{1q}$, $P_{2q}$, $P_{3q}$ are given as follows. Here, assuming that γq is small, approximation is performed using sin γq≈γq, cos γq≈1.

$$P_{1q} = (u1q, v1q, w1q)$$
$$= (-Dq1 * \sin\gamma q, -Dq1 * \cos\gamma q, Hq1)$$
$$\approx (-Dq1 * \gamma q, -Dq1, Hq1)$$

$$P_{2q} = (u2q, v2q, w2q)$$
$$= (Wq2 * \cos\gamma q + Dq2 * \sin\gamma q, -Wq2 * \sin\gamma q + Dq2 * \cos\gamma q, -Hq2)$$
$$\approx (Wq2 + Dq2 * \gamma q, -Wq2 * \gamma q + Dq2, -Hq2)$$

$$P_{3q} = (u3q, v3q, w3q)$$
$$= (-Wq3 * \cos\gamma q + Dq3 * \sin\gamma q, Wq3 * \sin\gamma q + Dq3 * \cos\gamma q, -Hq3)$$
$$\approx (-Wq3 + Dq3 * \gamma q, Wq3 * \gamma q + Dq3, -Hq3)$$

The lengths of the links are calculated as follows.

$L_{1q} = \sqrt{((Dq1*\gamma q)^2 + (-Dq1 + Dq4)^2 + (Hq1 + Hq4)^2)}$ $L_{2q} = \sqrt{((Wq2 + Dq2*\gamma q - Dq4*\cos(\pi/6))^2 + (-Wq2*\gamma q + Dq2 - Dq4*\sin(\pi/6))^2 + (-Hq2 + Hq4)^2)}$ $L_{3q} = \sqrt{((-Wq3 + Dq3*\gamma q + Dq4*\cos(\pi/6))^2 + (Wq3*\gamma q + Dq3 - Dq4*\sin(\pi/6))^2 + (-Hq3 + Hq4)^2)}$ Differences from the lengths of the links in the reference state are determined as follows.

$$L_{1z}^2 - L_{1q0}^2 = (Dq1 * \gamma q)^2 > 0$$

$$L_{2q}^2 - L_{2q0}^2 = (Wq2 + Dq2*\gamma q - Dq4*\cos(\pi/6))^2 -$$
$$(Wq2 - Dq4*\cos(\pi/6))^2 +$$
$$(-Wq2*\gamma q + Dq2 - Dq4*\sin(\pi/6))^2 -$$
$$(Dq2 - Dq4*\sin(\pi/6))^2$$
$$= \gamma q * ((Dq2^2 + Wq2^2) * \gamma q +$$
$$2 * (Wq2 * \sin(\pi/6) - Dq2 * \cos(\pi/6)) * Dq4)$$

$$L_{3q}^2 - L_{3q0}^2 = (-Wq3 + Dq3*\gamma q + Dq4*\cos(\pi/6))^2 -$$
$$(-Wq3 + Dq4*\cos(\pi/6))^2 +$$
$$(Wq3*\gamma q + Dq3 - Dq4*\sin(\pi/6))^2 -$$
$$(Dq3 - Dq4*\sin(\pi/6))^2$$
$$= \gamma q * ((Dq3^2 + Wq3^2) * \gamma q - 2 * (Wq3 * \sin(\pi/6) -$$
$$Dq3 * \cos(\pi/6)) * Dq4)$$

From the above equations, in the case that Wq2*sin(π/6)−Dq2*cos(π/6)>0 and Wq3*sin(π/6)−Dq3*cos(π/6)>0 hold, or in the case that Wq2*sin(π/6)−Dq2*cos (π/6)<0 and Wq3*sin(π/6)−Dq3*cos(π/6)<0 hold, it is understood that one of length $L_{2q}$ of thigh outside link 24L and length $L_{3q}$ of thigh inside link 25L is lengthened and the other is shortened when the rotation is performed by a small angle around the W-axis from the reference state. As shown in FIG. 85, the angle formed by line segment $P_{0q}P_{2q0}$ and the V-axis and the angle formed by the line $P_{0q}P_{3q0}$ and the V-axis are larger than π/6(=60 degrees). That is, Wq2*sin(π/6)−Dq2*cos(π/6)>0 and Wq3*sin(π/6)−Dq3*cos(π/6)>0 hold. In hip joint 22, when the rotation is performed by a small angle around the W-axis from the reference state, one of length $L_{2q}$ of thigh outside link 24L and length $L_{3q}$ of thigh inside link 25L is lengthened, and the other is shortened.

How to determine the length of knee drive link 42L such that the designated angle can be taken with respect to knee joint 40 is described. The positions of knee joint 40, knee drive link attaching unit J35, and thigh-side auxiliary tool attaching unit J36 are determined with respect to thighbone 10A. When angle $\alpha_n$ of knee joint 40 is determined, the position of lower leg-side auxiliary tool attaching unit J38 is determined. Because the lengths of thigh-side auxiliary tool 43 and lower leg side auxiliary tool 44 are fixed, when the position of lower leg-side auxiliary tool attaching unit J38 is determined, the position of knee drive link auxiliary tool connecting unit J37 is determined. Knee joint 40 can be set to the designated angle $\alpha_n$ when the length of knee drive link 42L is set to the determined distance between knee drive link auxiliary tool connecting unit J37 and knee drive link attaching unit J35.

In hand 9, the motor is driven such that the first finger joint and the second finger joint of each finger are set to the designated angle, and such that the worm gear of each finger joint is located at the position corresponding to the designated angle. Opposable finger 97 can be opposed to the ordinary fingers, and only the first finger joint of the ordinary fingers can be bent, so that the fingers can hold a thin paper or the like by sandwiching the thin paper with extended fingertips. The fingers may previously be disposed so that one finger is opposed to other fingers without including opposable finger 97. The number of fingers need not be five, but may be at least three. As in hand 9, when the hand includes the opposable finger and the four ordinary fingers, it is advantageous to make the same motion as a human such as grasp of an object, pressing of a button, and operation of a lever.

Humanoid robot 100 uses a driving method in which each joint is driven by the expansion and contraction of the actuator. For this reason, the disposition of the gear in the joint is not necessary, and the joint can be made compact. The joint has the rotational degree of freedom of the same order as a human, humanoid robot 100 can make the similar motion to a human.

Hand 9 has opposable finger 97 corresponding to the thumb. Opposable finger 97 can be opposed to four ordinary fingers 93, 94, 95, 96, and the object can be gripped by opposable finger 97 and ordinary fingers 93, 94, 95, 96. Each finger joint is driven by a worm gear mechanism in which a worm and a worm wheel are used, so that strong force to bend the finger can be obtained. Each of the first finger joint and the second finger joint are driven by the worm gear mechanism, so that only one or both of the first finger joint and the second finger joint can be bent. When the electric power supply is interrupted, gripping force can be maintained by the worm gear mechanism.

The humanoid robot according to the present disclosure has a structure enabling the motion close to a human. Consequently, the humanoid robot can perform work performed by an ordinary person. When artificial intelligence is installed, it is understood that the humanoid robot can be used in industry, an aging society, and solving labor shortage. In particular, it is estimated that the humanoid robot can be used to solve the labor shortage in simple work and work that is performed under the environment that is severe for a human to stay for a long time (radiation environment, high-temperature environment, low-temperature environment, and the like).

The three-rotational-degree-of-freedom connection mechanism may be used in chest bending unit C1, shoulder C4, elbow C5, knee C8, and ankle C9. The three-rotational-degree-of-freedom connection mechanism may be used in not all body bending unit C2, neck C3, wrist C6, crotch C7, but at least one of body bending unit C2, neck C3, wrist C6, crotch C7, chest bending unit C1, shoulder C4, elbow C5, knee C8, and ankle C9.

The humanoid robot may have only the chest, the head, and the upper limb. The humanoid robot may have only the waist, the chest, the head, and the upper limbs. The humanoid robot may have only the waist and lower limbs. The humanoid robot may not have the head. The three-rotational-degree-of-freedom connection mechanism may be used in at least one joint included in the humanoid robot. In the humanoid robot that includes no waist but the upper limb, the side far from the hand is set to the first member.

The three-rotational-degree-of-freedom connection mechanism of the present disclosure may be applied to not the humanoid robot but a robot arm including the hand and one or a plurality of arm section units connected in series from the hand. The three-rotational-degree-of-freedom connection mechanism may be used such that the second member being one of the hand and the arm section units is connected rotatably to the first member provided far from the hand with three rotational degrees of freedom. In the robot arm, the hand can be at a proper position and can be directed to a proper angle.

In the hand of the present disclosure, only the hand can be used as a robot hand. A hand different from that of the first embodiment may be used.

A biaxial gimbal having a structure different from that of the first embodiment may be used as the biaxial gimbal having two rotational degrees of freedom in the joint and the link attaching unit. The proper type of biaxial gimbal may be used according to the place to which the joint and link attachment are applied.

Each of features possessed by the body bending unit, the chest bending unit, the neck, the shoulder, the elbow, the wrist, the crotch, the knee, and the ankle of the first embodiment can be applied to the humanoid robot that does not include the three-rotational-degree-of-freedom connection mechanism.

A screw type actuator in which the screw rod is used or an actuator in which hydraulic pressure is used may be used as the actuator. The actuator may have any configuration as long as the distance between two points can be changed and maintained. In the actuator, a suitable mechanism such as a gear and a timing belt may be used as the mechanism for transmitting the rotation of the motor to the screw rod.

The opposable finger is movable from the position near the side of the palm plate to the position opposed to the ordinary finger across the palm plate, and may include three finger joints similarly to the ordinary finger. To that end, the opposable finger further includes a fourth dactylus and a fourth finger joint that connects the fourth dactylus rotatably to the third dactylus. The third finger joint rotates the third dactylus with respect to the second dactylus using the worm gear mechanism. The fourth finger joint may rotate in conjunction with the third finger joint, or can rotate independently of the third finger joint. The hand may include a finger that always exists at the position opposed to the ordinary finger. The hand may include a finger that is bent in the direction different from the ordinary finger.

The above is also applied to other embodiments.

Second Embodiment

Figure 86:
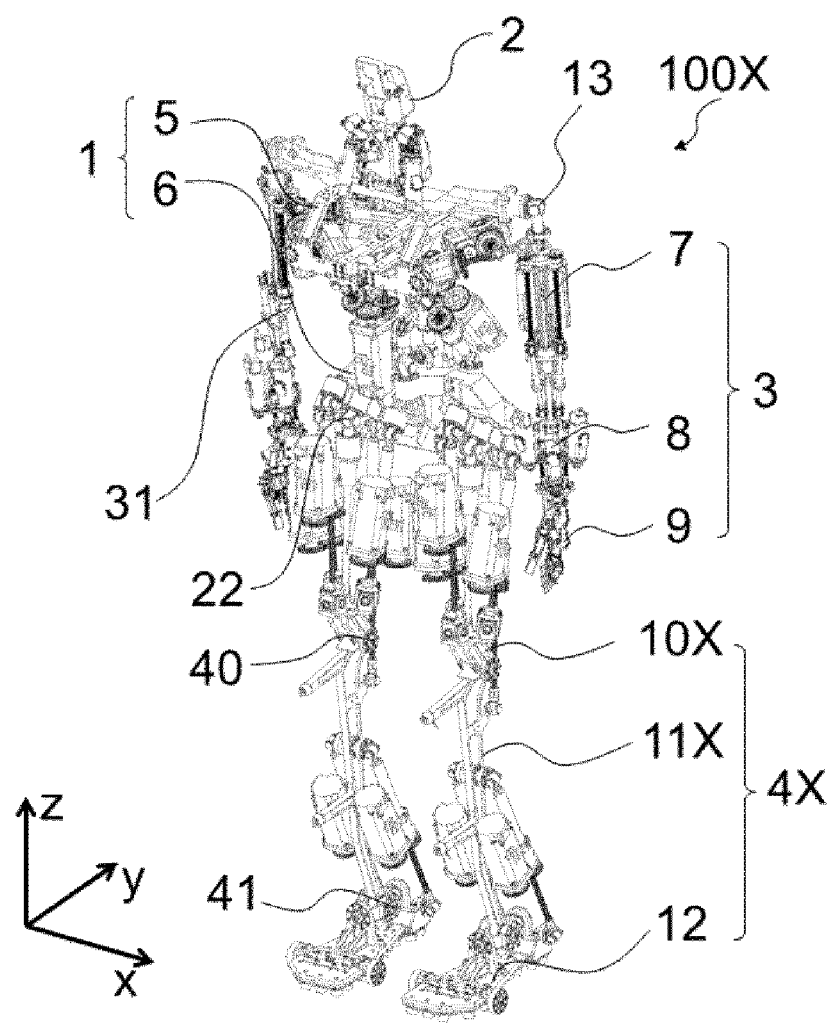
FIG. 86 is a perspective view illustrating a humanoid robot according to a second embodiment of the present disclosure.
Figure 87:
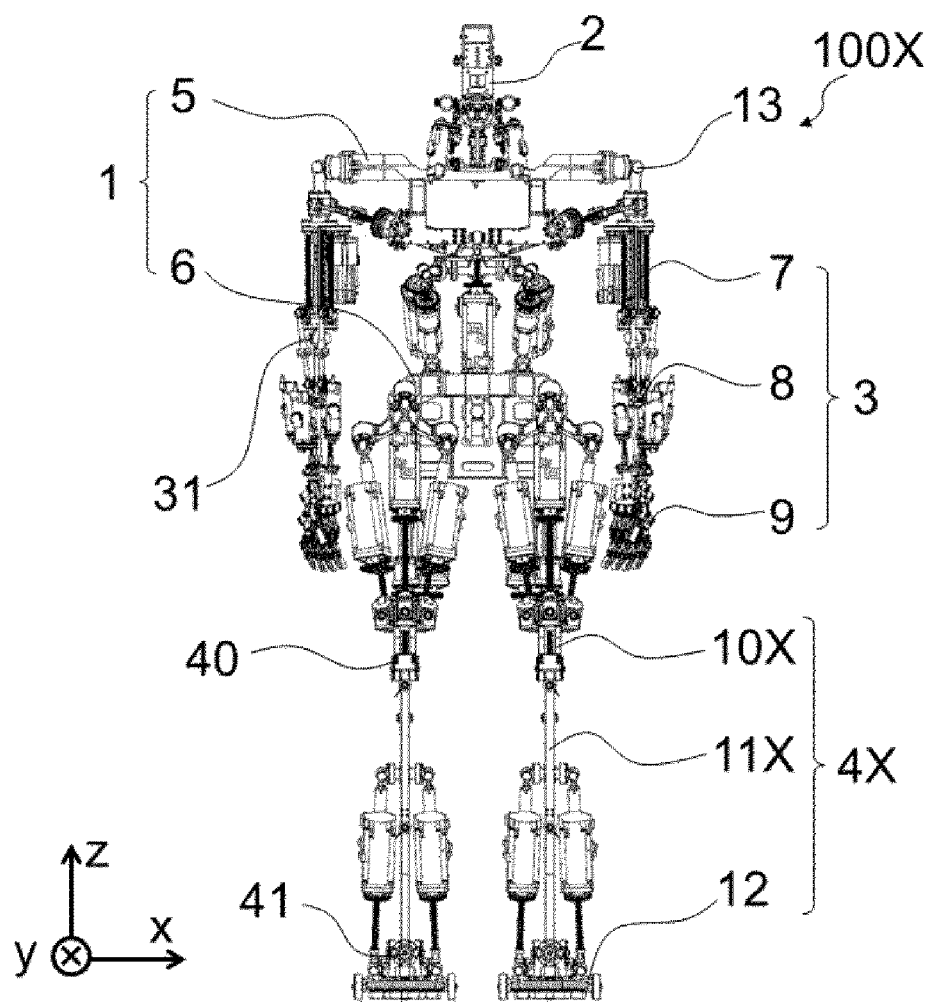
FIG. 87 is a front view illustrating the humanoid robot of the second embodiment.
Figure 88:
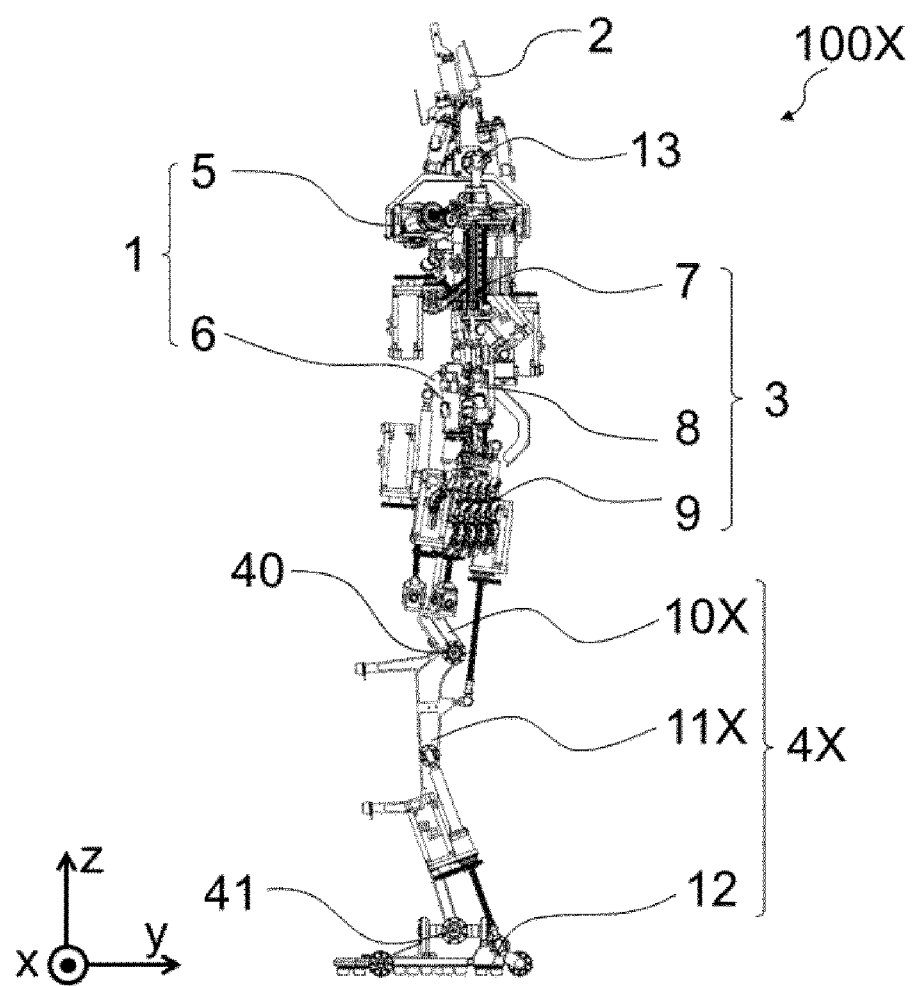
FIG. 88 is a left side view illustrating the humanoid robot of the second embodiment.
Figure 89:
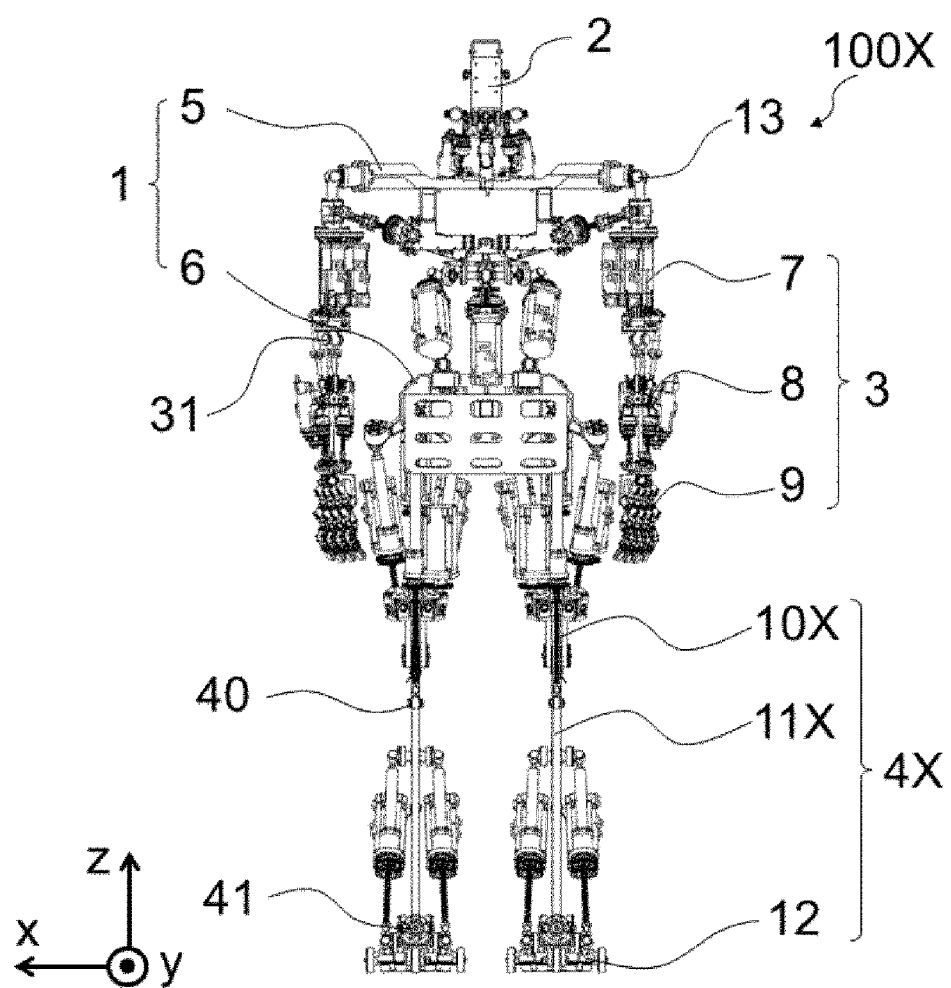
FIG. 89 is a rear view illustrating the humanoid robot of the second embodiment.
Figure 90:
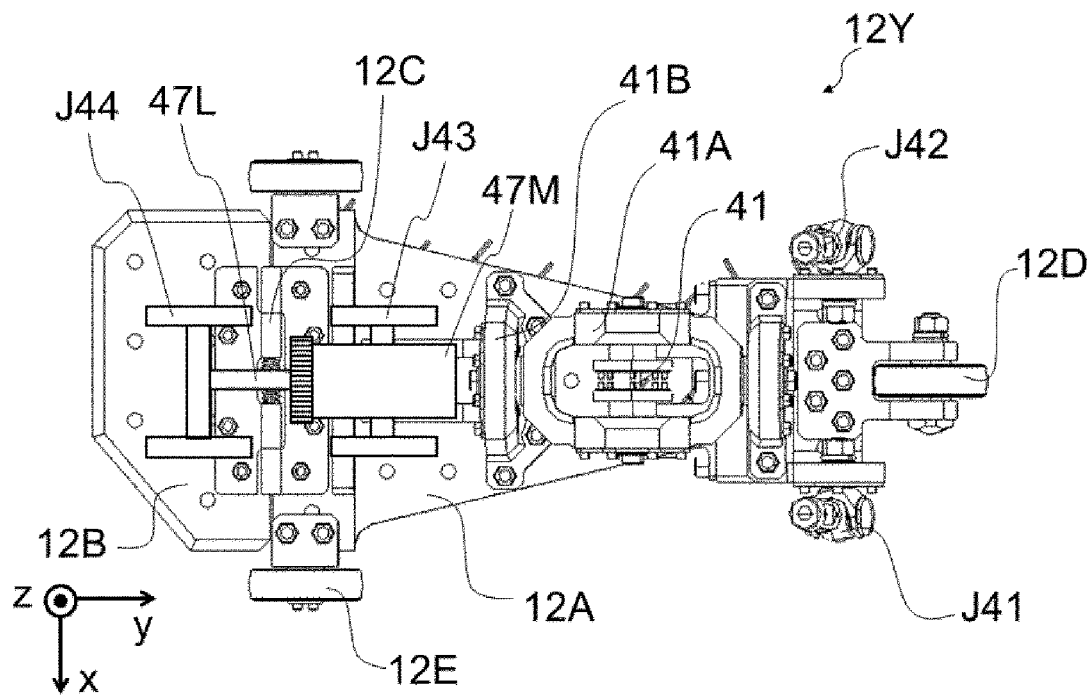
FIG. 90 is a plan view illustrating a left foot included in a humanoid robot according to a third embodiment of the present disclosure.
Figure 91:
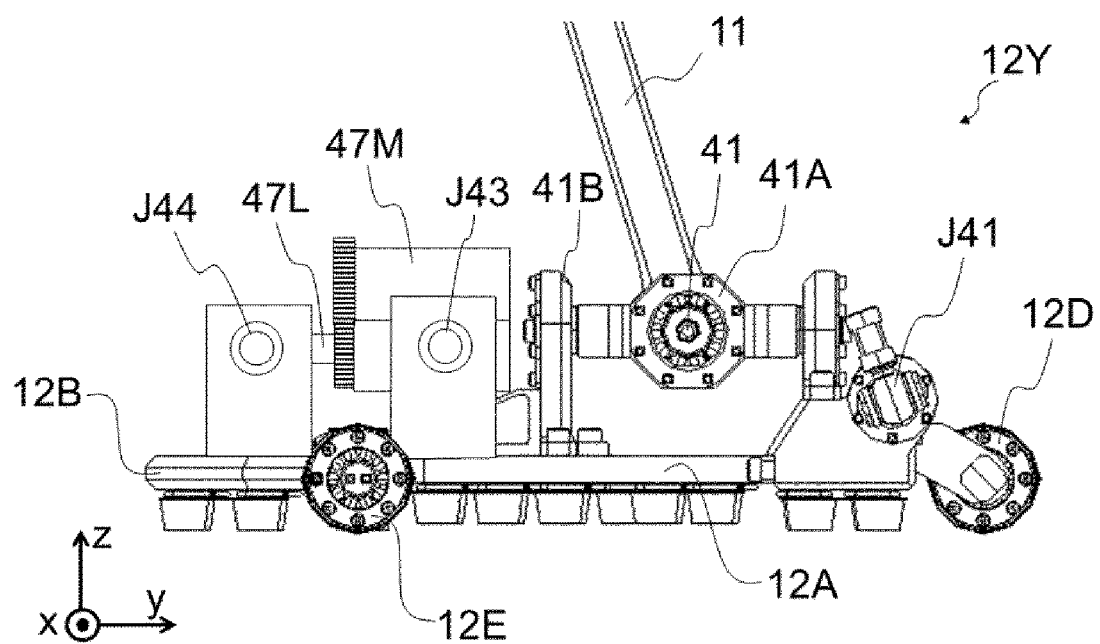
FIG. 91 is a left side view illustrating the left foot included in the humanoid robot of the third embodiment.
Figure 92:
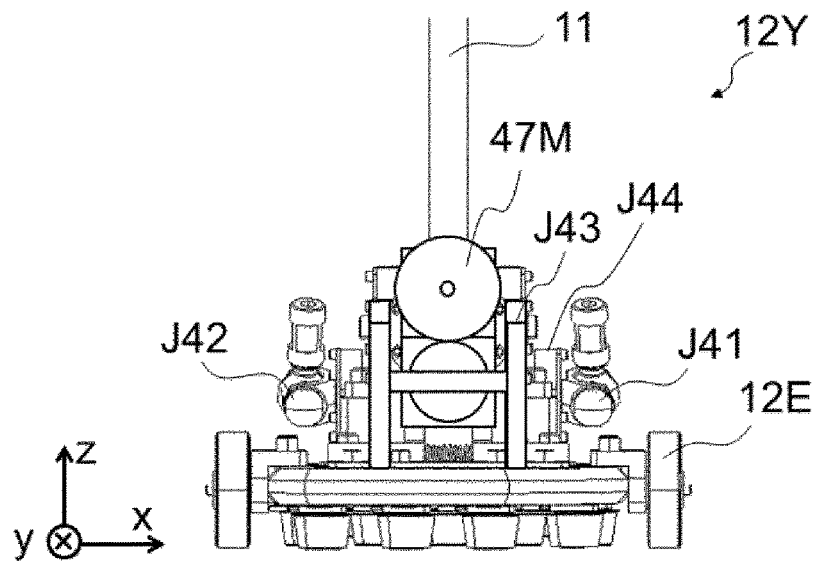
FIG. 92 is a front view illustrating the left foot included in the humanoid robot of the third embodiment.
Figure 93:
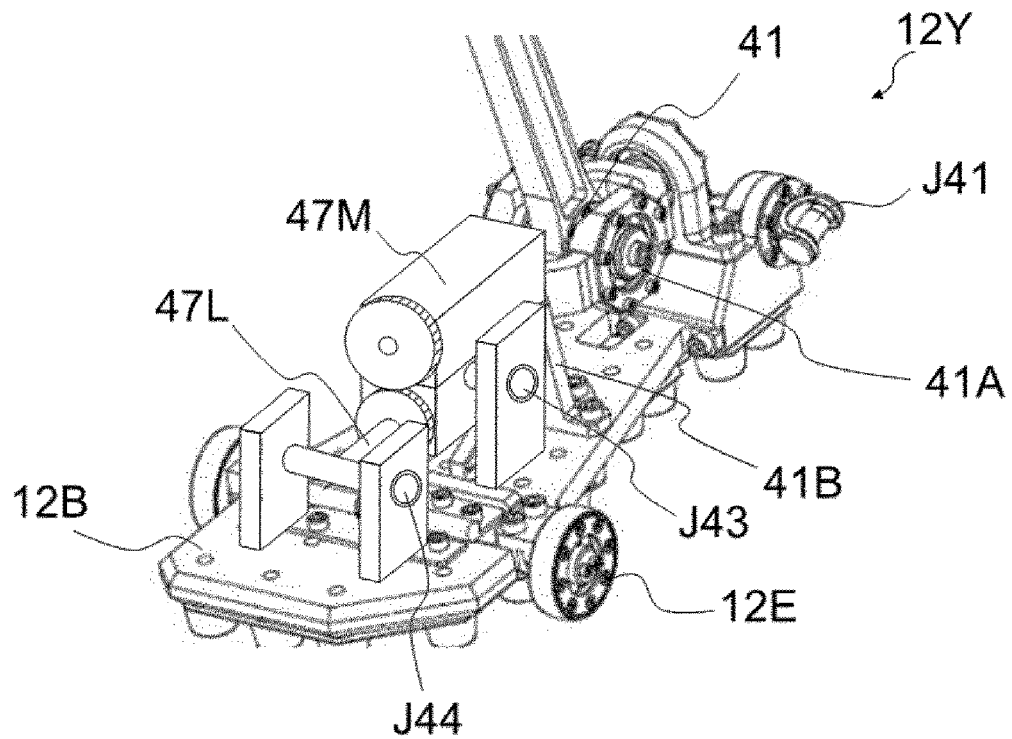
FIG. 93 is a perspective view illustrating the left foot included in the humanoid robot of the third embodiment.

In a second embodiment, knee drive link 42L that drives knee joint 40 is connected only to lower leg 11. FIG. 86 is a perspective view illustrating a humanoid robot 100X according to the second embodiment of the present disclosure FIGS. 87, 88 and 89 are a front view, a left side view, and a rear view, of humanoid robot 100X, respectively.

In humanoid robot 100X, one end of knee drive link 42L is not attached to a thigh 10X. One end of knee drive link 42L is attached only to a lower leg 11X. In humanoid robot 100X, a knee joint 40X is largely bent until thigh 10X and lower leg 11X become substantially parallel, sometimes sufficient force for extending knee joint 40X cannot be obtained. When the posture that knee joint 40X is largely bent is not necessary, humanoid robot 100X can be used similarly to humanoid robot 100 of the first embodiment. The structure of knee joint 40X is simplified in humanoid robot 100X, so that humanoid robot 100 can be manufactured at a lower cost than humanoid robot 100.

Third Embodiment

In a third embodiment, an actuator that changes the angle formed by the toe and the foot main body is provided. FIGS.

90, 91, 92, and 93 are a plan view, a left side view, a front view, and a perspective view illustrating the left foot of a humanoid robot 100Y according to a third embodiment of the present disclosure.

A foot 12Y of humanoid robot 100Y has a toe drive actuator 47 that changes the angle formed by foot main body 12A and toe 12B. Toe drive actuator 47 is disposed on the side existing toe 12B of foot 12Y longitudinally side by side with ankle joint 41. A foot-main-body-side link attaching unit J43 is provided in foot main body 12A. One end of toe drive link 47L is attached rotatably to foot-main-body-side link attaching unit J43. A toe-side link attaching unit J44 being attached rotatably with the other end of toe drive link 47L is provided in toe 12B. In foot-main-body-side link attaching unit J43 and toe-side link attaching unit J44, toe drive link 47L is attached with one rotational degree of freedom around the rotation axis parallel to the right and left direction of foot 12Y. A motor 47M is disposed above toe drive link 47L.

An intra-foot bending unit C10 connects toe 12B rotatably to foot main body 12A. Toe 12B is connected to the front of foot main body 12A. Intra-foot bending unit C10 includes a toe joint 12C, toe drive actuator 47 including toe drive link 47L and motor 47M, toe-side link attaching unit J44 provided in toe 12B, and foot-main-body-side link attaching unit J43 provided in foot main body 12A. Toe joint 12C connects toe 12B and foot main body 12A with one rotational degree of freedom. Toe drive link 47L is located above toe 12B and foot main body 12A, and the length of toe drive link 47L can be changed. One end of toe drive link 47L is attached rotatably to toe-side link attaching unit J44. The other end of toe drive link 44L is attached rotatably to foot-main-body-side link attaching unit J43.

When toe drive link 47L is shortened, the angle formed by toe 12B and foot main body 12A is decreased, and toe 12B moves upward. When toe drive link 47L is lengthened, the angle formed by toe 12B and foot main body 12A is increased, and toe 12B moves downward.

Since foot 12Y includes toe drive link 47L, the angle between toe 12B and foot main body 12A can be set to the designated angle. Consequently, when humanoid robot 100Y walks or runs, the motion of humanoid robot 100Y can be made closer to human motion.

When the space where toe drive actuator 47 is disposed in foot 12 is insufficient, the force changing the angle of toe joint 12C may be transmitted from a motor or the like provided in lower leg 11 or the like using a wire or the like.

Fourth Embodiment

Figure 94:
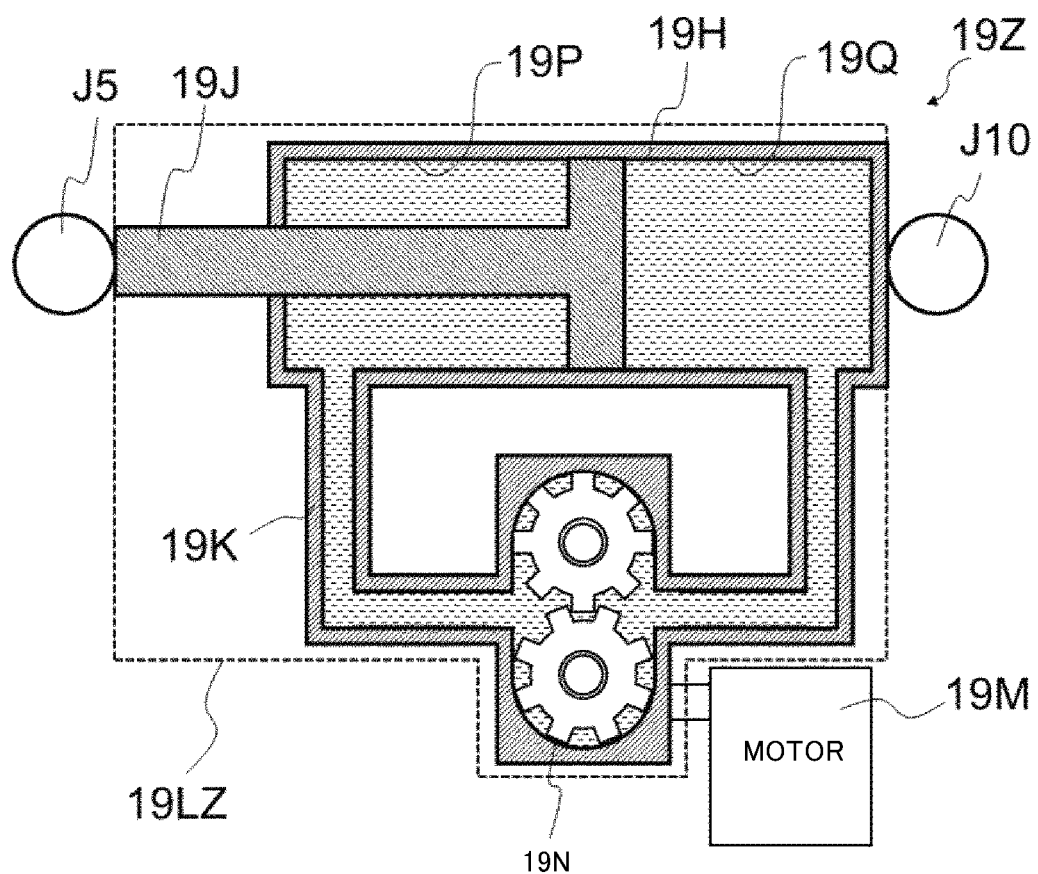
FIG. 94 is a cross-sectional view illustrating a structure of a variable length link of an actuator included in a humanoid robot according to a fourth embodiment of the present disclosure.

In a fourth embodiment, a hydraulic mechanism is used for the variable length link. A humanoid robot 100Z includes an actuator in which the hydraulic mechanism is used. FIG. 94 is a cross-sectional view illustrating a structure of the variable length link of the actuator included in the humanoid robot according to the fourth embodiment.

The structure of the actuator in which the hydraulic mechanism is used is described with a thoracolumbar center actuator 19Z as an example. Thoracolumbar center actuator 19Z includes a variable length link 19LZ and a motor 19M. Variable length link 19LZ includes a cylinder 19H, a piston 19J that moves inside of cylinder 19H, a pipe 19K, and a pump 19N. Cylinder 19H is filled with liquid such as mineral oil. Piston 19J divides the inside of cylinder 19H into a first chamber 19P and a second chamber 19Q. Pipe 19K connects first chamber 19P and second chamber 19Q. Pipe 19K is filled with the liquid. Pump 19N is provided in the middle of pipe 19K. Pump 19N is driven by motor 19M. Pump 19N is driven by motor 19M. Pump 19N can move the liquid from first chamber 19P to second chamber 19Q, and move the liquid from second chamber 19Q to first chamber 19P.

One end of piston 19J is attached to chest-side center link attaching unit J5. One end of cylinder 19H is attached to waist-side center link attaching unit J10.

When pump 19N moves the liquid from first chamber 19P to second chamber 19Q, piston 19J moves in the direction approaching chest-side center link attaching unit J5. When pump 19N moves the liquid from second chamber 19Q to first chamber 19P, piston 19J moves in the direction away from chest-side center link attaching unit J5. When no liquid moves between first chamber 19P and second chamber 19Q, the position of piston 19J does not change. Thus, the length of variable length link 19LZ can be changed, and maintain any length of variable length link 19LZ within the movable range.

Instead of the screw type actuator in which the screw rod 19A or the like is used, the actuator in which the hydraulic mechanism having pump 19N driven by motor 19M is used can be used.

A valve that switches whether the liquid flows in pipe 19K may be provided. The valve is open in the case that the length of variable length link 19LZ is to be changed. The valve is closed in the case that the length of variable length link 19LZ is to be fixed.

Fifth Embodiment

Figure 95:
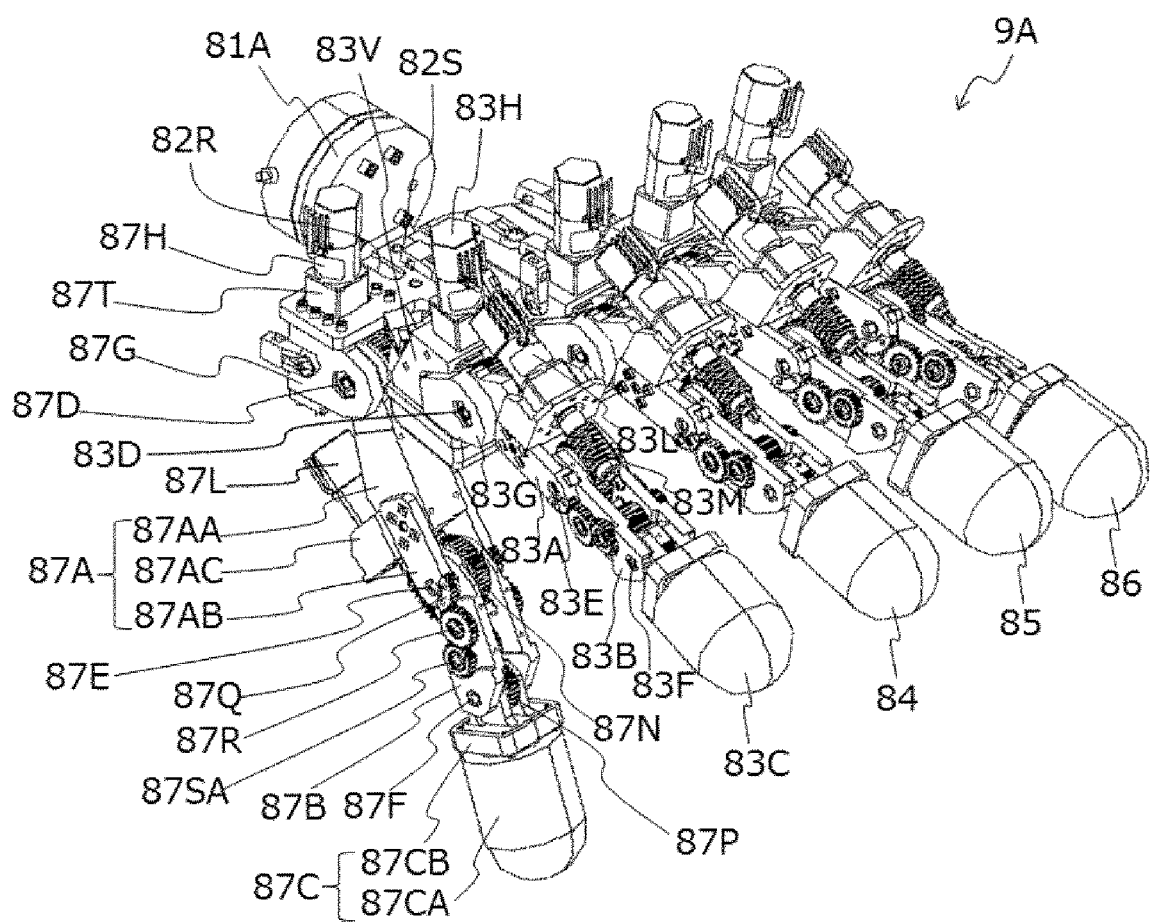
FIG. 95 is a perspective view illustrating a left hand included in a humanoid robot according to a fifth embodiment of the present disclosure viewing from the backside of the hand.
Figure 96:
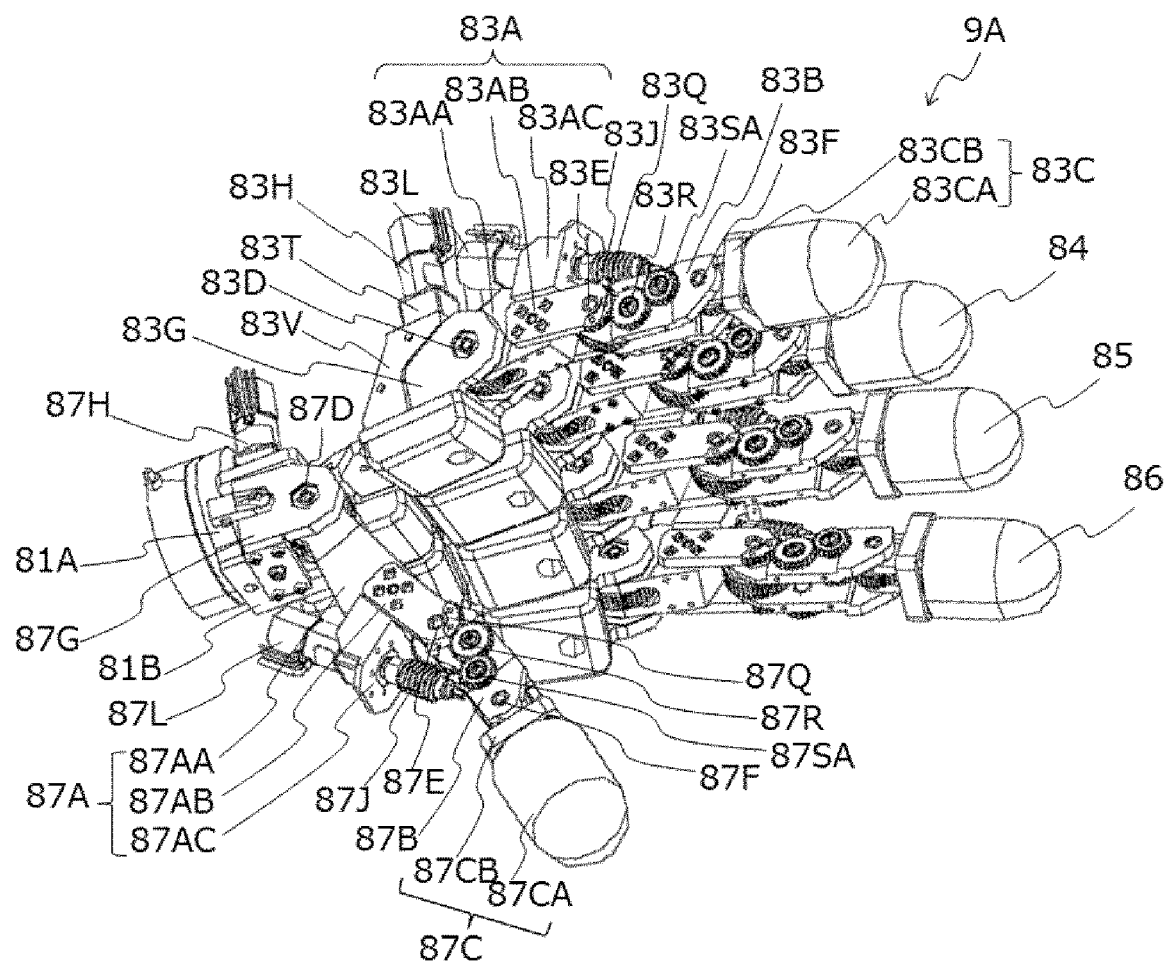
FIG. 96 is a perspective view illustrating the left hand included in the humanoid robot of the fifth embodiment viewing from the palm side.
Figure 97:
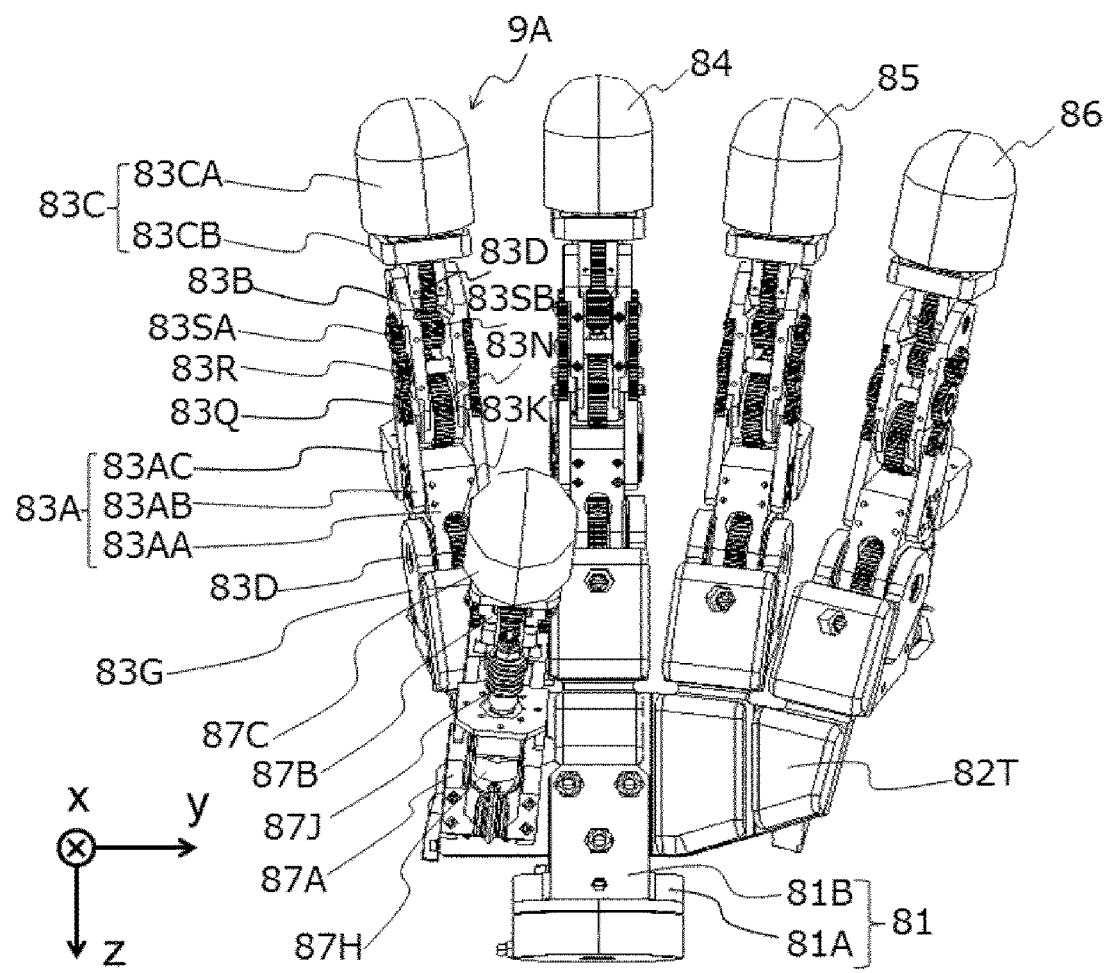
FIG. 97 is a front view illustrating the left hand included in the humanoid robot of the fifth embodiment.
Figure 98:
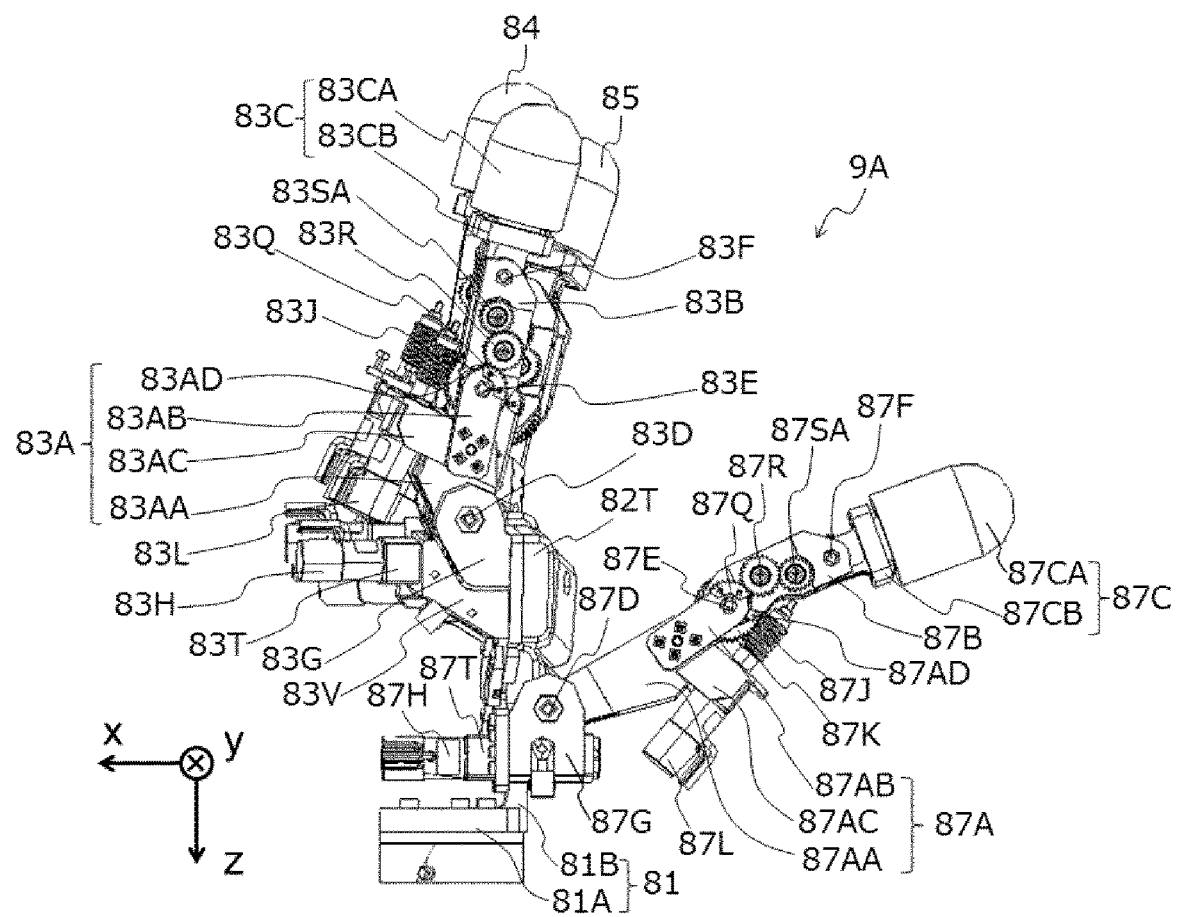
FIG. 98 is a side view illustrating the left hand included in the humanoid robot of the fifth embodiment viewing from the side existing the first finger.
Figure 99:
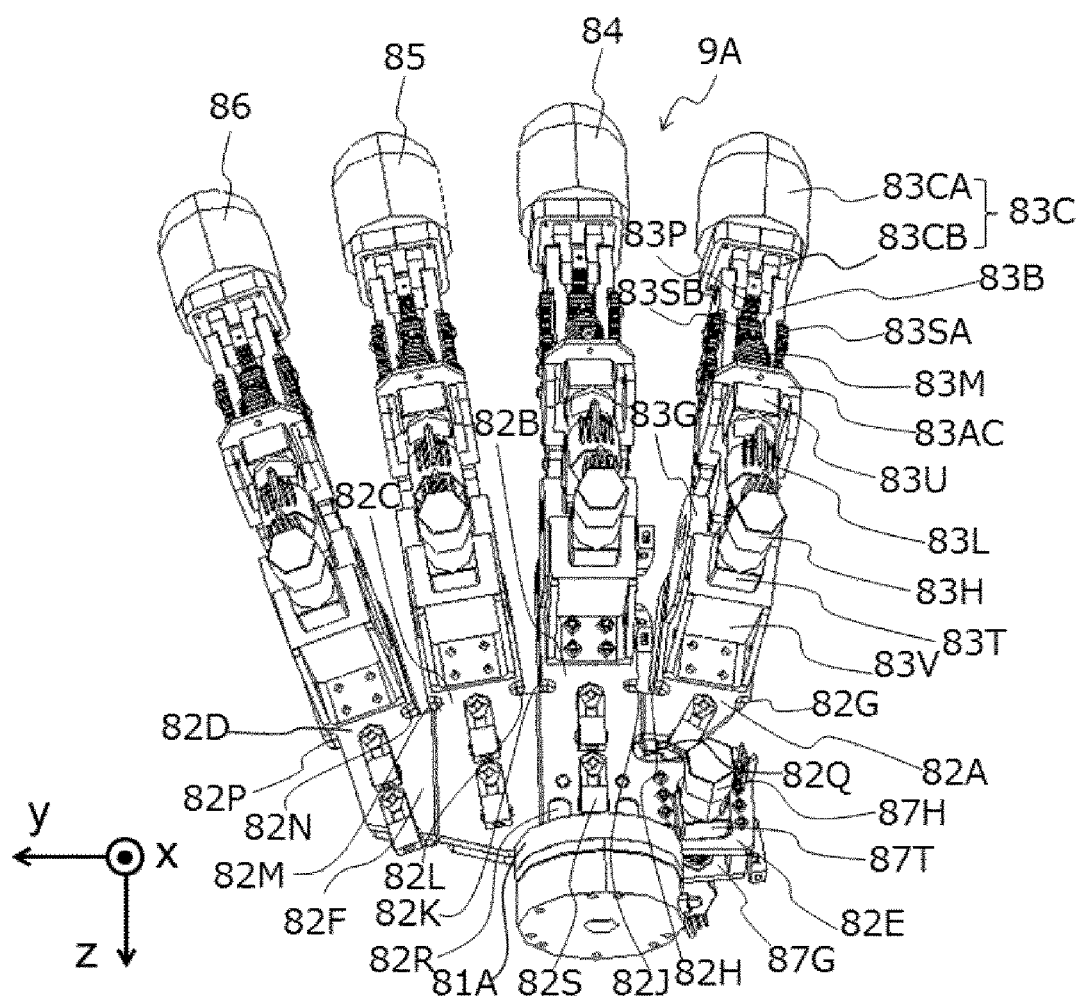
FIG. 99 is a rear view illustrating the left hand included in the humanoid robot of the fifth embodiment.
Figure 100:
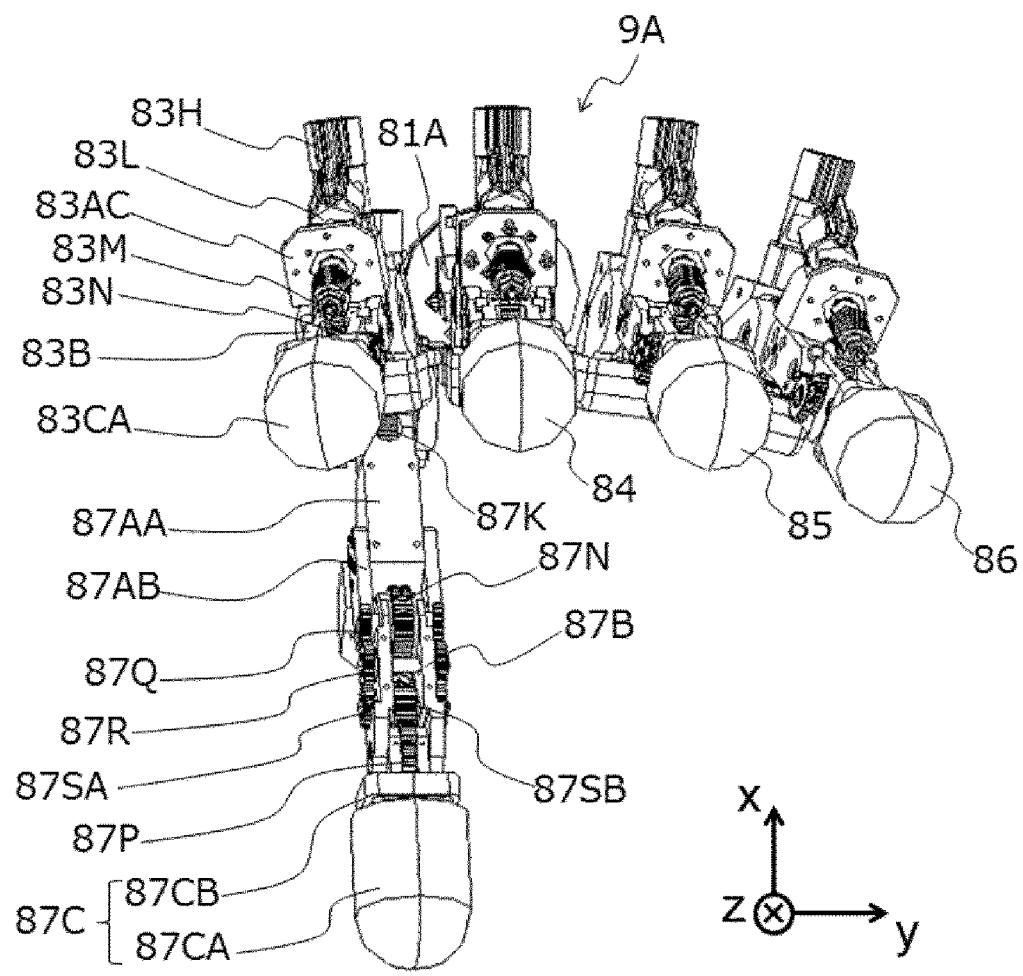
FIG. 100 is a side view illustrating the left hand included in the humanoid robot of the fifth embodiment viewing from the fingertip side.
Figure 101:
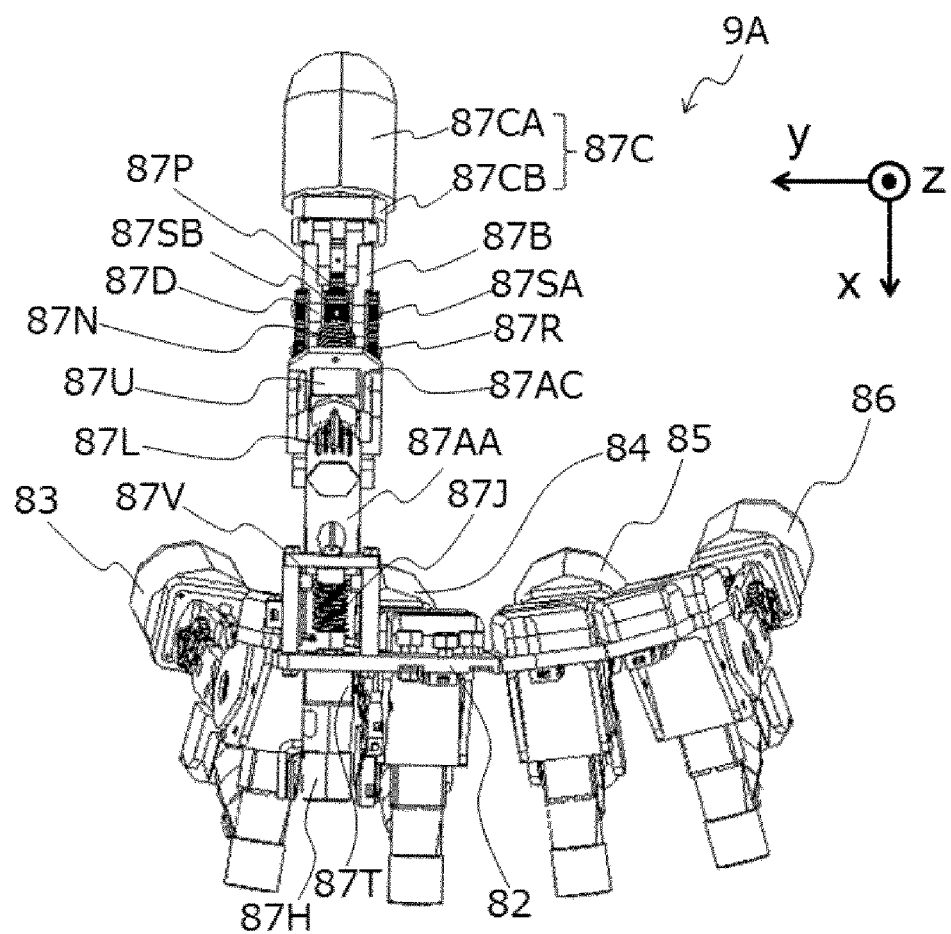
FIG. 101 is a side view illustrating the left hand included in the humanoid robot of the fifth embodiment viewing from the wrist side.
Figure 102:
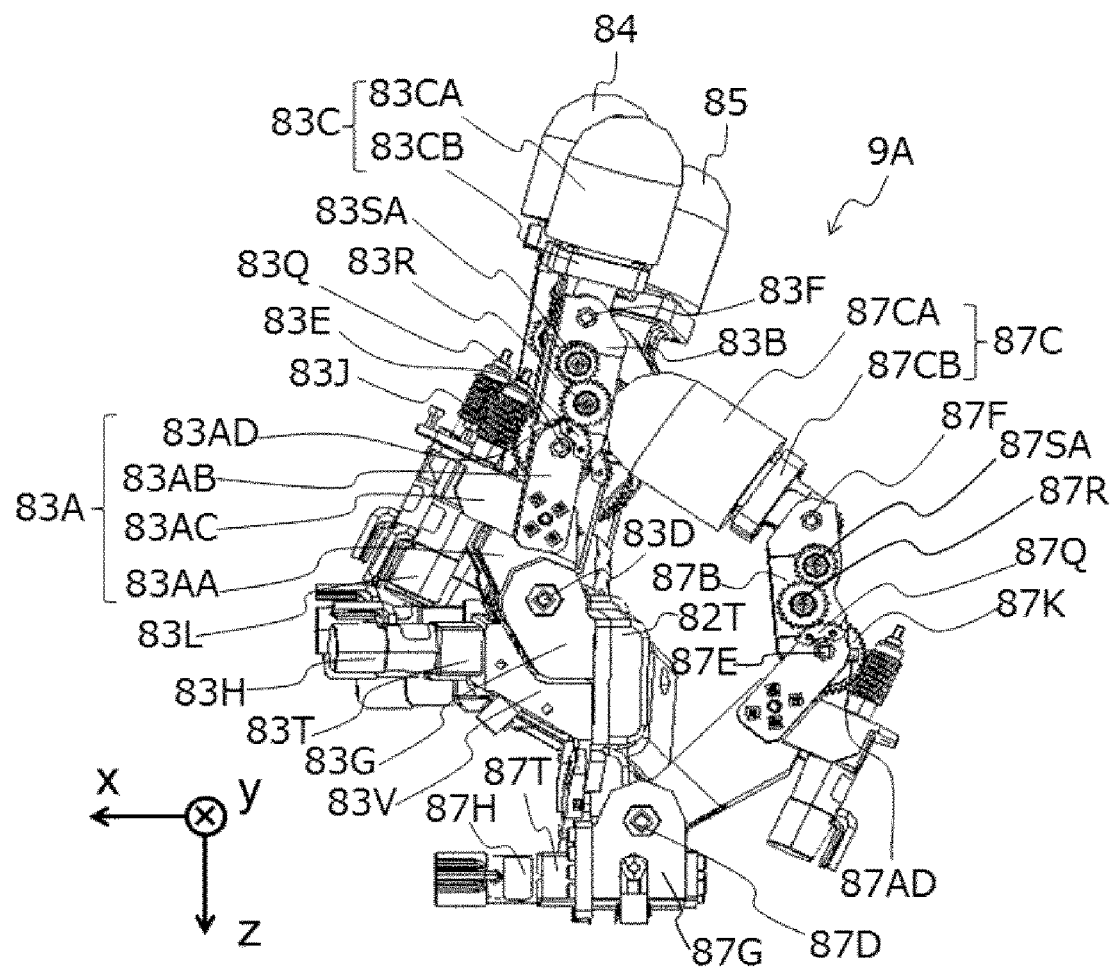
FIG. 102 is a side view illustrating the left hand included in the humanoid robot of the fifth embodiment when an opposed finger of the left hand is bent viewing from the side existing the first finger.

In a fifth embodiment, the humanoid robot includes a hand including an opposed finger that is always opposed to the ordinary fingers instead of the opposable finger. FIG. 95 is a perspective view illustrating a left hand 9A included in a humanoid robot according to the fifth embodiment viewing from the backside of the hand. FIG. 96 is a perspective view illustrating left hand 9A viewing from the palm side. FIGS. 97, 98, and 99 are a front view of left hand 9A, a side view of left hand 9A viewing from the side existing first finger 83, and a rear view, respectively. A view of hand 9A viewed from the palm side is taken as a front view. Left hand 9A is illustrated in the state in which the palm faces the front and first finger 83 to fourth finger 86 are directed upward. FIG. 100 is a side view illustrating left hand 9A viewing from the fingertip side. FIG. 101 is a side view illustrating left hand 9A viewing from the wrist side. FIG. 102 is a side view illustrating left hand 9A viewing from the side existing the first finger when an opposed finger 87 is bent. In FIG. 101, for convenience, left hand 9A is illustrated while a hand attaching tool 81 is omitted.

The structure of hand 9A is described. Hand 9A is attached to wrist plate 91 by hand attaching tool 81. Hand attaching tool 81 is an L-shaped member in the side view. Hand attaching tool 81 includes a circular attaching plate 81A attached to wrist plate 91 and a rectangular palm plate connecting part 81B connected to palm plate 82. Attaching plate 81A and palm plate connecting part 81B are connected to each other at an angle of about 90 degrees. A cylindrical member is sandwiched between hand attaching tool 81 and wrist plate 91. The cylindrical member may not be required to be sandwiched.

Figure 103:
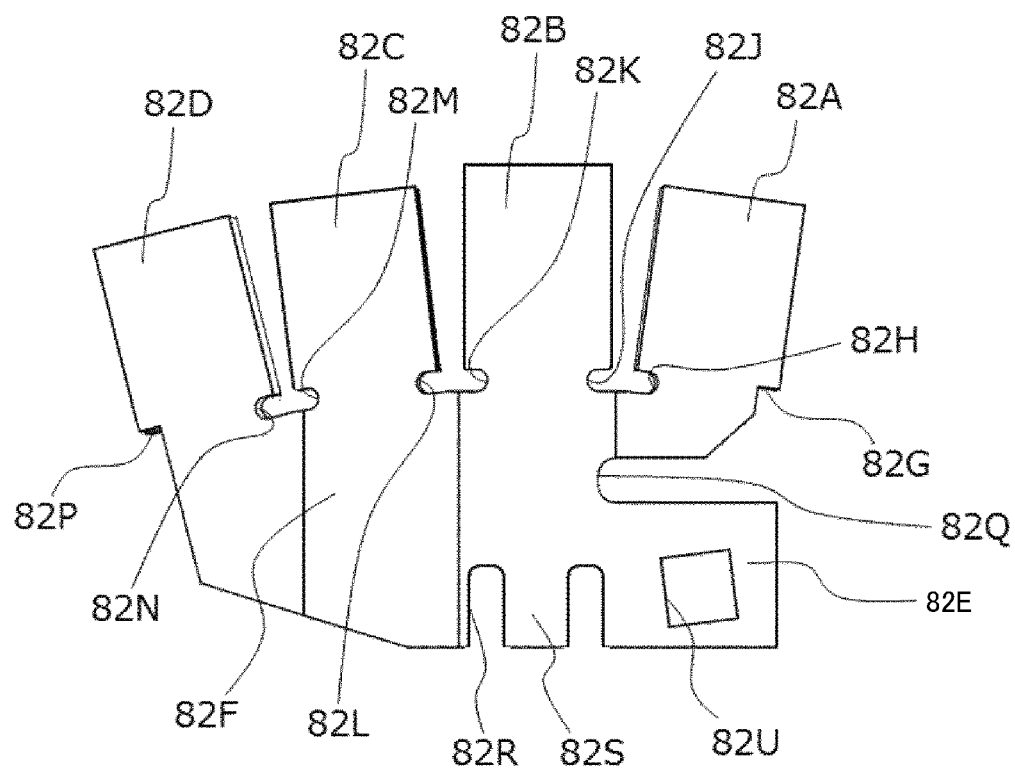
FIG. 103 is a plan view illustrating a palm plate of the left hand included in the humanoid robot of the fifth embodiment.

FIG. 103 is a plan view illustrating the palm plate of the left hand. As illustrated in FIG. 103, in palm plate 82, substantially rectangular portions being attached with first finger 83, second finger 84, third finger 85, fourth finger 86, and opposed finger 87 are referred to as a first finger attaching part 82A, a second finger attaching part 82B, a third finger attaching part 82C, a fourth finger attaching part 82D, and an opposed finger attaching part 82E. Other portions of the palm plate 82 are referred to as a palm plate main body 82F. First finger attaching part 82A, second finger attaching part 82B, third finger attaching part 82C, and fourth finger attaching part 82D are connected to the fingertip side in the fingertip direction of palm plate main body 82F. Opposed finger attaching part 82E exists at a corner of the palm plate 82, the corner exists on the wrist side in the fingertip direction and on the side existing first finger attaching part 82A in the hand breadth direction.

First finger attaching part 82A, second finger attaching part 82B, third finger attaching part 82C, fourth finger attaching part 82D, and opposed finger attaching part 82E are a finger base being provided separately for each finger and being connected with the first dactylus of the finger. Palm plate main body 82F is a main body being connected with the finger bases.

First finger attaching part 82A and second finger attaching part 82B are not connected directly to each other, but are connected to each other through palm plate main body 82F interposed therebetween. Second finger attaching part 82B and third finger attaching part 82C are also connected to each other through palm plate main body 82F interposed therebetween. Third finger attaching part 82C and fourth finger attaching part 82D are also connected to each other through palm plate main body 82F interposed therebetween. First finger attaching part 82A, second finger attaching part 82B, third finger attaching part 82C, and fourth finger attaching part 82D are connected to palm plate main body 82F having spaces between adjacent ones. First finger 83, second finger 84, third finger 85, and fourth finger 86 are attached to the palm plate 82 such that there exists wider space at the fingertip side. For this reason, first finger attaching part 82A, second finger attaching part 82B, third finger attaching part 82C, and fourth finger attaching part 82D are connected to palm plate main body 82F so as to be oriented toward the same directions as first finger 83, second finger 84, third finger 85, and fourth finger 86, respectively.

Between palm plate main body 82F and each of first finger attaching part 82A, second finger attaching part 82B, third finger attaching part 82C, and fourth finger attaching part 82D, a width decreasing portion having a narrowed width in the hand breadth direction orthogonal to the fingertip direction is interposed to connect each of first finger attaching part 82A, second finger attaching part 82B, third finger attaching part 82C, or fourth finger attaching part 82D to palm plate main body 82F. For this reason, a notch or difference in width is provided in places where first finger attaching part 82A, second finger attaching part 82B, third finger attaching part 82C, and fourth finger attaching part 82D are connected to palm plate main body 82F. A difference in width 82G that narrows the width of first finger attaching part 82A is provided in first finger attaching part 82A on the side not existing second finger attaching part 82B. And a semicircular notch 82H is provided in first finger attaching part 82A on the side near second finger attaching part 82B. Semicircular notches 82J, 82K are provided on both sides of second finger attaching part 82B. Semicircular notches 82L, 82M are provided on both sides of third finger attaching part 82C. In fourth finger attaching part 82D, a notch 82N is provided on the side near third finger attaching part 82C, and a difference in width 82P is provided on the side not existing third finger attaching part 82C.

Notches 82H, 82J, 82K, 82L, 82M, 82N have the same shape. Notches 82H, 82J are connected with a straight line. A straight line connects notches 82M, 82N. A straight line connects notches 82K, 82L. Notches 82H, 82J and the straight line connecting notches 82H, 82J may collectively be regarded as a notch provided in palm plate main body 82F. Notches 82K, 82L may be regarded as one notch provided in palm plate main body 82F, and notches 82M, 82N may be regarded as one notch provided in palm plate main body 82F.

The widths in the hand breadth direction of first finger attaching part 82A, second finger attaching part 82B, third finger attaching part 82C, and fourth finger attaching part 82D are the same, and the widths of the width decreasing portions are also the same. The width decreasing portion is the place in which the notch or the difference in width is provided.

When the object is gripped by hand 9A, first finger 83, second finger 84, third finger 85, fourth finger 86, and the opposed finger attaching part 82E are appropriately bent. This is because that first finger attaching part 82A, second finger attaching part 82B, third finger attaching part 82C, fourth finger attaching part 82D, and opposed finger attaching part 82E are provided separately from one another. This is also because first finger attaching part 82A, second finger attaching part 82B, third finger attaching part 82C, and fourth finger attaching part 82D are connected to palm plate main body 82F with the width decreasing portion interposed therebetween.

A notch 82Q that separates opposed finger attaching part 82E and first finger attaching part 82A is provided in palm plate 82 on the side existing first finger 83. Notch 82Q is formed to have a side parallel to a wrist-side outline on the side of opposed finger attaching part 82E. However, on the side of first finger attaching part 82A, notch 82Q is formed to have a straight portion in which the interval is narrowed toward the inside and a portion parallel to opposed finger attaching part 82E on the side of first finger attaching part 82A. Notch 82K has a semicircular shape in the portion farthest from the end in the hand breadth direction. A through-hole 82U to be inserted by first worm 87J is provided in opposed finger attaching part 82E. In FIG. 103, a hole or the like used to attach the member to the palm plate 82 is omitted.

Two notches 82R are provided in a place of palm plate main body 82F to which palm plate connecting part 81B is attached. Palm plate main body 82F sandwiched between two notches 82R is referred to as a wrist attaching part 82S. Palm plate connecting part 81B is screwed to wrist attaching part 82S by a single screw, and screwed to palm plate main body 82F on the fingertip side of two notches 82R by a single screw. Wrist attaching part 82S is narrow because wrist attaching part 82S is sandwiched between notches 82R. Hand 9A is attached to wrist plate 91 with wrist attaching part 82S interposed therebetween, so that hand 9A can appropriately be rotated around the axis directed toward the fingertip direction.

Palm plate main body 82F is bent, and three straight lines are formed on palm plate main body 82F by bending. One ordinary finger is connected to each bent portion. Consequently, the bent portions to which first finger attaching part 82A, second finger attaching part 82B, third finger attaching part 82C, and fourth finger attaching part 82D are connected have different angles. Each bent angle at a bending place is about 6 degrees. By bending palm plate 82, it becomes easier to grip the object to be enfolded by palm plate 82 compared with the case that palm plate 82 is not bent. The direction of the line generated at three bending places is the direction substantially parallel to the fingertip direction.

A plurality of palm fleshes 82T are provided on the palm side of palm plate 82. The shape of palm flesh 82T is a rectangular parallelepiped in which corners and edges on the side far from palm plate 82 are chamfered. Palm flesh 82T acts as a cushion that relieves a load applied from palm plate 82 to the object when the object is gripped. Palm flesh 82T is made of a material, such as rubber, which has moderate elasticity.

One palm flesh 82T is provided in each of first finger attaching part 82A, second finger attaching part 82B, third finger attaching part 82C, fourth finger attaching part 82D, and opposed finger attaching part 82E. Three palm fleshes 82T are provided for each bent portion in palm plate main body 82F. Palm flesh 82T is not provided in palm plate main body 82F in the portion in which the opposed finger 87 exists.

First finger 83, second finger 84, third finger 85, and fourth finger 86, which are the four ordinary fingers, are connected to palm plate 82 such that there exists wider space at the fingertip side as compared with the base side. As can be seen from FIG. 99, second finger 84 is perpendicular to attaching plate 81A, and the center of second finger 84 and the center of attaching plate 81A are matched with each other. First finger 83, second finger 84, third finger 85, and fourth finger 86 have the same structure.

The structure of opposed finger 87 in which hand 9A differs largely from hand 9 is described. Opposed finger 87 is provided on the palm side of palm plate 82 such that the fingertip extends in the direction intersecting palm plate 82. Opposed finger 87 is provided so as to face first finger 83 to fourth finger 86. Opposed finger 87 is provided at a position on the wrist side and close to the corner on the side existing first finger 83 of palm plate 82. The direction in which opposed finger 87 rotates is the direction intersecting first finger 83 and second finger 84. As illustrated in FIG. 97, when the angle between opposed finger 87, being extended, and palm plate 82 is decreased, the fingertip moves in the direction approaching second finger 84.

Similarly to first finger 83 and other fingers, in opposed finger 87, a first dactylus 87A, a second dactylus 87B, and a third dactylus 87C are connected in series from the side close to palm plate 82. A first finger joint 87D exists between palm plate 82 and first dactylus 87A. First finger joint 87D connects first dactylus 87A rotatably to palm plate 82. A second finger joint 87E exists between first dactylus 87A and second dactylus 87B. Second finger joint 87E connects second dactylus 87B rotatably to first dactylus 87A. A third finger joint 87F exists between second dactylus 87B and third dactylus 87C. Third finger joint 87F connects third dactylus 87C rotatably to second dactylus 87B. The rotation axes of first finger joint 87D, second finger joint 87E, and third finger joint 87F are parallel to one another. That is, in the opposed finger 87, the direction in which first finger joint 87D rotates first dactylus 87A, the direction in which second finger joint 87E rotates second dactylus 87B, and the direction in which third finger joint 87F rotate third dactylus 8CB are identical to one another. Opposed finger 87 is always located at the position opposed to first finger 83 to fourth finger 86, and opposed finger 87 includes three finger joints, so that hand 9A can more properly grip the object as compared with hand 9.

Regarding the adjacent two of palm plate 82, first dactylus 87A, second dactylus 87B, and third dactylus 87C, one member provided on the side close to palm plate 82 is referred to as a base-side member, and the other member provided on the side not existing the base-side member is referred to as a tip-side member. First finger joint 87D, second finger joint 87E, and third finger joint 87F are three finger joints that connect the tip-side member that is any one of first dactylus 87A, second dactylus 87B, and third dactylus 87C rotatably to the base-side member. The same holds true for first finger 83, second finger 84, third finger 85, and fourth finger 86.

Opposed finger 87 cannot be moved in the hand breadth direction. That is, unlike hand 9 in FIGS. 72 to 78, opposed finger 87 cannot move to the position near the side of palm plate 82 and cannot orient the fingertip toward the substantially same direction as first finger 83 to fourth finger 86. When one finger joint and one motor are further added to opposed finger 87, opposed finger 87 can also be moved in the hand breadth direction. In hand 9A, the number of finger joints and the number of motors are the same as those of hand 9.

A finger first motor 87H being a power source for rotating first finger joint 87D of opposed finger 87 is perpendicularly fixed to the backside of palm plate 82. A first gear head 87T for converting a rotation speed is provided on the rotation shaft side of finger first motor 87H. An outer shape of first gear head 87T is a quadrangular prism shape. First gear head 87T and finger first motor 87H are fixed so as not to move with respect to each other. First gear head 87T is perpendicularly fixed to palm plate 82. Finger first motor 87H and first gear head 87T can be fixed to palm plate 82 with high rigidity by perpendicularly fixing first gear head 87T.

A second gear head 87U is also fixed to a finger second motor 87L. The outer shape of second gear head 87U is also the quadrangular prism shape. The first gear head or the second gear head of other fingers is also fixed to the finger first motor or the finger second motor.

Portion of opposed finger 87 on the fingertip side from a finger base yoke 87G exists on the palm side of palm plate 82. At a position corresponding to first worm 87J, through-hole 82U is provided in palm plate 82. First worm 87J connected directly to the rotation shaft of finger first motor 87H meshes with and rotates first worm wheel 87K supported rotatably by finger base yoke 87G on the palm side.

In first finger joint 87D, a worm gear mechanism rotates first dactylus 87A with respect to palm plate 82. The worm gear mechanism includes finger first motor 87H disposed in palm plate 82, first worm 87J rotated by finger first motor 87H, and first worm wheel 87K meshing with first worm 87J and rotating around the rotation axis of first finger joint 87D.

When opposed finger 87 grips the object with large force, the force rotating first worm wheel 87K also becomes large as reaction. Finger first motor 87H generates force to prevent first worm wheel 87K from rotating. Unless the finger first motor 87H is firmly fixed to palm plate 82, finger first motor 87H and first gear head 87T are peeled off from palm plate 82 due to the force rotating first worm wheel 87K. Making finger first motor 87H and first gear head 87T perpendicular to palm plate 82 causes easily to generate force against force separating finger first motor 87H from palm plate 82.

First dactylus 87A is constructed with a first wheel linked part 87AA, a first yoke 87AB, and a second motor installation part 87AC. First wheel linked part 87AA is a box-shaped member that sandwiches first worm wheel 87K and rotates together with first worm wheel 87K. First yoke 87AB is a member that sandwiches and holds the rotation shaft of second finger joint 87E. The length of first wheel linked part 87AA is set to an extent that opposed finger 87 can sandwich the object with the fingertip of the ordinary finger.

Finger second motor 87L is installed in second motor installation part 87AC. Second motor installation part 87AC is a member existing on the wrist side and contacting with first yoke 87AB. First wheel linked part 87AA and second motor installation part 87AC are integrally manufactured. First wheel linked part 87AA is a polygon in which the side existing second finger joint 87E is wider viewing from the side existing opposed finger 87. First yoke 87AB being two plate materials are screwed to first wheel linked part 87AA on the side existing second finger joint 87E. Protrusions 87AD are provided at the tip of first yoke 87AB. Protrusions 87AD are stoppers that restrict the rotation of second finger joint 87E toward the backside of the hand to an allowable rotation angle.

Second motor installation part 87AC includes a motor installation surface perpendicular to first yoke 87AB, sides having a distance wider than first yoke 87AB and being parallel to first yoke 87AB, and a bottom connected to first wheel linked part 87AA. The sides are lower than the motor installation surface, and the corners of the sides on the finger base side are largely chamfered. The upper corners of the motor installation surface are also chamfered. Finger second motor 87L and second gear head 87U are vertically fixed in the motor installation surface. A through-hole is made in the motor installation surface, and the rotation shaft of second gear head 87U is inserted in the through hole.

A second worm 87M is attached to the rotation shaft of finger second motor 87L. Second worm 87M meshes with a second worm wheel 87N held rotatably by first yoke 87AB. Since the worm gear mechanism constructed with second worm 87M and second worm wheel 87N is used, second dactylus 87B is rotated around finger joint 87E, being the rotation axis, with respect to first dactylus 87A by rotation of finger second motor 87L.

Second dactylus 87B sandwiches and holds second worm wheel 87N, and rotates together with second worm wheel 87N. Second dactylus 87B is two plate materials. The rotation shaft of third finger joint 87F is provided at the end of second dactylus 87B on the side existing third dactylus 87C. Two plate materials included in second dactylus 87B have a constant thickness. Second dactylus 87B has a portion that sandwiches second worm wheel 87N and is sandwiched by first yoke 87AB, an intermediate portion, and a portion in which third finger joint 87F is provided. And second dactylus 87B is formed into a shape having different widths with a small difference. The distance between two plate materials included in second dactylus 87B is narrow on the side existing second finger joint 87E, and is wide on the side existing third finger joint 87F. The side surfaces of stoppers 87AD provided at the tip of first yoke 87AB contact with the portion sandwiched by first yoke 87AB. When stoppers 87AD abut on the difference in width of second dactylus 87B existing between the intermediate portion and the portion sandwiched by first yoke 87AB, the angle at which second finger joint 87E rotates onto the side opposite to the palm is restricted.

In second finger joint 87E, a worm gear mechanism rotates second dactylus 87B with respect to first dactylus 87A. The worm gear mechanism includes finger second motor 87L disposed on first dactylus 87A, second worm 87M rotated by finger second motor 87L, and second worm wheel 87N that meshes with second worm 87M to rotate around the rotation axis of second finger joint 87E together with second dactylus 87B.

Figure 104:
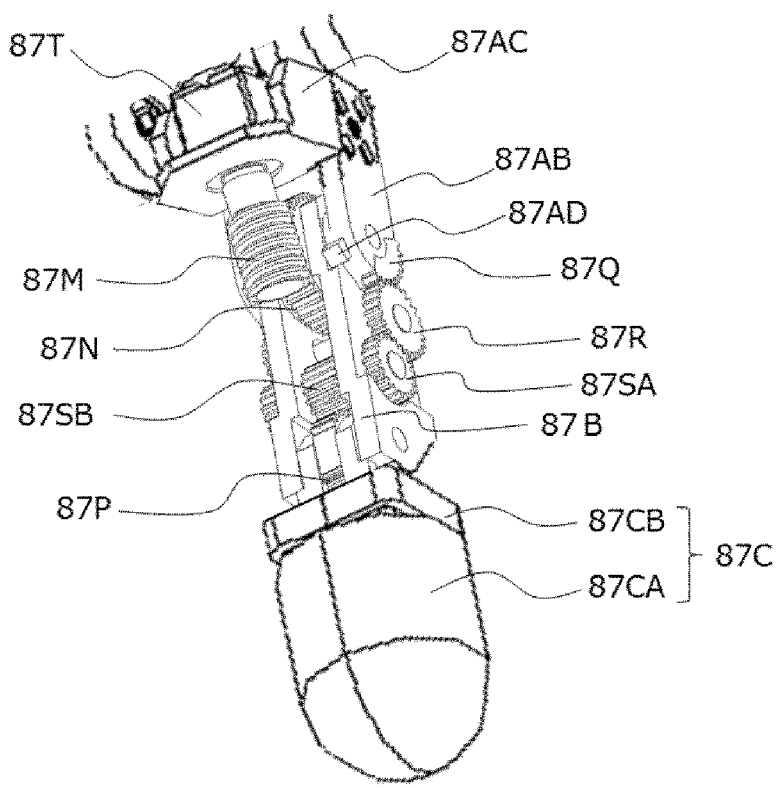
FIG. 104 is an enlarged perspective view illustrating a vicinity of the second dactylus of the opposed finger of the left hand included in the humanoid robot of the fifth embodiment.

Referring to FIG. 104, the gear that rotates third finger joint 87F in conjunction with second finger joint 87E is described. FIG. 104 is an enlarged perspective view illustrating the vicinity of second dactylus 87B of opposed finger 87. A plurality of gears that rotate third finger joint 87F in conjunction with the rotation of second finger joint 87E are provided in second dactylus 87B. An idler gear 87R existing outside second dactylus 87B meshes with a partial gear 87Q provided at the tip of first yoke 87AB. The pair of idler gear 87R and partial gear 87Q exists on both sides of second dactylus 87B. Idler gear 87R meshing with partial gear 87Q rotates in the same rotation direction as second worm wheel 87N. Idler gear 87R meshes with an outer-idler gear 87SA on the fingertip side. On the rotation shaft of outer-idler gear 87SA, an inner-idler gear 87SB is fixed by being sandwiched by second dactylus 87B. Outer-idler gear 87SA and inner-idler gear 87SB rotate in the opposite direction to idler gear 87R. Outer-idler gear 87SA and inner-idler gear 87SB rotate around the same rotation axis. Inner-idler gear 87SB meshes with a third dactylus drive gear 87P that rotates around the rotation axis of third finger joint 87F together with third dactylus 87AC. Third dactylus drive gear 87P rotates in the opposite direction to inner-idler gear 87SB. Third dactylus drive gear 87P rotates in the same direction as second worm wheel 87N. A gear ratio between second worm wheel 87N and third dactylus drive gear 87P is adjusted so as to become an appropriate value close to 1.

Idler gear 87R is a gear that rotates in conjunction with the rotation of second finger joint 87B. Outer-idler gear 87SA (including inner-idler gear 87SB) is one of a plurality of gears that rotates on an odd-numbered rotation shafts driven by idler gear 87R. Third dactylus drive gear 87P is a gear provided in third finger joint 87F driven by inner-idler gear 87SB.

Third dactylus 87C is constructed with a fingertip 87CA and a fingertip base 87CB. Fingertip 87CA has a shape in which a hemisphere is connected to the tip of the cylinder. Fingertip base 87CB is a member that rotates together with third dactylus drive gear 87P. A rectangular-plate-shaped member having a rounded corner is provided on the fingertip side of fingertip base 87CB. Fingertip 87CA is attached to this plate-shaped member. Consequently, fingertip 87CA can easily be replaced with a fingertip having a shape that conforms to the application.

In first finger 83, all members, including a finger first motor 83H, exist on the backside of the hand. Finger first motor 83H is attached to a first motor fixing unit 83V. First motor fixing unit 83V is a rectangular parallelepiped box. First motor fixing unit 83V is attached to first finger attaching part 82A. In first motor fixing unit 83V, the fingertip side and the side near first finger attaching part 82A are open. Ribs are provided on the finger base side for the purpose of reinforcement, and the side near the finger base side of first motor fixing unit 83V is seen obliquely when viewed from the side. First motor fixing unit 83V is perpendicular to palm plate 82B, and finger first motor 83H and a first gear head 83T are attached to the surface parallel to palm plate 82B. A first worm 83J attached to the rotation shaft of first gear head 83T is inserted between first motor fixing unit 83V and palm plate 82B.

Finger first motor 83H and first motor fixing unit 83V can be fixed with increased rigidity by fixing finger first motor 83H perpendicularly to first motor fixing unit 83V.

First worm 83J meshes with first worm wheel 83K that rotates around the rotation axis held by finger base yoke 83G. First dactylus 83A rotates around first finger joint 83D together with first worm wheel 83K.

The structure on the fingertip side from first dactylus 83A is the same as opposed finger 87. First wheel linked part 83AA is shorter than first wheel linked part 87AA of opposed finger 87.

The structures of second finger 84, third finger 85, and fourth finger 86 are the same as first finger 83.

The motion is described. In hand 9A, the motor is driven such that the first finger joint and the second finger joint of each finger are set to the designated angle, and such that the worm gear of each finger joint is located at the position corresponding to the designated angle.

Each finger joint is driven by a worm gear mechanism in which a worm and a worm wheel are used, so that strong force to bend the finger can be generated. Each of the first finger joint and the second finger joint are driven by the worm gear mechanism, so that only one or both of the first finger joint and the second finger joint can be bent. When the electric power supply is interrupted, gripping force can be maintained by the worm gear mechanism.

In addition to first finger joint 87D, opposed finger 87 also includes second finger joint 87E and third finger joint 87F, which have the rotation axis parallel to first finger joint 87D, so that the object can be held by bending second finger joint 87E as illustrated in FIG. 102. Hand 9A can hold a thin object such as paper with opposed finger 87 in the state in that only first finger joint 87D is bent, and second finger joint 87E and third finger joint 87F are extended.

In hand 9, first worm 93J protrudes to the side of palm plate 92 from first dactylus 93A. On the other hand, in hand 9A, first worm 83J exists on the backside of the hand. In first finger 83, first dactylus 83A, second dactylus 83B, and third dactylus 83C face palm plate 92. In holding the object between first finger 83 or other first dactyli and palm plate 92, a member that prevents first worm 83J or the like from coming into contact with the object is not necessary, and the structure of hand 9A is simplified as compared with hand 9.

First finger 83, second finger 84, third finger 85, and fourth finger 86 have the same structure. However, the structure may be changed depending on the fingers. In all the finger joints including the worm gear mechanism, the worm driven by the motor is made perpendicular to the base-side member. Alternatively, at least one worm gear mechanism of at least one finger may be made perpendicular to the base-side member.

The opposed finger including the three finger joints may be rotatable in the hand breadth direction with respect to the palm plate like the opposable finger.

The above is also applied to other embodiments.

Sixth Embodiment

Figure 105:
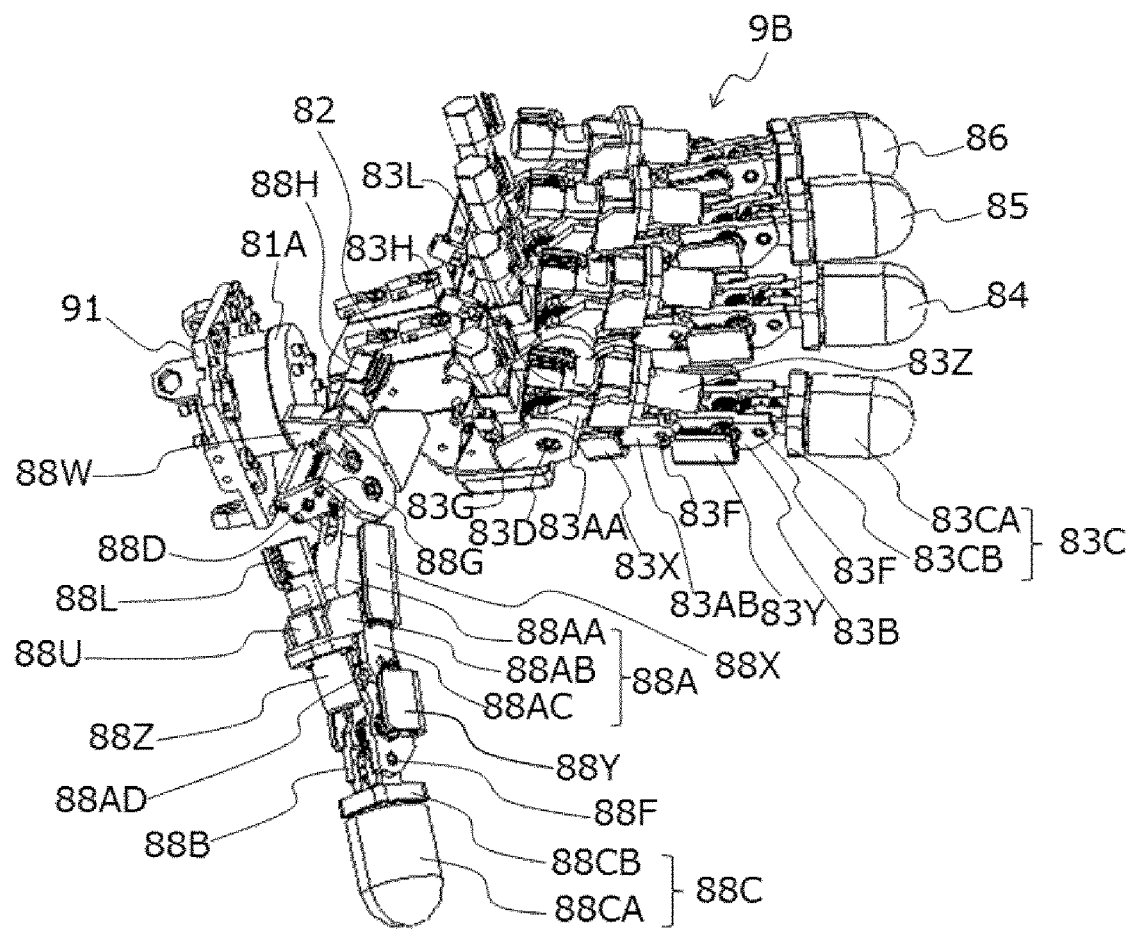
FIG. 105 is a perspective view illustrating a left hand included in a humanoid robot according to a sixth embodiment of the present disclosure when a hand breadth rotation finger extends viewing from the backside of the hand.
Figure 106:
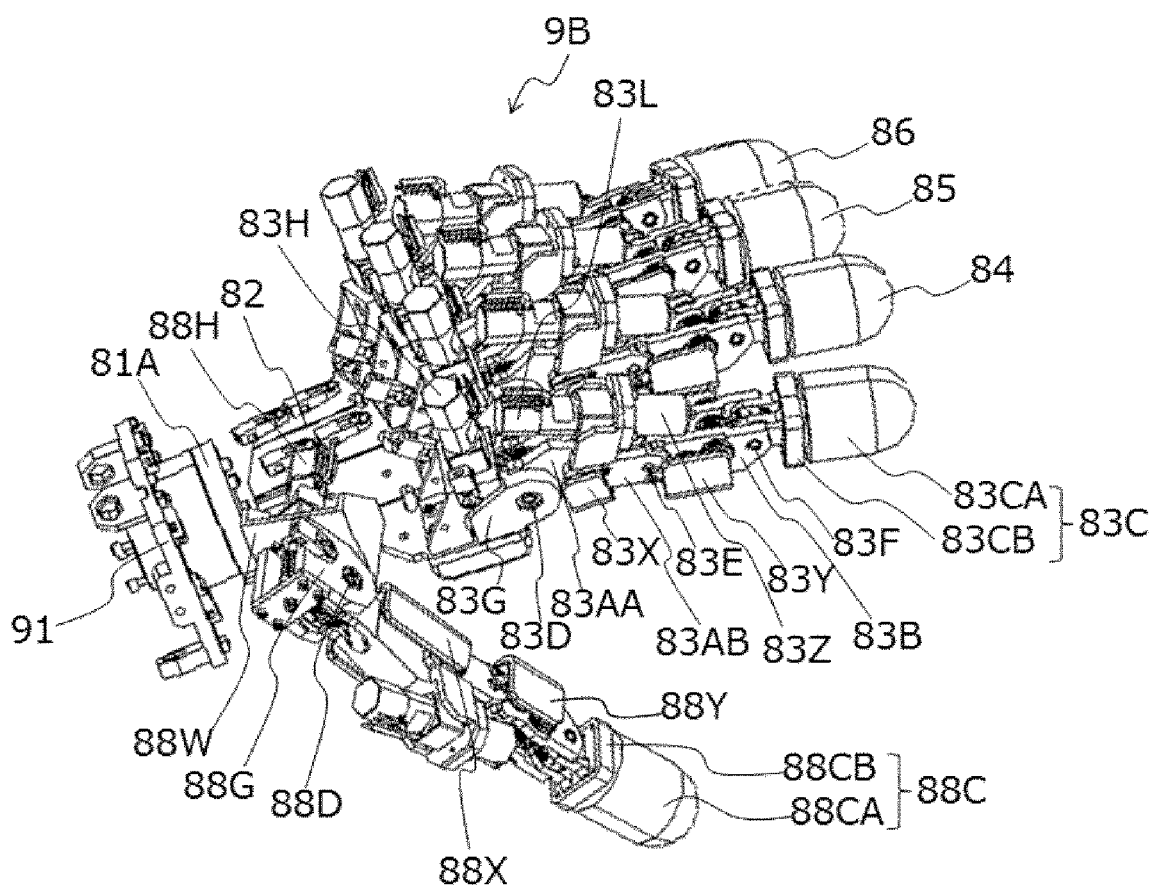
FIG. 106 is a perspective view illustrating the left hand included in the humanoid robot of the sixth embodiment when the hand breadth rotation finger is directed in the direction intersecting the palm plate viewing from the backside of the hand.
Figure 107:
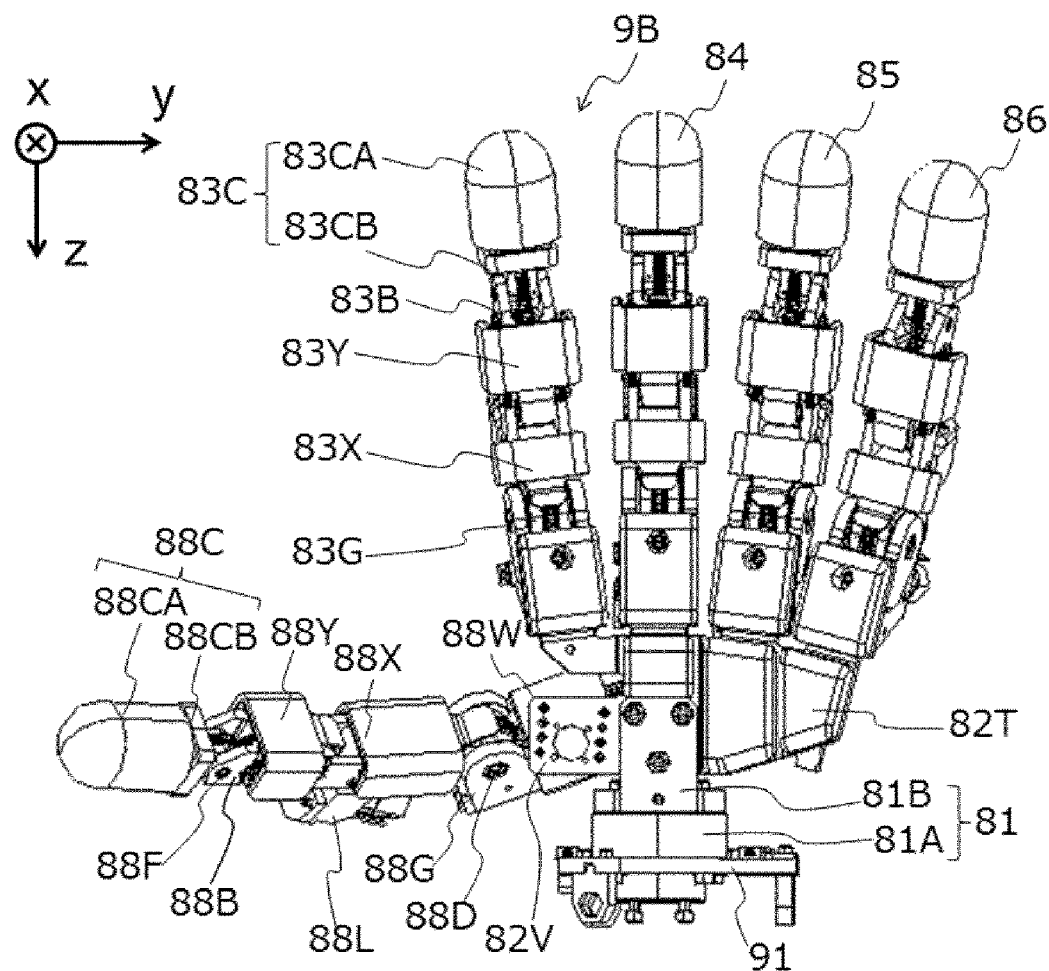
FIG. 107 is a front view illustrating the left hand included in the humanoid robot of the sixth embodiment when the hand breadth rotation finger extends.
Figure 108:
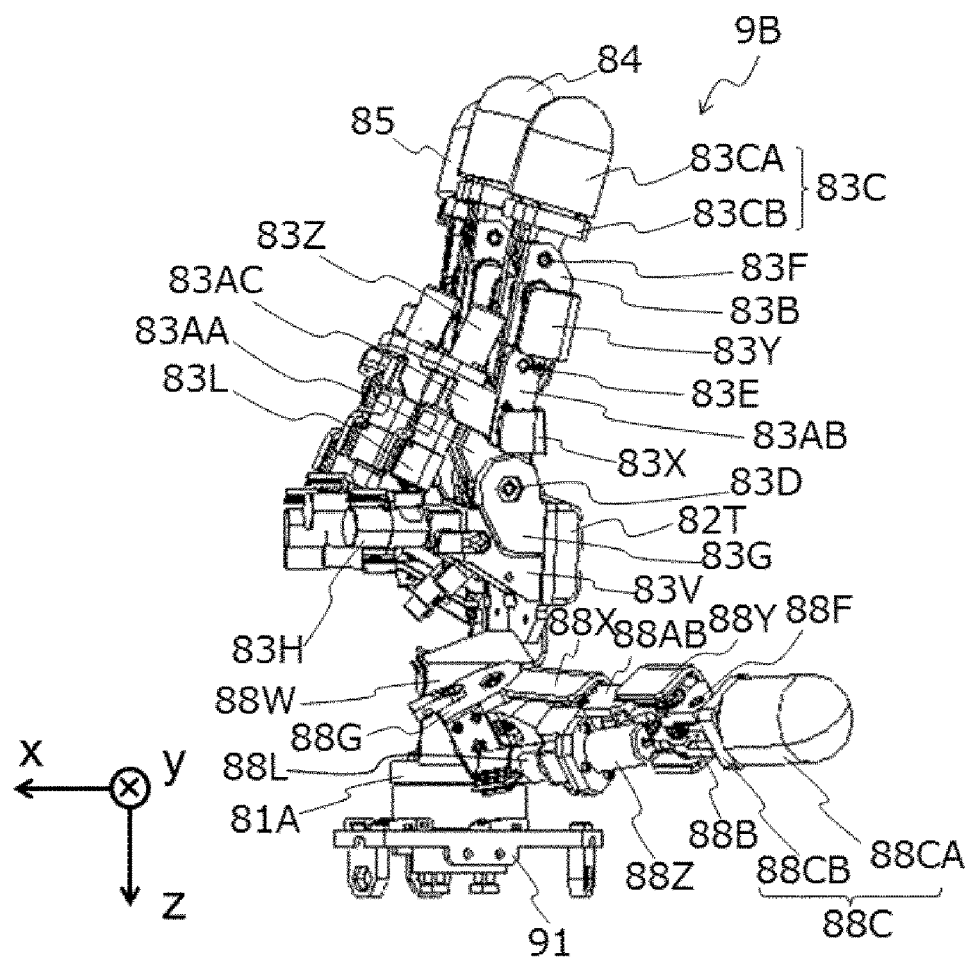
FIG. 108 is a side view illustrating the left hand included in the humanoid robot of the sixth embodiment when the hand breadth rotation finger extends viewing from the side existing the first finger.
Figure 109:
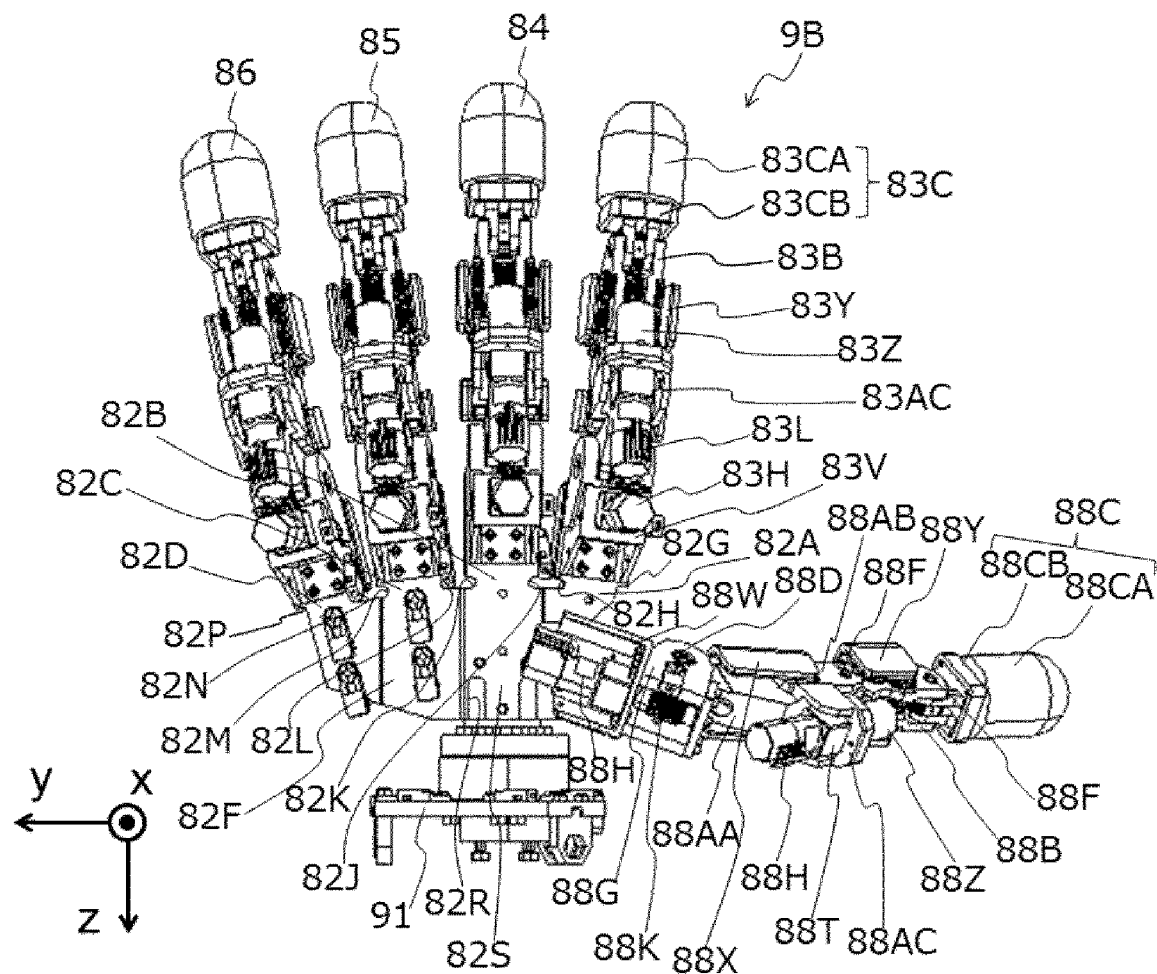
FIG. 109 is a rear view illustrating the left hand included in the humanoid robot of the sixth embodiment when the hand breadth rotation finger extends.
Figure 110:
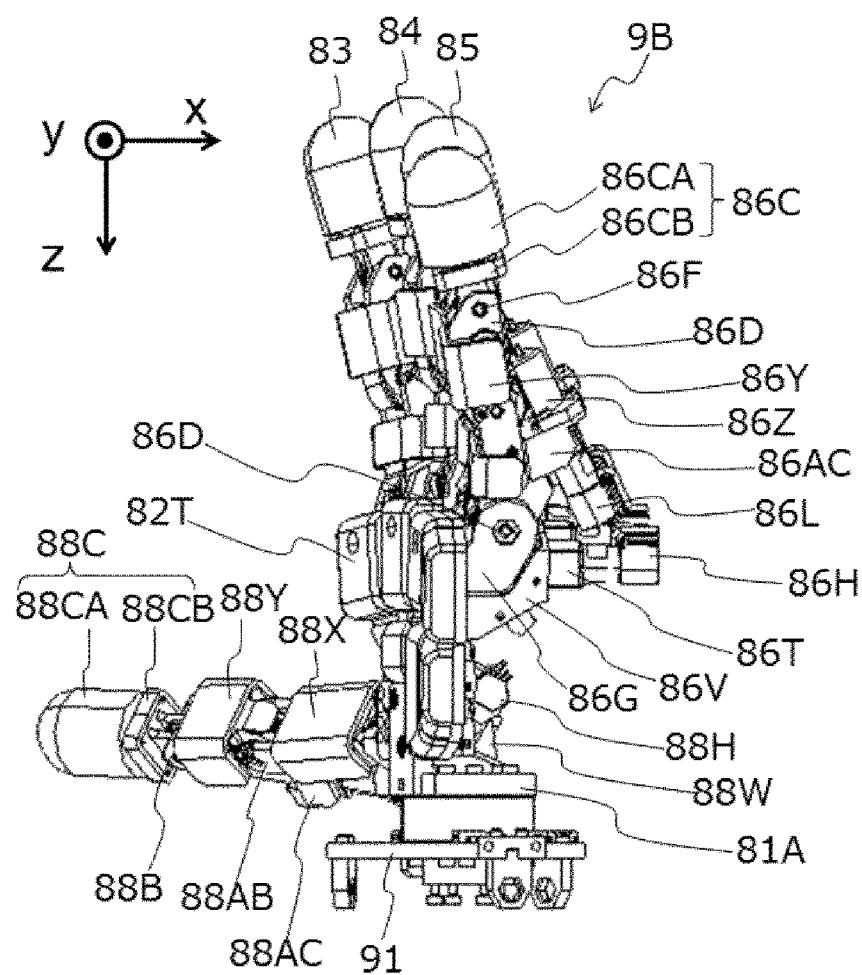
FIG. 110 is a side view illustrating the left hand included in the humanoid robot of the sixth embodiment when the hand breadth rotation finger extends viewing from the side existing the fourth finger.
Figure 111:
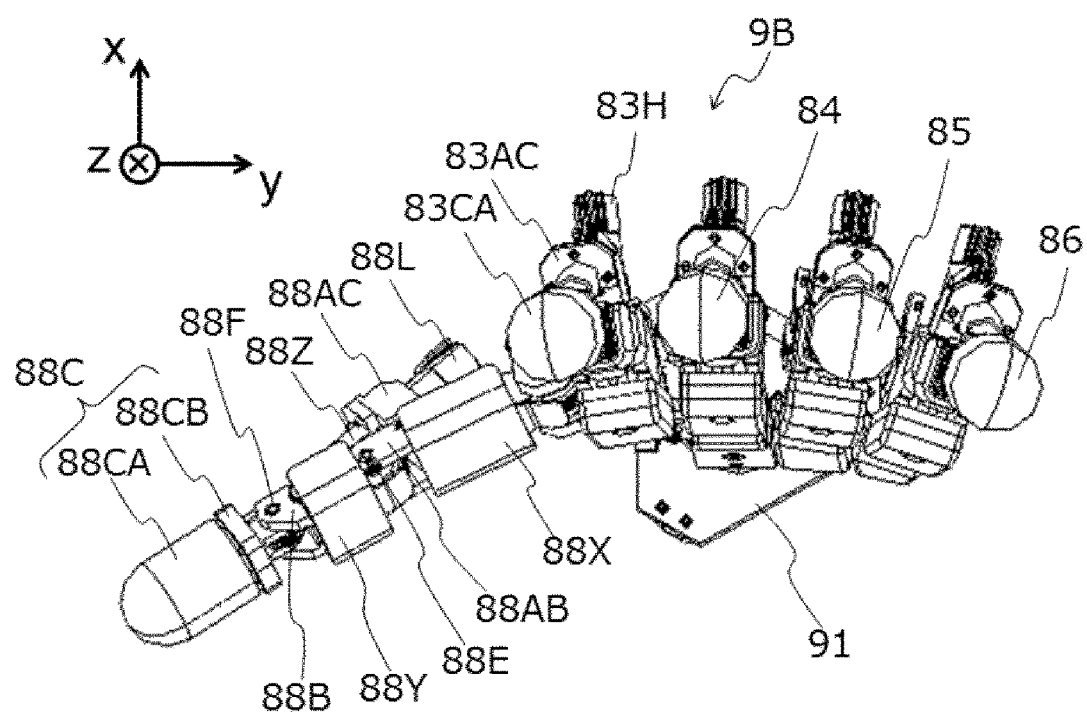
FIG. 111 is a side view illustrating the left hand included in the humanoid robot of the sixth embodiment when the hand breadth rotation finger extends viewing from the fingertip side.
Figure 112:
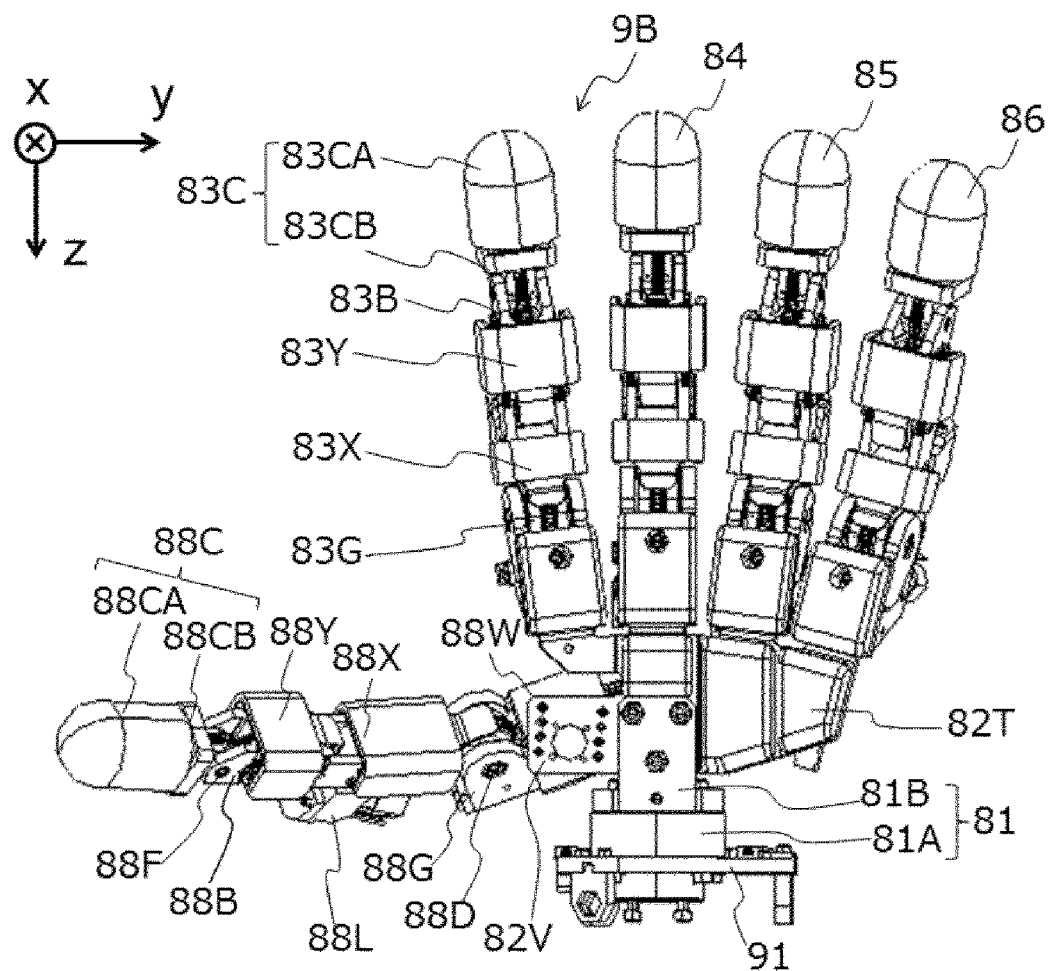
FIG. 112 is a front view illustrating the left hand included in the humanoid robot of the sixth embodiment when the hand breadth rotation finger is directed in the direction intersecting the palm plate.
Figure 113:
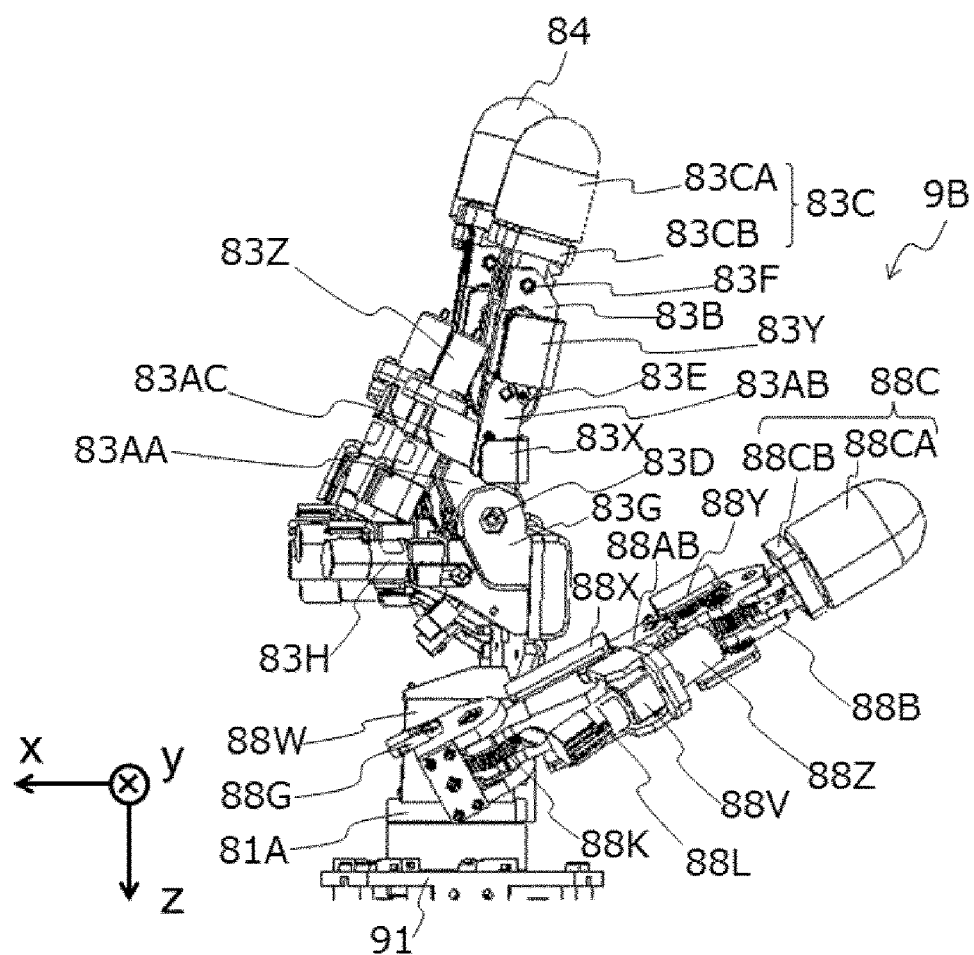
FIG. 113 is a side view illustrating the left hand included in the humanoid robot of the sixth embodiment when the hand breadth rotation finger is directed in the direction intersecting the palm plate viewing from the side existing first finger.
Figure 114:
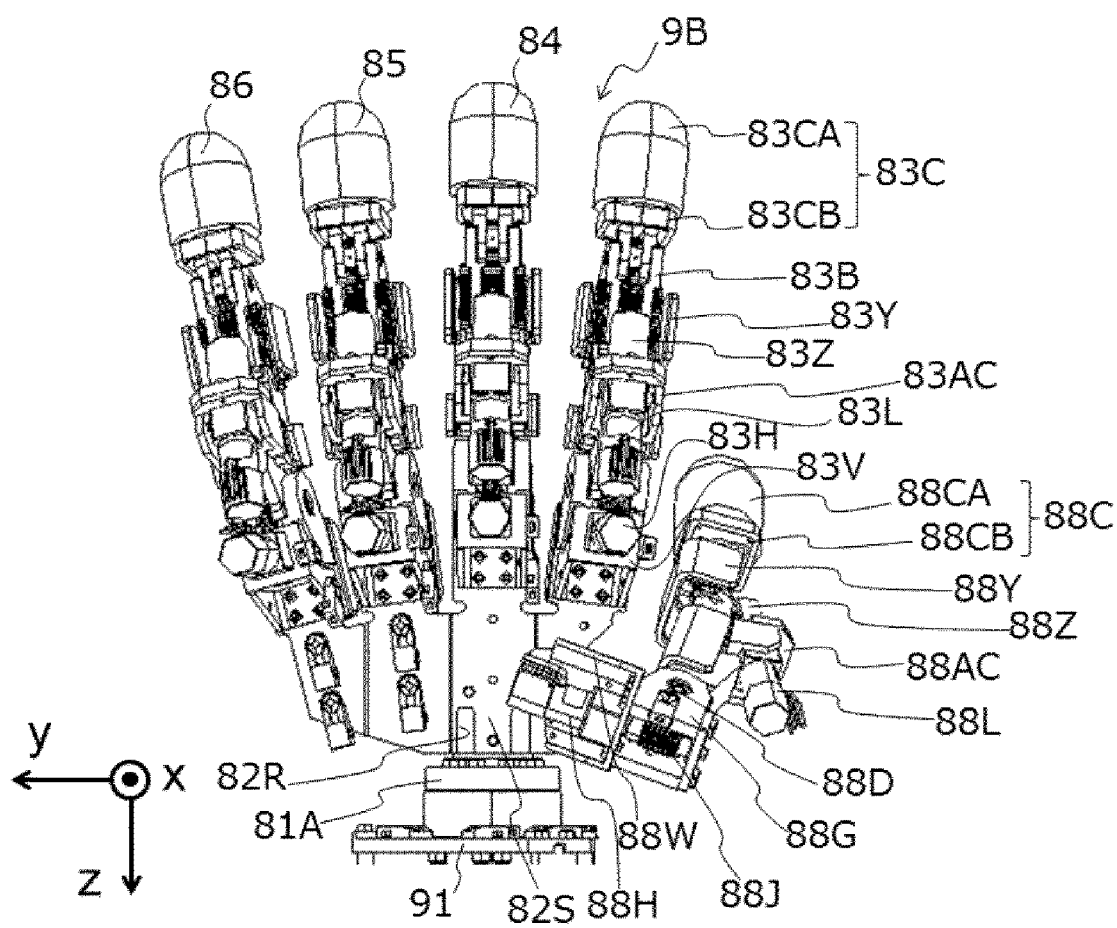
FIG. 114 is a rear view illustrating the left hand included in the humanoid robot of the sixth embodiment when the hand breadth rotation finger is directed in the direction intersecting the palm plate.
Figure 115:
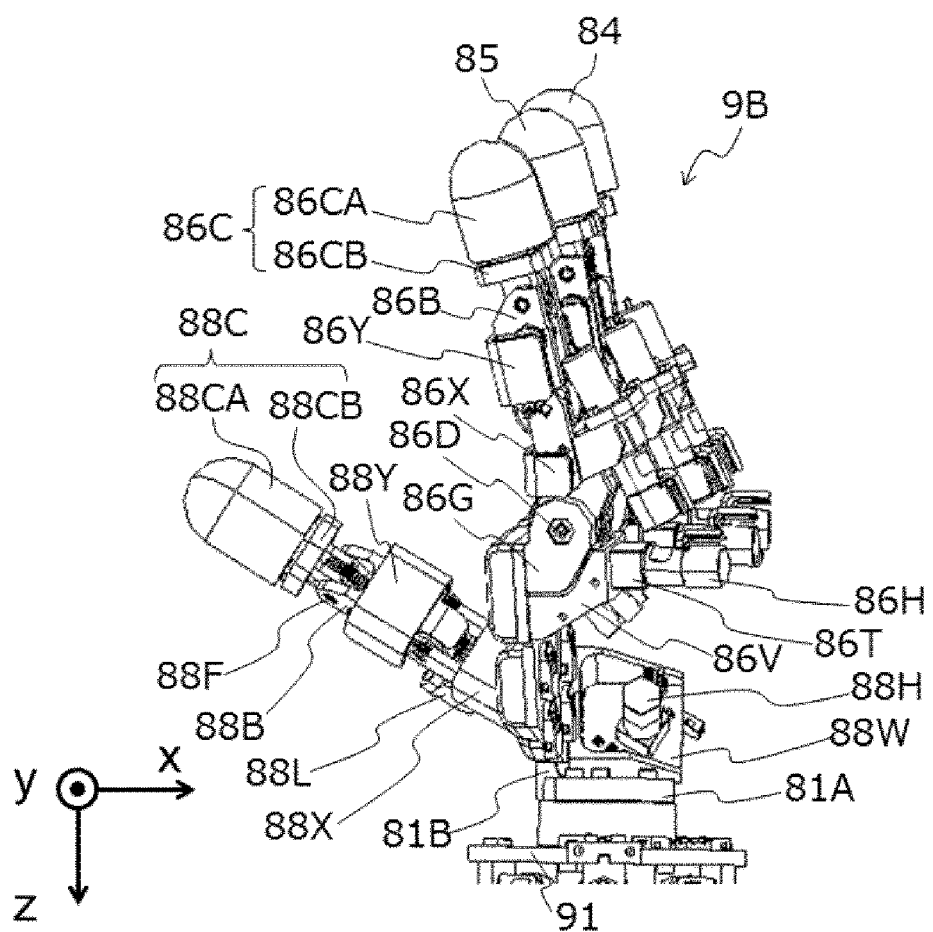
FIG. 115 is a side view illustrating the left hand included in the humanoid robot of the sixth embodiment when the hand breadth rotation finger is directed in the direction intersecting the palm plate viewing from the side existing a fourth finger.
Figure 116:
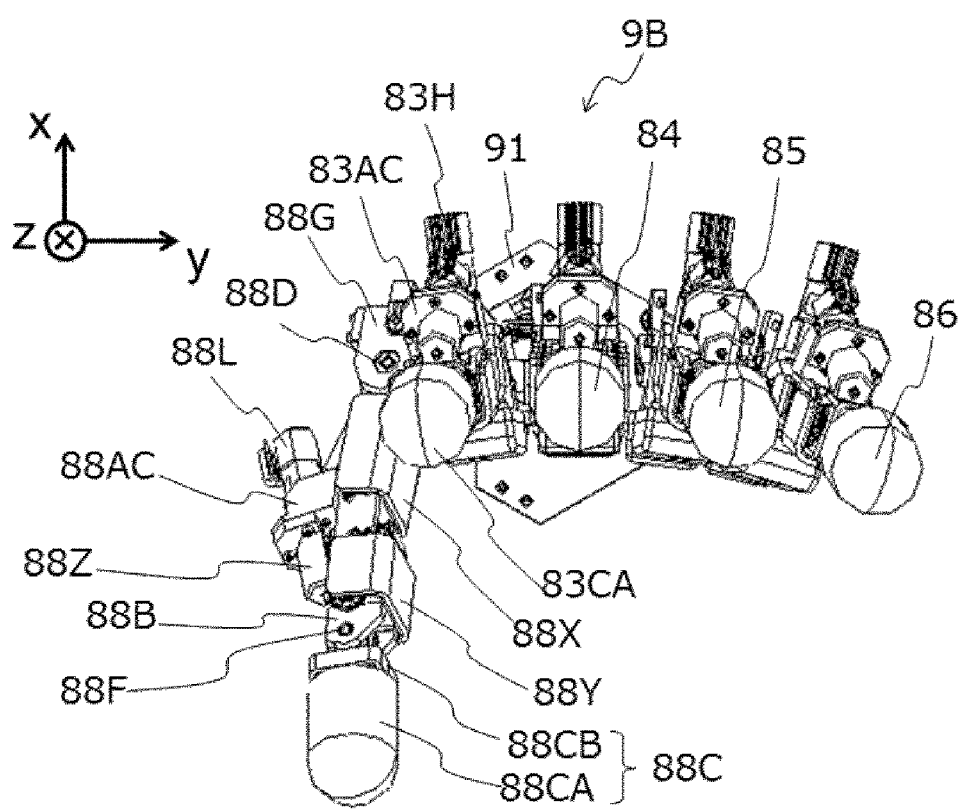
FIG. 116 is a side view illustrating the left hand included in the humanoid robot of the sixth embodiment when the hand breadth rotation finger is directed in the direction intersecting the palm plate viewing from the fingertip side.
Figure 117:
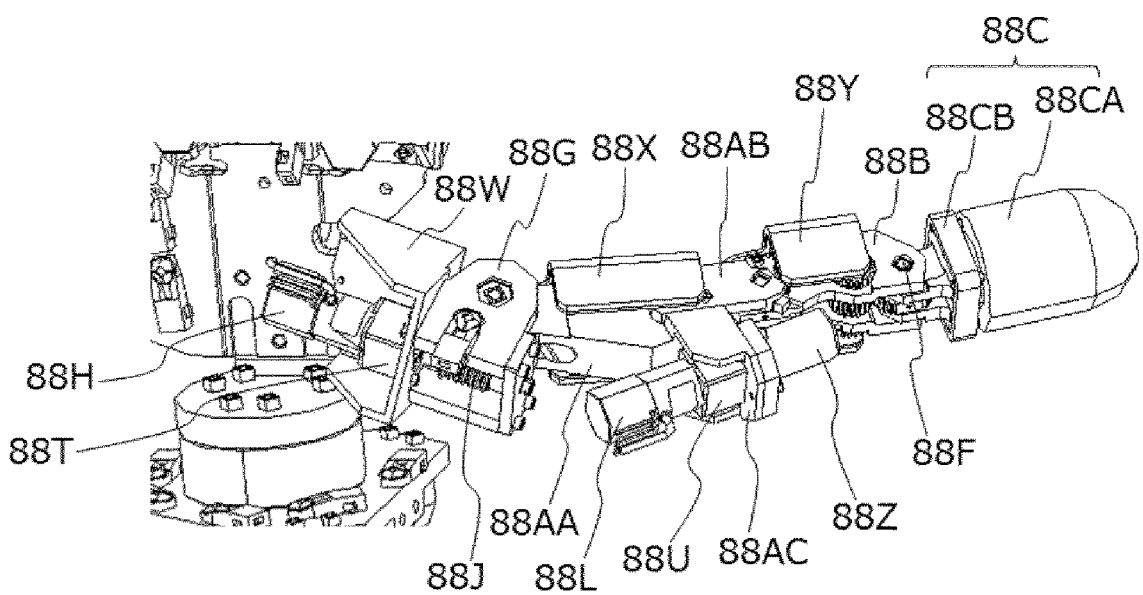
FIG. 117 is an enlarged perspective view illustrating the left hand included in the humanoid robot of the sixth embodiment when the hand breadth rotation finger extends viewing from the backside of the hand.
Figure 118:
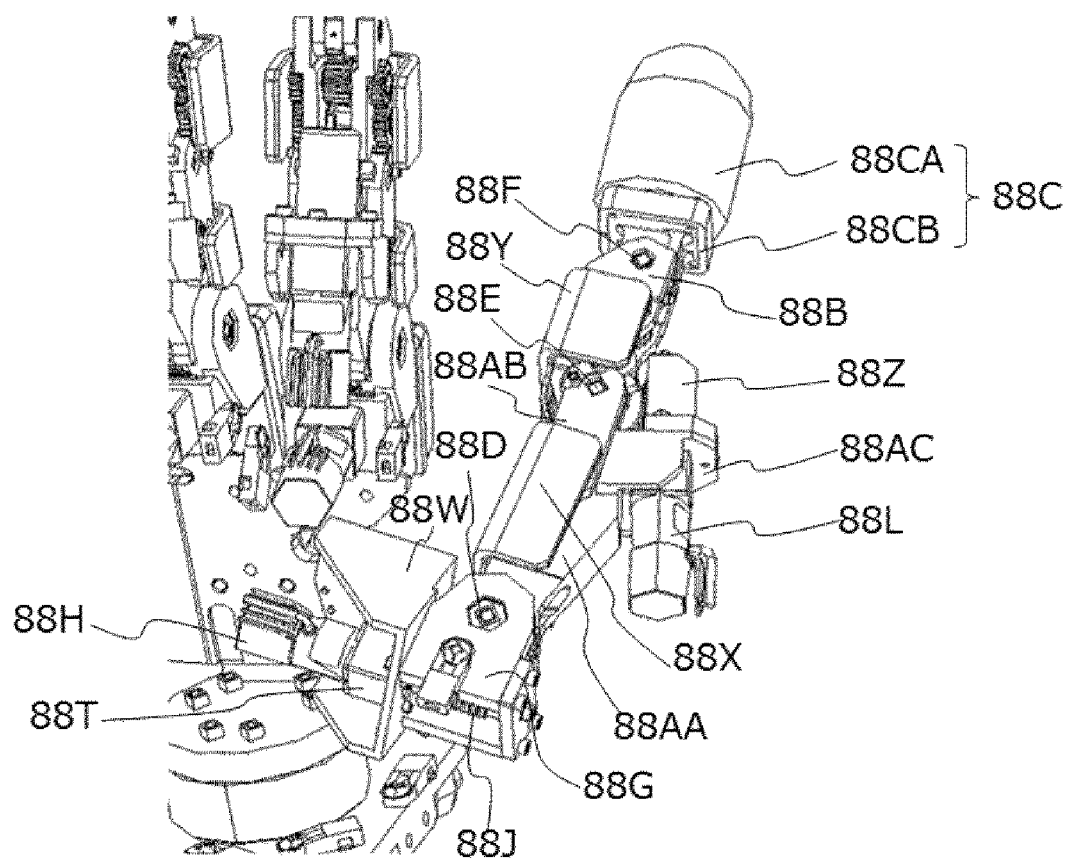
FIG. 118 is an enlarged perspective view illustrating the left hand included in the humanoid robot of the sixth embodiment when the hand breadth rotation finger is directed in the direction intersecting the palm plate viewing from the backside of the hand.

In a sixth embodiment, the fifth embodiment is changed such that the humanoid robot includes the hand including a hand breadth rotation finger in which the entire finger rotates in the hand breadth direction instead of the opposed finger. FIG. 105 is a perspective view illustrating a left hand 9B included in a humanoid robot according to the sixth embodiment when a hand breadth rotation finger 88 extends viewing from the backside of the hand. FIG. 106 is a perspective view illustrating left hand 9B when hand breadth rotation finger 88 is directed in the direction intersecting palm plate 82 viewing from the backside of the hand. FIGS. 107, 108, 109, 110, and 111 are a front view illustrating left hand 9B, a side view illustrating left hand 9B viewing from the side existing first finger 83, a rear view, a side view illustrating left hand 9B viewing from the side existing fourth finger 86, and a side view illustrating left hand 9B viewing from the fingertip side, respectively, when hand breadth rotation finger 88 extends. FIGS. 112, 113, 114, 115, and 116 are a front view illustrating left hand 9B, a side view illustrating left hand 9B viewing from the side existing first finger 83, a rear view, a side view illustrating left hand 9B viewing from the side existing fourth finger 86, and a side view illustrating left hand 9B viewing from the fingertip side, respectively, when hand breadth rotation finger 88 is directed in the direction intersecting palm plate 82. FIGS. 117 and 118 are enlarged perspective views of hand breadth rotation finger 88. FIG. 117 is a perspective view illustrating hand breadth rotation finger 88 when hand breadth rotation finger 88 extends. FIG. 118 is a perspective view illustrating hand breadth rotation finger 88 when hand breadth rotation finger 88 is directed in the direction intersecting palm plate 82.

In FIGS. 105 to 118, a portion up to wrist plate 91 is illustrated. Palm plate 82, first finger 83, second finger 84, third finger 85, and fourth finger 86 have the same structure as the fifth embodiment. The cover and the like omitted in FIGS. 95 to 104 of the fifth embodiment are also illustrated in FIGS. 105 to 118.

A first dactylus cover 83X is a cover that covers a portion in which a first yoke 83AB is attached to first wheel linked part 83AA. First dactylus cover 83X is a member in which a substantially rectangular plate material is bent into a U-shape. The substantially rectangular plate has a substantially rectangular protrusion in the center of one side. First dactylus cover 83X is put on first dactylus 83A from the palm side. The substantially rectangular protrusion has a rounded corner, and is bent such that a step can be formed in the middle of the protrusion.

A second dactylus cover 83Y is a cover that covers second worm wheel 83N and components that exist in a portion not being sandwiched between two plates materials included in second dactylus 83B, that are, partial gear 83Q, idler gear 83R, outer-idler gear 83SA, and the like. Second dactylus cover 83Y has the same shape as first dactylus cover 83X. Second dactylus cover 83Y in the direction along first finger 83 is longer than first dactylus cover 83X.

A second worm cover 83Z is a cover that covers second worm 83M from the backside of the hand. Second worm cover 83Z has a shape in which a cylinder including a bottom only on one side and a flange on the other side is cut in a half in the axial direction. Second worm 83M exists in the cylindrical portion. A flange is attached to the rear surface of the motor installation surface of second motor installation part 83AC. The outer shape of the flange has the same shape as the motor installation surface.

Differences from hand 9A are described. Hand 9B includes hand breadth rotation finger 88 instead of opposed finger 87. Hand breadth rotation finger 88 is attached to palm plate 82 such that the entire finger can rotate in the hand breadth direction. Hand breadth rotation finger 88 is attached to palm plate 82 at the same position as opposed finger 87. Hand breadth rotation finger 88 is attached to a hand breadth rotation finger attaching part 82V that is a part of palm plate 82. Similarly to opposed finger attaching part 82E, hand breadth rotation finger attaching part 82V exists at the corner of palm plate 82, the corner exists on the wrist side in the fingertip direction and on the side existing first finger attaching part 82A in the hand breadth direction. Hand breadth rotation finger attaching part 82V has the same shape as opposed finger attaching part 82E.

In hand breadth rotation finger 88, a portion in the fingertip side from finger base yoke 88G has the same structure as opposed finger 87. Hand breadth rotation finger 88 and opposed finger 87 are different from each other only in the attaching direction to palm plate 82.

Hand breadth rotation finger 88 is attached to palm plate 82 being able to rotate in the hand breadth direction with a box-shaped hand breadth finger base 88W which has two open sides. Hand breadth finger base 88W is interposed between hand breadth rotation finger 88 and palm plate 82. Hand breadth finger base 88W is attached onto the backside of the hand of hand breadth rotation finger attaching part 82V with an angle of about 20 degrees toward the wrist. Finger first motor 88H and second gear head 88T are accommodated in hand breadth finger base 88W, and attached to the motor installation surface that is the surface in the hand breadth direction of hand breadth finger base 88W. A through-hole is made in the motor installation surface, and the rotation shaft of second gear head 88T is inserted in the through-hole. Finger base yoke 88G is attached to the outer surface of the motor installation surface. Finger base yoke 88G is attached such that the shaft member of finger base yoke 88G is parallel to the motor installation surface and forms an angle of about 65 degrees with respect to palm plate 82. Consequently, in the case in that first finger joint 88D is rotated and hand breadth rotation finger 88 is extended, third dactylus 88C is located closer to the fingertip side as compared with palm plate 82, and the object is easily held between hand breadth rotation finger 88 and palm plate 82. Hand breadth finger base 88W includes the sides connected to both of the motor installation surface and the attaching surface to palm plate 82. The corners of the two sides have a shape that is largely cut by a straight line. The side surfaces of hand breadth finger base 88W each has a trapezoidal shape in which an upper base is short while a side is perpendicular to a lower base. The side surface on the wrist side has a shorter side near the attaching surface to palm plate 82 in the trapezoidal shape than that of the other side surface.

Similarly to opposed finger 87, in hand breadth rotation finger 88, first dactylus 88A is longer than first dactylus 83A and other first dactyli. For this reason, first dactylus cover 83X is longer than second dactylus cover 83Y.

The motion is described. In hand 9B, the motor is driven such that the first finger joint and the second finger joint of each finger are set to the designated angle, and such that the worm gear of each finger joint is located at the position corresponding to the designated angle.

Each finger joint is driven by a worm gear mechanism in which a worm and a worm wheel are used, so that strong force to bend the finger can be generated. Each of the first finger joint and the second finger joint are driven by the worm gear mechanism, so that only one or both of the first finger joint and the second finger joint can be bent. When the electric power supply is interrupted, gripping force can be maintained by the worm gear mechanism.

By including hand breadth rotation finger 88 that rotates in the hand breadth direction, the length in the hand breadth direction of hand 9B is larger than that of hand 9A when hand breadth rotation finger 88 is extended. Consequently, hand 9B can hold the larger object as compared with hand 9A. When palm plate 82 faces upward and right and left hands 9B are arranged at the same height, the large object can be held by both hands 9B.

The freely combination of the embodiments or the modification or omission of each embodiment can be made without departing from the scope of the present disclosure.

REFERENCE SIGNS LIST

100, 100X, 100Y, 100Z: humanoid robot
1: trunk
2: head (second member)
2A: head base plate
3: upper limb
4, 4X: lower limb
5: chest (first member, second member)
5U: chest upper portion
5D: chest lower portion
6: waist (first member)
7: upper arm
7A: actuator holder
8: forearm (first member, torsion axis)
9, 9A, 9B: hand (second member)
10, 10X: thigh (second member)
10A: thighbone (torsion axis)
10B: knee-side link attaching plate
10C: knee connecting frame
10D: thigh-side auxiliary tool attaching unit
11, 11X: lower leg
12, 12Y: foot
12A: foot main body
12B: toe
12C: toe joint
12D: heel wheel
12E: foot side-surface wheel
13: shoulder joint
14: upper arm drive main actuator
14L: upper arm drive main link
14M: motor (power source)
15: upper arm drive auxiliary actuator
15L: upper arm drive auxiliary link
15M: motor (power source)
16: intrathoracic joint
17: intrathoracic actuator
17L: intrathoracic link
17M: motor (power source)
18: thoracolumbar joint
19: thoracolumbar center actuator
19A: screw rod
19B: nut
19C: cylinder
19D: nut position fixing unit
19E: nut rotation holding unit
19F: nut gear
19G: drive gear
19L: thoracolumbar center link (variable length link)
19Z: thoracolumbar center actuator
19LZ: thoracolumbar center link (variable length link)
19H: cylinder
19J: piston
19K: pipe
19N: pump
19P: first chamber
19Q: second chamber
19M: motor (power source)
20: thoracolumbar right actuator
20L: thoracolumbar right link (variable length link)
20M: motor (power source)
21: thoracolumbar left actuator
21L: thoracolumbar left link (variable length link)
21M: motor (power source)
22: hip joint
23: thigh front actuator
23L: thigh front link (variable length link)
23M: motor
24: thigh outside actuator
24L: thigh outside link (variable length link)
24M: motor (power source)
25: thigh inside actuator
25L: thigh inside link (variable length link)
25M: motor (power source)
26: neck center rod (torsion axis)

27: neck joint
28: neck rear actuator
28L: neck rear link (variable length link)
28M: motor (power source)
28N: link attachment
29: neck right-side actuator
29L: neck right-side link (variable length link)
29M: motor (power source)
29N: link attachment
30: neck left-side actuator
30L: neck left-side link (variable length link)
30M: motor (power source)
30N: link attachment
31: elbow joint
32: elbow drive outside link
33: elbow drive inside Link
34: upper arm outside actuator
34A: screw rod
34B: nut
34C: rail
34D: gripper
34M: motor (power source)
35: upper arm inside actuator
35A: screw rod
35B: nut
35C: rail
35D: gripper
35M: motor (power source)
36: wrist joint
37: forearm front actuator
37L: forearm front link (variable length link)
37M: motor (power source)
37N: link attachment
38: forearm outside actuator
38L: forearm outside link (variable length link)
38M: motor (power source)
38N: link attachment
39: forearm inside actuator
39L: forearm inside link (variable length link)
39M: motor (power source)
39N: link attachment
40, 40X: knee joint
41: ankle joint
41A: front-back rotation yoke
41B: right-left rotation yoke
42: knee drive actuator
42L: knee drive link
42M: motor (power source)
43: thigh-side auxiliary tool
44: lower leg-side auxiliary tool
45: lower leg outside actuator
45L: lower leg outside link
45M: motor (power source)
46: lower leg inside actuator
46L: lower leg inside link
46M: motor (power source)
47: toe drive actuator
47L: toe drive link
47M: motor (power source)
51: shoulder frame
52: thorax frame
53: thorax front-back coupling frame
54: chest center coupling frame
55: intrathoracic joint frame
56: backbone (torsion axis, coupling rod)
56T: intrathoracic rotation shaft
57: link attaching frame
58: neck lower frame
61: waist main frame
62: lower limb connecting frame
63: waist cover
64: protrusion
65: protrusion
66: protrusion
67: protrusion
81: hand attaching tool
81A: attaching plate
81B: palm plate connecting part
82: palm plate (base)
82A: first finger attaching part (finger base)
82B: second finger attaching part (finger base)
82C: third finger attaching part (finger base)
82D: fourth finger attaching part (finger base)
82E: opposed finger attaching part (finger base)
82F: palm plate main body (main body)
82G, 82P: difference in width
82H, 82J, 82K, 82L, 82M, 82N, 82Q, 82R: notch
82S: wrist attaching part
82T: palm flesh
82U: through-hole
82V: hand breadth rotation finger attaching part (finger base)
83: first finger (ordinary finger)
84: second finger (ordinary finger)
85: third finger (ordinary finger)
86: fourth finger (ordinary finger)
87: opposed finger
88: hand breadth rotation finger
83A, 84A, 85A, 86A, 87A, 88A: first dactylus
83AA, 84AA, 85AA, 86AA, 87AA, 88AA: first wheel linked part
83AB, 84AB, 85AB, 86AB, 87AB, 88AB: first yoke
83AC, 84AC, 85AC, 86AC, 87AC, 88AC: second motor installation part
83AD, 84AD, 85AD, 86AD, 87AD, 88AD: protrusion
83B, 84B, 85B, 86B, 87B, 88B: second dactylus
83C, 84C, 85C, 86C, 87C, 88C: third dactylus
83CA, 84CA, 85CA, 86CA, 87CA, 88CA: fingertip
83CB, 84CB, 85CB, 86CB, 87CB, 88CB: fingertip base
83D, 84D, 85D, 86D, 87D, 88D: first finger joint
83E, 84E, 85E, 86E, 87E, 88E: second finger joint
83F, 84F, 85F, 86F, 87F, 88F: third finger joint
83G, 84G, 85G, 86G, 87G, 88G: finger base yoke
83H, 84H, 85H, 86H, 87H, 88H: finger first motor
83J, 84J, 85J, 86J, 87J, 88J: first worm
83K, 84K, 85K, 86K, 87K, 88K: first worm wheel
83L, 84L, 85L, 86L, 87L, 88L: finger second motor
83M, 84M, 85M, 86M, 87M, 88M: second worm
83N, 84N, 85N, 86N, 87N, 88N: second worm wheel
83P, 84P, 85P, 86P, 87P, 88P: third dactylus drive gear
83Q, 84Q, 85Q, 86Q, 87Q, 88Q: partial gear
83R, 84R, 85R, 86R, 87R, 88R: idler gear
83SA, 84SA, 85SA, 86SA, 87SA, 88SA: outer-idler gear
83SB, 84SB, 85SB, 86SB, 87SB, 88SB: inner-idler gear
83T, 84T, 85T, 86T, 87T, 88T: first gear head
83U, 84U, 85U, 86U, 87U, 88T: second gear head
83V, 84V, 85V, 86V: first motor fixing unit
88W: hand breadth finger base
83X, 84X, 85X, 86X, 88X: first dactylus cover
83Y, 84Y, 85Y, 86Y, 88Y: second dactylus cover
83Z, 84Z, 85Z, 86Z, 88Z: second worm cover
91: wrist plate
98: hand attaching tool
98A: attaching plate 98B: palm plate connecting part
92: palm plate (base)
93: first finger (ordinary finger)
94: second finger (ordinary finger)
95: third finger (ordinary finger)
96: fourth finger (ordinary finger)
97: opposable finger
97T: first dactylus base
97U: first dactylus tip
93A, 94A, 95A, 96A, 97A: first dactylus
93B, 94B, 95B, 96B, 97B: second dactylus
93C, 94C, 95C, 96C, 97C: third dactylus
93D, 94D, 95D, 96D, 97D: first finger joint
93E, 94E, 95E, 96E, 97E: second finger joint
93F, 94F, 95F, 96F, 97F: third finger joint
93G, 94G, 95G, 96G, 97G: finger base yoke
93H, 94H, 95H, 96H, 97H: finger first motor
93J, 94J, 95J, 96J, 97J: first worm
93K, 94K, 95K, 96K, 97K: first worm wheel
93L, 94L, 95L, 96L, 97L: finger second motor
93M, 94M, 95M, 96M, 97M: second worm
93N, 94N, 95N, 96N, 97N: second worm wheel
93P, 94P, 95P, 96P, 97P: third dactylus drive gear
93Q, 94Q, 95Q, 96Q, 97Q: idler gear
93R, 94R, 95R, 96R, 97R: idler gear
93S, 94S, 95S, 96S, 97S: idler gear
J1: chest-side main link attaching unit
J2: chest-side auxiliary link attaching unit
J3: lower intrathoracic link attaching unit
J4: upper intrathoracic link attaching unit
J5: chest center link attaching unit (second-member-side link attaching unit)
J6: chest right link attaching unit (second-member-side link attaching unit)
J7: chest left link attaching unit (second-member-side link attaching unit)
J8: waist right link attaching unit (first-member-side link attaching unit)
J9: waist left link attaching unit (first-member-side link attaching unit)
J10: waist center link attaching unit (first-member-side link attaching unit)
J11: crotch front link attaching unit (first-member-side link attaching unit)
J12: crotch outside link attaching unit (first-member-side link attaching unit)
J13: crotch inside link attaching unit (first-member-side link attaching unit)
J14: neck rear link attaching unit (first-member-side link attaching unit)
J15: neck right-side link attaching unit (first-member-side link attaching unit)
J16: neck left-side link attaching unit (first-member-side link attaching unit)
J17: head rear link attaching unit (second-member-side link attaching unit)
J18: head right-side link attaching unit (second-member-side link attaching unit)
J19: head left-side link attaching unit (second-member-side link attaching unit)
J20: upper arm main link attaching unit
J21: main-link-side auxiliary link attaching unit
J22: upper arm outside link attaching unit (upper-arm-side link attaching unit)
J23: upper arm inside link attaching unit (upper-arm-side link attaching unit)
J24: elbow drive inside link attaching unit (forearm-side main link attaching unit)
J25: elbow drive outside link attaching unit (main-link-side auxiliary link attaching unit)
J26: forearm front link attaching unit (first-member-side link attaching unit)
J27: forearm outside link attaching unit (first-member-side link attaching unit)
J28: elbow drive inside link attaching unit (first-member-side link attaching unit)
J29: hand-side front link attaching unit (second-member-side link attaching unit)
J30: hand-side outside link attaching unit (second-member-side link attaching unit)
J31: hand-side inside link attaching unit (second-member-side link attaching unit)
J32: knee front link attaching unit (second-member-side link attaching unit)
J33: knee outside link attaching unit (second-member-side link attaching unit)
J34: knee inside link attaching unit (second-member-side link attaching unit)
J35: knee drive link attaching unit
J36: thigh-side auxiliary tool attaching unit
J37: knee drive link auxiliary tool connecting unit
J38: lower leg-side auxiliary tool attaching unit
J39: lower leg outside link attaching unit (lower leg-side link attaching unit)
J40: lower leg inside link attaching unit (lower leg-side link attaching unit)
J41: foot outside link attaching unit (foot-side link attaching unit)
J42: foot inside link attaching unit (foot-side link attaching unit)
J43: foot-main-body-side link attaching unit
J44: toe-side link attaching unit
C1: chest bending unit
C2: body bending unit (three-rotational-degree-of-freedom connection mechanism)
C3: neck (three-rotational-degree-of-freedom connection mechanism)
C4: shoulder
C5: elbow
C6: wrist (three-rotational-degree-of-freedom connection mechanism)
C7: crotch (three-rotational-degree-of-freedom connection mechanism)
C8: knee
C9: ankle
C10: intra-foot bending unit
G1, G2, G3: torsion axis
L1, L2, L3: variable length link
T1, T2, T3, T4: second-member-side triangle
Rx1: rotation axis of shoulder joint 13
Rz2: rotation axis of elbow joint 22

The invention claimed is:
1. A three-rotational-degree-of-freedom connection mechanism comprising:
a joint for enabling a second member to rotate with respect to a first member around a torsion axis having a direction being fixed with respect to either the first member or the second member, and to connect the second member rotatably to the first member with three rotational degrees of freedom;

three actuators, each of the three actuators including a variable length link having a variable length and a power source for generating force changing the length of the variable length link;

three first-member-side link attaching units, each of the three first-member-side link attaching units being attached rotatably with one end of each of the three variable length links with at least two rotational degrees of freedom, and being provided in the first member having a fixed relative positional relationship with the joint; and three second-member-side link attaching units, each of the three second-member-side link attaching units being attached rotatably with the other end of each of the three variable length links with at least two rotational degrees of freedom, and being provided in the second member having a fixed relative positional relationship with the joint, wherein the first-member-side link attaching units and the second-member-side link attaching units are disposed such that the variable length link has a twisted relationship with the torsion axis in each state within a movable range of the joint, the three first-member-side link attaching units and a first-member-side torsion center form three first-member-side center angles on a first-member-side link attaching plane determined by the three first-member-side link attaching units, the three first-member-side center angles are determined by three line segments, each of the three line segments connecting the first-member-side torsion center and each of the three first-member-side link attaching units, the first-member-side torsion center is an intersection of the torsion axis and the first-member-side link attaching plane, the three second-member-side link attaching units and a second-member-side torsion center form three second-member-side center angles on a second-member-side link attaching plane determined by the three second-member-side link attaching units, the three second-member-side center angles are determined by three line segments, each of the three line segments connecting the second-member-side torsion center and each of the three second-member-side link attaching units, the second-member-side torsion center is an intersection of the torsion axis and the second-member-side link attaching plane, and the first-member-side link attaching units and the second-member-side link attaching units are disposed such that the three first-member-side center angles differ from the three second-member-side center angles.

2. The three-rotational-degree-of-freedom connection mechanism according to claim 1, wherein the first-member-side link attaching units and the second-member-side link attaching units are disposed such that rotation of the second member around the torsion axis causes lengthening and shortening of the variable length links in a reference state in which rotation can be performed in both directions on at least two rotation axes including the torsion axis.

3. The three-rotational-degree-of-freedom connection mechanism according to claim 1, wherein the first-member-side link attaching units are disposed such that the joint exists on a line segment connecting the two first-member-side link attaching units provided in the first member having a changeable angle with respect to the torsion axis, or the second-member-side link attaching units are disposed such that the joint exists on a line segment connecting the two second-member-side link attaching units provided in the second member having a changeable angle with respect to the torsion axis.

4. The three-rotational-degree-of-freedom connection mechanism according to claim 1, wherein the variable length link includes:

a screw rod being formed with male threads, and being attached to the first-member-side link attaching unit or the second-member-side link attaching unit;

a rotation member including a through-hole having an inner surface formed with female threads meshing with the male threads provided on the screw rod, the rotation member being rotated by transmitted force from the power source;

a tube accommodating the rotation member and the screw rod and being attached to the second-member-side link attaching unit or the first-member-side link attaching unit not being attached with the screw rod;

a rotation member position fixing unit fixing a relative position of the rotation member with respect to the tube in an axial direction of the screw rod; and a rotation member holding unit being provided between the rotation member and the tube and holding the rotation member rotatably with respect to the tube.

5. The three-rotational-degree-of-freedom connection mechanism according to claim 1, wherein the variable length link includes:

a cylinder filled with liquid;

a movable piston dividing an inside of the cylinder into a first chamber and a second chamber;

a pipe filled with the liquid, the pipe connecting the first chamber and the second chamber; and a pump being provided in a middle of the pipe and being driven by the power source, the pump being able to move the liquid from the first chamber to the second chamber and to move the liquid from the second chamber to the first chamber, the piston is attached to the first-member-side link attaching unit or the second-member-side link attaching unit, and the cylinder is attached to the first-member-side link attaching unit or the second-member-side link attaching unit not being attached with the piston.

6. A robot comprising:

a chest;

a pair of right and left upper limbs, each of the upper limbs including an upper arm, a forearm, and a hand, the upper arm, the forearm, and the hand being connected in series to either a right or a left in an upper portion of the chest; and the three-rotational-degree-of-freedom connection mechanism according to claim 1, having the second member being one of the hand, the forearm, and the upper arm, and the first member being far from the hand and being connected rotatably with the second member with three rotational degrees of freedom.

7. A robot comprising:

a waist;

a chest connected above the waist;

a pair of right and left upper limbs, each of the upper limbs including an upper arm, a forearm, and a hand, the upper arm, the forearm, and the hand being connected in series to either a right or a left in an upper portion of the chest; and the three-rotational-degree-of-freedom connection mechanism according to claim 1, having the second member being one of the hand, the forearm, the upper arm, and the chest, and the first member being on a side close to the waist and being connected rotatably with the second member with three rotational degrees of freedom.

8. A robot comprising:
a waist;
a chest connected above the waist;
a pair of right and left upper limbs, each of the upper limbs including an upper arm, a forearm, and a hand, the upper arm, the forearm, and the hand being connected in series to either a right or a left of an upper portion of the chest;
a pair of right and left lower limbs, each of the lower limbs including a thigh, a lower leg, and a foot, the thigh, the lower leg, and the foot being connected in series to either a right or a left of a lower portion of the waist; and
the three-rotational-degree-of-freedom connection mechanism according to claim 1, having the second member being one of the hand, the forearm, the upper arm, the chest, the foot, the lower leg, and the thigh, and the first member being on a side close to the waist and being connected rotatably with the second member with three rotational degrees of freedom.

9. A robot comprising:
a waist;
a chest connected above the waist;
a pair of right and left upper limbs, each of the upper limbs including an upper arm, a forearm, and a hand, the upper arm, the forearm, and the hand being connected in series to either a right or a left of an upper portion of the chest;
a pair of right and left lower limbs, each of the lower limbs including a thigh, a lower leg, and a foot, the thigh, the lower leg, and the foot being connected in series to either a right or a left of a lower portion of the waist; and
a pair of right and left crotches, each of the crotches being the three-rotational-degree-of-freedom connection mechanism according to claim 1 having the second member being either the right thigh or left thigh and the first member being the waist,
wherein in the crotch, a normal line of a plane determined by the three first-member-side link attaching units is directed forward and obliquely downward.

10. A robot comprising:
a waist;
a chest connected above the waist;
a pair of right and left upper limbs, each of the upper limbs including an upper arm, a forearm, and a hand, the upper arm, the forearm, and the hand being connected in series to either a right or a left of an upper portion of the chest;
a pair of right and left lower limbs, each of the lower limbs including a thigh, a lower leg, and a foot, the thigh, the lower leg, and the foot being connected in series to either a right or a left of a lower portion of the waist;
a pair of right and left crotches, each of the crotches being the three-rotational-degree-of-freedom connection mechanism according to claim 1 having the second member being either the right thigh or left thigh and the first member being the waist, and
a pair of right and left knee joints connecting the right and left lower legs rotatably to the right and left thighs, respectively,
wherein in a reference state, the knee joint exists behind the torsion axis included in the crotch.

11. The robot according to claim 8, further comprising a pair of right and left hip joints connecting the right and left thighs rotatably to the waist with three rotational degrees of freedom, respectively,
wherein the hip joint includes a spherical member including a spherical surface protruding outward and obliquely upward from the waist and a spherical surface receiving member provided at an end of the thigh to hold rotatably the spherical surface of the spherical member with three rotational degrees of freedom.

12. The robot according to claim 8, further comprising an ankle connecting the foot rotatably to the lower leg,
wherein the ankle includes:
an ankle joint connecting a lower portion of the lower leg and the foot with at least two rotational degrees of freedom;
two ankle actuators, each of the two ankle actuators including an ankle link having a variable length and a power source for generating force changing the length of the ankle link;
two lower leg-side link attaching units, each of the two lower leg-side link attaching units being attached rotatably with one end of the ankle link with at least two rotational degrees of freedom, and being provided in the lower leg; and
two foot-side link attaching units, each of the two foot-side link attaching units being attached rotatably with the other end of the ankle link with at least two rotational degrees of freedom, and being provided in the foot at a position behind the ankle joint with a longer interval than an interval between the two lower leg-side link attaching units.

13. The robot according to claim 8, further comprising a knee connecting the right and left lower legs rotatably to the thighs with one rotational degree of freedom, respectively,
wherein the knee includes:
a knee joint connecting the thigh and the lower leg rotatably with one rotational degree of freedom;
a knee drive actuator including a knee drive link having a variable length and a power source for generating force changing the length of the knee drive link;
a knee drive link attaching unit being attached rotatably to one end of the knee drive link, and being provided on a rear side of the thigh;
a thigh-side auxiliary tool having one end being attached rotatably to the other end of the knee drive link;
a thigh-side auxiliary tool attaching unit being attached rotatably with the other end of the thigh-side auxiliary tool, and being provided on the rear side of the thigh;
a lower leg-side auxiliary tool having one end being attached rotatably to the other end of the knee drive link; and
a lower leg-side auxiliary tool attaching unit being attached rotatably with the other end of the lower leg-side auxiliary tool, and provided on the rear side of the lower leg.

14. A robot comprising:
a waist;
a chest connected above the waist;
a pair of right and left upper limbs, each of the upper limbs including an upper arm, a forearm, and a hand, the upper arm, the forearm, and the hand being connected in series to either a right or a left of an upper portion of the chest;

a pair of right and left lower limbs, each of the lower limbs including a thigh, a lower leg, and a foot, the thigh, the lower leg, and the foot being connected in series to either a right or a left of a lower portion of the waist; and a body bending unit being the three-rotational-degree-of-freedom connection mechanism according to claim 1 having the second member being the chest and the first member being the waist, wherein a coupling rod extending downward from the chest is provided in the chest in the body bending unit, and the body bending unit includes:

a thoracolumbar joint being the joint connecting a tip of the coupling rod and the waist with three rotational degrees of freedom;

two of the three variable length links extending from positions existing on a front side in the chest to positions existing on a rear side in the waist respectively so as to sandwich the coupling rod; and one of the three variable length link extending from a center position in right and left direction existing on the rear side in the chest to a position existing behind the thoracolumbar joint in the waist.

15. The robot according to claim 8, wherein the chest includes a chest upper portion connected with the upper arms, a chest lower portion connected to the waist, and a chest bending unit connecting the chest upper portion rotatably to the chest lower portion with at least one rotational degree of freedom.

16. The robot according to claim 6, further comprising a pair of right and left shoulders connecting the right and left upper arms rotatably to the chest with two rotational degrees of freedom, respectively, wherein the shoulder includes:

a shoulder joint connecting the upper arm rotatably to the chest with two rotational degrees of freedom, the shoulder including a rotation axis extending from either a right end or a left end of the upper portion of the chest in a direction being directed to the side far from the center of the chest and the rear side, the shoulder joint allowing rotation around the rotation axis and rotation changing an angle formed by the rotation axis and the upper arm;

a chest-side main link attaching unit provided in the chest at a position being below the shoulder joint;

an upper arm main link attaching unit provided in the upper arm;

an upper arm drive main actuator including an upper arm drive main link having a variable length and a power source for generating force changing the length of the upper arm drive main link, one end of the upper arm drive main link being attached rotatably to the upper arm main link attaching unit with at least two rotational degrees of freedom, the other end of the upper arm drive main link being attached rotatably to the chest-side main link attaching unit with at least two rotational degrees of freedom;

a chest-side auxiliary link attaching unit provided in the chest at a position being below the shoulder joint and sandwiching the shoulder joint in a front-back direction together with the upper arm main link attaching unit;

a main-link-side auxiliary link attaching unit provided in the upper arm drive main link; and an upper arm drive auxiliary actuator including an upper arm drive auxiliary link having a variable length and a power source for generating force changing the length of the upper arm drive auxiliary link, one end of the upper arm drive auxiliary link being attached rotatably to the main-link-side auxiliary link attaching unit, the other end of the upper arm drive auxiliary link being attached rotatably to the chest-side auxiliary link attaching unit with at least two rotational degrees of freedom.

17. The robot according to claim 6, further comprising a pair of right and left elbows connecting the right and left forearms rotatably to the upper arm with two rotational degrees of freedom, respectively, wherein the elbow includes:

an elbow joint connecting the forearm and the upper arm with two rotational degrees of freedom;

an elbow drive main link having a fixed length;

an elbow drive auxiliary link having a fixed length;

a forearm-side main link attaching unit being attached rotatably with one end of the elbow drive main link with at least two rotational degrees of freedom, and being provided in the forearm;

a main-link-side auxiliary link attaching unit being attached rotatably with one end of the elbow drive auxiliary link with at least two rotational degrees of freedom, and being provided on the elbow drive main link;

two upper-arm-side link attaching units, each of the two upper-arm-side link attaching units being attached rotatably with the other end of either the elbow drive main link or the elbow drive auxiliary link with at least two rotational degrees of freedom, and being provided in the upper arm so as to be movable along the upper arm; and two linear actuators, each of the two linear actuators including a moving member for moving each of the two upper-arm-side link attaching units, a guide for guiding the moving member to be moved along the upper arm, and a power source for generating force changing a position of the moving member with respect to the guide.

18. The robot according to claim 6, wherein the hand includes a base connected to the forearm and at least three fingers, each of the at least three fingers including a first dactylus, a second dactylus, and a third dactylus, the first dactylus, the second dactylus, and the third dactylus being connected in series from the base, and three finger joints connecting a tip-side member being one of the first dactylus, the second dactylus, and the third dactylus rotatably to a base-side member being a member provided on a side existing the base, in each of a first finger joint being the finger joint connecting the first dactylus rotatably to the base and a second finger joint being the finger joint connecting the second dactylus rotatably to the first dactylus, the tip-side member is rotated with respect to the base-side member by a worm gear mechanism, the worm gear mechanism including a motor disposed in the base-side member, a worm rotated by the motor, and a worm wheel meshing with the worm to rotate around a rotation shaft of the finger joint together with tip-side member, and the first dactylus is rotated with respect to the base by the first finger joint including the worm gear mechanism, and is connected rotatably to the second dactylus by the second finger joint including the worm gear mechanism.

19. A robot comprising:
a chest;
a head connected to an upper center of the chest;
a pair of right and left upper limbs, each of the upper limbs including an upper arm, a forearm, and a hand, the upper arm, the forearm, and the hand being connected in series to either a right or a left in an upper portion of the chest; and
the three-rotational-degree-of-freedom connection mechanism according to claim 1 having the second member being one of the head, the hand, the forearm, and the upper arm, and the first member being far from the hand and being connected rotatably with the second member with three rotational degrees of freedom.

20. A robot arm comprising:
a hand;
one or a plurality of arm section units connected in series from the hand; and
the three-rotational-degree-of-freedom connection mechanism according to claim 1, connecting the second member being one of the hand and the arm section unit rotatably to the first member on a side far from the hand with three rotational degrees of freedom.

\* \* \* \* \*